(12) United States Patent
Mukaigaito et al.

(10) Patent No.: US 8,126,712 B2
(45) Date of Patent: Feb. 28, 2012

(54) INFORMATION COMMUNICATION TERMINAL, INFORMATION COMMUNICATION SYSTEM, INFORMATION COMMUNICATION METHOD, AND STORAGE MEDIUM FOR STORING AN INFORMATION COMMUNICATION PROGRAM THEREOF FOR RECOGNIZING SPEECH INFORMATION

(75) Inventors: Takeya Mukaigaito, Tokyo (JP); Shinya Takada, Tokyo (JP); Daigoro Yokozeki, Tokyo (JP); Miki Sakai, Tokyo (JP); Rie Sakai, Tokyo (JP); Katsuya Arai, Tokyo (JP); Takuo Nishihara, Tokyo (JP); Takahiko Murayama, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 1053 days.

(21) Appl. No.: 11/815,839

(22) PCT Filed: Feb. 8, 2006

(86) PCT No.: PCT/JP2006/302195
§ 371 (c)(1), (2), (4) Date: Aug. 8, 2007

(87) PCT Pub. No.: WO2006/085565
PCT Pub. Date: Aug. 17, 2006

(65) Prior Publication Data
US 2009/0018832 A1    Jan. 15, 2009

(30) Foreign Application Priority Data

Feb. 8, 2005 (JP) ................................. 2005-032063
Jun. 20, 2005 (JP) ................................. 2005-179198
Jun. 20, 2005 (JP) ................................. 2005-179207
Jun. 20, 2005 (JP) ................................. 2005-179235
Dec. 13, 2005 (JP) ................................. 2005-358481
Dec. 15, 2005 (JP) ................................. 2005-362390
Dec. 15, 2005 (JP) ................................. 2005-362395

(51) Int. Cl.
*G10L 15/00* (2006.01)
(52) U.S. Cl. ........ 704/251; 704/231; 704/255; 704/270; 704/242
(58) Field of Classification Search .................. 704/251, 704/270, 231, 242, 255
See application file for complete search history.

(56) References Cited

U.S. PATENT DOCUMENTS 6,006,221 A * 12/1999 Liddy et al. ........................... 1/1
(Continued)

FOREIGN PATENT DOCUMENTS

JP         03-022167        1/1991
(Continued)

OTHER PUBLICATIONS

PCT/JP2006/302195 International Search Report mailed May 2, 2006.

*Primary Examiner* — Douglas Godbold
(74) *Attorney, Agent, or Firm* — Kilpatrick Townsend & Stockton LLP

(57) ABSTRACT

An information communication terminal (100) that includes: a speech recognition module (6) for recognizing speech information to identify a plurality of words in the recognized speech information; a storage medium (20) for storing keyword extraction condition setting data (24) in which a condition for extracting a keyword is set; a keyword extraction module (8) for reading the keyword extraction condition setting data (24) to extract a plurality of keywords from the plurality of words; a related information acquisition module (11) for acquiring related information related to a plurality of keywords; and a related information output module (14) for providing related information to a monitor (2).

32 Claims, 93 Drawing Sheets

U.S. PATENT DOCUMENTS

| | | | |
|---|---|---|---|
| 6,266,631 B1 * | 7/2001 | Higginbotham et al. | 704/1 |
| 6,751,621 B1 * | 6/2004 | Calistri-Yeh et al. | 1/1 |
| 7,152,031 B1 * | 12/2006 | Jensen et al. | 704/10 |
| 7,295,967 B2 * | 11/2007 | Corman et al. | 704/9 |
| 7,542,902 B2 * | 6/2009 | Scahill et al. | 704/251 |
| 7,617,196 B2 * | 11/2009 | Dettinger et al. | 1/1 |
| 2002/0103647 A1 | 8/2002 | Houplain | 704/260 |
| 2002/0107827 A1 * | 8/2002 | Benitez-Jimenez et al. | 706/59 |
| 2002/0133483 A1 | 9/2002 | Klenk et al. | 707/3 |
| 2003/0130976 A1 * | 7/2003 | Au | 706/55 |
| 2003/0191627 A1 * | 10/2003 | Au | 704/9 |
| 2004/0093328 A1 * | 5/2004 | Damle | 707/3 |
| 2004/0220893 A1 * | 11/2004 | Spivack et al. | 706/46 |
| 2004/0230676 A1 * | 11/2004 | Spivack et al. | 709/223 |
| 2005/0055213 A1 * | 3/2005 | Claudatos et al. | 704/270.1 |
| 2005/0060332 A1 * | 3/2005 | Bernstein et al. | 707/100 |
| 2005/0075886 A1 * | 4/2005 | LeFebvre et al. | 704/276 |
| 2005/0080772 A1 * | 4/2005 | Bem | 707/3 |
| 2005/0154690 A1 * | 7/2005 | Nitta et al. | 706/46 |
| 2006/0200435 A1 * | 9/2006 | Flinn et al. | 706/12 |
| 2008/0235018 A1 * | 9/2008 | Eggen et al. | 704/251 |

FOREIGN PATENT DOCUMENTS

| | | |
|---|---|---|
| JP | 03-190348 | 8/1991 |
| JP | 03-268161 | 11/1991 |
| JP | 04-020998 | 1/1992 |
| JP | 04-290158 | 10/1992 |
| JP | 07-182347 | 7/1995 |
| JP | 08-137874 | 5/1996 |
| JP | 08-147324 | 6/1996 |
| JP | 09-146954 | 6/1997 |
| JP | 09-153055 | 6/1997 |
| JP | 10-069482 | 3/1998 |
| JP | 11-007447 | 1/1999 |
| JP | 2000-151800 | 5/2000 |
| JP | 2000-152207 | 5/2000 |
| JP | 2001-117581 | 4/2001 |
| JP | 2001-229180 | 8/2001 |
| JP | 2001-237969 | 8/2001 |
| JP | 2001-273293 | 10/2001 |
| JP | 2001-285527 | 10/2001 |
| JP | 2002-165193 | 6/2002 |
| JP | 2002-190879 | 7/2002 |
| JP | 2002-247240 | 8/2002 |
| JP | 2002-261939 | 9/2002 |
| JP | 2002-297645 | 10/2002 |
| JP | 2003-115951 | 4/2003 |
| JP | 2004-272831 | 9/2004 |
| JP | 2004-349851 | 12/2004 |

* cited by examiner

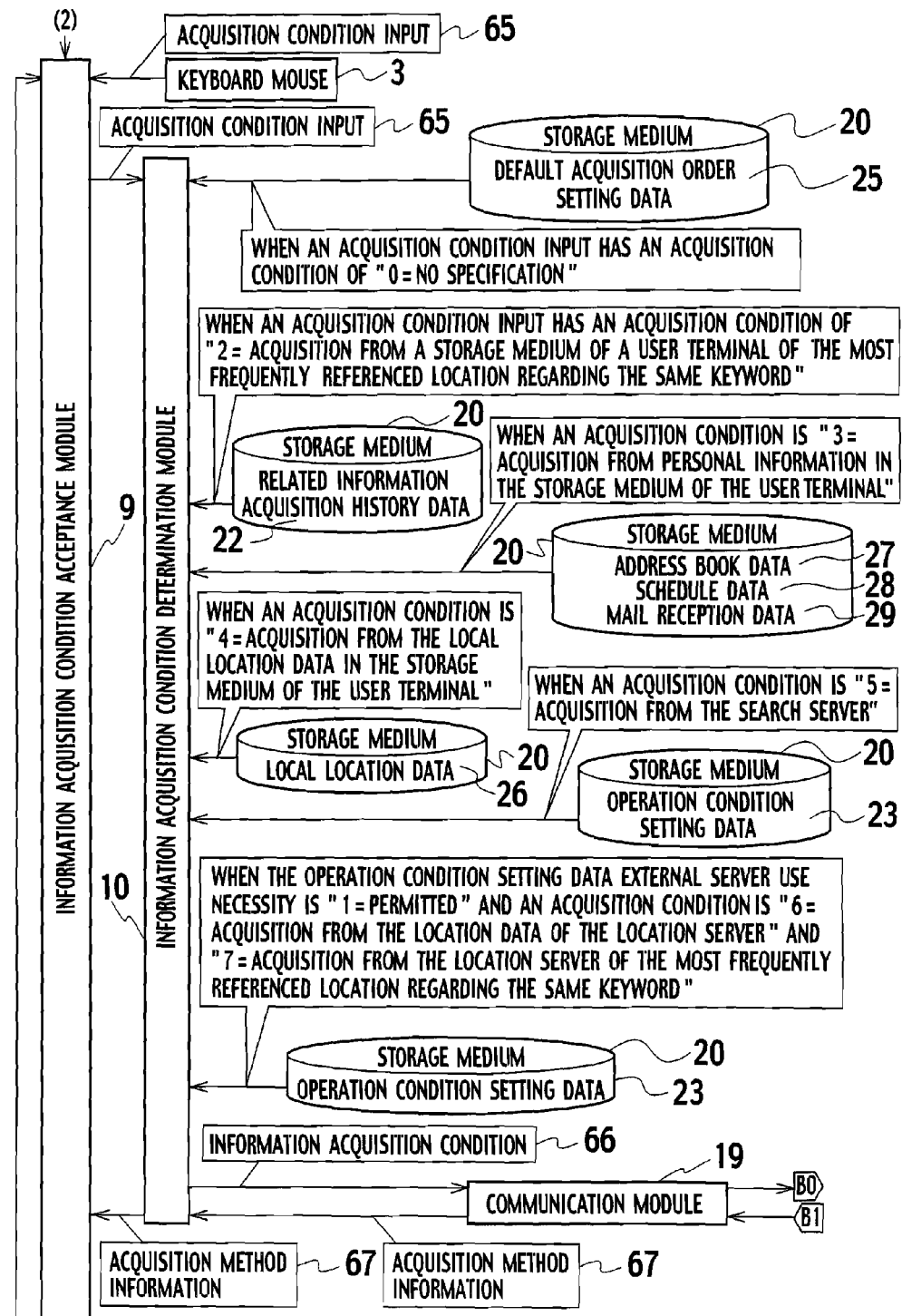

FIG. 14

OPERATION CONDITION SETTING DATA

| ITEM | VALUE | EXAMPLE OF VALUE |
|---|---|---|
| REQUESTING CALLING PARTY ID | CALLING PARTY ID FOR WHICH KEYWORD OPERATION CONDITION IS SET | 05011111112 |
| INFORMATION ACQUISITION CONDITION INPUT NECESSITY | SET THE DISPLAY OF A KEYWORD ON A SCREEN, KEYWORD SETTING BY A USER FOR INFORMATION ACQUISITION, AND THE NECESSITY OF AN ACQUISITION CONDITION INPUT. EXAMPLE: "0 = NOT REQUIRED" "1 = REQUIRED" | 1 |
| ADVERTISEMENT DISPLAY NECESSITY | SET THE NECESSITY OF THE DISPLAY OF ADVERTISEMENT ON A SCREEN. EXAMPLE: "0 = NOT REQUIRED" "1 = REQUIRED" | 1 |
| EXTERNAL SERVER USE NECESSITY | SET THE USE OF LOCATION DATA OF A LOCATION SERVER ON NETWORK AND WHETHER RELATED INFORMATION ACQUISITION HISTORY CAN BE SENT TO THE LOCATION SERVER OR NOT. EXAMPLE: "0 = NOT REQUIRED" "1 = REQUIRED" WHEN "PERMITTED", THE USER SETS, AS AN ACQUISITION CONDITION OF THE RELATED INFORMATION ACQUISITION MODULE, "6 = ACQUISITION FROM THE LOCATION DATA OF THE LOCATION SERVER"; AND "7 = ACQUISITION FROM THE LOCATION SERVER OF THE MOST FREQUENTLY REFERENCED LOCATION REGARDING THE SAME KEYWORD". | 1 |
| DEFAULT COMMON CONDITION SETTING | COMMON CONDITIONS WHEN NO INPUT IS PERFORMED FROM A USER FOR COMMON CONDITIONS. EXAMPLE: "0 = NOT REQUIRED" "1 = REQUIRED" | |
| ADVERTISEMENT INFORMATION SERVER LOCATION | LOCATION OF ADVERTISEMENT INFORMATION SERVER (EX., URL) | |
| SEARCH SERVER LOCATION | LOCATION OF SEARCH SERVER (EX., URL) | |
| LOCATION SERVER LOCATION (TO BE ACQUIRED LOCATION) | LOCATION OF LOCATION SERVER FOR LOCATION INFORMATION ACQUISITION (EX., URL) | |
| LOCATION SERVER LOCATION (FOR HISTORY) | LOCATION OF LOCATION SERVER FOR HISTORY REGISTRATION (EX., URL) | |

FIG. 15

KEYWORD EXTRACTION CONDITION SETTING DATA

| ITEM | VALUE | EXAMPLE OF VALUE |
|---|---|---|
| REQUESTING CALLING PARTY ID | CALLING PARTY ID FOR WHICH A KEYWORD EXTRACTION CONDITION IS SET | 05011111112 |
| PROPER NAME EXTRACTION NECESSITY | SET WHETHER A PROPER NAME MUST BE EXTRACTED BY A KEYWORD EXTRACTION MODULE OR NOT.<br>EXAMPLES: "0 = NOT EXTRACTED"<br>"1 = EXTRACTED" | 1 |
| NOUN EXTRACTION NECESSITY | SET WHETHER A NOUN MUST BE EXTRACTED BY A KEYWORD EXTRACTION MODULE OR NOT.<br>EXAMPLES: "0 = NOT EXTRACTED"<br>"1 = EXTRACTED" | 1 |
| VERB EXTRACTION NECESSITY | SET WHETHER A VERB MUST BE EXTRACTED BY A KEYWORD EXTRACTION MODULE OR NOT.<br>EXAMPLES: "0 = NOT EXTRACTED"<br>"1 = EXTRACTED" | 0 |

FIG. 16

DEFAULT ACQUISITION ORDER SETTING DATA

| ITEM | VALUE | EXAMPLE OF VALUE |
|---|---|---|
| REQUESTING CALLING PARTY ID | CALLING PARTY ID FOR WHICH A DEFAULT ACQUISITION ORDER IS SET. | 05011111112 |
| FIRST DEFAULT ACQUISITION CONDITION | SET AN ACQUISITION CONDITION THAT IS FIRSTLY APPLIED WHEN A USER SPECIFIES AN ACQUISITION CONDITION OF "0 = NO SPECIFICATION". EXAMPLE : " 1 = ACQUISITION FROM A LOCATION SPECIFIED BY A USER " "2 = ACQUISITION FROM A STORAGE MEDIUM OF A USER TERMINAL OF THE MOST FREQUENTLY REFERENCED LOCATION REGARDING THE SAME KEYWORD". "3 = ACQUISITION FROM PERSONAL INFORMATION IN THE STORAGE MEDIUM OF THE USER TERMINAL" "4 = ACQUISITION FROM THE LOCAL LOCATION DATA IN THE STORAGE MEDIUM OF THE USER TERMINAL" "5 = ACQUISITION FROM THE SEARCH SERVER" "6 = ACQUISITION FROM THE LOCATION DATA OF THE LOCATION SERVER" "7 = ACQUISITION FROM THE LOCATION SERVER OF THE MOST FREQUENTLY REFERENCED LOCATION REGARDING THE SAME KEYWORD" | 1 |
| SECOND DEFAULT ACQUISITION CONDITION | SET AN ACQUISITION CONDITION THAT IS SECONDLY APPLIED WHEN A USER SPECIFIES AN ACQUISITION CONDITION OF "0 = NO SPECIFICATION". *THE SAME SETTING EXAMPLES AS THOSE OF THE DEFAULT ACQUISITION CONDITION 1. | 2 |
| THIRD DEFAULT ACQUISITION CONDITION | SET AN ACQUISITION CONDITION THAT IS THIRDLY APPLIED WHEN A USER SPECIFIES AN ACQUISITION CONDITION OF "0 = NO SPECIFICATION". *THE SAME SETTING EXAMPLES AS THOSE OF THE DEFAULT ACQUISITION CONDITION 1. | 3 |
| FOURTH DEFAULT ACQUISITION CONDITION | SET AN ACQUISITION CONDITION THAT IS FOURTHLY APPLIED WHEN A USER SPECIFIES AN ACQUISITION CONDITION OF "0 = NO SPECIFICATION". *THE SAME SETTING EXAMPLES AS THOSE OF THE DEFAULT ACQUISITION CONDITION 1. | 4 |
| FIFTH DEFAULT ACQUISITION CONDITION | SET AN ACQUISITION CONDITION THAT IS FIFTHLY APPLIED WHEN A USER SPECIFIES AN ACQUISITION CONDITION OF "0 = NO SPECIFICATION". *THE SAME SETTING EXAMPLES AS THOSE OF THE DEFAULT ACQUISITION CONDITION 1. | 5 |
| SIXTH DEFAULT ACQUISITION CONDITION | SET AN ACQUISITION CONDITION THAT IS SIXTHLY APPLIED WHEN A USER SPECIFIES AN ACQUISITION CONDITION OF "0 = NO SPECIFICATION". *THE SAME SETTING EXAMPLES AS THOSE OF THE DEFAULT ACQUISITION CONDITION 1. | 6 |
| SEVENTH DEFAULT ACQUISITION CONDITION | SET AN ACQUISITION CONDITION THAT IS SEVENTHLY APPLIED WHEN A USER SPECIFIES AN ACQUISITION CONDITION OF "0 = NO SPECIFICATION". *THE SAME SETTING EXAMPLES AS THOSE OF THE DEFAULT ACQUISITION CONDITION 1. | 7 |

FIG. 17

EXTRACTED KEYWORD HISTORY DATA

| ITEM | VALUE | EXAMPLE OF VALUE |
|---|---|---|
| EXTRACTION DATE AND TIME | DATE AND TIME AT WHICH A KEYWORD IS EXTRACTED BY THE KEYWORD EXTRACTION MODULE | 20041010133045 |
| CALL ID | ID UNIQUELY SHOWING THE ID OF A KEYWORD TO BE EXTRACTED | 15 DIGIT CHARACTER STRING INCLUDING DATE |
| REQUESTING CALLING PARTY ID | ID UNIQUELY SHOWING A CALLING PARTY OF AN INFORMATION ACQUISITION REQUEST | 05011111112 |
| FIRST CALLING PARTY ID | ID UNIQUELY SHOWING A CALLING PARTY PARTICIPATING IN THE CALL | 05011111111 |
| SECOND CALLING PARTY ID | ID UNIQUELY SHOWING A CALLING PARTY PARTICIPATING IN THE CALL | 05011111112 |
| THIRD CALLING PARTY ID | ID UNIQUELY SHOWING A CALLING PARTY PARTICIPATING IN THE CALL | 05011111113 |
| FOURTH CALLING PARTY ID | ID UNIQUELY SHOWING A CALLING PARTY PARTICIPATING IN THE CALL | 05011111114 |
| FIFTH CALLING PARTY ID | ID UNIQUELY SHOWING A CALLING PARTY PARTICIPATING IN THE CALL | 05011111115 |
| SPEAKER ID | ID UNIQUELY SHOWING A CALLING PARTY HAVING COMMUNICATION INCLUDING A KEYWORD | 05011111111 |
| EXTRACTED KEYWORD | EXTRACTED KEYWORD | MOVIE |

FIG. 18

RELATED INFORMATION ACQUISITION HISTORY DATA

| ITEM | VALUE | EXAMPLE OF VALUE |
|---|---|---|
| ACCEPTANCE DATE AND TIME | DATE AND TIME AT WHICH AN ACQUISITION CONDITION FOR KEYWORD-RELATED INFORMATION IS ACCEPTED BY THE INFORMATION ACQUISITION CONDITION ACCEPTANCE MODULE | 20041010133045 |
| CALL ID | ID UNIQUELY SHOWING A CAL OF A KEYWORD TO BE EXTRACTED | 15 DIGIT CHARACTER STRING INCLUDING DATE |
| REQUESTING CALLING PARTY ID | ID UNIQUELY SHOWING A CALLING PARTY OF AN INFORMATION ACQUISITION REQUESTING PARTY | 05011111112 |
| REQUESTED KEYWORD | KEYWORD FOR WHICH INFORMATION ACQUISITION IS REQUESTED | MOVIE |
| ACQUISITION CONDITION | DATA SHOWING INFORMATION ACQUISITION METHOD<br>EXAMPLES: "0 = NO SPECIFICATION"<br>"1 = ACQUISITION FROM A LOCATION SPECIFIED BY A USER"<br>"2 = ACQUISITION FROM A STORAGE MEDIUM OF A USER TERMINAL OF THE MOST FREQUENTLY REFERENCED LOCATION REGARDING THE SAME KEYWORD"<br>"3 = ACQUISITION FROM PERSONAL INFORMATION IN THE STORAGE MEDIUM OF THE USER TERMINAL"<br>"4 = ACQUISITION FROM THE LOCAL LOCATION DATA IN THE STORAGE MEDIUM OF THE USER TERMINAL"<br>"5 = ACQUISITION FROM THE SEARCH SERVER"<br>"6 = ACQUISITION FROM THE LOCATION DATA OF THE LOCATION SERVER"<br>"7 = ACQUISITION FROM THE LOCATION SERVER OF THE MOST FREQUENTLY REFERENCED LOCATION REGARDING THE SAME KEYWORD"<br>"8 = ACQUISITION FROM ADVERTISEMENT SERVER" | 0 |
| COMMON CONDITION | DATA SHOWING THE NECESSITY OF THE ACQUIRED INFORMATION<br>EXAMPLES: "0 = NOT REQUIRED"    "1 = REQUIRED" | 1 |
| REQUESTED DATA LOCATION | LOCATION SPECIFIED BY A USER WHEN THE REQUEST CONDITION IS "1" | http://www.zzz.co.jp |
| ACQUIRED DATA LOCATION | LOCATION AT WHICH THE INFORMATION IS ACQUIRED BY THE RELATED INFORMATION OUTPUT MODULE | http://www.zzz.co.jp |

FIG. 19

LOCAL LOCATION DATA

| ITEM | VALUE | EXAMPLE OF VALUES |
|---|---|---|
| REQUESTING CALLING PARTY ID | ID UNIQUELY IDENTIFYING THE CALLING PARTY OF THE INFORMATION ACQUISITION REQUESTING PARTY | 05011111112 |
| REGISTRATION DATE AND TIME | SET REGISTRATION DATE AND TIME OF LOCATION DATA RECORD | 20041001000000 |
| VALID DATE AND TIME | SET VALID DATE AND TIME OF LOCATION DATA RECORD | 20041031235959 |
| KEYWORD | SET A KEYWORD FOR WHICH A DATA LOCATION IS SET | MOVIE |
| DATA LOCATION | SET A DATA LOCATION FOR WHICH INFORMATION IS ACQUIRED BY THE RELATED INFORMATION ACQUISITION MODULE | http://www.zzz.co.jp |

FIG. 20

LOCATION DATA

| ITEM | VALUE | EXAMPLE OF VALUES |
|---|---|---|
| REGISTRATION DATE AND TIME | SET REGISTRATION DATE AND TIME OF LOCATION DATA RECORD | 20041001000000 |
| VALID DATE AND TIME | SET VALID DATE AND TIME OF LOCATION DATA RECORD | 20041031235959 |
| KEYWORD | SET A KEYWORD FOR WHICH A DATA LOCATION IS SET | MOVIE |
| DATA LOCATION | SET A DATA LOCATION FOR WHICH INFORMATION IS ACQUIRED BY THE RELATED INFORMATION ACQUISITION MODULE | http://www.zzz.co.jp |

FIG. 21

HISTORY DATA

| ITEM | VALUE | EXAMPLE OF VALUES |
|---|---|---|
| ACCEPTANCE DATE AND TIME | DATE AND TIME AT WHICH HISTORY DATA IS ACQUIRED BY THE HISTORY INFORMATION ACQUISITION MODULE OF THE LOCATION SERVER | 20041010133045 |
| REQUESTED KEYWORD | KEYWORD FOR WHICH INFORMATION ACQUISITION IS REQUESTED | MOVIE |
| ACQUISITION CONDITION | DATA SHOWING INFORMATION ACQUISITION METHOD<br>EXAMPLES "0 = NO SPECIFICATION"<br>"1 = ACQUISITION FROM A LOCATION SPECIFIED BY A USER"<br>"2 = ACQUISITION FROM A STORAGE MEDIUM OF A USER TERMINAL OF THE MOST FREQUENTLY REFERENCED LOCATION REGARDING THE SAME KEYWORD"<br>"3 = ACQUISITION FROM PERSONAL INFORMATION IN THE STORAGE MEDIUM OF THE USER TERMINAL"<br>"4 = ACQUISITION FROM THE LOCAL LOCATION DATA IN THE STORAGE MEDIUM OF THE USER TERMINAL"<br>"5 = ACQUISITION FROM THE SEARCH SERVER"<br>"6 = ACQUISITION FROM THE LOCATION DATA OF THE LOCATION SERVER"<br>"7 = ACQUISITION FROM THE LOCATION SERVER OF THE MOST FREQUENTLY REFERENCED LOCATION REGARDING THE SAME KEYWORD" | 0 |
| ACQUIRED DATA LOCATION | LOCATION AT WHICH INFORMATION IS ACQUIRED BY THE RELATED INFORMATION ACQUISITION MODULE | http://www.zzz.co.jp |

FIG. 22

ADVERTISEMENT DATA

| ITEM | VALUE | EXAMPLE OF VALUES |
|---|---|---|
| REGISTRATION DATE AND TIME | SET REGISTRATION DATE AND TIME OF AN ADVERTISEMENT DATA RECORD | 20041001000000 |
| VALID DATE AND TIME | SET VALID DATE AND TIME OF AN ADVERTISEMENT DATA RECORD | 20041031235959 |
| KEYWORD | SET A KEYWORD FOR WHICH ADVERTISEMENT INFORMATION IS DISPLAYED | MOVIE |
| ADVERTISEMENT INFORMATION | INFORMATION FOR ADVERTISEMENT CONTENTS DISPLAYED TO A USER | |

FIG. 27

- EMOTION INFORMATION HISTORY DATA -

| ITEM | VALUE | EXAMPLE OF VALUES |
|---|---|---|
| ACCEPTANCE DATE AND TIME | DATE ANT TIME AT WHICH EMOTION INFORMATION IS ACCEPTED BY THE EMOTION INFORMATION DISPLAY UNIT | 20041010133045 |
| CALLING PARTY ID | CALLING PARTY ID OF A TERMINAL THAT HAS DETECTED EMOTION INFORMATION | 15 DIGIT CHARACTER STRING INCLUDING DATE |
| EMOTION INFORMATION | INFORMATION SHOWING AN DETECTED EMOTION | 8, 3, 0, 0 (EVALUATION OF DELIGHT, ANGER, SORROW AND PLEASURE BASED ON 10 LEVELS) |

FIG. 28

- OPERATION CONDITION SETTING DATA -

| ITEM | VALUE | EXAMPLE OF VALUES |
|---|---|---|
| SELF TERMINAL CALLING PARTY ID | CALLING PARTY ID OF SELF TERMINAL | 05011111112 |
| EMOTION INFORMATION TRANSMISSION PERMISSION/ PROHIBITION | SET WHETHER THE TRANSMISSION OF EMOTION INFORMATION TO A TERMINAL HAVING COMMUNICATION IS PERMITTED OR FORBIDDEN. EXAMPLES: "0 = FOR BIDDEN" "1 = PERMITTED" | 1 |

FIG. 36

OPERATION CONDITION SETTING DATA

| ITEM | VALUE | EXAMPLE OF VALUES |
|---|---|---|
| REQUESTING CALLING PARTY ID | CALLING PARTY ID FOR WHICH A KEYWORD OPERATION CONDITION IS SET | 05011111112 |
| INFORMATION ACQUISITION CONDITION INPUT NECESSITY | SET THE DISPLAY OF A KEYWORD ON A SCREEN, SPECIFICATION BY A USER OF A KEYWORD FOR WHICH INFORMATION IS ACQUIRED, AND WHETHER THE ACQUISITION CONDITION INPUT IS NEEDED OR NOT. EXAMPLES: "0 = NOT REQUIRED" "1 = REQUIRED" | 1 |
| SPEECH RECOGNITION RESULT TRANSMISSION NECESSITY | WHETHER THE TRANSMISSION FROM THE CALL PARTY OF TO THE INFORMATION COMMUNICATION TERMINAL OF WORD INFORMATION AND A REQUESTING CALLING PARTY ID IS NEEDED OR NOT. EXAMPLES: "0 = NOT REQUIRED" "1 = REQUIRED" | 1 |
| ADVERTISEMENT DISPLAY NECESSITY | SET WHETHER ADVERTISEMENT NEEDS TO BE DISPLAYED ON A SCREEN OR NOT. EXAMPLES: "0 = NOT REQUIRED" "1 = REQUIRED" | 1 |
| WARNING DATA ACQUISITION NECESSITY | SET WHETHER WARNING DATA NEEDS TO BE ACQUIRED FROM THE WARNING INFORMATION SERVER OR NOT. EXAMPLES: "0 = NOT REQUIRED" "1 = REQUIRED" | 1 |
| COMMUNICATION CUTOFF NECESSITY | SET THE NECESSITY OF A COMMUNICATION CUTOFF. EXAMPLES: "0 = NOT REQUIRED" "1 = REQUIRED" | 1 |
| RECORDING NECESSITY | SET WHETHER COMMUNICATION NEEDS TO BE RECORDED OR NOT. EXAMPLES: "0 = NOT REQUIRED" "1 = REQUIRED" | 1 |
| EXTERNAL SERVER USE NECESSITY | SET WHETHER LOCATION DATA ON A LOCATION SERVER ON THE NETWORK NEEDS TO BE USED OR NOT AND WHETHER THE TRANSMISSION OF A RELATED INFORMATION ACQUISITION HISTORY TO THE LOCATION SERVER IS REQUIRED OR NOT. EXAMPLES: "0 = NOT REQUIRED" "1 = REQUIRED" WHEN "PERMITTED", THE USER SETS, AS AN ACQUISITION CONDITION OF A RELATED INFORMATION ACQUISITION MODULE: "6 = ACQUISITION FROM THE LOCATION DATA OF THE LOCATION SERVER" AND "7 = ACQUISITION FROM THE LOCATION SERVER OF THE MOST FREQUENTLY REFERENCED LOCATION REGARDING THE SAME KEYWORD". | 1 |
| DEFAULT COMMON CONDITION SETTING | A COMMON CONDITION USED WHEN NO INPUT FROM A USER FOR A COMMON CONDITION IS PERFORMED. EXAMPLES: "0 = NOT REQUIRED" "1 = REQUIRED" | |
| ADVERTISEMENT INFORMATION SERVER LOCATION | LOCATION OF ADVERTISEMENT INFORMATION SERVER (EX., URL) | |
| WARNING INFORMATION SERVER LOCATION | LOCATION OF A WARNING INFORMATION SERVER (EX., URL) | |
| SEARCH INFORMATION SERVER LOCATION | LOCATION OF A SEARCH SERVER (EX., URL) | |
| INFORMATION SERVER LOCATION (TO BE ACQUIRED LOCATION) | LOCATION OF A LOCATION SERVER FOR LOCATION INFORMATION ACQUISITION (EX., URL) | |
| INFORMATION SERVER LOCATION (FOR HISTORY) | LOCATION OF A LOCATION SERVER FOR HISTORY REGISTRATION (EX., URL) | |

FIG. 37

WARNING CONDITION SETTING DATA

| ITEM | VALUE | EXAMPLE OF VALUES |
|---|---|---|
| REQUESTING CALLING PARTY ID | CALLING PARTY ID FOR WHICH DEFAULT ACQUISITION IS SET | 05011111112 |
| KEYWORD NON DETECTION WARNING SETTING TIME | A WAITING TIME AFTER WHICH THE KEYWORD NON DETECTION WARNING INFORMATION IS DISPLAYED WHEN KEYWORD GENERATED BY A CALLING PARTY IS NOT DETECTED | 120 SECONDS |
| KEYWORD NON DETECTION WARNING INFORMATION | WARNING INFORMATION DISPLAYED ON A MONITOR WHEN A KEYWORD GENERATED BY A CALL PARTY IS NOT DETECTED WITHIN THE KEYWORD NON DETECTION WARNING SETTING TIME | USER KEYWORD OF A CALLING PARTY IDXXXXXXXX IS NOT DETECTED |
| FIRST VALID DATE AND TIME | VALID DATE AND TIME OF A FIRST WARNING DATA RECORD | 2004103123595959 |
| FIRST WARNING OBJECT KEYWORD SET | A FIRST KEYWORD SET FOR WHICH THE DETECTION NUMBER IS COUNTED | TRAFFIC ACCIDENT, SETTLEMENT, BANK ACCOUNT |
| FIRST WARNING ISSUE DETECTION NUMBER | A FIRST ACCUMULATED DETECTION NUMBER OF KEYWORDS IN A FIRST WARNING OBJECT KEYWORD SET. WHEN THE FIRST ACCUMULATED DETECTION NUMBER IS EXCEEDED, THE FIRST WARNING INFORMATION IS DISPLAYED ON THE MONITOR. | 5 |
| FIRST WARNING OBJECT KEYWORD SET DETECTION WARNING INFORMATION | FIRST INFORMATION DISPLAYED ON THE MONITOR WHEN KEYWORDS IN THE FIRST WARNING OBJECT KEYWORD SET HAVE THE ACCUMULATED DETECTION NUMBER EXCEEDING THE FIRST ACCUMULATED DETECTION NUMBER | WARNING! THIS MAY BE "ORE-ORE" TELEPHONE FRAUD |
| SECOND VALID DATE AND TIME | VALID DATE AND TIME OF A SECOND WARNING DATA RECORD | 2004103123595959 |
| SECOND WARNING OBJECT KEYWORD SET | A SECOND KEYWORD SET FOR WHICH THE DETECTION NUMBER IS COUNTED | PREGNANCY, ABORTION, BANK ACCOUNT |
| SECOND WARNING ISSUE DETECTION NUMBER | A SECOND ACCUMULATED DETECTION NUMBER OF KEYWORDS IN A SECOND WARNING OBJECT KEYWORD SET. WHEN THE SECOND ACCUMULATED DETECTION NUMBER IS EXCEEDED, THE SECOND WARNING INFORMATION IS DISPLAYED ON THE MONITOR. | 3 |
| SECOND WARNING OBJECT KEYWORD SET DETECTION WARNING INFORMATION | SECOND INFORMATION DISPLAYED ON THE MONITOR WHEN KEYWORDS IN THE SECOND WARNING OBJECT KEYWORD SET HAVE THE ACCUMULATED DETECTION NUMBER EXCEEDING THE SECOND ACCUMULATED DETECTION NUMBER | WARNING! THIS MAY BE "ORE-ORE" TELEPHONE FRAUD. |
| THIRD VALID DATE AND TIME | VALID DATE AND TIME OF A THIRD WARNING DATA RECORD | 2004103123595959 |
| THIRD WARNING OBJECT KEYWORD SET | A THIRD KEYWORD SET FOR WHICH THE DETECTION NUMBER IS COUNTED | DEBT, GUARANTEE, COURSES |
| THIRD WARNING ISSUE DETECTION NUMBER | A THIRD ACCUMULATED DETECTION NUMBER OF KEYWORDS IN A THIRD WARNING OBJECT KEYWORD SET. WHEN THE THIRD ACCUMULATED DETECTION NUMBER IS EXCEEDED, THE THIRD WARNING INFORMATION IS DISPLAYED ON THE MONITOR. | 5 |
| THIRD WARNING OBJECT KEYWORD SET DETECTION WARNING INFORMATION | THIRD INFORMATION DISPLAYED ON THE MONITOR WHEN KEYWORDS IN THE THIRD WARNING OBJECT KEYWORD SET HAVE THE ACCUMULATED DETECTION NUMBER EXCEEDING THE THIRD ACCUMULATED DETECTION NUMBER | WARNING! THIS MAY BE "ORE-ORE" TELEPHONE FRAUD. |

FIG. 38

WARNING DATA

| ITEM | VALUE | EXAMPLE OF VALUES |
|---|---|---|
| FIRST REGISTRATION DATE AND TIME | REGISTRATION DATE AND TIME OF FIRST WARNING DATA RECORD | 200410010000000 |
| FIRST VALID DATE AND TIME | VALID DATE AND TIME OF FIRST WARNING DATA RECORD | 20041031235959 |
| FIRST WARNING OBJECT KEYWORD SET | FIRST KEYWORD SET FOR WHICH THE DETECTION NUMBER IS COUNTED | TRAFFIC ACCIDENT, SETTLEMENT, BANK ACCOUNT |
| FIRST WARNING ISSUE DETECTION NUMBER | A FIRST ACCUMULATED DETECTION NUMBER OF KEYWORDS IN A FIRST WARNING OBJECT KEYWORD SET. WHEN THE FIRST ACCUMULATED DETECTION NUMBER IS EXCEEDED, THE FIRST WARNING INFORMATION IS DISPLAYED ON THE MONITOR. | 5 |
| FIRST WARNING DISPLAY INFORMATION | FIRST INFORMATION DISPLAYED ON THE MONITOR WHEN KEYWORDS IN THE FIRST WARNING OBJECT KEYWORD SET HAVE THE ACCUMULATED DETECTION NUMBER EXCEEDING THE FIRST ACCUMULATED DETECTION NUMBER. | WARNING! THIS MAY BE "ORE-ORE" TELEPHONE FRAUD |
| SECOND REGISTRATION DATE AND TIME | REGISTRATION DATE AND TIME OF SECOND WARNING DATA RECORD | 200410010000000 |
| SECOND VALID DATE AND TIME | VALID DATE AND TIME OF FIRST SECOND DATA RECORD | 20041031235959 |
| SECOND WARNING OBJECT KEYWORD SET | SECOND KEYWORD SET FOR WHICH THE DETECTION NUMBER IS COUNTED | PREGNANCY, ABORTION, BANK ACCOUNT |
| SECOND WARNING ISSUE DETECTION NUMBER | A SECOND ACCUMULATED DETECTION NUMBER OF KEYWORDS IN A SECOND WARNING OBJECT KEYWORD SET. WHEN THE SECOND ACCUMULATED DETECTION NUMBER IS EXCEEDED, THE SECOND WARNING INFORMATION IS DISPLAYED ON THE MONITOR. | 3 |
| SECOND WARNING DISPLAY INFORMATION | SECOND INFORMATION DISPLAYED ON THE MONITOR WHEN KEYWORDS IN THE SECOND WARNING OBJECT KEYWORD SET HAVE THE ACCUMULATED DETECTION NUMBER EXCEEDING THE SECOND ACCUMULATED DETECTION NUMBER. | WARNING! THIS MAY BE "ORE-ORE" TELEPHONE FRAUD |
| THIRD REGISTRATION DATE AND TIME | REGISTRATION DATE AND TIME OF THIRD WARNING DATA RECORD | 200410010000000 |
| THIRD VALID DATE AND TIME | VALID DATE AND TIME OF THIRD WARNING DATA RECORD | 20041031235959 |
| THIRD WARNING OBJECT KEYWORD SET | THIRD KEYWORD SET FOR WHICH THE DETECTION NUMBER IS COUNTED | DEBT, GUARANTEE, COURSES |
| THIRD WARNING ISSUE DETECTION NUMBER | A THIRD ACCUMULATED DETECTION NUMBER OF KEYWORDS IN A THIRD WARNING OBJECT KEYWORD SET. WHEN THE THIRD ACCUMULATED DETECTION NUMBER IS EXCEEDED, THE THIRD WARNING INFORMATION IS DISPLAYED ON THE MONITOR. | 5 |
| THIRD WARNING DISPLAY INFORMATION | THIRD INFORMATION DISPLAYED ON THE MONITOR WHEN KEYWORDS IN THE THIRD WARNING OBJECT KEYWORD SET HAVE THE ACCUMULATED DETECTION NUMBER EXCEEDING THE THIRD ACCUMULATED DETECTION NUMBER. | WARNING! THIS MAY BE "ORE-ORE" TELEPHONE FRAUD |

FIG. 42 — OPERATION CONDITION SETTING DATA

| ITEM | VALUE | EXAMPLE OF VALUES |
|---|---|---|
| REQUESTING CALLING PARTY ID | CALLING PARTY ID FOR WHICH A KEYWORD OPERATION CONDITION IS SET | 05011111112 |
| INFORMATION ACQUISITION CONDITION INPUT NECESSITY | SET THE DISPLAY OF A KEYWORD ON THE SCREEN, SPECIFICATION BY A USER OF A KEYWORD FOR INFORMATION ACQUISITION, AND WHETHER AN INPUT OF AN ACQUISITION CONDITION IS REQUIRED OR NOT. EXAMPLES: "0 = NOT REQUIRED" "1 = REQUIRED" | 1 |
| ADVERTISEMENT DISPLAY NECESSITY | SET WHETHER ADVERTISEMENT NEEDS TO BE DISPLAYED ON A SCREEN OR NOT. EXAMPLES: "0 = NOT REQUIRED" "1 = REQUIRED" | 1 |
| EXTERNAL SERVER USE NECESSITY | SET THE USE OF LOCATION DATA OF A LOCATION SERVER ON NETWORK AND WHETHER RELATED INFORMATION ACQUISITION HISTORY CAN BE SENT TO THE LOCATION SERVER OR NOT. EXAMPLES: "0 = NOT REQUIRED" "1 = REQUIRED" WHEN "PERMITTED", THE USER CAN SETS, AS AN ACQUISITION CONDITION OF THE RELATED INFORMATION ACQUISITION MODULE, "6 = ACQUISITION FROM THE LOCATION DATA OF THE LOCATION SERVER", AND "7 = ACQUISITION FROM THE LOCATION SERVER OF THE MOST FREQUENTLY REFERENCED LOCATION REGARDING THE SAME KEYWORD" | 1 |
| EXTERNAL KEYWORD EXTRACTION SERVER USE PERMISSION | SET WHETHER A KEYWORD EXTRACTION SERVER ON THE NETWORK CAN BE USED OR NOT EXAMPLES: "0 = NOT REQUIRED" "1 = REQUIRED" | |
| DEFAULT COMMON CONDITION SETTING | A COMMON CONDITIONS WHEN NO INPUT IS PERFORMED FROM A USER FOR A COMMON CONDITIONS IS PERFORMED. EXAMPLES: "0 = NOT REQUIRED" "1 = REQUIRED" | |
| ADVERTISEMENT INFORMATION SERVER LOCATION | LOCATION OF AN ADVERTISEMENT INFORMATION SERVER (EX., URL) | |
| SEARCH INFORMATION SERVER LOCATION | LOCATION OF A SEARCH SERVER (EX., URL) | |
| SERVER LOCATION (TO BE ACQUIRED LOCATION) | LOCATION OF A LOCATION SERVER FOR LOCATION INFORMATION ACQUISITION (EX., URL) | |
| SERVER LOCATION (FOR HISTORY) | LOCATION OF A LOCATION SERVER FOR HISTORY REGISTRATION (EX., URL) | |
| KEYWORD EXTRACTION SERVER LOCATION | LOCATION OF A KEYWORD EXTRACTION SERVER (EX., URL) | |

FIG. 43

EXTRACTED KEYWORD HISTORY DATA

| ITEM | VALUE | EXAMPLE OF VALUES |
|---|---|---|
| EXTRACTION DATE AND TIME | DATE AND TIME AT WHICH A KEYWORD IS EXTRACTED BY A KEYWORD EXTRACTION MODULE | 2004101013345 |
| CALL ID | ID UNIQUELY IDENTIFYING A CALL OF A TO-BE-EXTRACTED KEYWORD | 15 DIGIT CHARACTER STRING INCLUDING DATE |
| REQUESTING CALLING PARTY ID | ID UNIQUELY IDENTIFYING A CALLING PARTY OF AN INFORMATION ACQUISITION REQUESTING PARTY | 05011111112 |
| FIRST CALLING PARTY ID | ID UNIQUELY IDENTIFYING A CALLING PARTY PARTICIPATING IN A CALL | 05011111111 |
| SECOND CALLING PARTY ID | ID UNIQUELY IDENTIFYING A CALLING PARTY PARTICIPATING IN A CALL | 05011111112 |
| THIRD CALLING PARTY ID | ID UNIQUELY IDENTIFYING A CALLING PARTY PARTICIPATING IN A CALL | 05011111113 |
| THE FOURTH CALLING PARTY ID | ID UNIQUELY IDENTIFYING A CALLING PARTY PARTICIPATING IN A CALL | 05011111114 |
| THE FIFTH CALLING PARTY ID | ID UNIQUELY IDENTIFYING A CALLING PARTY PARTICIPATING IN A CALL | 05011111115 |
| SPEAKER ID | ID UNIQUELY IDENTIFYING A CALLING PARTY GENERATING A KEYWORD IN THE COMMUNICATION | 05011111111 |
| EXTRACTED KEYWORD | AN EXTRACTED KEYWORD | MOVIE |
| EXTRACTED KEYWORD TYPE | DATA SHOWING A TYPE OF AN EXTRACTED KEYWORD EXAMPLES: "0" KEYWORD INCLUDED IN THE WORD INFORMATION "1" KEYWORD NOT INCLUDED IN THE WORD INFORMATION | 0 |

FIG. 44

RELATED INFORMATION ACQUISITION HISTORY DATA

| ITEM | VALUE | EXAMPLE OF VALUES |
|---|---|---|
| ACCEPTANCE DATE AND TIME | DATE AND TIME AT WHICH A CONDITION FOR ACQUIRING KEYWORD-RELATED INFORMATION IS ACCEPTED BY THE INFORMATION ACQUISITION CONDITION ACCEPTANCE MODULE | 2004101013 3045 |
| CALL ID | ID UNIQUELY SHOWING A CALL OF A TO-BE-EXTRACTED KEYWORD | 15 DIGIT CHARACTER STRING INCLUDING DATE |
| REQUESTING CALLING PARTY ID | ID UNIQUELY SHOWING A CALL OF AN INFORMATION ACQUISITION REQUESTING PARTY | 05011111112 |
| REQUESTED KEYWORD | A KEYWORD FOR WHICH INFORMATION ACQUISITION IS REQUESTED | MOVIE |
| REQUESTED KEYWORD TYPE | DATA SHOWING THE TYPE OF AN EXTRACTED KEYWORD<br>EXAMPLES: "0" = KEYWORD INCLUDED IN WORD INFORMATION<br>"1" = KEYWORD NOT INCLUDED IN WORD INFORMATION | 0 |
| ACQUISITION CONDITION | DATA SHOWING AN INFORMATION ACQUISITION METHOD<br>EXAMPLES: "0 = NO SPECIFICATION"<br>"1 = ACQUISITION FROM A LOCATION SPECIFIED BY A USER"<br>"2 = ACQUISITION FROM A STORAGE MEDIUM OF A USER TERMINAL OF THE MOST FREQUENTLY REFERENCED LOCATION REGARDING THE SAME KEYWORD"<br>"3 = ACQUISITION FROM PERSONAL INFORMATION IN THE STORAGE MEDIUM OF THE USER TERMINAL"<br>"4 = ACQUISITION FROM THE LOCAL LOCATION DATA IN THE STORAGE MEDIUM OF THE USER TERMINAL"<br>"5 = ACQUISITION FROM THE SEARCH SERVER"<br>"6 = ACQUISITION FROM THE LOCATION DATA OF THE LOCATION SERVER"<br>"7 = ACQUISITION FROM THE LOCATION SERVER OF THE MOST FREQUENTLY REFERENCED LOCATION REGARDING THE SAME KEYWORD"<br>"8 = ACQUISITION FROM THE ADVERTISEMENT INFORMATION SERVER" | 0 |
| COMMON CONDITION | DATA SHOWING WHETHER THE ACQUIRED INFORMATION NEEDS TO BE SHARED OR NOT<br>EXAMPLES: "0 = NOT REQUIRED"<br>"1 = REQUIRED" | 1 |
| REQUESTED DATA LOCATION | LOCATION SPECIFIED BY A USER WHEN THE REQUEST CONDITION IS "1" | http://www.ntt.co.jp |
| ACQUIRED DATA LOCATION | LOCATION AT WHICH THE INFORMATION IS ACQUIRED BY THE RELATED INFORMATION OUTPUT MODULE | http://www.ntt.co.jp |

FIG. 45

-HISTORY DATA

| ITEM | VALUE | EXAMPLE OF VALUES |
|---|---|---|
| ACCEPTANCE DATE AND TIME | DATE AND TIME AT WHICH HISTORY DATA IS ACQUIRED BY THE HISTORY INFORMATION ACQUISITION MODULE OF THE LOCATION SERVER | 20041010133045 |
| REQUESTED KEYWORD | KEYWORD FOR WHICH INFORMATION ACQUISITION IS REQUESTED | MOVIE |
| REQUESTED KEYWORD TYPE | DATA SHOWING THE TYPE OF AN EXTRACTED KEYWORD<br>EXAMPLES : "0" = KEYWORD INCLUDED IN WORD INFORMATION<br>"1" = KEYWORD NOT INCLUDED IN WORD INFORMATION | 0 |
| ACQUISITION CONDITION | DATA SHOWING AN INFORMATION ACQUISITION METHOD<br>EXAMPLES : "1"=ACQUISITION FROM A LOCATION SPECIFIED BY A USER"<br>"2"=ACQUISITION FROM A STORAGE MEDIUM OF A USER TERMINAL OF THE MOST FREQUENTLY REFERENCED LOCATION REGARDING THE SAME KEYWORD"<br>"4"=ACQUISITION FROM THE LOCAL LOCATION DATA IN THE STORAGE MEDIUM OF THE USER TERMINAL"<br>"5"=ACQUISITION FROM THE SEARCH SERVER"<br>"6"=ACQUISITION FROM THE LOCATION DATA OF THE LOCATION SERVER"<br>"7"=ACQUISITION FROM THE LOCATION SERVER OF THE MOST FREQUENTLY REFERENCED LOCATION REGARDING THE SAME KEYWORD" | 0 |
| ACQUIRED DATA LOCATION | LOCATIONLOCATION AT WHICH INFORMATION IS ACQUIRED BY THE RELATED INFORMATION OUTPUT MODULE | http://www.ntt.co.jp |

| ITEM NAME | EXAMPLE | DESCRIPTION |
|---|---|---|
| ID | 1 | ·GIVE A UNIQUE ID TO EACH VOCABULARY<br>·GIVE DIFFERENT IDS TO PIECES OF VOCABULARY EVEN WHEN THE PIECES OF VOCABULARY REPRESENT AN IDENTICAL IDEOGRAPHICAL REPRESENTATION |
| NOTATION | TOZAISEN | NOTATION |
| READING SOUND | TOZAISEN | PRONUNCIATION OF THE NOTATION |

(TOZAISEN) →

FIG. 52

| ID | NOTATION | READING SOUND |
|---|---|---|
| 1 | TOZAISEN | TOZAISEN |
| 2 | TOZAISEN | TOZAISEN |
| 3 | TOKYO METRO TOZAISEN | TOKYO METORO TOUZAISEN |
| 4 | TAKADANOBABA | TAKADANOBABA |
| 5 | OTEMACHI | OTEMACHI |
| 6 | TOKYO EKI | TOUKYOUEKI |
| 7 | NTT | ENUTEITEI |
| 8 | KDDI | KEIDEIDEIAI |
| 9 | NTT Docomo | ENUTEITEIDOKOMO |
| 10 | MOBLE PHONE | KEITAIDENWA |
| 11 | NETWORK | NETTOWAAKU |
| 12 | SYSTEM | SISTEMU |
| 13 | HARDWARE | HAADOWEAA |
| 14 | SOFTWARE | SOHUTOWEAA |
| 15 | JAPAN | NIHON |
| 16 | JR NISHINIHON | JEIARUNISHINIHON |
| 17 | JR TOZAISEN | JEIARUTOUZAISEN |
| 18 | KANSAI | KANSAI |
| 19 | TAKOYAKI | TAKOYAKI |
| 20 | OKONOMIYAKI | OKONOMIYAKI |
| 21 | REFRESHMENT | INSYOKUBUTSU |
| 22 | SUSHI | SUSHI |
| 23 | KURAZUSHI | KURAZUSHI |
| 24 | KAITENSUSHI | KAITENSUSHI |

FIG. 54

A: TODAY, I WILL GO TO <u>OTEMACHI</u> FOR BUSINESS.
SINCE I HAVE SOME SPARE TIME, I WILL GO THERE BY <u>TOZAISEN</u>.

B: YOU CAN GET A SEAT IN THE TRAIN.
WHAT IS THE PURPOSE OF YOUR VISIT TO <u>OTEMACHI</u> TODAY?

A: WE ARE THINKING ABOUT AN ORDERING SYSTEM USING A <u>MOBILE PHONE</u>
AND WILL DISCUSS THE <u>SYSTEM</u>.

B: I HEARD THAT SOME <u>SUSHI RESTAURANTS</u> USE SUCH A <u>SYSTEM.</u>

A: YEAR, THAT'S THE SYSTEM. YOU MAY PROBABLY KNOW <u>KURAZUSHI</u>.
THE SYSTEM IS FOR THAT COMPANY.

EXTRACT A WORD COLLECTION.

OTEMACHI, TOZAISEN, OTEMACHI, MOBILE PHONE, SYSTEM, SUSHI, SYSTEM, KURAZUSHI

FIG. 55

| ID | NOTATION | DESCRIPTION/APPEARED WORDS → | 5 | 5 | 10 | 12 | 22 | 12 | 23 | THE TOTAL NUMBER OF WORDS FOUND WITHIN 2HOP |
|---|---|---|---|---|---|---|---|---|---|---|
| | | ID → | OTEMACHI | OTEMACHI | MOBILE PHONE | SYSTEM | SUSHI | SYSTEM | KURAZUSHI | |
| 1 | TOZAISEN | TOKYO METORO TOUZAISEN | 1 | 1 | 0 | 0 | 0 | 0 | 0 | 2 |
| 2 | TOZAISEN | JR TOZAISEN | 0 | 0 | 0 | 0 | 0 | 0 | 0 | 0 |

FIG. 56

```
INFORMATION OBTAINED IN WASEDA STATION AT ABOUT 17:30 INCLUDES SENTENCES
OF "RECOVERY OF TOZAISEN IS NOT YET ANNOUNCED. JR IS ALSO NOT AVAILABLE.
SIBUSEN IS AVAILABLE." THE PERSON MOVED ON FOOT WITH A FRIEND TO TAKADANOBABA
AND OBTAINED, AT A POLICE BOX, INFORMATION COMPOSED OF "IT SEEMS LIKE THAT
THE FIRST EARTHQUAKE IN THE NORTHWEST REGION OF CHIBA PREFECTURE WAS FOLLOWED
BY THE SECOND EARTHQUAKE OF A SEISMIC INTENSITY OF 5 IN THE ADACHI-KEY."
HOWEVER, WHETHER THE INFORMATION IS CORRECT OR NOT IS UNCLEAR.
```

| EXTRACT A WORD COLLECTION. ↓

```
WASEDA, TOZAISEN, SEIBUSEN, TAKADANOBABA, CHIBAKEN
```

FIG. 57

| ID | NAME | DESCRIPTION/APPEARED WORDS → | 15 | 16 | 17 | 19 | THE TOTAL NUMBER OF WORDS FOUND WITHIN 2HOP |
|---|---|---|---|---|---|---|---|
| | | | WASEDA | TAKADANOBABA | CHIBAKEN | SEIBUSEN | |
| 1 | TOZAISEN | JR TOZAISEN | 0 | 0 | 0 | 0 | 0 |
| 2 | TOZAISEN | KYOTOSHIEI CHIKATETSU TOZAISEN | 0 | 0 | 0 | 0 | 0 |
| 3 | TOZAISEN | TOKYO METOROTOZAISEN | 1 | 1 | 1 | 0 | 3 |
| 4 | TOZAISEN | KITA OSAKA KYUKOUDENTETSU KAIJYOUSEN (HAISIROSEN) BETSUMEI | 0 | 0 | 0 | 0 | 0 |
| 5 | TOZAISEN | SAPPOROSIEI CHIKATETSU TOUZAISEN | 0 | 0 | 0 | 0 | 0 |
| 6 | TOZAISEN | SENDAI SIEI TIKATETSU KEIKAKUROSEN | 0 | 0 | 0 | 0 | 0 |
| 7 | TOZAISEN | KOUBE KOUSOKU TETSUDOU TOZAISEN | 0 | 0 | 0 | 0 | 0 |

FIG. 60

| ID | KEYWORD |
|---|---|
| 1 | WORD A |
| 2 | WORD B |
| 3 | WORD C |
| 4 | WORD D |
| 5 | WORD E |
| ⋮ | ⋮ |

FIG. 61

| ORIGIN | END POINT |
|---|---|
| 1 | 3 |
| 2 | 5 |
| ⋮ | ⋮ |

FIG. 63

| ID | KEYWORDS |
|---|---|
| 0 | SARKIT |
| 1 | SUZUKA |
| 2 | F1 |
| 3 | KANSAI |
| 4 | OKONOMIYAKI |
| 5 | TAKOYAKI |
| 6 | INSYOKUBUTU |
| 7 | KOUHII |
| 8 | SUSHI |
| 9 | B SUSHI |
| 10 | A SUSHI |
| 11 | KAITENSUSHI |
| 12 | NIHON |
| 13 | NIHONBASHI |
| 14 | TOZAISEN |
| 15 | TAKADANOBABA |
| 16 | TOKYO |
| 17 | OTEMACHI |
| 18 | DoCoMo |
| 19 | NTT |
| 20 | MOBILE PHONE |
| 21 | NETTOWAAKU |
| 22 | SYSTEM |
| 23 | HARDWARE |
| 24 | SOFTWARE |

FIG. 64

| ORIGIN | END POINT |
|---|---|
| 0 | 1 |
| 1 | 2 |
| 1 | 3 |
| 1 | 3 |
| 3 | 4 |
| 3 | 5 |
| 3 | 12 |
| 4 | 6 |
| 5 | 6 |
| 6 | 7 |
| 6 | 8 |
| 8 | 9 |
| 8 | 10 |
| 8 | 11 |
| 10 | 11 |
| 12 | 16 |
| 13 | 14 |
| 14 | 15 |
| 14 | 17 |
| 16 | 17 |
| 17 | 19 |
| 18 | 19 |
| 18 | 20 |
| 19 | 21 |
| 20 | 21 |
| 21 | 22 |
| 22 | 23 |
| 22 | 24 |

FIG. 65

A: I WILL GO TO MEET MR. SUZUKI AT <u>OTEMACHI</u> FOR BUSINESS.
CAN <u>TOZAISEN</u> TAKE ME THERE SOONER?

B: YOU CAN CHOOSE ANY LINE BECAUSE YOU HAVE SOME SPARE TIME.
WHAT BRINGS YOU THERE?

A: WE ARE EXAMINING THE STRUCTURING OF A <u>NETWORK</u> USING <u>MOBILE PHONES</u> FOR <u>KAITENSUSHI.</u>
I WILL GO TO THERE IN ORDER TO HAVE A MEETING FOR THIS MATTER.

B: I HEARD THAT SUCH A SYSTEM IS RECENTLY USED BY <u>A SUSHI</u>.

A: YEAR. WE WILL SUGGEST THIS SYSTEM TO <u>B SUSHI</u>, A RIVAL OF A SUSHI.

FIG. 66

I WILL GO TO MEET MR. SUZUKI AT <u>OTEMACHI</u> FOR BUSINESS.
CAN <u>TOZAISEN</u> TAKE ME THERE HAYA IKA NA?

YOU CAN CHOOSE OKONOMIYAKIKATA BECAUSE YOU HAVE SOME SPARE TIME.
WHAT BRINGS YOU THERE?

WE ARE EXAMINING THE STRUCTURING OF A <u>NETWORK</u> USING <u>MOBILE PHONES</u> FOR <u>KAITENSUSHI.</u>
I WILL GO TO THERE IN ORDER TO HAVE A MEETING FOR THIS MATTER.

I HEARD THAT SUCH A SYSTEM IS "SAIKINDATO" USED BY <u>A SUSHI</u>.

YEAR. WE WILL SUGGEST THIS SYSTEM TO <u>B SUSHI</u>, A RIVAL OF A SUSHI.

FIG. 67

| INPUT KEYWORDS |
| --- |
| OTEMACHI |
| SUZUKA |  ← FALSE RECOGNITION OF SUZUKI
| TOZAISEN |
| OKONOMIYAKI |  ← FALSE RECOGNITION OF OKONOMI
| MOBILE PHONE |
| NETTOWAAKU |
| KAITENSUSHI |
| A SUSHI |
| B SUSHI |

FIG. 68

| NODES ON THE SHORTEST ROUTE | OTE-MACHI SUZUKA | OTE-MACHI TOZAI-SEN | OTE-MACHI OKONOMI-YAKI | OTE-MACHI MOBILE PHONE | OTE-MACHI NET-WORK | SUZUKA OKONOMI-YAKI | TOZAI-SEN MOBILE PHONE | TOZAI-SEN NET-WORK | OKONOMI-YAKI KAITEN-SUSHI | OKONOMI-YAKI A SUSHI | OKONOMI-YAKI B SUSHI | MOBILE PHONE NET-WORK | KAITEN-SUSHI A SUSHI | KAITEN-SUSHI B SUSHI | A SUSHI | B SUSHI | TOTAL POINT |
|---|---|---|---|---|---|---|---|---|---|---|---|---|---|---|---|---|---|
| SUZUKA | 0.02 | | | | | 0.13 | | | | | | | | | | | 0.14 |
| KANSAI | 0.02 | | 0.02 | | | 0.13 | | | | | | | | | | | 0.16 |
| OKONOMIYAKI | | | 0.02 | 0.04 | | 0.13 | | | 0.04 | | | | | | | | 0.25 |
| INSYOKUBUTU | | | | | | | | | 0.04 | 0.04 | 0.04 | | | | | | 0.11 |
| SUSHI | | | | | | | | | 0.04 | 0.04 | 0.04 | | | 0.13 | 0.13 | | 0.36 |
| B SUSHI | | | | | | | | | 0.04 | 0.04 | 0.04 | | | 0.13 | | 0.13 | 0.29 |
| A SUSHI | | | | | | | 0.04 | | | | | | 1.00 | | 0.13 | | 1.16 |
| KAITENSUSHI | 0.02 | | 0.02 | | | | | | 0.04 | | | | 1.00 | 0.13 | | | 1.16 |
| NIHON | 0.02 | | | | | | | | | | | | | | | | 0.03 |
| TOZAISEN | | 1.00 | | 0.04 | | | 0.02 | 0.04 | | | | | | | | | 1.05 |
| TOKYO | 0.02 | | 0.02 | 0.04 | | | 0.02 | 0.04 | | | | | | | | | 0.03 |
| OTEMACHI | 0.02 | 1.00 | 0.02 | 0.04 | 0.13 | | 0.02 | 0.04 | | | | | | | | | 1.25 |
| NTT | | | | 0.04 | 0.13 | | | 0.04 | | | | | | | | | 0.21 |
| MOBILE PHONE | | | | 0.04 | | | 0.02 | | | | | 1.00 | | | | | 1.05 |
| NETWORK | | | | | 0.13 | | | 0.04 | | | | 1.00 | | | | | 1.21 |

(1) (2) (3) COURSE (4)

FIG. 69

| INPUT WORDS | EXTRACTED WORDS | POINT | EXTRACTED WORDS | POINT | EXTRACTED WORDS | POINT | EXTRACTED WORDS | POINT | EXTRACTED WORDS | POINT |
|---|---|---|---|---|---|---|---|---|---|---|
| OTEMACHI | | | | | | | | | | |
| SUZUKA | SUZUKA | 0.02 | OTEMACHI | 0.02 | NIHON | 0.02 | TOKYO | 0.02 | KANSAI | 0.02 |
| TOZAISEN | OTEMACHI | 1.02 | TOZAISEN | 1.00 | SUZUKA | 0.02 | NIHON | 0.02 | TOKYO | 0.02 |
| OKONOMIYAKI | OTEMACHI | 1.03 | TOZAISEN | 1.00 | KANSAI | 0.16 | SUZUKA | 0.14 | OKONOMIYAKI | 0.14 |
| MOBILE PHONE | OTEMACHI | 1.08 | TOZAISEN | 1.02 | KANSAI | 0.16 | SUZUKA | 0.14 | OKONOMIYAKI | 0.14 |
| NETWORK | OTEMACHI | 1.25 | NETWORK | 1.21 | MOBILE PHONE | 1.05 | TOZAISEN | 1.05 | NTT | 0.21 |
| KAITENSUSHI | OTEMACHI | 1.25 | NETWORK | 1.21 | MOBILE PHONE | 1.05 | TOZAISEN | 1.05 | NTT | 0.21 |
| A SUSHI | OTEMACHI | 1.25 | NETWORK | 1.21 | MOBILE PHONE | 1.05 | TOZAISEN | 1.05 | KAITENSUSHI | 1.04 |
| B SUSHI | OTEMACHI | 1.25 | NETWORK | 1.21 | KAITENSUSHI | 1.16 | A SUSHI | 1.16 | MOBILE PHONE | 1.05 |

FIG. 70

| INPUT WORDS | EXTRACTED WORDS | POINT | EXTRACTED WORDS | POINT | EXTRACTED WORDS | POINT | EXTRACTED WORDS | POINT | EXTRACTED WORDS | POINT |
|---|---|---|---|---|---|---|---|---|---|---|
| OTEMACHI | | | | | | | | | | |
| SUZUKA | | | | | | | | | | |
| TOZAISEN | OTEMACHI | 1.02 | TOZAISEN | 1.00 | | | | | | |
| OKONOMIYAKI | OTEMACHI | 1.03 | TOZAISEN | 1.00 | | | | | | |
| MOBILE PHONE | OTEMACHI | 1.08 | TOZAISEN | 1.02 | | | | | | |
| NETWORK | OTEMACHI | 1.25 | NETWORK | 1.21 | MOBILE PHONE | 1.05 | TOZAISEN | 1.05 | | |
| KAITENSUSHI | OTEMACHI | 1.25 | NETWORK | 1.21 | MOBILE PHONE | 1.05 | TOZAISEN | 1.05 | | |
| A SUSHI | OTEMACHI | 1.25 | NETWORK | 1.21 | MOBILE PHONE | 1.05 | TOZAISEN | 1.05 | KAITENSUSHI | 1.04 |
| B SUSHI | OTEMACHI | 1.25 | NETWORK | 1.21 | KAITENSUSHI | 1.16 | A SUSHI | 1.16 | MOBILE PHONE | 1.05 |

| EXTRACTED WORDS | POINT |
|---|---|
| | |
| | |
| | |
| | |
| | |
| | |
| | |
| A SUSHI | 1.04 |
| TOZAISEN | 1.05 |

FIG. 74

| INPUTTED WORDS | EXTRACTED WORD | POINT | EXTRACTED WORD | POINT |
|---|---|---|---|---|
| OTEMACHI | | | | |
| SUZUKA | SUZUKA | 0.02 | OTEMACHI | 0.02 |
| TOZAISEN | OTEMACHI | 1.02 | TOZAISEN | 1.00 |
| OKONOMIYAKI | OTEMACHI | 1.03 | TOZAISEN | 1.00 |
| MOBILE PHONE | OTEMACHI | 1.08 | TOZAISEN | 1.02 |
| NETWORK | NETWORK | 1.05 | MOBILE PHONE | 1.02 |
| KAITENSUSHI | NETWORK | 1.05 | MOBILE PHONE | 1.02 |
| A SUSHI | A SUSHI | 1.04 | KAITENSUSHI | 1.04 |
| B SUSHI | A SUSHI | 1.13 | KAITENSUSHI | 1.13 |

FIG. 75

| INPUT WORDS | EXTRACTED WORDS | POINT | EXTRACTED WORDS | POINT | EXTRACTED WORDS | POINT | EXTRACTED WORDS | POINT | EXTRACTED WORDS | POINT |
|---|---|---|---|---|---|---|---|---|---|---|
| OTEMACHI | | | | | | | | | | |
| SUZUKA | | | | | | | | | | |
| TOZAISEN | OTEMACHI | 1.02 | TOZAISEN | 1.00 | | | | | | |
| OKONOMIYAKI | OTEMACHI | 1.03 | TOZAISEN | 1.00 | | | | | | |
| MOBILE PHONE | OTEMACHI | 1.08 | TOZAISEN | 1.02 | | | | | | |
| NETWORK | NETWORK | 1.05 | MOBILE PHONE | 1.02 | | | | | | |
| KAITENSUSHI | NETWORK | 1.05 | MOBILE PHONE | 1.02 | | | | | | |
| A SUSHI | A SUSHI | 1.04 | KAITENSUSHI | 1.04 | MOBILE PHONE | 1.00 | NETWORK | 1.00 | | |
| B SUSHI | B SUSHI | 1.13 | KAITENSUSHI | 1.13 | MOBILE PHONE | 1.00 | NETWORK | 1.00 | | |

FIG. 77

| NODE NUMBER | NODE NAME | ALL NODE DISTANCE AVERAGE |
|---|---|---|
| 1 | OTEMACHI | 3.478 |
| 2 | TOZAISEN | 5.217 |
| 3 | KYOBASHI | 5.522 |
| 4 | MOBILE PHONE | 4.435 |
| 5 | SYSTEM | 5.913 |
| 6 | SUSHI | 5.739 |
| 7 | KURAZUSHI | 6.652 |
| 8 | JR NISHI NIHON | 4.609 |
| 9 | JR TOZAISEN | 4.565 |
| 10 | KANSAI | 3.739 |
| 11 | OKONOMIYAKI | 4.348 |
| 12 | TAKOYAKI | 4.348 |
| 13 | INSYOKUBUTSU | 4.957 |
| 14 | KAITENZUSHI | 6.652 |
| 15 | NIHON | 3.565 |
| 16 | TOKYOEKI | 3.478 |
| 17 | TOKYO METORO TOZAISEN | 4.261 |
| 18 | TAKADANOBABA | 5.217 |
| 19 | NTT | 4.130 |
| 20 | KDDI | 3.913 |
| 21 | NTTDocomo | 4.565 |
| 22 | NETWORK | 5.130 |
| 23 | HARDWARE | 6.870 |
| 24 | SOFTWARE | 6.870 |

FIG. 78

| NODE NUMBER OF A NODE FROM WHICH A LINK EXTENDS | NODE NUMBER OF A NODE TO WHICH THE LINK EXTENDS |
|---|---|
| 1 | 16 |
| 1 | 17 |
| 1 | 19 |
| 1 | 20 |
| 2 | 17 |
| 3 | 9 |
| 4 | 20 |
| 4 | 21 |
| 4 | 22 |
| 5 | 22 |
| 5 | 23 |
| 5 | 24 |
| 6 | 7 |
| 6 | 13 |
| 6 | 14 |
| 7 | 14 |
| 8 | 9 |
| 8 | 10 |
| 9 | 10 |
| 10 | 11 |
| 10 | 12 |
| 10 | 15 |
| 11 | 13 |
| 12 | 13 |
| 15 | 16 |
| 17 | 18 |
| 19 | 21 |
| 20 | 21 |

FIG. 82

| ITEM | VALUE | EXAMPLE OF VALUES |
|---|---|---|
| PROCESSING EXECUTION UNIT (STEP) | A UNIT (STEP) FOR SENDING A WORD EXTRACTED FROM TEXT INFORMATION AS WORD EXTRACTION RESULT DATA TO A SUBSEQUENT. SPECIFY THE NUMBER OF EXTRACTED WORDS TO BE SENT. | 1 |

| EXTRACTED WORD NODE NUMBER | EXTRACTED WORD |
|---|---|
| 1 | OTEMACHI |

(b)

| EXTRACTED WORD NODE NUMBER | EXTRACTED WORD |
|---|---|
| 2 | TOZAISEN |

(c)

| EXTRACTED WORD NODE NUMBER | EXTRACTED WORD |
|---|---|
| 1 | OTEMACHI |

(d)

| EXTRACTED WORD NODE NUMBER | EXTRACTED WORD |
|---|---|
| 4 | MOBILE PHONE |

(e)

| EXTRACTED WORD NODE NUMBER | EXTRACTED WORD |
|---|---|
| 5 | SYSTEM |

(f)

| EXTRACTED WORD NODE NUMBER | EXTRACTED WORD |
|---|---|
| 6 | SUSHI |

(g)

| EXTRACTED WORD NODE NUMBER | EXTRACTED WORD |
|---|---|
| 5 | SYSTEM |

(h)

| EXTRACTED WORD NODE NUMBER | EXTRACTED WORD |
|---|---|
| 7 | KURASUSHI |

FIG. 84

| ITEM | VALUE | EXAMPLE OF VALUES |
|---|---|---|
| DISTANCE CALCULATION WINDOW WIDTH | THE MAXIMUM NUMBER OF WORDS AT WHICH THE SHORTEST DISTANCE CALCULATION RESULT IS RETAINED IN A STORAGE MEDIUM. BASED ON THIS SET VALUE, A REGION FOR THE SHORTEST DISTANCE DATA IS SECURED. WHEN THE NUMBER OF INPUTTED WORDS (THE NUMBER OF STEPS) EXCEEDS THE DISTANCE CALCULATION WINDOW WIDTH, THE ORDER ONE IS OVERWRITTEN. | 5 |
| THE SHORTEST DISTANCE TO BE CALCULATED | THE MAXIMUM NUMBER OF THE SHORTEST DISTANCES CALCULATED BY THE SHORTEST DISTANCE CALCULATOR. WHEN THIS SET VALUE IS LONGER THAN THE SHORTEST DISTANCE CALCULATION RESULT, THE SHORTEST DISTANCE CALCULATOR STOPS THE SHORTEST ROUTE SEARCH TO OUTPUT N (NOT FOUND) AS THE SHORTEST ROUTE | 4 |

FIG. 85(a)

| | NODE NAME | NODE NUMBER | SHORTEST DISTANCE | | | | |
|---|---|---|---|---|---|---|---|
| | | | OTEMACHI | | | | |
| REGION 1 | OTEMACHI | 1 | | | | | |
| REGION 2 | | | | | | | |
| REGION 3 | | | | | | | |
| REGION 4 | | | | | | | |
| REGION 5 | | | | | | | |

FIG. 85(b)

| | NODE NAME | NODE NUMBER | SHORTEST DISTANCE | | | | |
|---|---|---|---|---|---|---|---|
| | | | OTEMACHI | TOZAISEN | | | |
| REGION 1 | OTEMACHI | 1 | | 2 | | | |
| REGION 2 | TOZAISEN | 2 | 2 | | | | |
| REGION 3 | | | | | | | |
| REGION 4 | | | | | | | |
| REGION 5 | | | | | | | |

FIG. 85(c)

| | NODE NAME | NODE NUMBER | SHORTEST DISTANCE | | | | |
|---|---|---|---|---|---|---|---|
| | | | OTEMACHI | TOZAISEN | OTEMACHI | | |
| REGION 1 | OTEMACHI | 1 | | 2 | 0 | | |
| REGION 2 | TOZAISEN | 2 | 2 | | 2 | | |
| REGION 3 | OTEMACHI | 1 | 0 | 2 | | | |
| REGION 4 | | | | | | | |
| REGION 5 | | | | | | | |

FIG. 85(d)

| | NODE NAME | NODE NUMBER | SHORTEST DISTANCE | | | | |
|---|---|---|---|---|---|---|---|
| | | | OTEMACHI | TOZAISEN | OTEMACHI | MOBILE PHONE | |
| REGION 1 | OTEMACHI | 1 | | 2 | 0 | 2 | |
| REGION 2 | TOZAISEN | 2 | 2 | | 2 | 4 | |
| REGION 3 | OTEMACHI | 1 | 0 | 2 | | 2 | |
| REGION 4 | MOBILE PHONE | 4 | 2 | 4 | 2 | | |
| REGION 5 | | | | | | | |

FIG. 85(e)

| | NODE NAME | NODE NUMBER | SHORTEST DISTANCE | | | | |
|---|---|---|---|---|---|---|---|
| | | | OTEMACHI | TOZAISEN | OTEMACHI | MOBILE PHONE | SYSTEM |
| REGION 1 | OTEMACHI | 1 | | 2 | 0 | 2 | 4 |
| REGION 2 | TOZAISEN | 2 | 2 | | 2 | 4 | N |
| REGION 3 | OTEMACHI | 1 | 0 | 2 | | 2 | 4 |
| REGION 4 | MOBILE PHONE | 4 | 2 | 4 | 2 | | 2 |
| REGION 5 | SYSTEM | 5 | 4 | N | 4 | 2 | |

FIG. 85(f)

| | NODE NAME | NODE NUMBER | SHORTEST DISTANCE | | | | |
|---|---|---|---|---|---|---|---|
| | | | TOZAISEN | OTEMACHI | MOBILE PHONE | SYSTEM | SUSHI |
| REGION 1 | TOZAISEN | 2 | | 2 | 4 | N | N |
| REGION 2 | OTEMACHI | 1 | 2 | | 2 | 4 | N |
| REGION 3 | MOBILE PHONE | 4 | 4 | 2 | | 2 | N |
| REGION 4 | SYSTEM | 5 | N | 4 | 2 | | N |
| REGION 5 | SUSHI | 6 | N | N | N | N | |

FIG. 85(g)

| | NODE NAME | NODE NUMBER | SHORTEST DISTANCE | | | | |
|---|---|---|---|---|---|---|---|
| | | | OTEMACHI | MOBILE PHONE | SYSTEM | SUSHI | SYSTEM |
| REGION 1 | OTEMACHI | 1 | | 2 | 4 | N | 4 |
| REGION 2 | MOBILE PHONE | 4 | 2 | | 2 | N | 2 |
| REGION 3 | SYSTEM | 5 | 4 | 2 | | N | 0 |
| REGION 4 | SUSHI | 6 | N | N | N | | N |
| REGION 5 | SYSTEM | 5 | 4 | 2 | 0 | N | |

FIG. 85(h)

| | NODE NAME | NODE NUMBER | SHORTEST DISTANCE | | | | |
|---|---|---|---|---|---|---|---|
| | | | MOBILE PHONE | SYSTEM | SUSHI | SYSTEM | KURAZUSHI |
| REGION 1 | MOBILE PHONE | 4 | | 2 | N | 2 | N |
| REGION 2 | SYSTEM | 5 | 2 | | N | 0 | N |
| REGION 3 | SUSHI | 6 | N | N | | N | 1 |
| REGION 4 | SYSTEM | 5 | 2 | 0 | N | | N |
| REGION 5 | KURAZUSHI | 7 | N | N | 1 | N | |

FIG. 86

| ITEM | VALUE | EXAMPLE OF VALUES |
|---|---|---|
| EVALUATION WINDOW WIDTH | THE MAXIMUM NUMBER OF WORDS EVALUATED AS KEYWORDS. BASED ON THIS SET VALUE, A REGION FOR THE WORD EVALUATION DATA IS SECURED. WHEN THE NUMBER OF EVALUATED WORDS (THE NUMBER OF STEPS) EXCEEDS THE DISTANCE CALCULATION WINDOW WIDTH, THE ORDER ONE IS OVERWRITTEN. | 5 |
| EXTRACTION ACCUMULATION NUMBER (THE SHORTEST DISTANCE 0) | ACCUMULATION NUMBER FOR DISTANCE 0 FOR WHICH A WORD IS EXTRACTEDRACTED | 1 |
| EXTRACTION ACCUMULATION NUMBER (THE SHORTEST DISTANCE 1) | ACCUMULATION NUMBER FOR DISTANCE 1 FOR WHICH A WORD IS EXTRACTEDRACTED | 1 |
| EXTRACTION ACCUMULATION NUMBER (THE SHORTEST DISTANCE 2) | ACCUMULATION NUMBER FOR DISTANCE 2 FOR WHICH A WORD IS EXTRACTEDRACTED | 2 |

FIG. 87(a)

| | NODE NAME | NODE NUMBER | ACCUMULATION NUMBER | | |
|---|---|---|---|---|---|
| | | | SHORTEST DISTANCE 0 | SHORTEST DISTANCE 1 | SHORTEST DISTANCE 2 |
| REGION 1 | OTEMACHI | 1 | | | |
| REGION 2 | | | | | |
| REGION 3 | | | | | |
| REGION 4 | | | | | |
| REGION 5 | | | | | |

FIG. 87(b)

| | NODE NAME | NODE NUMBER | ACCUMULATION NUMBER | | |
|---|---|---|---|---|---|
| | | | SHORTEST DISTANCE 0 | SHORTEST DISTANCE 1 | SHORTEST DISTANCE 2 |
| REGION 1 | OTEMACHI | 1 | 0 | 0 | 1 |
| REGION 2 | TOZAISEN | 2 | 0 | 0 | 1 |
| REGION 3 | | | | | |
| REGION 4 | | | | | |
| REGION 5 | | | | | |

FIG. 87(c)

| | NODE NAME | NODE NUMBER | ACCUMULATION NUMBER | | |
|---|---|---|---|---|---|
| | | | SHORTEST DISTANCE 0 | SHORTEST DISTANCE 1 | SHORTEST DISTANCE 2 |
| REGION 1 | OTEMACHI | 1 | 1 | 0 | 1 |
| REGION 2 | TOZAISEN | 2 | 0 | 0 | 2 |
| REGION 3 | OTEMACHI | 1 | 1 | 0 | 1 |
| REGION 4 | | | | | |
| REGION 5 | | | | | |

FIG. 87(d)

| | NODE NAME | NODE NUMBER | ACCUMULATION NUMBER | | |
|---|---|---|---|---|---|
| | | | SHORTEST DISTANCE 0 | SHORTEST DISTANCE 1 | SHORTEST DISTANCE 2 |
| REGION 1 | OTEMACHI | 1 | 1 | 0 | 2 |
| REGION 2 | TOZAISEN | 2 | 0 | 0 | 2 |
| REGION 3 | OTEMACHI | 1 | 1 | 0 | 2 |
| REGION 4 | MOBILE PHONE | 4 | 0 | 0 | 2 |
| REGION 5 | | | | | |

FIG. 87(e)

| NODE NAME | NODE NUMBER | ACCUMULATION NUMBER | | |
|---|---|---|---|---|
| | | SHORTEST DISTANCE 0 | SHORTEST DISTANCE 1 | SHORTEST DISTANCE 2 |
| REGION 1 | OTEMACHI | 1 | 1 | 0 | 2 |
| REGION 2 | TOZAISEN | 2 | 0 | 0 | 2 |
| REGION 3 | OTEMACHI | 1 | 1 | 0 | 2 |
| REGION 4 | MOBILE PHONE | 4 | 0 | 0 | 3 |
| REGION 5 | SYSTEM | 5 | 0 | 0 | 1 |

FIG. 87(f)

| NODE NAME | NODE NUMBER | ACCUMULATION NUMBER | | |
|---|---|---|---|---|
| | | SHORTEST DISTANCE 0 | SHORTEST DISTANCE 1 | SHORTEST DISTANCE 2 |
| REGION 1 | TOZAISEN | 2 | 0 | 0 | 1 |
| REGION 2 | OTEMACHI | 1 | 0 | 0 | 2 |
| REGION 3 | MOBILE PHONE | 4 | 0 | 0 | 2 |
| REGION 4 | SYSTEM | 5 | 0 | 0 | 1 |
| REGION 5 | SUSHI | 6 | 0 | 0 | 0 |

FIG. 87(g)

| NODE NAME | NODE NUMBER | ACCUMULATION NUMBER | | |
|---|---|---|---|---|
| | | SHORTEST DISTANCE 0 | SHORTEST DISTANCE 1 | SHORTEST DISTANCE 2 |
| REGION 1 | OTEMACHI | 1 | 0 | 0 | 1 |
| REGION 2 | MOBILE PHONE | 4 | 0 | 0 | 3 |
| REGION 3 | SYSTEM | 5 | 1 | 0 | 1 |
| REGION 4 | SUSHI | 6 | 0 | 0 | 0 |
| REGION 5 | SYSTEM | 5 | 1 | 0 | 1 |

FIG. 87(h)

| NODE NAME | NODE NUMBER | ACCUMULATION NUMBER | | |
|---|---|---|---|---|
| | | SHORTEST DISTANCE 0 | SHORTEST DISTANCE 1 | SHORTEST DISTANCE 2 |
| REGION 1 | MOBILE PHONE | 4 | 0 | 0 | 2 |
| REGION 2 | SYSTEM | 5 | 1 | 0 | 1 |
| REGION 3 | SUSHI | 6 | 0 | 1 | 0 |
| REGION 4 | SYSTEM | 5 | 1 | 0 | 1 |
| REGION 5 | KURASUSHI | 7 | 1 | 0 | 0 |

| EXTRACTED KEYWORD NODE NUMBER | EXTRACTED KEYWORD |
|---|---|
| NONE | NONE |

(b)

| EXTRACTED KEYWORD NODE NUMBER | EXTRACTED KEYWORD |
|---|---|
| NONE | NONE |

(c)

| EXTRACTED KEYWORD NODE NUMBER | EXTRACTED KEYWORD |
|---|---|
| 1 | OTEMACHI |
| 2 | TOZAISEN |

(d)

| EXTRACTED KEYWORD NODE NUMBER | EXTRACTED KEYWORD |
|---|---|
| 1 | OTEMACHI |
| 2 | TOZAISEN |
| 4 | MOBILE PHONE |

(e)

| EXTRACTED KEYWORD NODE NUMBER | EXTRACTED KEYWORD |
|---|---|
| 1 | OTEMACHI |
| 2 | TOZAISEN |
| 4 | MOBILE PHONE |

(f)

| EXTRACTED KEYWORD NODE NUMBER | EXTRACTED KEYWORD |
|---|---|
| 1 | OTEMACHI |
| 4 | MOBILE PHONE |

(g)

| EXTRACTED KEYWORD NODE NUMBER | EXTRACTED KEYWORD |
|---|---|
| 4 | MOBILE PHONE |
| 5 | SYSTEM |

(h)

| EXTRACTED KEYWORD NODE NUMBER | EXTRACTED KEYWORD |
|---|---|
| 4 | MOBILE PHONE |
| 5 | SYSTEM |
| 6 | SUSHI |
| 7 | KURASUSHI |

FIG. 89

| ITEM | VALUE | EXAMPLE OF VALUES |
|---|---|---|
| EXTRACTION DISTANCE NUMBER | THE MAXIMUM DISTANCE FROM A KEYWORD FOR WHICH A RELATED WORD IS EXTRACTED | 2 |
| UPPER LIMIT OF THE NUMBER OF WORDS RELATED TO THE DISTANCE 1 | THE MAXIMUM OF OUTPUT QUANTITY OF A RELATED WORD HAVING A DISTANCE FROM A KEYWORD OF 1 | 1 |
| UPPER LIMIT OF THE NUMBER OF WORDS RELATED TO THE DISTANCE 2 | THE MAXIMUM OF OUTPUT QUANTITY OF A RELATED WORD HAVING A DISTANCE FROM A KEYWORD OF 2 | 1 |

FIG. 90(a)

| WORD IDENTIFICATION | EXTRACTED KEYWORD NUMBER | EXTRACTED KEYWORD | A NODE NUMBER OF A NODE TO WHICH THE LINK EXTENDS |
|---|---|---|---|
| NONE | NONE | NODE | NODE |

FIG. 90(b)

| WORD IDENTIFICATION | EXTRACTED KEYWORD NUMBER | EXTRACTED KEYWORD | A NODE NUMBER OF A NODE TO WHICH THE LINK EXTENDS |
|---|---|---|---|
| NONE | NONE | NODE | NODE |

FIG. 90(c)

| WORD IDENTIFICATION | EXTRACTED KEYWORD NUMBER | EXTRACTED KEYWORD | A NODE NUMBER OF A NODE TO WHICH THE LINK EXTENDS |
|---|---|---|---|
| KEYWORD | 1 | OTEMACHI | 17 |
| KEYWORD | 2 | TOZAISEN | 17 |
| RELATED WORD | 17 | TOKYO METORO TOZAISEN | 1,2 |

FIG. 90(d)

| WORD IDENTIFICATION | EXTRACTED KEYWORD NUMBER | EXTRACTED KEYWORD | A NODE NUMBER OF A NODE TO WHICH THE LINK EXTENDS |
|---|---|---|---|
| KEYWORD | 1 | OTEMACHI | 20 |
| KEYWORD | 2 | TOZAISEN | NODE |
| KEYWORD | 4 | MOBILE PHONE | 20 |
| RELATED WORD | 20 | KDDI | 1,4 |

FIG. 90(e)

| WORD IDENTIFICATION | EXTRACTED KEYWORD NUMBER | EXTRACTED KEYWORD | A NODE NUMBER OF A NODE TO WHICH THE LINK EXTENDS |
|---|---|---|---|
| KEYWORD | 1 | OTEMACHI | 20 |
| KEYWORD | 2 | TOZAISEN | NODE |
| KEYWORD | 4 | MOBILE PHONE | 20 |
| RELATED WORD | 20 | KDDI | 1,4 |

FIG. 90(f)

| WORD IDENTIFICATION | EXTRACTED KEYWORD NUMBER | EXTRACTED KEYWORD | A NODE NUMBER OF A NODE TO WHICH THE LINK EXTENDS |
|---|---|---|---|
| KEYWORD | 1 | OTEMACHI | 20 |
| KEYWORD | 4 | MOBILE PHONE | 20 |
| RELATED WORD | 20 | KDDI | 1,4 |

FIG. 90(g)

| WORD IDENTIFICATION | EXTRACTED KEYWORD NUMBER | EXTRACTED KEYWORD | A NODE NUMBER OF A NODE TO WHICH THE LINK EXTENDS |
|---|---|---|---|
| KEYWORD | 4 | MOBILE PHONE | 22 |
| KEYWORD | 5 | SYSTEM | 22 |
| RELATED WORD | 22 | NETWORK | 4,5 |

FIG. 90(h)

| WORD IDENTIFICATION | EXTRACTED KEYWORD NUMBER | EXTRACTED KEYWORD | A NODE NUMBER OF A NODE TO WHICH THE LINK EXTENDS |
|---|---|---|---|
| KEYWORD | 4 | MOBILE PHONE | 22 |
| KEYWORD | 5 | SYSTEM | 22 |
| KEYWORD | 6 | SUSHI | 7,14 |
| KEYWORD | 7 | KURASUSHI | 6,14 |
| RELATED WORD | 22 | NETWORK | 4,5 |
| RELATED WORD | 14 | KAITENSUSHI | 6,7 |

FIG. 91

| ITEM | VALUE | EXAMPLE OF VALUES |
|---|---|---|
| EVALUATION WINDOW WIDTH | THE MAXIMUM NUMBER OF WORDS FOR WHICH A KEYWORD IS EXTRACTED. BASED ON THIS SET VALUE, A REGION FOR THE WORD EVALUATION DATA IS SECURED. WHEN THE NUMBER OF EVALUATED WORDS (THE NUMBER OF STEPS) EXCEEDS THE DISTANCE CALCULATION WINDOW WIDTH, THE ORDER ONE IS OVERWRITTEN. | 5 |
| THE NUMBER OF AVERAGE DISTANCE CALCULATION RESULTS | THE MAXIMUM NUMBER OF DISTANCE CALCULATION RESULTS USED FOR THE CALCULATION OF AN AVERAGE DISTANCE. WHEN THE DISTANCE CALCULATION RESULT IS HIGHER THAN THIS SET VALUE, THE HIGHER DISTANCE CALCULATION RESULT ((SHORTER DISTANCE) IN THE NUMBER OF THE AVERAGE DISTANCE CALCULATION RESULTS IS SUBJECTED TO AN AVERAGE CALCULATION | 2 |
| NUMBER OF DISTANCES TO BE AVERAGED | AN AVERAGE DISTANCE FOR WHICH A WORD IS EXTRACTED | 1.5 |
| TO-BE-EXTRACTED SHORTENED DISTANCE | A SHORTENED DISTANCE FOR WHICH A WORD IS EXTRACTED (= ALL NODE DISTANCE AVERAGE - AVERAGE DISTANCE) | 3.0 |

FIG. 92(a)

|  | NODE NAME | NODE NUMBER | AVERAGE DISTANCE | SHORTEST DISTANCE |
|---|---|---|---|---|
| REGION 1 | OTEMACHI | 1 | N |  |
| REGION 2 |  |  |  |  |
| REGION 3 |  |  |  |  |
| REGION 4 |  |  |  |  |
| REGION 5 |  |  |  |  |

FIG. 92(b)

|  | NODE NAME | NODE NUMBER | AVERAGE DISTANCE | SHORTEST DISTANCE |
|---|---|---|---|---|
| REGION 1 | OTEMACHI | 1 | 2.000 | 1.478 |
| REGION 2 | TOZAISEN | 2 | 2.000 | 3.217 |
| REGION 3 |  |  |  |  |
| REGION 4 |  |  |  |  |
| REGION 5 |  |  |  |  |

FIG. 92(c)

|  | NODE NAME | NODE NUMBER | AVERAGE DISTANCE | SHORTEST DISTANCE |
|---|---|---|---|---|
| REGION 1 | OTEMACHI | 1 | 1.000 | 2.478 |
| REGION 2 | TOZAISEN | 2 | 2.000 | 3.217 |
| REGION 3 | OTEMACHI | 1 | 1.000 | 2.478 |
| REGION 4 |  |  |  |  |
| REGION 5 |  |  |  |  |

FIG. 92(d)

|  | NODE NAME | NODE NUMBER | AVERAGE DISTANCE | SHORTEST DISTANCE |
|---|---|---|---|---|
| REGION 1 | OTEMACHI | 1 | 1.000 | 2.478 |
| REGION 2 | TOZAISEN | 2 | 2.000 | 3.217 |
| REGION 3 | OTEMACHI | 1 | 1.000 | 2.478 |
| REGION 4 | MOBILE PHONE | 4 | 2.000 | 2.435 |
| REGION 5 |  |  |  |  |

FIG. 92(e)

|  | NODE NAME | NODE NUMBER | AVERAGE DISTANCE | SHORTEST DISTANCE |
|---|---|---|---|---|
| REGION 1 | OTEMACHI | 1 | 1.000 | 2.478 |
| REGION 2 | TOZAISEN | 2 | 2.000 | 3.217 |
| REGION 3 | OTEMACHI | 1 | 1.000 | 2.478 |
| REGION 4 | MOBILE PHONE | 4 | 2.000 | 2.435 |
| REGION 5 | SYSTEM | 5 | 3.000 | 2.913 |

FIG. 92(f)

|  | NODE NAME | NODE NUMBER | AVERAGE DISTANCE | SHORTEST DISTANCE |
|---|---|---|---|---|
| REGION 1 | TOZAISEN | 2 | 3.000 | 2.217 |
| REGION 2 | OTEMACHI | 1 | 2.000 | 1.478 |
| REGION 3 | MOBILE PHONE | 4 | 2.000 | 2.435 |
| REGION 4 | SYSTEM | 5 | 3.000 | 2.913 |
| REGION 5 | SUSHI | 6 | N | N |

FIG. 92(g)

|  | NODE NAME | NODE NUMBER | AVERAGE DISTANCE | SHORTEST DISTANCE |
|---|---|---|---|---|
| REGION 1 | OTEMACHI | 1 | 3.000 | 0.478 |
| REGION 2 | MOBILE PHONE | 4 | 2.000 | 2.435 |
| REGION 3 | SYSTEM | 5 | 1.000 | 4.913 |
| REGION 4 | SUSHI | 6 | N | N |
| REGION 5 | SYSTEM | 5 | 1.000 | 4.913 |

FIG. 92(h)

|  | NODE NAME | NODE NUMBER | AVERAGE DISTANCE | SHORTEST DISTANCE |
|---|---|---|---|---|
| REGION 1 | MOBILE PHONE | 4 | 2.000 | 2.435 |
| REGION 2 | SYSTEM | 5 | 1.000 | 4.913 |
| REGION 3 | SUSHI | 6 | 1.000 | 4.739 |
| REGION 4 | SYSTEM | 5 | 1.000 | 4.913 |
| REGION 5 | KURASUSHI | 7 | 1.000 | 5.652 |

| EXTRACTED KEYWORD NODE NUMBER | EXTRACTED KEYWORD |
|---|---|
| NONE | NONE |

(b)

| EXTRACTED KEYWORD NODE NUMBER | EXTRACTED KEYWORD |
|---|---|
| 2 | TOZAISEN |

(c)

| EXTRACTED KEYWORD NODE NUMBER | EXTRACTED KEYWORD |
|---|---|
| 1 | OTEMACHI |
| 2 | TOZAISEN |

(d)

| EXTRACTED KEYWORD NODE NUMBER | EXTRACTED KEYWORD |
|---|---|
| 1 | OTEMACHI |
| 2 | TOZAISEN |

(e)

| EXTRACTED KEYWORD NODE NUMBER | EXTRACTED KEYWORD |
|---|---|
| 1 | OTEMACHI |
| 2 | TOZAISEN |

(f)

| EXTRACTED KEYWORD NODE NUMBER | EXTRACTED KEYWORD |
|---|---|
| NONE | NONE |

(g)

| EXTRACTED KEYWORD NODE NUMBER | EXTRACTED KEYWORD |
|---|---|
| 5 | SYSTEM |

(h)

| EXTRACTED KEYWORD NODE NUMBER | EXTRACTED KEYWORD |
|---|---|
| 5 | SYSTEM |
| 6 | SUSHI |
| 7 | KURASUSHI |

FIG. 94(a)

| WORD IDENTIFICATION | EXTRACTED KEYWORD NODE NUMBER | EXTRACTED KEYWORD | A NODE NUMBER OF A NODE TO WHICH THE LINK EXTENDS |
|---|---|---|---|
| NONE | NONE | NONE | NONE |

FIG. 94(b)

| WORD IDENTIFICATION | EXTRACTED KEYWORD NODE NUMBER | EXTRACTED KEYWORD | A NODE NUMBER OF A NODE TO WHICH THE LINK EXTENDS |
|---|---|---|---|
| KEYWORD | 2 | TOZAISEN | NONE |

FIG. 94(c)

| WORD IDENTIFICATION | EXTRACTED KEYWORD NODE NUMBER | EXTRACTED KEYWORD | A NODE NUMBER OF A NODE TO WHICH THE LINK EXTENDS |
|---|---|---|---|
| KEYWORD | 1 | OTEMACHI | 17 |
| KEYWORD | 2 | TOZAISEN | 17 |
| RELATED WORD | 17 | TOKYO METORO TOZAISEN | 1,2 |

FIG. 94(d)

| WORD IDENTIFICATION | EXTRACTED KEYWORD NODE NUMBER | EXTRACTED KEYWORD | A NODE NUMBER OF A NODE TO WHICH THE LINK EXTENDS |
|---|---|---|---|
| KEYWORD | 1 | OTEMACHI | 17 |
| KEYWORD | 2 | TOZAISEN | 17 |
| RELATED WORD | 17 | TOKYO METORO TOZAISEN | 1,2 |

FIG. 94(e)

| WORD IDENTIFICATION | EXTRACTED KEYWORD NODE NUMBER | EXTRACTED KEYWORD | A NODE NUMBER OF A NODE TO WHICH THE LINK EXTENDS |
|---|---|---|---|
| KEYWORD | 1 | OTEMACHI | 17 |
| KEYWORD | 2 | TOZAISEN | 17 |
| RELATED WORD | 17 | TOKYO METORO TOZAISEN | 1,2 |

FIG. 94(f)

| WORD IDENTIFICATION | EXTRACTED KEYWORD NODE NUMBER | EXTRACTED KEYWORD | A NODE NUMBER OF A NODE TO WHICH THE LINK EXTENDS |
|---|---|---|---|
| NONE | NONE | NONE | NONE |

FIG. 94(g)

| WORD IDENTIFICATION | EXTRACTED KEYWORD NODE NUMBER | EXTRACTED KEYWORD | A NODE NUMBER OF A NODE TO WHICH THE LINK EXTENDS |
|---|---|---|---|
| KEYWORD | 5 | SYSTEM | NONE |

FIG. 94(h)

| WORD IDENTIFICATION | EXTRACTED KEYWORD NODE NUMBER | EXTRACTED KEYWORD | A NODE NUMBER OF A NODE TO WHICH THE LINK EXTENDS |
|---|---|---|---|
| KEYWORD | 5 | SYSTEM | NONE |
| KEYWORD | 6 | SUSHI | 7,14 |
| KEYWORD | 7 | KURASUSHI | 6,14 |
| RELATED WORD | 14 | KAITENSUSHI | 6,7 |

INFORMATION COMMUNICATION TERMINAL, INFORMATION COMMUNICATION SYSTEM, INFORMATION COMMUNICATION METHOD, AND STORAGE MEDIUM FOR STORING AN INFORMATION COMMUNICATION PROGRAM THEREOF FOR RECOGNIZING SPEECH INFORMATION

CROSS REFERENCE TO RELATED APPLICATIONS

This application is the U.S. National Phase of PCT/JP2006/302195 filed on Feb. 8, 2006 which claims the benefit Japanese Application No. JP2005-032063 filed on Feb. 8, 2005, Japanese Application No. JP2005-179235 filed on Jun. 20, 2005, Japanese Application No. JP2005-179198 filed on Jun. 20, 2005, Japanese Application No. JP2005-179207 filed on Jun. 20, 2005, Japanese Application No. JP2005-358481 filed on Dec. 13, 2005, Japanese Application No. JP2005-362395 filed on Dec. 15, 2005, and Japanese Application No. JP2005-362390 filed on Dec. 15, 2005, each of which are incorporated by reference herein.

BACKGROUND OF THE INVENTION

1. Field of the Invention

The present invention relates to an information communication terminal, an information communication system, an information communication method, and an information communication program by which a communication technique (e.g. an Internet Protocol (IP) telephone, IP television telephone) and a data processing technique for acquiring information retained by a server on a network and information on a user terminal to display the information on the screen of the user terminal as well as a recording medium in which such a technique is recorded.

2. Description of the Related Art

With the recent development of information techniques, methods for organically combining various pieces of information such as audio communication, World Wide Web (www) have been developed. Thus, a user has been enabled, through a user terminal for example, (A) to download, from the Internet or a server on an exclusive network, text, audio, or video information to the user terminal; and (B) to exchange, via the Internet or an exclusive network, text, audio, or video information among two or more user terminals.

The example (A) allows a user to view a web page on the Internet via a browser.

The example (B) allows a user to have an audio conversation via an IP telephone terminal and an audio or video communication via an IP television telephone terminal.

When a conventional terminal user has tried to download, during an exchange of audio or video information, text, audio, or video information related to the conversation, the user himself or herself inputs a keyword into the terminal to find where the information is stored. This operation is performed simultaneously with the conversation to cause:

a situation where a keyword may be inputted in a wrong manner or may be inputted with a long time; and a situation where the search of a place where the information is stored may require a long time.

Conventional technique are made in view of the above include the following techniques.

In the first technique, based on speech information sent from a communication terminal to a provider of an exchange facility, a keyword is recognized by a module (e.g., speech recognition module) to send back distribution information suitable for the keyword to the terminal.

The technique as described above is based on an assumption that:

(1) an information common module for supplying distribution information via a communication path must be used and communication must be relayed via an exchange facility provider.

(a) Thus, this conventional technique cannot be applied to communication where terminals have direct communication.

(b) This conventional technique requires an advertisement information database to be established on an exchange facility for performing communication. Thus, a provider for relaying advertisement distribution requires, in spite of its desire to provide only additional information, an exchange facility for call establishment and information exchange to require a facility provider to establish and operate an exclusive exchange facility.

(c) This conventional technique requires user speech information to be analyzed by an exchange facility. Thus, the control of user privacy information depends on an operation policy of the exchange facility provider.

(2) Furthermore, the first technique is characterized in that a keyword obtained by speech recognition itself is not disclosed to a user but additional information related to the keyword is presented and in that only one piece of additional information is presented at the same time. Thus, a user cannot select information that the user really wants. The first technique also fails to provide a system through which a user can select information that the user really wants from among speech recognition results.

The second technique is mainly characterized in that a processing method for providing a call establishment between an originator terminal and a destination terminal subjects call audio from the originator terminal or the destination terminal to speech recognition to search information in a data communication network using the speech recognition result as a search keyword. Then, the search result is sent to the originator data communication terminal or the destination data communication terminal. The conventional technique as described above is characterized in having the following problems.

(1) The second technique works based on an assumption that a telephone exchange system is provided and an exchange facility provider is required to relay a call, causing a similar problem.

(2) The second technique displays keyword-related information only when a match with the keyword is found or when a user desires the information.

The third technique provides a system for the purpose of providing subject information to a plurality of calling party terminals having an established call via a network. This system includes a speech recognition module, an acquisition module for extracting keyword information from among recognition results, and a subject information storage module for storing and controlling subject information suitable for the respective user attributes. This system selects an appropriate subject based on a user attribute and a keyword. The invention intends to provide information with a higher accuracy by controlling user attribute information to consider a user preference and conversation contents. The conventional technique as described above has the following problems.

(1) This technique works based on an assumption that a telephone exchange system is provided and an exchange facility provider relays a call. Thus, the third technique has the same problem as that of the first technique.

(2) This technique requires user preference information to be previously registered in a user information database in an exchange facility provider, failing to prevent the user information from being leaked to an exchange facility operator.

(3) This technique requires a user information database and a subject information database to be previously established on the exchange facility. Thus, information can be provided only from the exchange facility provider.

(4) The third technique is characterized in that a keyword itself obtained by speech recognition is not disclosed to a user but subject information related to the keyword is presented. The third technique is also characterized in that only additional information is presented at the same time. Thus, the user cannot select information that the user really wants. Thus, this technique fails to provide a system through which a user can select information that the user really wants from among speech recognition results.

(1) The third technique is based on an assumption that, as in the first technique, a call must be relayed by a communication processing system provided by an exchange facility provider and speech recognition is performed by the communication processing system provided by the exchange facility provider.

(2) The conventional technique as described above does not disclose a module for providing advertisement information.

(3) The third technique uses a method that does not disclose a keyword itself to a terminal but presents the search result. The third technique does not disclose a module for providing information in the terminal. Thus, a method for presenting information when many keywords are extracted from the conversation of a user is unclear. There also may be a case where a vast amount of search results is displayed at the same, failing to assure that a user can obtain a desired search.

However, the conventional technique had problems as described below.

1) A conventional user cannot obtain, during an exchange of audio video information (e.g., during conversation using an IP telephone terminal, an IP television telephone terminal, or a mobile terminal for example), additional information or advertisement information so long as the user himself or herself performs an input via a keyboard for example or a search for a place storing the information for example.

Furthermore, the conventional technique had difficulty in providing information highly interesting to a user without hindering a smooth communication with a conversation partner and only through conversation.

Furthermore, the conventional technique also had difficulty in providing information suitable for a user without depending on speech recognition accuracy.

Furthermore, when the conversation includes a plurality of pieces of additional information and advertisement information, information that the user really wants was difficulty selected.

(2) (Securing of User Privacy)

All of the above conventional techniques extract a keyword by allowing an exchange facility to analyze audio video information exchanged between terminals. Thus, "secret of communication contents" between terminals is not technically guaranteed. This causes user privacy protection to depend on the policy of an exchange facility operator, failing to eliminate anxiety of the user.

Furthermore, the conventional technique had difficulty in providing a module for providing suitable additional information and advertisement information to a user without providing all information for conversation contents.

(3) The conventional audio exchange is based on an assumption that an exchange system exclusive for telephone is provided. A publication relating to a conventional technique is also based on an assumption that a module for providing information is provided on an exclusive exchange facility. Thus, "business for providing information suitable for conversation contents" could not be realized without having an exclusive audio exchange facility.

Furthermore, a method for realizing IP telephone and IPTV telephone using Session Initiation Protocol (SIP) and H.323 in recent years is not always based on an assumption that call establishment between audio and video communication system terminals (exchange of address information) as well as exchange of audio and video information after call establishment are realized by a telephone-exclusive exchange system. However, this method requires a facility provider to structure and operate an exclusive exchange facility. Furthermore, some facility providers have operation policies requiring users to pay the cost.

Furthermore, current audio and video communication services do not have a function to display advertisement related to the conversation. Thus, users have been prevented from having an opportunity to obtain service and article information related to call contents to use the information as required. Furthermore, advertisers also have been prevented from having an opportunity to provide services and to sell articles.

SUMMARY OF THE INVENTION

An embodiment of the invention of the present application inheres in an information communication terminal for exchanging at least speech information with a plurality of information communication terminals, comprising: a speech recognition module for recognizing the speech information to identify a plurality of words based on the recognized speech information; a storage medium for storing keyword extraction condition setting data in which conditions for extracting keywords are set; a keyword extraction module for reading the keyword extraction condition setting data to extract a plurality of keywords from the plurality of words; a related information acquisition module for acquiring related information related to the plurality of keywords; and a related information output module for providing the related information to a monitor.

Another aspect of the invention of the present application inheres in an information communication system connected with a plurality of information communication terminals via a network, one of the information communication terminals includes: a speech recognition module for recognizing at least speech information sent via the network to identify a plurality of words, based on the recognized speech information; a storage medium for storing keyword extraction condition setting data in which conditions for extracting keywords are set; a keyword extraction module for reading the keyword extraction condition setting data to extract a plurality of keywords from the plurality of words; a related information acquisition module for acquiring related information related to the plurality of keywords; and a related information output module for providing related information to a monitor.

Still another aspect of the invention of the present application inheres in an information communication method for using an information communication terminal including a speech recognition module, a storage medium, a keyword extraction module, a related information acquisition module, a related information output module, and a monitor to exchange at least speech information with another information communication terminal, the method comprising: recognizing a plurality of words in the speech information by the speech recognition module; storing keyword extraction condition setting data including conditions for extracting keywords in the storage medium; reading the keyword extraction condition setting data from the storage medium and extract a plurality of keywords from the plurality of words by the keyword extraction module; acquiring related information relating to the plurality of keywords by the related information acquisition module; and providing the related information to the monitor by the related information output module.

Still another aspect of the invention of the present application inheres in an information communication program for using an information communication terminal including a speech recognition module, a storage medium, a keyword extraction module, a related information acquisition module, a related information output module, and a monitor to exchange at least speech information with another information communication terminal, the information communication program makes a computer execute a series of instructions, the series of instructions includes: instructions within the speech recognition module for recognizing a plurality of words in the speech information; instructions within the storage medium for storing keyword extraction condition setting data including conditions for extracting keywords; instructions within the keyword extraction module for reading the keyword extraction condition setting data from the storage medium and extracting a plurality of keywords from the plurality of words; instructions within the related information acquisition module for acquiring related information related to the plurality of keywords; and instructions within the related information output module for providing the related information.

Still another aspect of the invention of the present application inheres in a computer-readable recording medium in which an information communication program is recorded, the information communication program executed in an information communication terminal including a speech recognition module, a storage medium, a keyword extraction module, a related information acquisition module, a related information output module, and a monitor to exchange at least speech information with another information communication terminal, the information communication program comprising: instructions for executing the speech recognition module to recognize a plurality of words in the speech information; instructions for executing the storage medium to store keyword extraction condition setting data including conditions for extracting keywords; instructions for executing the keyword extraction module to read the keyword extraction condition setting data from the storage medium and extract a plurality of keywords from the plurality of words; instructions for executing the related information acquisition module to acquire related information related to the plurality of keywords; and instructions for the related information output module to provide the related information.

BRIEF DESCRIPTION OF THE DRAWINGS

FIG. 4A is a flow diagram explaining an acquisition condition acceptance/information display sequence of the information communication system according to the first embodiment of the present invention;

FIG. 14 illustrates an example of operation condition setting data according to the first embodiment of the present invention;

FIG. 15 illustrates an example of keyword extraction condition setting data according to the first embodiment of the present invention;

FIG. 16 illustrates an example of default acquisition order setting data according to the first embodiment of the present invention;

FIG. 17 illustrates an example of extracted keyword history data according to the first embodiment of the present invention;

FIG. 18 illustrates an example of related information acquisition history data according to the first embodiment of the present invention;

FIG. 19 illustrates an example of local location data according to the first embodiment of the present invention;

FIG. 20 illustrates an example of location data according to the first embodiment of the present invention;

FIG. 21 illustrates an example of history data according to the first embodiment of the present invention;

FIG. 22 illustrates an example of advertisement data according to the first embodiment of the present invention;

FIG. 27 illustrates an example of emotion information history data of an information communication system according to the third embodiment of the present invention;

FIG. 28 illustrates an example of operation condition setting data of the information communication system according to the third embodiment of the present invention;

FIG. 36 illustrates an example of operation condition setting data according to the fourth embodiment of the present invention;

FIG. 37 illustrates an example of warning condition setting data according to the fourth embodiment of the present invention;

FIG. 38 illustrates an example of extracted keyword history data according to the fourth embodiment of the present invention;

FIG. 42 illustrates an example of operation condition setting data according to the fifth embodiment of the present invention;

FIG. 43 illustrates an example of extracted keyword history data according to the fifth embodiment of the present invention;

FIG. 44 illustrates an example of related information acquisition history data according to the fifth embodiment of the present invention;

FIG. 45 illustrates an example of history data according to the fifth embodiment of the present invention;

FIG. 52 shows an example of element information showing the correspondence among an ID number, notation, and pronunciation of the respective pieces of vocabulary of the knowledge network in a keyword extraction server according to a modification of the first example of the fifth embodiment of the present invention;

FIG. 54 shows an exemplary input word collection obtained by extracting a word collection from an input text data example and an input text data example by the keyword extraction serve according to the modification of the first example of the fifth embodiment of the present invention;

FIG. 55 shows an example of the result of using the keyword extraction server according to the modification of the first example of the fifth embodiment of the present invention to use the knowledge network shown in FIG. 52 and FIG. 53 to use the exemplary input word collection obtained by extracting a word collection from the input text data example and the input text data example shown in FIG. 54 to determine a homonym or a homograph;

FIG. 56 illustrates another example of an exemplary input word collection obtained by using the keyword extraction server according to the modification of the first example of the fifth embodiment of the present invention to extract a word collection from an input text data example and an input text data example;

FIG. 57 shows an example of the result by using the keyword extraction server according to the modification of the first example of the fifth embodiment of the present invention to use a knowledge network shown in FIG. 58 to use the exemplary input word collection obtained by extracting a word collection from the input text data example and the input text data example shown in FIG. 56 to determine a homonym or a homograph;

FIG. 60 illustrates an example of a table of a word dictionary according to the second example of the fifth embodiment of the present invention;

FIG. 61 illustrates an example of a table of a word relevance dictionary of the second example of the fifth embodiment of the present invention;

FIG. 63 is a schematic view illustrating an example of the knowledge network according to the second example of the fifth embodiment of the present invention;

FIG. 64 illustrates an example of a table of a word dictionary representing the knowledge network shown in FIG. 63;

FIG. 65 illustrates an example of text data according to the second example of the fifth embodiment of the present invention;

FIG. 66 illustrates the recognition result of text data according to the second example of the fifth embodiment of the present invention;

FIG. 67 illustrates an example of a word column (window) according to the second example of the fifth embodiment of the present invention;

FIG. 68 illustrates an example of a graph explaining the evaluation result in the second example of the fifth embodiment of the present invention;

FIG. 69 shows a graph explaining an example in which top B(=5) words are extracted from among the evaluation result according to the second example of the fifth embodiment of the present invention;

FIG. 70 shows a graph explaining an example in which a word having a point equal to or higher than a threshold value C(=1.00) is extracted from among the evaluation result according to the second example of the fifth embodiment of the present invention;

FIG. 74 shows an example in which a subject word having a window size of 5 and top B(=2) points is extracted according to the modification of the second example of the fifth embodiment of the present invention;

FIG. 75 illustrates an example in which a subject word having a window size=5 and a threshold value C (=1.00) or more is extracted according to the modification the second example of the fifth embodiment of the present invention;

FIG. 77 illustrates an example of node attribute data of knowledge network data used in a keyword extraction server according to the third example of the fifth embodiment of the present invention;

FIG. 78 illustrates an example of link attribute data of knowledge network data used in the keyword extraction server according to the third example of the fifth embodiment of the present invention;

FIG. 82 illustrates an example of the word extraction condition setting data in a word extraction processing according to the third example of the fifth embodiment of the present invention;

FIG. 83(*a*) thorough FIG. 83(*h*) illustrate an example of the extraction result of a word outputted by the word extraction unit according to the third example of the fifth embodiment of the present invention;

FIG. 84 illustrates an example of an example of the shortest distance calculation condition setting data in the shortest distance between words according to the third example of the fifth embodiment of the present invention;

FIG. 85(*a*) through FIG. 85(*h*) illustrate an example of the shortest distance data outputted by the shortest distance between words unit according to the third example of the fifth embodiment of the present invention;

FIG. 86 illustrates an example of keyword extraction condition setting data in the first text analysis method according to the third example of the fifth embodiment of the present invention;

FIG. 87(*a*) through FIG. 87(*h*) illustrate an example of word evaluation data in the first text analysis method according to the third example of the fifth embodiment of the present invention;

FIG. 88(*a*) through FIG. 88(*h*) illustrate an example of a keyword extraction result outputted by the first text analysis method according to the third example of the fifth embodiment of the present invention;

FIG. 89 illustrates an example of related word extraction condition setting data according to the third example of the fifth embodiment of the present invention;

FIG. 90(*a*) through FIG. 90(*h*) illustrate an example of a related word extraction result outputted by a first text analysis method according to the third example of the fifth embodiment of the present invention;

FIG. 91 illustrates an example of keyword extraction condition setting data in a second text analysis method according to the third example of the fifth embodiment of the present invention;

FIG. 92(*a*) through FIG. 92(*h*) illustrate an example of word evaluation data outputted by the second text analysis method according to the third example of the fifth embodiment of the present invention;

FIG. 93(a) through FIG. 93(h) illustrate an example of a keyword output result outputted by the second text analysis method according to the embodiment of the present invention;

FIG. 94(a) through FIG. 94(h) illustrate an example of a related word extraction result outputted by the second text analysis method according to the third example of the fifth embodiment of the present invention;

DETAILED DESCRIPTION OF THE INVENTION

First Embodiment

-Description of Entire Structure-

Figure 1:
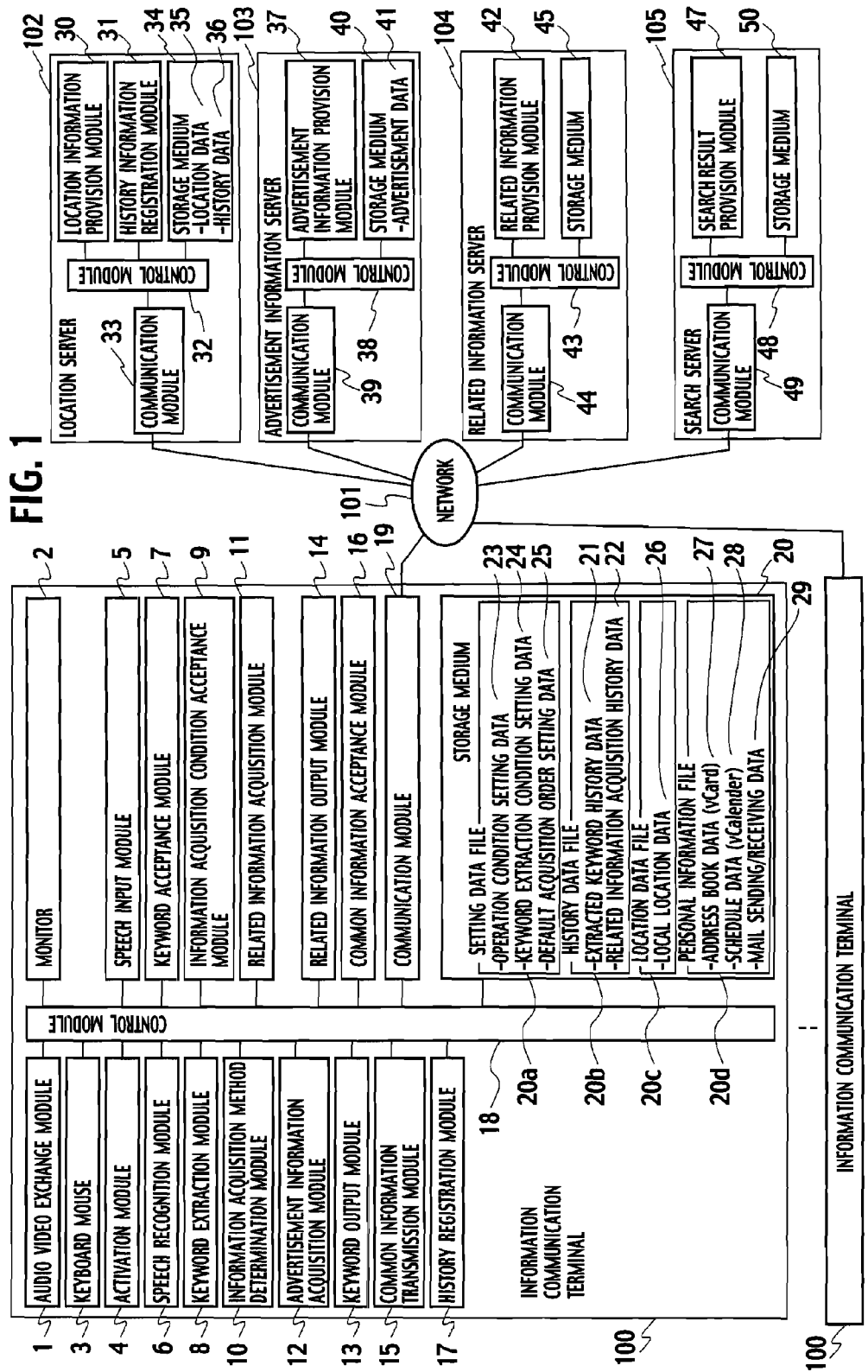
FIG. 1 is a structure diagram explaining the entire structure of an information communication system according to a first embodiment of the present invention.

The information communication system according to a first embodiment of the present invention includes, as shown in FIG. 1, an the information communication terminal 100 including an audio video communication terminal, a related information server 104, a search server 105, a location server 102, and an advertisement information server 103. The respective systems can communicate with each other via a network 101.

There exists a plurality of information communication terminals 100. The information communication terminal 100 has a function to use the audio video exchange module 1 to provide IP telephone and IPTV telephone functions for providing realtime exchange of audio and video information.

It is assumed that call control is performed by a specific method based on a protocol (e.g., H.323, SIP). The information communication terminal 100 extracts a keyword from speech information exchanged via an IP telephone or an IPTV telephone to acquire keyword-related information from the search server 105 or the related information server 104 to display the information on a screen.

The related information server 104 is assumed as the entire web server for providing information via the Internet.

More specifically, the related information server 104 is assumed to have a function to reply information (e.g., text data, HTML data, audio stream data, video stream data) when an information location (ex. URL=the location of the related information server 104+the location of information in the related information server 104) is specified. The information communication terminal 100 displays these pieces of information acquired from the elated information server 104 on a monitor 2.

As to the search server 105, for example, a search server provided by a search service may be used.

More specifically, the search server 105 is assumed as a server that replies, when a keyword is sent to the location of the search server 105 (ex., URL), a list of the search result (i.e., a part of the contents of the information related to the location of the related information server 104 (ex., URL) in which information related to the keyword is stored).

The information communication terminal 100 is assumed to have a function to display the search result list acquired from the search server 105 on a screen. A user (not shown) only has to specify, from among the list, the location of the related information server 104 for which information is desired to be acquired to display the information on the screen.

The location server 102 is a system that is used as a member of a pair with the information communication terminal 100 and that retains location data 35 and history data 36.

The location data 35 is data representing a combination of a keyword and a location in which information related to the keyword (ex., URL) is stored. The location data 35 is assumed as data to be edited and controlled by an operator (not shown) of the location server 102.

The operator registers, with regards to individual keywords, locations (ex., URL) that are presumably optimal as information to be provided when the keywords are generated from conversation. For example, it is assumed that data that should be updated as required (e.g., a location (ex., URL) in which news keywords and explanation of the keywords are stored) is registered in a storage medium 34 of the location server 102 as the location data 35 (it is also assumed that data that is not required to be updated is mainly registered on a storage medium 20 of the information communication terminal 100 as local location data 26).

When the information communication terminal 100 is set to permit the use of the location server 102 (when an external server use permission setting (which will be described later) is "1=permitted"), the information communication terminal 100 can acquire, from the location server 102, the location (ex., URL) of the related information server 104 based on the keyword to subsequently acquire the information from the related information server 104 to display the information on the screen. As a result, the user can browse, when a keyword is generated from conversation, information that is determined by the operator of the location server 102 as optimal for the keyword.

The history data 36 is data that represents a combination of "keyword" and the locations of information related to the keyword displayed by the respective information communication terminals 100 on a screen. The history data 36 is registered in the location server 102 by the information communication terminal 100 that permits the collection of the history data 36 (the external server use permission setting is "1=permitted"), with regards to the respective displays of related information.

The information communication terminal 100 also can acquire, from the location server 102, the location of the related information server 104 that is most frequently referenced (ex., URL) related to the keyword to subsequently acquire information from the related information server 104 to display the information on a screen (as will be described later, when the external server use permission setting is "0=forbidden", history data (related information acquisition history data 22) limited to one information communication terminal 100 is referred to acquire the location of the related information server 104 that is most frequently referenced (ex., URL).

The advertisement information server 103 is a system that is used as a member of a pair with the information communication terminal 100. The advertisement information server 103 retains advertisement data 41.

It is assumed that the advertisement data 41 is data representing a combination of a keyword and advertisement information related to the keyword and is edited and controlled by an operator of the advertisement information server 103.

The operator receives from the advertiser a "keyword" for which advertisement is displayed and advertisement information (contents of advertisement to be displayed) to register the "keyword" and advertisement information in the advertisement data 41. It is assumed that advertisement information may be text data, HTML data, audio stream data, or video stream data for example.

When the information communication terminal 100 is set to permit the display of advertisement (when an advertisement necessity setting (which will be described later) is "1=required"), the information communication terminal 100 can acquire from the advertisement information server 103 the advertisement information based on the keyword to display the advertisement information on the screen.

<Description of Structure and Operation of Information Communication Terminal 100>

The information communication terminal 100 encompasses: an audio video exchange module 1; a monitor 2; a keyboard/mouse 3; an activation module 4; a speech input module 5; a speech recognition module 6; a keyword acceptance module 7; a keyword extraction module 8; an information acquisition condition acceptance module 9; an information acquisition method determination module 10; a related information acquisition module 11; an advertisement information acquisition module 12; a keyword output module 13; a related information output module 14; a common information transmission module 15; a common information acceptance module 16; a history registration module 17; a control module 18; a communication module 19; and a storage medium 20. The following section will describe the respective modules.

The audio video exchange module 1 uses the communication module 19 to perform realtime exchange of video and speech information with another information communication terminal 100. The audio video exchange module 1 is generally a module that provides a function called as an IP telephone or an IP television telephone. Specifically, it is assumed that the audio video exchange module 1 can cope with a call control protocol (e.g., H.323, SIP) and can cope with a video codec (e.g. H.261/H.263/H.263+/H.264/MPEG-4) and an audio codec (e.g., G.711/G.728/G729/G722/G.722.1). It is assumed that the audio video exchange module 1 also can cope with a so-called P2P call control that does not use an exclusive Call Agent or a gate keeper in consideration of call control.

The monitor 2 is a system that is controlled by the control module 18 and that displays, to a user of the information communication terminal 100, video exchanged by the audio video exchange module 1 and information outputted from the keyword output module 13 and the related information acquisition module 11. Specifically, the monitor 2 is a display system using liquid crystal or a cathode-ray tube.

The keyboard/mouse 3 is a system that is controlled by the control module 18 and that is used by a user of the information communication terminal 100 to input, to the keyword acceptance module 7, conditions under which related information is acquired (e.g., keyword, acquisition method). The keyboard/mouse 3 is also used by a user of the information communication terminal 100 to activate an audio/video communication method.

The activation module 4 is a module that is activated by an input by a user of the information communication terminal 100 through the keyboard/mouse 3 for example and that is used to activate, based on the setting contents of the operation condition setting data 23, the audio video exchange module 1, the speech input module 5, the information acquisition condition acceptance module 9, and the common information acceptance module 16.

The speech input module 5 is a module that acquires speech information exchanged between the audio video exchange module 1 and another information communication terminal 100 to send the speech information to the speech recognition module 6. The speech input module 5 preferably includes a function to acquire, in addition to the speech information, information regarding a call performed by the audio video exchange module 1 (speech additional information) to send the information to the speech recognition module 6. Speech additional information includes any or all of a call ID, a calling party ID, and a speaker ID.

The speech recognition module 6 specifies, based on the speech information acquired from the speech input module 5, a word included in a call and the word class thereof to send the word information (word, word class) and the speech additional information to the keyword extraction module 8.

It is assumed that not all of functions of the speech recognition module 6 are stored in the information communication terminal 100 and a part of the functions also may be stored in another terminal having a higher calculation capability.

The keyword extraction module 8 is a module that extracts, based on word information (word, word class) acquired from the speech recognition module 6, a keyword based on the keyword extraction condition setting data 24 to generate, based on the extracted keyword and the speech additional information, the extracted keyword history data 21 to store the extracted keyword history data 21 to send the extracted keyword history data 21 to the keyword acceptance module 7. The use of this module allows a user of the information communication terminal 100 to narrow down keywords displayed on the monitor 2.

The keyword acceptance module 7 is a module that uses the keyword output module 13 to output extracted keywords acquired from the keyword extraction module 8 to the monitor 2. The keyword acceptance module 7 also has a function to use, when the operation condition setting data 23 is set so that the advertisement display necessity is "1=required", the advertisement information acquisition module 12 to acquire advertisement information related to the extracted keyword to use the keyword output module 13 to output the information to the monitor 2.

The keyword acceptance module 7 also has a function to fail, when the operation condition setting data 23 is set so that the information acquisition condition input necessity is "0=not required", to accept an input of acquisition conditions by a user of the information communication terminal 100 to use the information acquisition method determination module 10 and the related information acquisition module 11 to acquire related information to output the related information to the monitor 2. The keyword acceptance module 7 also has a function to use, when the operation condition setting data 23 is set so that the external server use necessity is "1=permitted", the history registration module 17 to register the history data 36 regarding the related information outputted to the monitor 2 in the location server 102.

The information acquisition condition acceptance module 9 has a function to accept an input from a user of the information communication terminal 100 for acquisition conditions (object keyword, related information acquisition method) to use the information acquisition method determination module 10 to determine a location of related information to be acquired (e.g., URL) to use the related information acquisition module 11 to acquire related information based on the determined location (e.g., URL) to output the information to the monitor 2. The information acquisition condition acceptance module 9 also has a function to use, when the operation condition setting data 23 is set so that the external server use necessity is "1=permitted", the history registration module 17 to register the history data 36 regarding the related information outputted to the monitor 2 in the location server 102 and a function to use, when the operation condition setting data 23 is set so that the common condition is "1=required", the common information transmission module 15 to share a method for acquiring the related information and acquired related information itself with a call party.

The information acquisition method determination module 10 is a module that access, based on an input by a user of the information communication terminal 100 regarding conditions for acquiring related information (object keyword, method for acquiring related information) or the default acquisition order setting data 25 stored in the storage medium 20, the local location data 26, the operation condition setting data 23, and the location server 102 to determine a location of related information to be acquired (e.g., URL). The information acquisition method determination module 10 is called by the keyword acceptance module 7 and the information acquisition condition acceptance module 9.

The related information acquisition module 11 is a module that acquires related information based on a location (e.g., URL) of the related information determined by the information acquisition method determination module 10 or a location (e.g., URL) of the related information inputted by a user of the information communication terminal 100. Related information to be acquired includes user personal information stored in the information communication terminal 100 (e.g., address book data 27, schedule data 28, mail sending/receiving data 29), related information of the related information server 104 connected to the network 101, or search result information of the search server 105 for example. When information is acquired from the related information server 104 and the search server 105, the communication module 19 is used.

The related information acquisition module 11 is called by the keyword acceptance module 7, the information acquisition condition acceptance module 9, and the common information acceptance module 16.

The advertisement information acquisition module 12 is a module that uses, when the operation condition setting data 23 is set so that the advertisement display necessity is "1=required", the communication module 19 to acquire advertisement information related to the keyword by the advertisement information server 103. The advertisement information acquisition module 12 is called by the keyword acceptance module 7 and the information acquisition condition acceptance module 9.

The keyword output module 13 is a module that outputs to the monitor 2 a keyword extracted by the keyword extraction module 8 and advertisement information acquired by the advertisement information acquisition module 12. The keyword output module 13 is called by the keyword acceptance module 7 and the information acquisition condition acceptance module 9.

The related information output module 14 is a module that outputs to the monitor 2 related information acquired by the related information acquisition module 11. The related information output module 14 is called by the keyword acceptance module 7, the information acquisition condition acceptance module 9, and the common information acceptance module 16.

The common information transmission module 15 is a module that uses the communication module 19 to send a method for acquiring related information determined by the information acquisition method determination module 10 (e.g., location) or related information acquired by the related information acquisition module 11 to the information communication terminal 100 as a call party. It is assumed that there are a plurality of information communication terminals 100 as a call party.

The common information acceptance module 16 is a module that uses the communication module 19 to receive a method for acquiring related information transmitted from the common information transmission module 15 as a call party (e.g., location) or related information acquired by the related information acquisition module 11 to acquire, based on the received method for acquiring related information, related information by the related information acquisition module 11 to output the information to the monitor 2.

The history registration module 17 is a module that uses, when the operation condition setting data 23 is so that the external server use necessity is "1=permitted", uses the communication module 19 to register, in the location server 102, the history data 36 regarding related information outputted to the monitor 2 by the related information output module 14. The history registration module 17 is called by the keyword acceptance module 7 and the information acquisition condition acceptance module 9.

The control module 18 performs transmission of information inputted to the keyboard/mouse 3 to the keyword acceptance module 7 and an output to the monitor 2 of video exchanged by the audio video exchange module 1 and information outputted from the keyword output module 13 and the related information acquisition module 11.

Moreover, the control module 18 uses the communication module 19 depending on a request from the audio video exchange module 1, the advertisement information acquisition module 12, the information acquisition method determination module 10, the related information output module 14, the common information transmission module 15, the common information acceptance module 16, and the history registration module 17.

Furthermore, the control module 18 controls a writing operation for example to a storage medium by the keyword acceptance module 7, the keyword extraction module 8, the information acquisition condition acceptance module 9, the information acquisition method determination module 10, the related information acquisition module 11, and the common information acceptance module 16. For example, an operating system (e.g., Windows (registered trademark)) may be used as the control module 18.

The communication module 19 is controlled by the control module 18 and is used by the audio video exchange module 1, the advertisement information acquisition module 12, the information acquisition method determination module 10, the related information output module 14, the common information transmission module 15, the common information acceptance module 16, and the history registration module 17 to exchange information with another information communication terminal 100, the related information server 104, the location server 102, the advertisement information server 103, or the search server 105 via the network 101. Specifically, the communication module 19 is assumed as a system (e.g., modem) for physically sending data and the control software thereof.

The storage medium 20 is controlled by the control module 18, and storage and reading of information in the storage medium 20 are performed by the keyword acceptance module 7, the keyword extraction module 8, the information acquisition condition acceptance module 9, the information acquisition method determination module 10, the related information acquisition module 11, and the common information acceptance module 16. The storage medium 20 stores therein a setting data file 20a, a history data file 20b, a location data file 20c, and a personal information data file 20d.

The setting data file 20a stores therein the operation condition setting data 23, the keyword extraction condition setting data 24, and the default acquisition order setting data 25. The history data file 20b stores therein the extracted keyword history data 21 and the related information acquisition history data 22. The location data file 20c stores therein the local location data 26. The personal information data file 20d stores therein the address book data 27, the schedule data 28, and the mail sending/receiving data 29.

The extracted keyword history data 21 is data showing a history of a keyword in speech information extracted by the speech recognition module 6 and the keyword extraction module 8. The extracted keyword history data 21 is assumed as being composed of extraction date and time, a call ID, a requesting calling party ID, a plurality of types of calling party IDs for identifying the respective plurality of calling parties, a speaker ID, and an extracted keyword. An example of contents and settings of the respective items can be seen in the extracted keyword history data shown in FIG. 17.

It is noted that the number of calling party IDs is not limited a specific number and may be the number of the information communication terminals 100 that can have communication with the audio video exchange module 1 at the same time.

The related information acquisition history data 22 is data showing the history of information acquisition performed by the advertisement information acquisition module 12 and the related information acquisition module 11. The related information acquisition history data 22 is assumed as being composed of acceptance date and time, a call ID, a requesting calling party ID, a requested keyword, acquisition conditions ("0" to "8"), common conditions, a requested data location, and a to-be-acquired data location. An example of contents and settings of the respective items can be seen in the related information acquisition history data shown in FIG. 18.

The operation condition setting data 23 stores therein data for the setting for an operation of the information communication terminal 100. It is assumed that the operation condition setting data 23 is composed of a requesting calling party ID, an information acquisition condition input necessity, an advertisement display necessity, an external server use necessity, a default common condition setting, and the location of the advertisement information server 103 (for history). An example of contents and settings of the respective items can be seen in the operation condition setting data shown in FIG. 14.

The keyword extraction condition setting data 24 is data for setting words to be extracted, from among words recognized by the speech recognition module 6 through speech information, by the keyword extraction module 8 for the respective word classes. It is assumed that the keyword extraction condition setting data 24 is composed of, for example, a requesting calling party ID, a proper name extraction necessity, a noun extraction necessity, and a verb extraction necessity. An example of contents and settings of the respective items can be seen in the keyword extraction condition setting data shown in FIG. 15.

Such items may be prepared in an amount of word classes classified by the speech recognition module 6. A word also may be set as a word to be extracted as a keyword by setting a specific proper name or sense classification.

The default acquisition order setting data 25 is data for setting a default order of acquisition conditions used by the information acquisition method determination module 10 when a user does not input conditions for acquiring related information. The default acquisition order setting data 25 is at least composed of: a requesting calling party ID, the first default acquisition condition, the second default acquisition condition, the third default acquisition condition, the fourth default acquisition condition, the fifth default acquisition condition, the sixth default acquisition condition, and the seventh default acquisition condition.

An example of contents and settings of the respective items can be seen in the default acquisition order setting data shown in FIG. 16. In addition to the first to seventh default acquisition conditions, other default acquisition conditions also may be prepared to correspond to newly-defined acquisition conditions.

The local location data 26 is data used to allow, when the acquisition condition is "4=acquisition from the local location data 26 in the storage medium 20 of the user terminal", the information acquisition method determination module 10 to determine a location at which keyword-related information is acquired. The local location data 26 is composed of registration date and time, valid date and time, a keyword, and a data location.

It is noted that the term "user terminal" in the above acquisition condition "4" denotes the information communication terminal 100 shown in FIG. 1.

An example of contents and settings of the respective items can be seen in the local location data shown in FIG. 19. Specific setting examples include, for example, indexes of portal site categories as keywords and registered URLs of portal site categories as locations.

The address book data 27 is personal address book data 27 such as vCard (RFC 2425: MIME Content-Type for Directory Information, RDC2426: vcard MIME Directory Profile) or mailer address information for example. When the acquisition condition is "3=Acquisition from personal information in the storage medium 20 of a user terminal", the address book data 27 is searched by the information acquisition method determination module 10.

The schedule data 28 is personal schedule data such as vCal, iCal (RFC 2445: Internet Calendaring and Scheduling Core Object specification (iCalendar), RFC 2446: iCalendar Transport-Independent Interoperability Protocol (iTIP): Scheduling Events, BusyTime, To-dos and Journal Entries, RFC 2447: iCalendar Message-based Interoperability Protocol (iMIP) for example. When the acquisition condition is "3=Acquisition from personal information in the storage medium 20 of a user terminal", the schedule data 28 is searched by the information acquisition method determination module 10.

The mail sending/receiving data 29 is mail information that is sent or received by a mailer of the information communication terminal 100. The mail sending/receiving data 29 is searched by the information acquisition method determination module 10 when the acquisition condition is "3=Acquisition from personal information in the storage medium 20 of a user terminal".

<Description of Structure and Operation of Location Server 102>

The location server 102 includes: a location information provision module 30, a history information registration module 31, a control module 32, a communication module 33, and a storage medium 34.

The location information provision module 30 determines, via the network 101, a data location of related information based on a requested keyword and a requested keyword acquisition condition sent from the information communication terminal 100 to the location server 102 to return the location to the information communication terminal 100.

The history information registration module 31 receives, via the network 101, the requested keyword, the acquisition condition, and the value of the to-be-acquired data location from the history registration module 17 of the information communication terminal 100 to store these pieces of information as the history data 36 into the storage medium 34.

The control module 32 controls the use of the communication module 33 by the location information provision module 30 or the history information registration module 31 and the storage medium 34. The control module 32 may be, for example, an operating system (e.g., Windows (registered trademark), Linux (registered trademark), Sun-OS (registered trademark)).

The communication module 33 is controlled by the control module 32 and is used by the location information provision module 30 and the history information registration module 31 to exchange information with the information communication terminal 100 via the network 101. Specifically, the communication module 33 is assumed as a system (e.g., modem) for physically transmitting data and control software.

The storage medium 34 is controlled by the control module 32. Information is stored in and read from the storage medium 34 by the location information provision module 30 and the history information registration module 31. The storage medium 34 also stores therein the location data 35 and the history data 36 as data.

The location data 35 is information used by the location information provision module 30 to determine, via the network 101, a data location of related information based on the requested keyword and the requested keyword acquisition condition sent from the information communication terminal 100 to the location server 102. The location data 35 is composed of: registration date and time, valid date and time, a keyword, and a data location.

An example of contents and settings of the respective items can be seen in the location data shown in FIG. 20.

Furthermore, specific setting examples include terms used in current news topics as keywords and URLs of sites explaining the respective terms and news sites as locations.

The history data 36 is data showing the history of information acquisition performed by the related information acquisition modules 11 of the respective information communication terminals 100. The history data 36 is assumed as being composed of acceptance date and time, a requested keyword, an acquisition condition, and a to-be-acquired data location. An example of contents and settings of the respective items can be seen in the history data shown in FIG. 21.

The record of the history data 36 is registered, when the operation condition setting data 23 of the information communication terminal 100 is set so that the external server use necessity is "1=permitted", based on data transmitted from the history registration module 17 to the location server 102.

Furthermore, when an acquisition condition is "7", the history data 36 is used by the location server 102 to determine the most frequently referenced location regarding the keyword.

<Description of Structure and Operation of Advertisement Information Server 103>

The advertisement information server 103 includes: an advertisement information provision module 37, a control module 38, a communication module 39, and a storage medium 40.

The advertisement information provision module 37 is structured so that the advertisement information server 103 receives an extracted keyword from the information communication terminal 100 via the network 101 and the advertisement information provision module 37 returns advertisement information related to the extracted keyword to the information communication terminal 100.

The control module 38 controls the use of the communication module 39 by the advertisement information provision module 37 and the storage medium 40. For example, the control module 38 may be an operating system (e.g., Windows (registered trademark), Linux (registered trademark), Sun-OS14 (registered trademark)).

The communication module 39 is controlled by the control module 38 and is used by the advertisement information provision module 37 to exchange information with the information communication terminal 100 via the network 101. Specifically, the communication module 39 is assumed as a system (e.g., modem) for physically transmitting data and the control software thereof.

The storage medium 40 is controlled by the control module 38. Information is stored in and read from the storage medium 40 by the advertisement information provision module 37. The storage medium 40 stores therein the advertisement data 41 as data.

The advertisement data 41 is advertisement information for an article or a service related to a keyword and is assumed as being composed of registration date and time, valid date and time, a keyword, and advertisement information. An example of contents and settings of the respective items can be seen in the advertisement data shown in FIG. 22.

It is assumed that advertisement information includes a catch copy of an article or a service, a data location of information related to the advertisement information, and a calling party ID of an advertisement operator (not shown). A user can use the keyboard/mouse 3 to specify the advertisement information outputted to the monitor 2 to acquire information related to advertisement information to display the information on the monitor 2 or to perform a call including a calling party and an advertisement operator by the information communication terminal 100.

Through information related to advertisement information or a call with an advertisement operator, an article of a service shown by the advertisement information can be purchased or used.

<Description of Structure and Operation of Related Information Server 104>

The related information server 104 includes: a related information provision module 42; a control module 43; a communication module 44; and a storage medium 45.

The related information provision module 42 is structured so that the related information server 104 receives, via the network 101, a to-be-acquired data location and a value of a requested keyword (which is not always required) from the related information acquisition module 11 of the information communication terminal 100 and the related information provision module 42 returns related information applicable to the to-be-acquired data location to the information communication terminal 100.

The control module 43 controls the use of the communication module 44 by the related information provision module 42 and the storage medium 45. The control module 43 may be, for example, an operating system (e.g., Windows (registered trademark), Linux (registered trademark), Sun-OS (registered trademark)).

The communication module 44 is controlled by the control module 43 and is used by the related information provision module 42 to exchange information with the information communication terminal 100 via the network 101. Specifically, the communication module 44 is assumed as a system (e.g., modem) for physically transmitting data and the control software thereof.

The storage medium 45 is controlled by the control module 43. Information is read from the storage medium 45 by the related information provision module 42. The storage medium 45 stores, as data, data as a base of related information generated by the related information provision module 42.

<Description of Structure and Operation of Search Server 105>

The search server 105 includes a search result provision module 47, a control module 48, a communication module 49, and a storage medium 50.

The search result provision module 47 is structured so that the search server 105 receives, via the network 101, a to-be-acquired data location and a value of a requested keyword from the related information acquisition module 11 of the information communication terminal 100 and the search result provision module 47 returns the search result based on the requested keyword as related information to the information communication terminal 100.

The control module 48 controls the use of the communication module 49 by the search result provision module 47 and the storage medium 50. For example, the control module 48 may be an operating system (e.g., Windows (registered trademark), Linux (registered trademark), Sun-OS (registered trademark)).

The communication module 49 is controlled by the control module 48 and is used by the search result provision module 47 to exchange information with the information communication terminal 100 via the network 101. Specifically, the communication module 49 is assumed as a system (e.g., modem) for physically transmitting data and the control software thereof.

The storage medium 50 is controlled by the control module 48. Information is read from the storage medium 50 by the search result provision module 47. The storage medium 50 stores, as data, data as a base of related information (search result information) generated by the search result provision module 47.

-Description of Processing Flow-

With reference to FIG. 2 to FIG. 11, the following section will describe the flow of a processing for acquiring related information by the information communication terminal 100 according to the first embodiment.

<Activation Sequence>

First, with reference to FIG. 2, an activation sequence of the information communication terminal 100 will be described. A user of the information communication terminal 100 uses the keyboard/mouse 3 to execute the activation module 4. In the execution, the user also may input the requesting calling party ID of the user performing the activation. First, the activation module 4 activates the audio video exchange module 1 to start a call with a call party. Next, the activation module 4 uses the requesting calling party ID as key information to read, via the control module 18, a value of the information acquisition condition input necessity from the storage medium 20.

Here, the first conditional branching is reached in which, when the value of the information acquisition condition input necessity is "1=required", the activation module 4 activates a speech input module 5 (which leads to a (1) keyword display sequence (FIG. 3)), the information acquisition condition acceptance module 9 (which leads to a (2) acquisition condition acceptance/information display sequence (FIG. 4)), and the common information acceptance module 16 (which leads to a (3) common information reception/display sequence (FIG. 5)).

When the value of the information acquisition condition input necessity is set to "1=required", the user can select, from among keywords displayed on the monitor 2, a keyword for which related information is acquired or a condition under which related information is acquired. Acquired related information also can be shared between the user and a call party.

The conditional branching 2 is reached in which, when the value of the information acquisition condition input necessity is "0=not required", the activation module 4 activates the speech input module 5 (which leads to the (4) keyword display/information display sequence (FIG. 6)) and the common information acceptance module 16 (which leads to the (3) common information reception/display sequence (FIG. 5)).

When the value of the information acquisition condition input necessity is set to "0=not required", the user cannot select a keyword for which related information is acquired from among keywords displayed on the monitor 2 or input a condition under which related information is acquired. Thus, related information regarding an extracted keyword and/or related information shared by the call party are/is automatically displayed.

Furthermore, the respective modules activated by the activation module 4 receive the requesting calling party ID.

<Keyword Display Sequence>

Next, a keyword display sequence will be described. The keyword display sequence shown in FIG. 3 ((1) in FIG. 2) is a sequence in which a keyword is extracted from the speech information 60 of the call by the speech recognition module 6 and the keyword extraction module 8 and the keyword is displayed on the monitor 2.

The speech input module 5 acquires the speech information 60 and the speech additional information 61 in the communication by the audio video exchange module 1 to send the speech information 60 and the speech additional information 61 to the speech recognition module 6. The term "speech additional information 61" is information regarding a call performed by the audio video exchange module 1 and includes any or all of a call ID, a calling party ID, and a speaker ID.

When the speech recognition module 6 receives the speech information 60 and the speech additional information 61, the speech recognition module 6 specifies, based on the speech information 60, a word included in the call and the word class thereof to generate the word information 62 at least including the word class to send the word information 62 and the speech additional information 61 to the keyword extraction module 8.

When the keyword extraction module 8 receives the word information 62 and the speech additional information 61, the keyword extraction module 8 uses the requesting calling party ID acquired from the activation module 4 as key information to read, via the control module 18, the keyword extraction condition setting data 24 from the storage medium 20. The keyword extraction condition setting data 24 includes a setting showing whether keyword extraction must be performed for each word class or not.

Next, the keyword extraction module 8 extracts, from word information, only a word having a word class that is set to "1=to be extracted" by the keyword extraction condition setting data 24 as a keyword to generate, based on the extracted keyword and the speech additional information 61, the extracted keyword history data 21 to store, via the control module 18, the extracted keyword history data 21 in the storage medium 20. The keyword extraction also may be performed by statistical analysis or linguistic analysis of word information as described in the fifth embodiment.

The extracted keyword history data 21 is at least composed of extraction date and time, a call ID, a requesting calling party ID, a calling party ID, a speaker ID, and an extracted keyword. A call ID, a calling party ID, and a speaker ID are set to have a value of the speech additional information 61.

The requesting calling party ID is set to have the requesting calling party ID acquired from the activation module 4. The extraction date and time are set to have date and time at which the keyword is extracted by the keyword extraction module 8. The extracted keyword is set to have a keyword extracted by the keyword extraction module 8.

Next, the keyword extraction module 8 sends the stored extracted keyword history data 21 to the keyword acceptance module 7.

When the keyword acceptance module 7 receives the extracted keyword history data 21 from the keyword extraction module 8, the keyword acceptance module 7 uses a requesting call ID acquired from the activation module 4 as key information to read, via the control module 18, an advertisement display necessity value of the operation condition setting data 23 from the storage medium 20.

Here, the following section will describe a case where the first conditional branching is reached in which the operation condition setting data 23 has an advertisement display necessity value set to "1=required".

The keyword acceptance module 7 uses the requesting calling party ID acquired from the activation module 4 as key information to read, via the control module 18, the value of the location of the advertisement information server 103 of the operation condition setting data 23 from the storage medium 20.

Next, the keyword acceptance module 7 sends the extracted keyword history data 21 and the value of the location of the advertisement information server 103 to the advertisement information acquisition module 12.

When the advertisement information acquisition module 12 receives the extracted keyword history data 21 and the value of the location of the advertisement information server 103, the advertisement information acquisition module 12 uses the communication module 19 to transmit, based on the value of the location of the advertisement information server 103, the extracted keyword in the extracted keyword history data 21 to the advertisement information server 103 via the control module 18 to acquire the advertisement information 64 from the advertisement information server 103 to return the advertisement information 64 to the keyword acceptance module 7.

Figure 7:
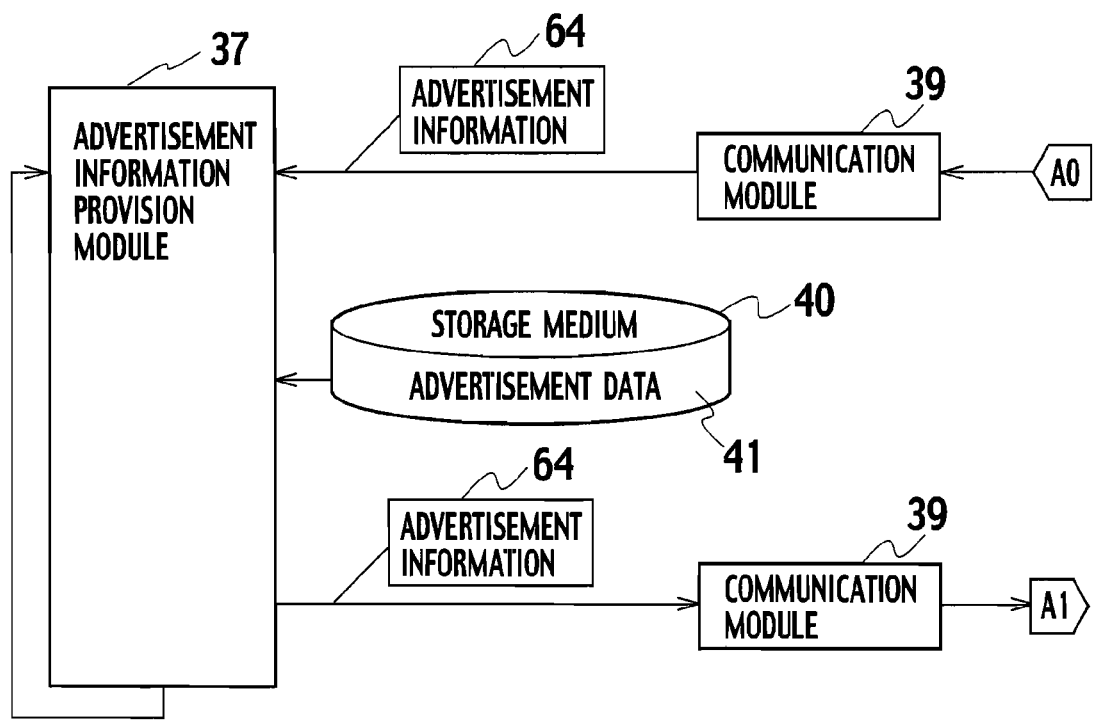
FIG. 7 is a flow diagram explaining an advertisement information provision sequence of the information communication system according to the first embodiment of the present invention.

It is noted that the transmission of the advertisement information 64 from the advertisement server is described in the advertisement information provision sequence (see FIG. 7 (which will be shown later)).

Next, the keyword acceptance module 7 sends the advertisement information 64 and the extracted keyword history data 21 to the keyword output module 13.

When the keyword output module 13 receives the advertisement information 64 and the extracted keyword history data 21, the keyword output module 13 outputs at least the extracted keyword in the extracted keyword history data 21, the call ID, and the advertisement information 64 to the monitor 2 via the control module 18.

Next, the keyword acceptance module 7 generates the related information acquisition history data 22 regarding the acquired advertisement information 64 to store, via the control module 18, the related information acquisition history data 22 in the storage medium 20.

The related information acquisition history data 22 is at least composed of acceptance date and time, a call ID, a requesting calling party ID, a requested keyword acquisition condition, a common condition, a requested data location, and a to-be-acquired data location.

The acceptance date and time are set to acceptance date and time at which the extracted keyword history data 21 is accepted by the keyword acceptance module 7. The call ID is set to a call ID in the extracted keyword history data 21. The requesting calling party ID is set to the requesting calling party ID acquired from the activation module 4. The requested keyword acquisition condition is set to NULL. The common condition is set to "0=not required". The requested data location is set to NULL. The to-be-acquired data location is set to the value of the location of the advertisement information server 103.

Next, a case will be described in which the second conditional branching is reached and the operation condition setting data 23 is set to have an advertisement display necessity value of "0=not required". The keyword acceptance module 7 sends the extracted keyword history data 21 to the keyword output module 13.

When the keyword output module 13 receives the extracted keyword history data 21, the keyword output module 13 outputs at least an extracted keyword and a call ID in the extracted keyword history data 21 to the monitor 2 via the control module 18.

Next, it is assumed that the advertisement information 64 displayed on the monitor 2 includes a data location of related information and a calling party ID of an advertisement operator. The user can use the keyboard/mouse 3 to specify the advertisement information 64 outputted to the monitor 2 to acquire information related to the advertisement information 64 to display the information on the monitor 2 or to use the information communication terminal 100 to perform a call by a calling party and an advertisement operator. It is assumed that an article or a service shown by the advertisement information 64 can be purchased or used through information related to the advertisement information 64 or a call with an advertisement operator.

Finally, the keyword acceptance module 7 uses the requesting calling party ID acquired from the activation module 4 as key information to read, via the control module 18, the value of the information acquisition condition input necessity of the operation condition setting data 23 of the storage medium 20 to call the speech input module 5 when the value is "1=required" (in this sequence, only "1=required" is possible).

The above loop is repeated until the audio and video exchange is completed.

<Acquisition Condition Acceptance/Information Display Sequence>

The acquisition condition acceptance/information display sequence shown in FIG. 2(2) will be described with reference to FIG. 4A and FIG. 4B. This acquisition condition acceptance/information display sequence represents a sequence in which a user firstly performs, with regards to a displayed keyword, the selection of a keyword for which the related information 68 is acquired and an input of a condition for acquiring the related information 68 to determine the location (e.g., URL) of the related information 68 acquired by the information acquisition method determination module 10 to allow the related information acquisition module 11 to acquire, based on the determined location (e.g., URL), the related information 68 and the related information 68 is displayed on the monitor.

The information acquisition condition acceptance module 9 accepts, via the control module 18, the acquisition condition input 65 from the keyboard/mouse 3. The acquisition condition input 65 includes at least a requested keyword, a call I, a condition for acquiring the requested keyword, and a common condition.

The requested keyword acquisition condition is set to have any of the following values.

"0=No specification"
"1=Acquisition from a location specified by a user"

"2=Acquisition from the storage medium 20 of the user terminal of the most frequently referenced location regarding the same keyword"

"3=Acquisition from personal information in the storage medium 20 of the user terminal"

"4=acquisition from the local location data 26 in the storage medium 20 of the user terminal"

"5=Acquisition from the search server 105

"6=Acquisition from the location data 35 of the location server 102"

"7=Acquisition from the location server 102 of the most frequently referenced location regarding the same keyword"

When the requested keyword acquisition condition is "1=Acquisition from a location specified by a user", the requested keyword acquisition condition also includes a requested data location. The common condition includes any of "0=not required", "1=required", or "NULL (no setting)". The requested keyword and the call ID are set to include an extracted keyword and a call ID outputted from the keyword output module 13 to the monitor 2, respectively. When the operation condition setting data 23 is set to have an external server use necessity of "0=forbidden", a requested keyword acquisition condition of "6=Acquisition from the location data 35 of the location server 102" or "7=Acquisition from the location server 102 of the most frequently referenced location regarding the same keyword" is not accepted.

Next, the information acquisition condition acceptance module 9 sends, to the information acquisition method determination module 10, the acceptance date and time, the acquisition condition input 65 and the requesting calling party ID acquired from the activation module 4.

The acceptance date and time are set to include acceptance date and time at which the requested keyword acquisition condition is accepted by the information acquisition condition acceptance module 9.

The following section will describe a case where the first conditional branching is reached in which the acquisition condition input 65 has a value of a requested keyword acquisition condition other than "0=no specification".

The information acquisition method determination module 10 generates the acquisition method information 67 to return the acquisition method information 67 to the information acquisition condition acceptance module 9.

Here, the acquisition method information 67 is assumed as including at least acceptance date and time, a requesting calling party ID, a requested keyword, a call ID, a requested keyword acquisition condition, a common condition, and a to-be-acquired data location.

The to-be-acquired data location is set to include a data location that is determined by the following processing by the information acquisition method determination module 10 based on a set value of a requested keyword acquisition condition acquired from the information acquisition condition acceptance module 9.

(1) When a requested keyword acquisition condition is "1=Acquisition from a location specified by a user", the information acquisition method determination module 10 sets the value of the requested data location to the to-be-acquired data location.

(2) When the requested keyword acquisition condition is "2=Acquisition from the storage medium 20 of the user terminal of the most frequently referenced location regarding the same keyword", the information acquisition method determination module 10 uses the requesting calling party ID as key information to collect, via the control module 18, the record of related information acquisition history data 22 of the storage medium 20 having the same requested keyword as that in the acquisition condition input 65 to set, as a to-be-acquired data location, the value of the to-be-acquired data location for which the information is acquired with the highest frequency It is noted that the record of the related information acquisition history data 22 collected by the information acquisition method determination module 10 is a record for which the requested keyword acquisition condition is other than NULL (record other than advertisement). When there is no applicable related information acquisition history data 22, the to-be-acquired data location is set to NULL.

(3) When the requested keyword acquisition condition is "3=Acquisition from personal information in the storage medium 20 of a user terminal", the information acquisition method determination module 10 searches, via the control module 18, the requested keyword in the address book data 27, the schedule data 28, and the mail sending/receiving data 29 to set a path for the search result to the to-be-acquired data location. When there is no applicable data, the to-be-acquired data location is set to NULL.

(4) When the requested keyword acquisition condition is "4=Acquisition from the local location data 26 in the storage medium 20 of the user terminal", the information acquisition method determination module 10 uses the requesting calling party ID as key information to read, via the control module 18, the record of the local location data 26 of the storage medium 20 having the same requested keyword value as that in the acquisition condition input 65 to set the value of the data location in the record as the to-be-acquired data location. Then, only such records are read out for which acceptance date and time are between the registration date and time and the valid date and time of the record.

When there is no applicable local location data 26, the to-be-acquired data location is set to NULL.

(5) When the requested keyword acquisition condition is "5=Acquisition from the search server 105", the information acquisition method determination module 10 uses the requesting calling party ID as key information to read, via the control module 18, the value of the location of the search server 105 in the operation condition setting data 23 to set the value to the to-be-acquired data location.

(6) When the requested keyword acquisition condition is "6=Acquisition from the location data 35 of the location server 102", the information acquisition method determination module 10 uses the requesting calling party ID as key information to read, via the control module 18, the value of the location (to be acquired location) of the location server 102 in the operation condition setting data 23.

Next, the information acquisition method determination module 10 uses the communication module 19 to send, based on the location of the location server 102 (to be acquired location), the requested keyword and the requested keyword acquisition condition ("6") via the control module 18 to the location server 102 to acquire the data location from the location server 102 to set the value as the to-be-acquired data location.

It is noted that the transmission of the data location from the location server 102 can be seen in a acquisition method information provision sequence (see FIG. 8 (which will be shown later)).

(7) When the requested keyword acquisition condition is "7=Acquisition from the location server 102 of the most frequently referenced location regarding the same keyword", the information acquisition method determination module 10 uses the requesting calling party ID as key information to read, via the control module 18, the location (to be acquired location) of the location server 102 in the operation condition setting data 23 to set the value as a to-be-acquired data location.

Next, the information acquisition method determination module 10 uses the value of the location (to be acquired location) of the location server 102 to use the communication module 19 to send the requested keyword and the requested keyword acquisition condition ("7") via the control module 18 to the location server 102 to acquire the data location from the location server 102 to set the value as a to-be-acquired data location.

It is noted that the transmission of the data location from the location server 102 can be seen in the acquisition method information provision sequence (see FIG. 8 (which will be shown later)).

Next, a case will be described in which the second conditional branching is reached in which the acquisition condition input 65 has a value of the requested keyword acquisition condition of "0=no specification".

First, the information acquisition method determination module 10 uses the requesting calling party ID as key information to read, via the control module 18, the values of the default acquisition conditions "1" to "7" in the default acquisition order setting data 25 to execute the above (1) to (7) in an order of the acquisition condition values set in the default acquisition condition 1 until the value of the to-be-acquired data location other than NULL is determined.

Next, the information acquisition method determination module 10 generates the acquisition method information 67 to return the acquisition method information 67 to the information acquisition condition acceptance module 9.

Here, the acquisition method information 67 includes at least acceptance date and time, a requested keyword, a call ID, a requested keyword acquisition condition, a common condition, and a to-be-acquired data location.

At this stage, the processing in the second conditional branching is completed.

Next, the information acquisition condition acceptance module 9 sends the acquisition method information 67 returned from the information acquisition method determination module 10 to the related information acquisition module 11.

When the related information acquisition module 11 receives the value of the acquisition method information 67, the related information acquisition module 11 uses the requested keyword and the value of the to-be-acquired data location in the acquisition method information 67 to acquire the related information 68.

When the to-be-acquired data location is within the information communication terminal 100 of the user, the related information 68 is acquired from the storage medium 20 via the control module 18. When the to-be-acquired data location is other than the information communication terminal 100 of the user, the communication module 19 is used to acquire the related information 68 via the control module 18.

It is noted that the transmission of the related information 68 from the related information server 104 can be seen in a related information provision sequence (see FIG. 9 (which will be shown later)) and that the transmission of the related information from the search server 105 can be seen in a search information provision sequence (see FIG. 10 (which will be shown later)).

Next, the related information acquisition module 11 returns the acquired related information 68 to the information acquisition condition acceptance module 9.

The information acquisition condition acceptance module 9 sends the related information 68 returned from the related information acquisition module 11 to the related information output module 14. When the related information output module 14 receives the related information 68, the information output module 14 outputs the related information 68 to the monitor 2 via the control module 18.

Next, the information acquisition condition acceptance module 9 uses, when a common condition in the acquisition condition input 65 is NULL, the requesting calling party ID as key information to read a value of the default common condition setting in the operation condition setting data 23 via the control module 18. When the common condition in the acquisition condition input 65 or a value of the acquisition condition of the acquisition condition input 65 of the default common condition setting is "1=required", the information acquisition condition acceptance module 9 sends to the common information transmission module 15 the acquisition method information 67 or the related information 68.

Figure 4B:
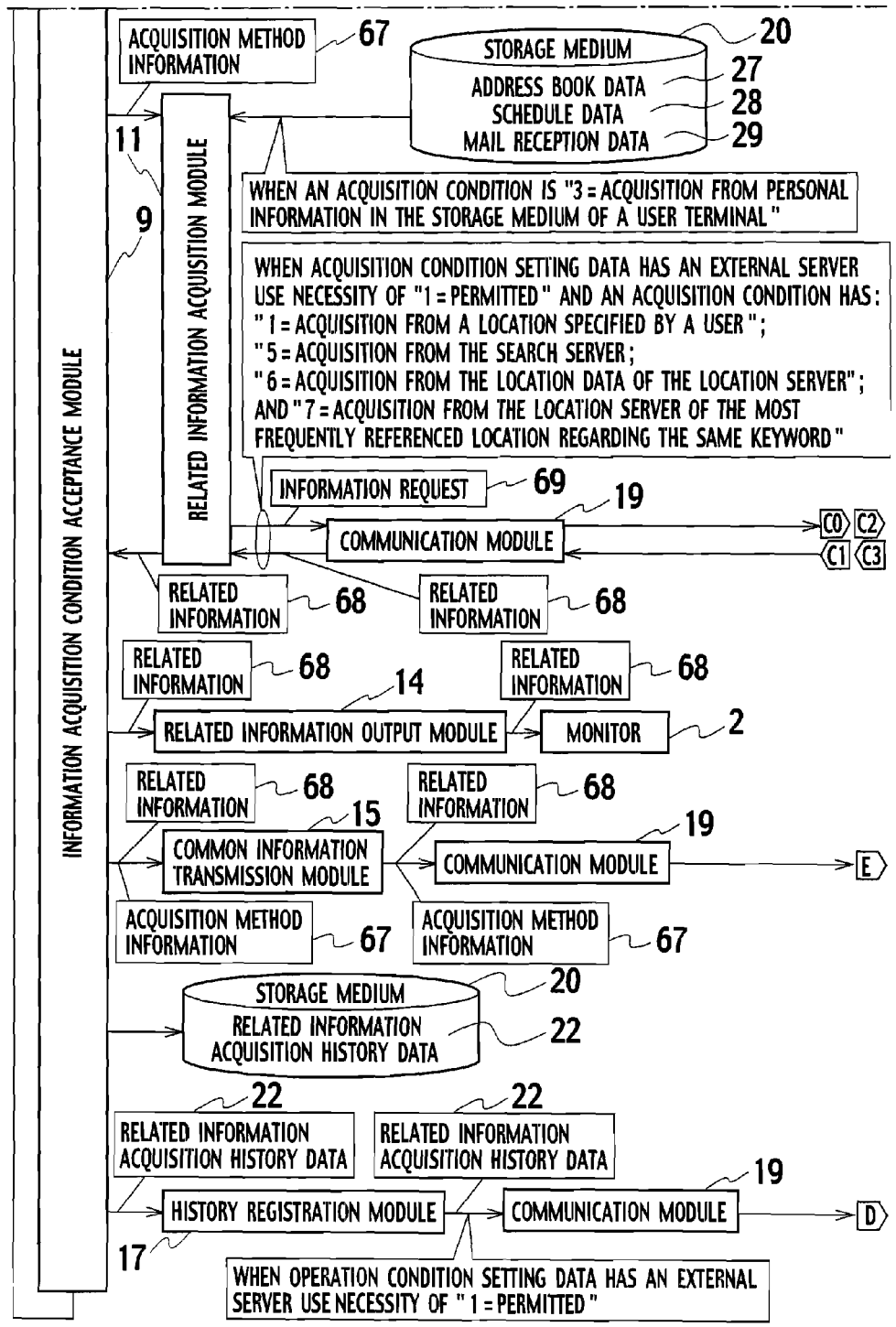
FIG. 4B is a flow diagram explaining an acquisition condition acceptance/information display sequence of the information communication system according to the first embodiment of the present invention.

When the common information transmission module 15 receives the acquisition method information 67 or the related information 68, the common information transmission module 15 uses, via the control module 18, the communication module 19 to send the acquisition method information 67 or the related information 68 to the information communication terminal 100 as a call party (shown in "E" in FIG. 4B).

Next, the information acquisition condition acceptance module 9 generates the related information acquisition history data 22 regarding the acquired related information 68 to store, via the control module 18, the generated related information acquisition history data 22 into the storage medium 20.

The related information acquisition history data 22 is at least composed of acceptance date and time, a call ID, a requesting calling party ID, a requested keyword acquisition condition, a common condition, a requested data location, and a to-be-acquired data location.

The call ID, the requested keyword acquisition condition, and the requested data location are set to the call ID, the requested keyword acquisition condition, and the requested data location of the acquisition condition input 65. The acceptance date and time, the requesting calling party ID, and the to-be-acquired data location are set to the acceptance date and time, the requesting calling party ID, and the to-be-acquired data location of the acquisition method information 67.

The common condition is set, when the acquisition condition input 65 has a common condition other than NULL, to the common condition of the acquisition condition input 65. When the acquisition condition input 65 has a common condition of NULL, a value of a read default common condition setting is set as a common condition.

Next, the information acquisition condition acceptance module 9 uses the requesting calling party ID as key information to read, via the control module 18, a value of the external server use necessity in the operation condition setting data 23. When the external server use necessity has a value of "1=permitted", the information acquisition condition acceptance module 9 sends the related information acquisition history data 22 to the history registration module 17.

When the history registration module 17 receives the related information acquisition history data 22, the history registration module 17 uses the requesting calling party ID in the related information acquisition history data 22 as key information to read, via the control module 18, the value of the location (for history) of the location server 102 in the operation condition setting data 23.

Next, the history registration module 17 uses the value of the location (for history) of the location server 102 to use, via the control module 18, the communication module 19 to send to the location server 102 the requested keyword, acquisition condition, and acquired data location in the related information acquisition history data 22.

It is noted that the registration of the history data 36 in the location server 102 can be seen in a history information registration sequence (see FIG. 11 (which will be shown later)).

The information acquisition condition acceptance module 9 waits, via the control module 18, the acquisition condition input 65 from the keyboard/mouse 3.

The above processing loop is repeated until the audio and video exchange is completed.

<Common Information Reception Display Sequence>

Figure 5:
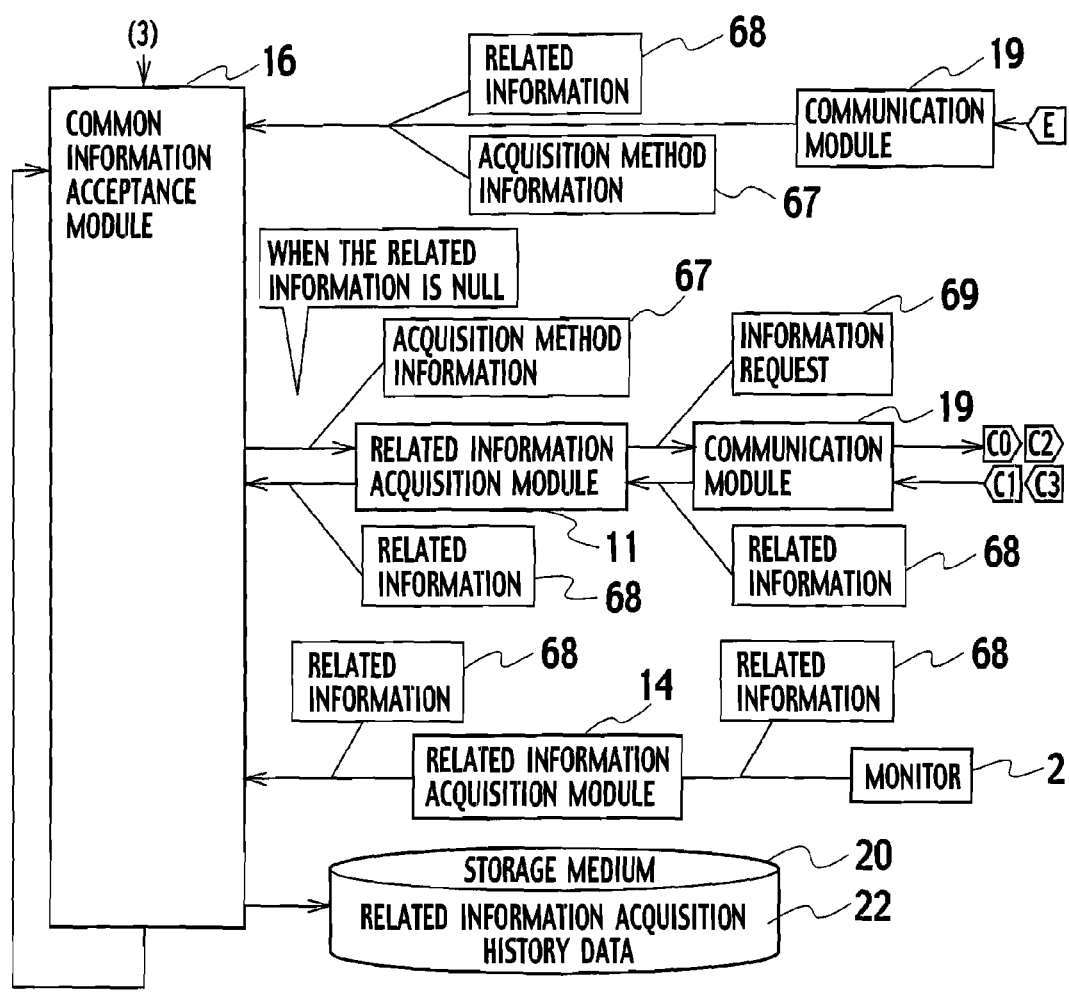
FIG. 5 is a flow diagram explaining a common information reception/display sequence of the information communication system according to the first embodiment of the present invention.

A common information reception display sequence shown in (3) of FIG. 2 will be described with reference to FIG. 5. FIG. 5 represents a sequence in which the acquisition method information 67 or the related information 68 sent from the common information transmission module 15 of the information communication terminal 100 of a call party corresponding to ("E" in FIG. 4B) is received to allow the related information acquisition module 11 to acquire the related information 68 based on the acquisition method information 67 and the related information 68 is displayed on the monitor 2.

The common information acceptance module 16 uses the communication module 19 via the control module 18 to receive the acquisition method information 67 or the related information 68 sent from the common information transmission module 15 of the information communication terminal 100 of the call party. When the common information acceptance module 16 does not receive the related information 6, the common information acceptance module 16 sends the acquisition method information 67 and the requesting calling party ID acquired from the activation module 4 to the related information acquisition module 11.

When the related information acquisition module 11 receives the value of the acquisition method information 67, the related information acquisition module 11 acquires the related information 68 based on the requested keyword and the value of the to-be-acquired data location in the acquisition method information 67.

When the to-be-acquired data location is within the information communication terminal 100 of the user, the related information 68 is acquired from the storage medium 20 via the control module 18. When the acquire data location is at a position other than the information communication terminal 100 of the user, the communication module 19 is used via the control module 18 to acquire the related information 68.

It is noted that the transmission of related information from the related information server 104 can be seen in a related information provision sequence (see FIG. 9 (which will be shown later)) and the transmission of related information from the search server 105 can be seen in a search information provision sequence (see FIG. 10 (which will be shown later)).

Next, the related information acquisition module 11 returns the acquired related information 68 to the common information acceptance module 16.

The common information acceptance module 16 sends the related information 68 returned from the related information acquisition module 11 to the related information output module 14.

When the related information output module 14 receives the related information 68, the related information output module 14 outputs the related information 68 to the monitor 2 via the control module 18.

Next, the common information acceptance module 16 generates the related information acquisition history data 22 regarding the acquired related information 68 to store, via the control module 18, the generated related information acquisition history data 22 in the storage medium 20.

The related information acquisition history data 22 is at least composed of acceptance date and time, a call ID, a requesting calling party ID, a requested keyword acquisition condition, a common condition, a requested data location, and a to-be-acquired data location.

The acceptance date and time, call ID, requested keyword acquisition condition, common condition, and acquired data location of the related information acquisition history data 22 are set to have the value of the acquisition method information 67. The requesting calling party ID is set to have a value of the requesting calling party ID acquired from the activation module 4. The requested data location is set to NULL.

Next, the common information acceptance module 16 waits, via the control module 18, the acquisition method information 67 or the related information 68 sent from the common information transmission module 15 of the information communication terminal 100 of the call party The above processing loop is repeated until the audio and video exchange is completed.

<Keyword Display/Information Display Sequence>

A keyword display/information display sequence shown in (4) of FIG. 2 will be described with reference to FIGS. 6A to 6C.

Figure 6A:
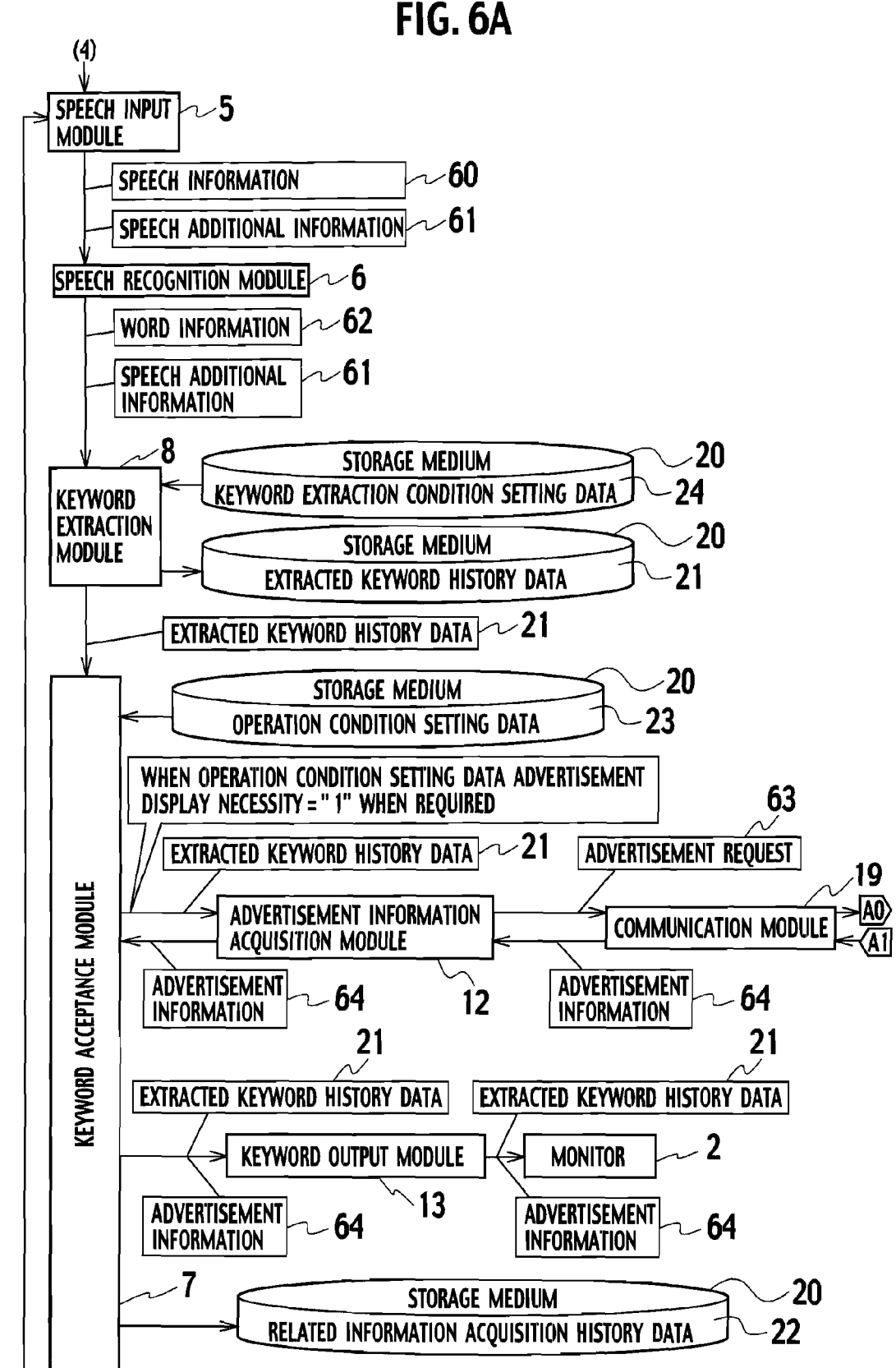
FIG. 6A is a flow diagram explaining common information reception/information display sequence of the information communication system according to the first embodiment of the present invention.
Figure 6B:
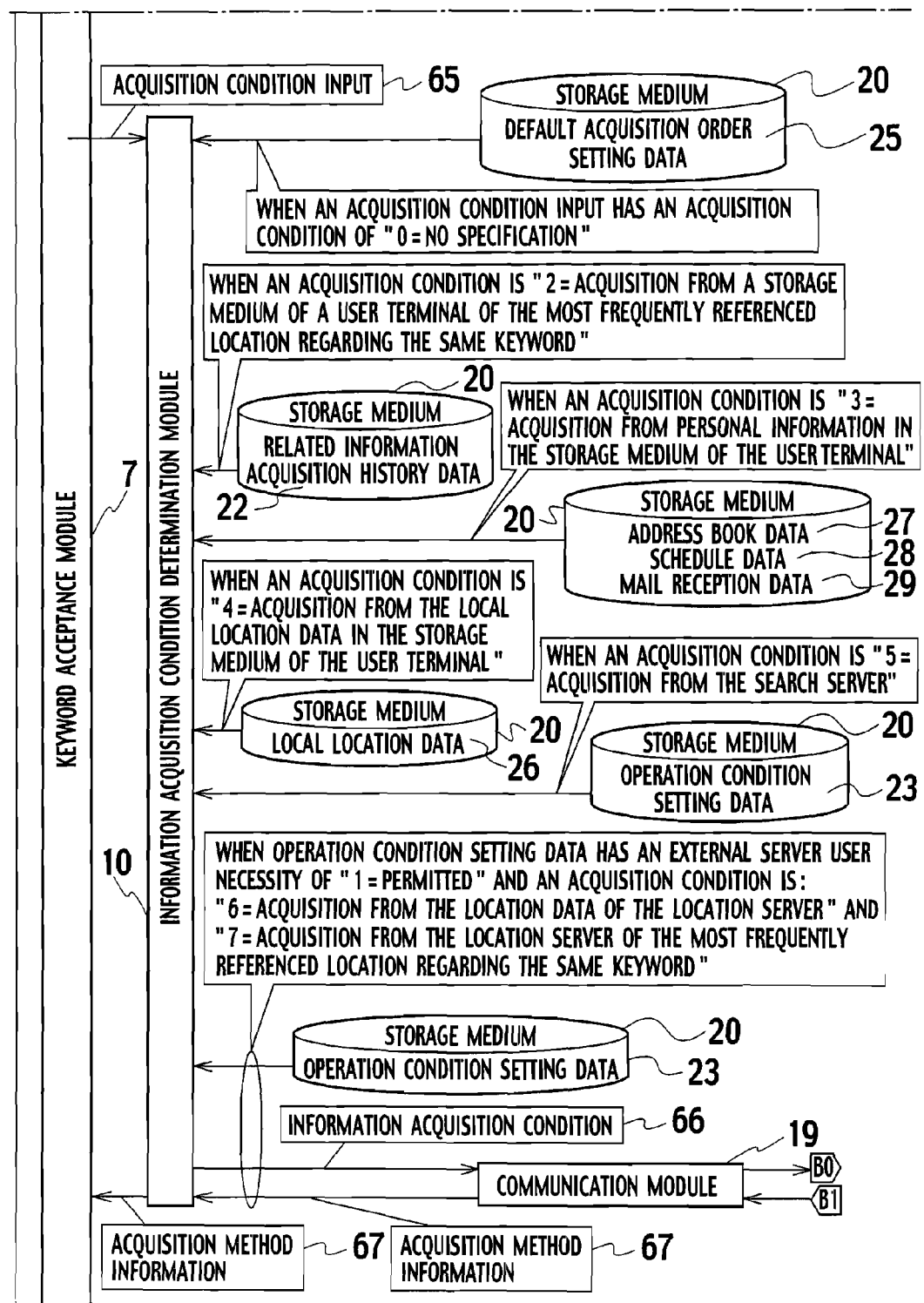
FIG. 6B is a flow diagram explaining a common information reception/information display sequence of the information communication system according to the first embodiment of the present invention.
Figure 6C:
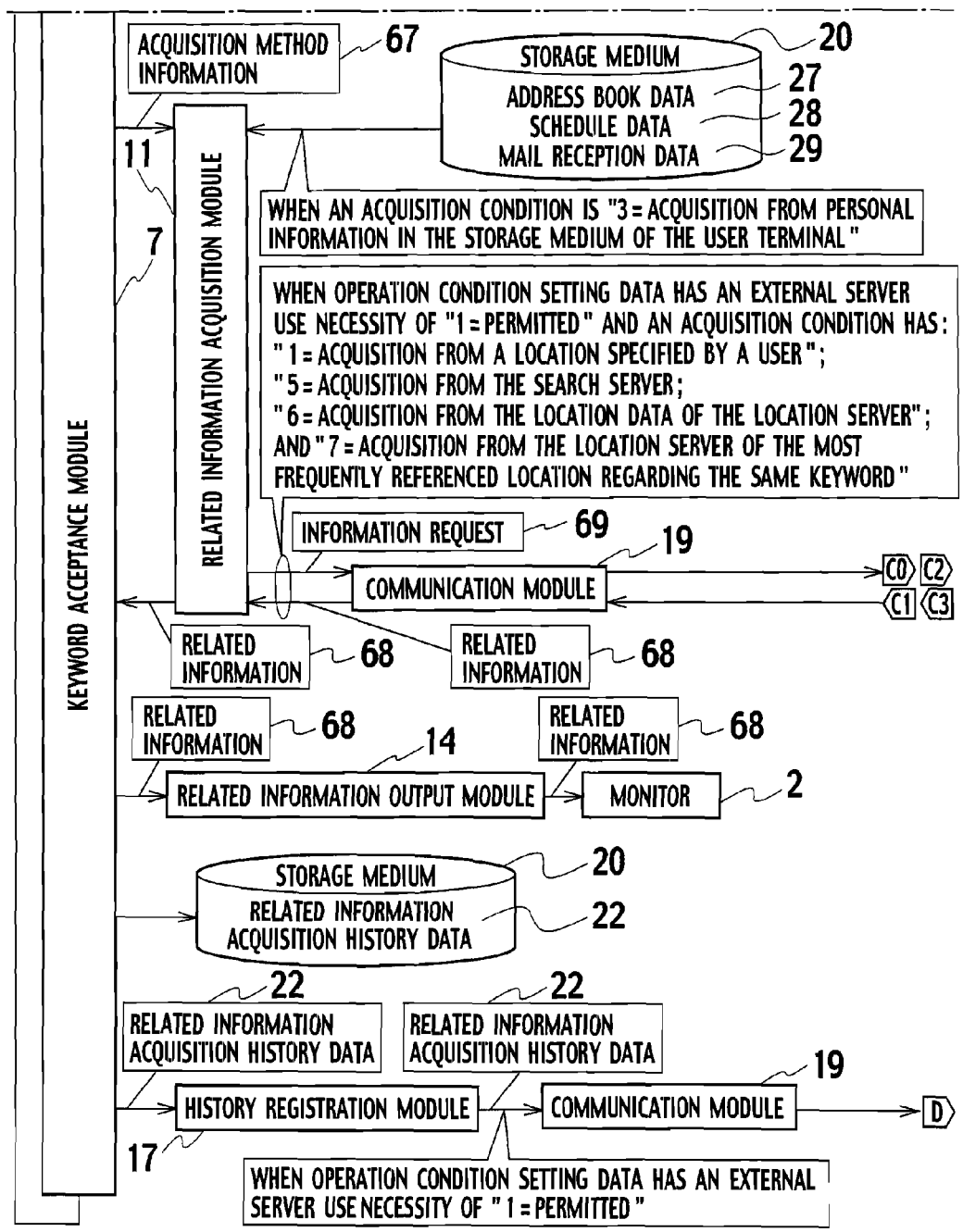
FIG. 6C is a flow diagram explaining a common information reception/information display sequence of the information communication system according to the first embodiment of the present invention.

FIGS. 6A to 6C illustrate a sequence in which a keyword is extracted from the speech information 60 of a call by the speech recognition module 6 and the keyword extraction module 8 to display the keyword on the monitor 2 and, with regards to the displayed keyword, the information acquisition method determination module 10 determines a location (e.g., URL) of the related information 68 to be acquired and the related information acquisition module 11 acquires, based on the determined location (e.g., URL), the related information 68 and the related information 68 is displayed on the monitor 2.

The speech input module 5 acquires the speech information 60 and the speech additional information 61 included in the communication by the audio video exchange module 1 to send the speech information 60 and the speech additional information 61 to the speech recognition module 6. Here, the speech additional information 61 is information regarding a call performed by the audio video exchange module 1 and includes any or all of a call ID, a calling party ID, and a speaker ID.

When the speech recognition module 6 receives the speech information 60 and the speech additional information 61, the speech recognition module 6 specifies, based on the speech information 60, a word included in the call and the word class thereof to generate word information at least including the word and the word class to send the word information and the speech additional information 61 to the keyword extraction module 8.

When the keyword extraction module 8 receives the word information and the speech additional information 61, the keyword extraction module 8 uses the keyword extraction module 8 acquired from the activation module 4 as key information to read, via the control module 18, the keyword extraction condition setting data 24 in the storage medium 20. The keyword extraction condition setting data 24 shows whether keyword extraction must be performed for each word class or not. It is noted that the keyword extraction also may be performed by statistical analysis or linguistic analysis of word information as described in the fifth embodiment.

Next, the keyword extraction module 8 extracts as a keyword, from the word information, only a word having a word class for which the keyword extraction condition setting data 24 is set to "1=to be extracted". Then, the keyword extraction module 8 generates, based on the extracted keyword and the speech additional information 61, the extracted keyword history data 21 to store the extracted keyword history data 21 in the storage medium 20 via control module 18.

The extracted keyword history data 21 is composed at least of: extraction date and time, a call ID, a requesting calling party ID, a calling party ID, a speaker ID, and an extracted keyword. The call ID, the calling party ID, and the speaker ID are set to have a value of the speech additional information 61. The requesting calling party ID is set to have the requesting calling party ID acquired from the activation module 4. The extraction date and time are set to have date and time at which the keyword is extracted by the keyword extraction module 8. The extracted keyword is set to have extracted by the keyword extraction module 8.

Next, the keyword extraction module 8 sends the stored extracted keyword history data 21 to the keyword acceptance module 7.

When the keyword acceptance module 7 receives the extracted keyword history data 21 from the keyword extraction module 8, the keyword acceptance module 7 uses the requesting calling party ID acquired from the activation module 4 as key information to read, via the control module 18, the advertisement display necessity value of the operation condition setting data 23 in the storage medium 20.

The following section will describe a case where the first conditional branching is reached in which the operation condition setting data 23 has the advertisement display necessity value set to "1=required".

The keyword acceptance module 7 uses the requesting calling party ID acquired from the activation module 4 as key information to read, via the control module 18, the value of the location of the advertisement information server 103 of the operation condition setting data 23 in the storage medium 20.

Next, the keyword acceptance module 7 sends the extracted keyword history data 21 and the value of the location of the advertisement information server 103 to the advertisement information acquisition module 12.

When the advertisement information acquisition module 12 receives the extracted keyword history data 21 and the value of the location of the advertisement information server 103, the advertisement information acquisition module 12 uses the communication module 19 to transmit, based on the value of the location of the advertisement information server 103, the extracted keyword in the extracted keyword history data 21 to the advertisement information server 103 via the control module 18 to acquire the advertisement information 64 from the advertisement information server 103 to return the advertisement information 64 to the keyword acceptance module 7.

It is noted that the transmission of advertisement information from an advertisement server can be seen in an advertisement information provision sequence (see FIG. 7 (which will be shown later)).

Next, the keyword acceptance module 7 sends the advertisement information 64 and the extracted keyword history data 21 to the keyword output module 13.

When the keyword output module 13 receives the advertisement information 64 and the extracted keyword history data 21, the keyword output module 13 outputs at least the extracted keyword in the extracted keyword history data 21, the call ID, and the advertisement information 64 to the monitor 2 via the control module 18.

Next, the keyword acceptance module 7 generates the related information acquisition history data 22 regarding the acquired advertisement information 64 to store the generated related information acquisition history data 22 in the storage medium 20 via the control module 18.

The related information acquisition history data 22 is composed at least of: acceptance date and time, a call ID, a requesting calling party ID, a requested keyword acquisition condition, a common condition, a requested data location, and a to-be-acquired data location.

The acceptance date and time show acceptance date and time at which the extracted keyword history data 21 is accepted by the keyword acceptance module 7. The call ID is set to a call ID in the extracted keyword history data 21. The requesting calling party ID is set to the requesting calling party ID acquired from the activation module 4. The requested keyword acquisition condition is set to NULL. The common condition 23 is set to "0=not required". The requested data location is set to NULL. The to-be-acquired data location is set to have a value of the location of the advertisement information server 103.

Next, the following section will describe a case where the second conditional branching is reached in which the operation condition setting data 23 has an advertisement display necessity value of "0=not required".

First, the keyword acceptance module 7 sends the extracted keyword history data 21 to the keyword output module 13.

When the keyword output module 13 receives the extracted keyword history data 21, the keyword output module 13 outputs at least the extracted keyword and the call ID in the extracted keyword history data 21 to the monitor 2 via the control module 18.

Then, the processing at the second conditional branching is completed.

The keyword acceptance module 7 uses the requesting calling party ID acquired from the activation module 4 as key information to read, via the control module 18, the value of the information acquisition condition input necessity of the operation condition setting data 23 of the storage medium 20. When the value is "0=not required" (in this sequence, only "0=not required" is possible), the keyword acceptance module 7 generates the acquisition condition input 65. The acquisition condition input 65 includes at least a requested keyword, a call ID, a requested keyword acquisition condition, and a common condition.

The requested keyword and the call ID are set to the extracted keyword and the call ID in the extracted keyword history data 21, respectively. The requested keyword acquisition condition is set to "0=no specification". The requested keyword acquisition condition is set to NULL.

Next, the keyword acceptance module 7 sends to the information acquisition method determination module 10 the acceptance date and time, the generated acquisition condition input 65, and the requesting calling party ID acquired from the activation module 4. The acceptance date and time are set to acceptance date and time at which the extracted keyword history data 21 is accepted by the keyword acceptance module 7.

The information acquisition method determination module 10 uses the requesting calling party ID as key information to read, via the control module 18, the values of the default acquisition conditions "1" to "7" in the default acquisition order setting data 25 to execute the above (1) to (7) in an order of the acquisition condition values set in the default acquisition condition 1 until the value of the to-be-acquired data location other than NULL is determined.

Next, the information acquisition method determination module 10 generates the acquisition method information 67 to return the acquisition method information 67 to the keyword acceptance module 7.

The acquisition method information 67 includes at least acceptance date and time, a requested keyword, a call ID, a requested keyword acquisition condition, a common condition, and a to-be-acquired data location.

Next, the keyword acceptance module 7 sends to the related information acquisition module 11 the acquisition method information 67 returned from the information acquisition method determination module 10.

When the related information acquisition module 11 receives the value of the acquisition method information 67, the related information acquisition module 11 uses the requested keyword and the value of the to-be-acquired data location in the acquisition method information 67 to acquire the related information 68.

When the to-be-acquired data location is within the information communication terminal 100 of the user, the related information 68 is acquired via the control module 18 from the storage medium 20. When the to-be-acquired data location is at a position other than that of the information communication terminal 100 of the user, the communication module 19 is used via the control module 18 to acquire the related information 68.

It is noted that the transmission of related information transmission from the related information server 104 can be seen in a related information provision sequence (see FIG. 9 (which will be shown later)) and the transmission of related information 68 from the search server 105 can be seen in a search information provision sequence (see FIG. 10 (which will be shown later)).

Next, the related information acquisition module 11 returns the acquired related information 68 to the keyword acceptance module 7.

The keyword acceptance module 7 sends the related information 68 returned from the related information acquisition module 11 to the related information output module 14. When the related information output module 14 receives the related information 68, the related information output module 14 outputs the related information 68 to the monitor 2 via the control module 18.

Next, the keyword acceptance module 7 generates the related information acquisition history data 22 regarding the acquired related information 68 to store, via the control module 18, the generated related information acquisition history data 22 in the storage medium 20.

The related information acquisition history data 22 is at least composed of: acceptance date and time, a call ID, a requesting calling party ID, a requested keyword acquisition condition, a common condition, a requested data location, and a to-be-acquired data location.

The call ID, the requested keyword acquisition condition, and the requested data location are set to the call ID, the requested keyword acquisition condition, and the requested data location of the acquisition condition input 65. The acceptance date and time, the requesting calling party ID, and the to-be-acquired data location are set to the acceptance date and time, the requesting calling party ID, and the to-be-acquired data location of the acquisition method information 67. The common condition is set to a value of the read default common condition setting.

Next, the keyword acceptance module 7 uses the requesting calling party ID as key information to read, via the control module 18, the value of the external server use necessity in the operation condition setting data 23. When the external server use necessity has a value of "1=permitted", the keyword acceptance module 7 sends the related information acquisition history data 22 to the history registration module 17.

When the history registration module 17 receives the related information acquisition history data 22, the history registration module 17 uses the requesting calling party ID of the related information acquisition history data 22 as key information to read, via the control module 18, the value of the location (for history) of the location server 102 in the operation condition setting data 23.

Next, the history registration module 17 uses, based on the value of the location (for history) of the location server 102, the communication module 19 via the control module 18 to send to the location server 102 the requested keyword, the acquisition condition, and the to-be-acquired data location in the related information acquisition history data 22.

Finally, the keyword acceptance module 7 calls the speech input module 5.

The above processing loop is repeated until the audio and video exchange is completed.

<Advertisement Information Provision Sequence>

Next, an advertisement information provision sequence will be described hereinafter with reference to FIG. 7. FIG. 7 shows a sequence in which the advertisement information server 103 receives, via the network 101, a keyword extracted from the information communication terminal 100 to return the advertisement information 64 related to the extracted keyword to the information communication terminal 100. It is noted that "A0" in FIG. 7 corresponds to "A0" in FIG. 3 and "A1" in FIG. 7 corresponds "A1" in FIG. 3.

The advertisement information provision module 37 of the advertisement information server 103 uses the communication module 19 via the control module 18 to receive an extracted keyword sent from the advertisement information acquisition module 12 of the information communication terminal 100.

Next, the advertisement information provision module 37 uses the extracted keyword as key information to search, via the control module 18, the record of the advertisement data 41 in the storage medium 40 to read the advertisement information 64 of the record for which the keyword of the record of the advertisement data 41 is identical with the extracted keyword.

Next, the advertisement information provision module 37 uses the communication module 39 via the control module 38 to transmit the read advertisement information 64 to the advertisement information acquisition module 12 of the information communication terminal 100.

The advertisement information provision module 37 waits, via the control module 38, the extracted keyword sent from the advertisement information acquisition module 12 of the information communication terminal 100.

The above loop is repeated until the audio video exchange is completed.

<Acquisition Method Information Provision Sequence>

Figure 8:
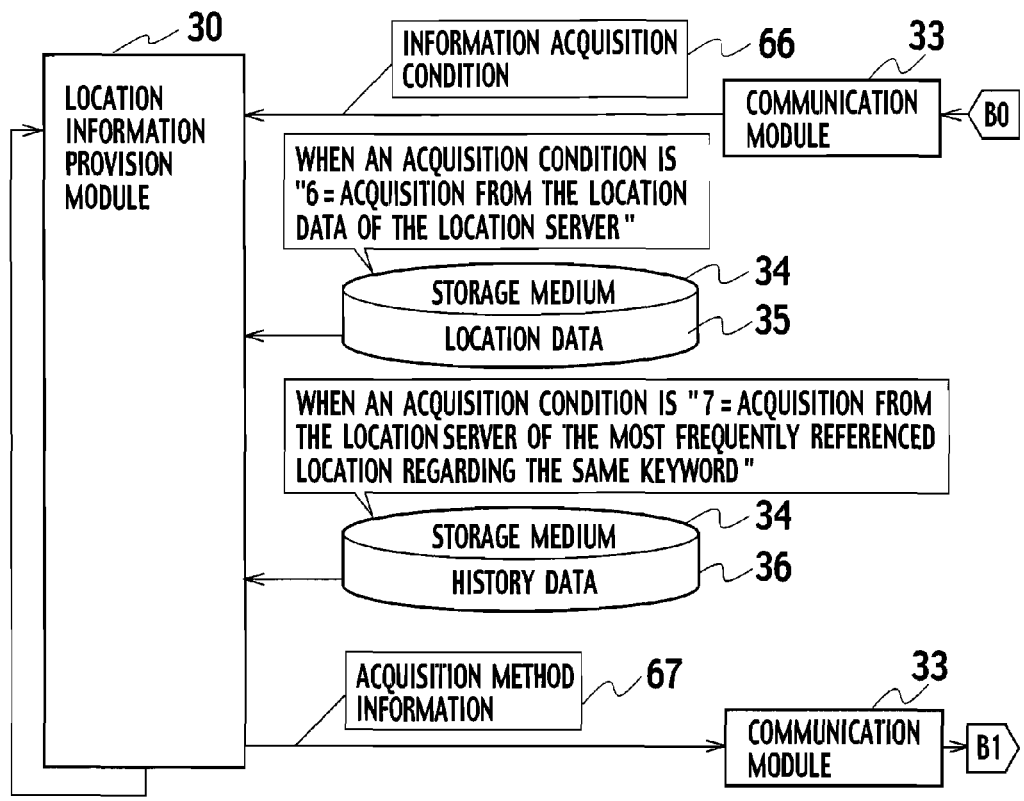
FIG. 8 is a flow diagram explaining an acquisition method information provision sequence of the information communication system according to the first embodiment of the present invention.

FIG. 8 shows an acquisition method information provision sequence in which the location server 102 receives, via the network 101, a requested keyword and a requested keyword acquisition condition from the information communication terminal 100 to return the requested keyword and a data location of information related to the requested keyword acquisition condition to the information communication terminal 100. It is noted that "B0" in FIG. 8 corresponds to "B0" in FIG. 4A and "B1" in FIG. 8 corresponds to "B1" in FIG. 4A.

The location information provision module 30 of the location server 102 uses, via the control modules 25 to 32, the communication module 33 to receive the requested keyword and the requested keyword acquisition condition sent from the information acquisition method determination module 10 of the information communication terminal 100.

The following section will describe a case where the first conditional branching is reached in which the received requested keyword acquisition condition is "6=Acquisition from the location data 35 of the location server 102".

The location information provision module 30 of the location server 102 uses the requested keyword as key information to search, via the control module 32, the record of the location data 35 in the storage medium 34 to read a data location for which the keyword of the record of the location data 35 is identical with the requested keyword. Here, the location information provision module 30 reads only records for which a time at which the requested keyword and the requested keyword acquisition condition are received by the information communication terminal 100 is between the registration date and time and the valid date and time of the record.

Next, the following section will describe a case where the second conditional branching is reached in which the received requested keyword acquisition condition is "7=Acquisition from the location server 102 of the most frequently referenced location regarding the same keyword".

The location information provision module 30 of the location server 102 collects the record of the history data 36 of the storage medium 34 for which the value of the requested keyword is identical with the requested keyword received from the information communication terminal 100 to read the value of the to-be-acquired data location for which the information is acquired with the highest frequency.

At this stage, the processing of the second conditional branching is completed.

Next, the location information provision module 30 uses, via the control module 32, the communication module 33 to send the read data location value to the information acquisition method determination module 10 of the information communication terminal 100.

The location information provision module 30 uses, via the control module 32, the communication module 33 to wait for a requested keyword and a requested keyword acquisition condition sent from the information acquisition method determination module 10 of the information communication terminal 100.

<Related Information Provision Sequence>

Figure 9:
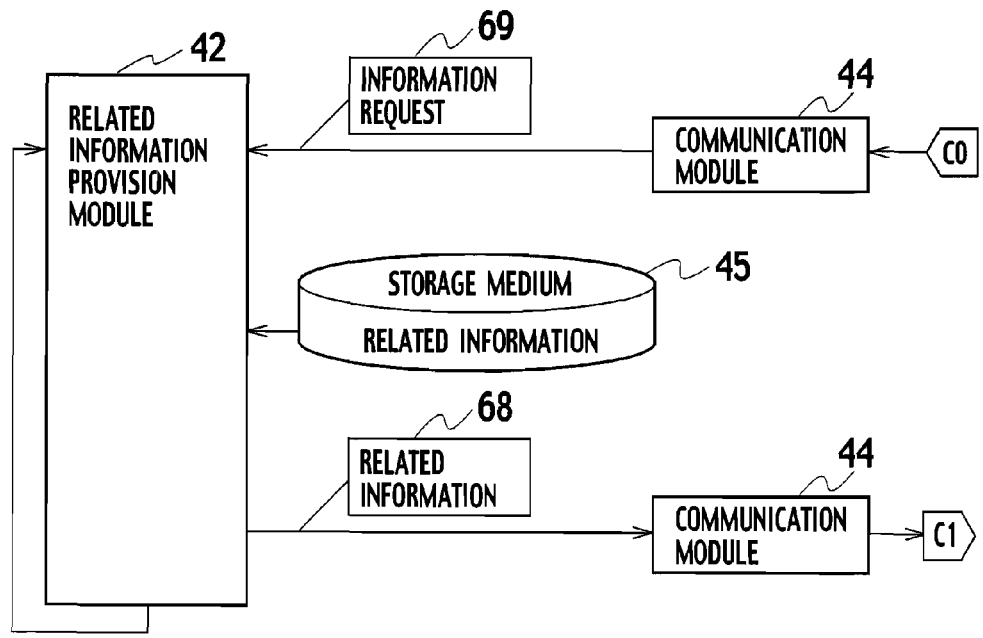
FIG. 9 is a flow diagram explaining a related information provision sequence of the information communication system according to the first embodiment of the present invention.

FIG. 9 shows a related information provision sequence in which the related information server 104 receives, via the network 101, the to-be-acquired data location and the value of the requested keyword (which is not always required) from the related information acquisition module 11 of the information communication terminal 100 to return the related information 68 applicable to the to-be-acquired data location to the information communication terminal 100.

It is noted that "C0" in FIG. 9 corresponds to "C0" in FIG. 4B and "C1" in FIG. 9 corresponds to "C1" in FIG. 4B.

The related information provision module 42 of the related information server 104 uses, via the control module 43, the communication module 44 to receive the to-be-acquired data location and the value of the requested keyword (which is not always required) sent from the related information acquisition module 11 of the information communication terminal 100.

Next, the related information provision module 42 generates the related information 68 applicable to the to-be-acquired data location to use, via the control module 43, the communication module 44 to send the read related information 68 to the related information acquisition module 11 of the information communication terminal 100.

Next, the related information provision module 42 waits, via the control module 43, for a acquired data location sent from the related information acquisition module 11 of the information communication terminal 100.

<Search Information Provision Sequence>

Figure 10:
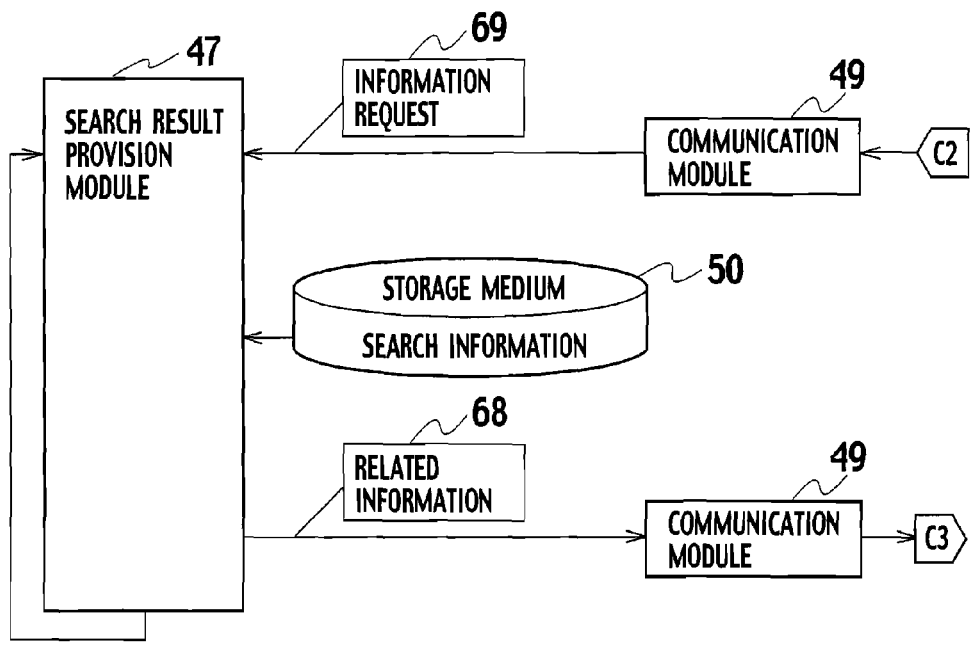
FIG. 10 is a flow diagram explaining a search information provision sequence of the information communication system according to the first embodiment of the present invention.

FIG. 10 shows a search information provision sequence in which the search server 105 receives, via the network 101, a to-be-acquired data location and a value of a requested keyword from the related information acquisition module 11 of the information communication terminal 100 to return the search result based on the requested keyword as the related information 68 to the information communication terminal 100.

It is noted that "C2" in FIG. 10 corresponds to "C2" in FIG. 4B and "C3" in FIG. 10 corresponds to "C3" in FIG. 4B.

The search result provision module 47 of the search server 105 uses, via the control module 48, the communication module 49 to receive the to-be-acquired data location and the requested keyword sent from the related information acquisition module 11 of the information communication terminal 100.

Next, the search result provision module 47 generates the search result based on the requested keyword as the related information 68 to use, via the control module 48, the communication module 49 to send the generated related information 68 to the related information acquisition module 11 of the information communication terminal 100.

The search result provision module 47 waits, via the control module 48, for the to-be-acquired data location and the value of the requested keyword sent from the related information acquisition module 11 of the information communication terminal 100.

<History Information Registration Sequence>

Figure 11:
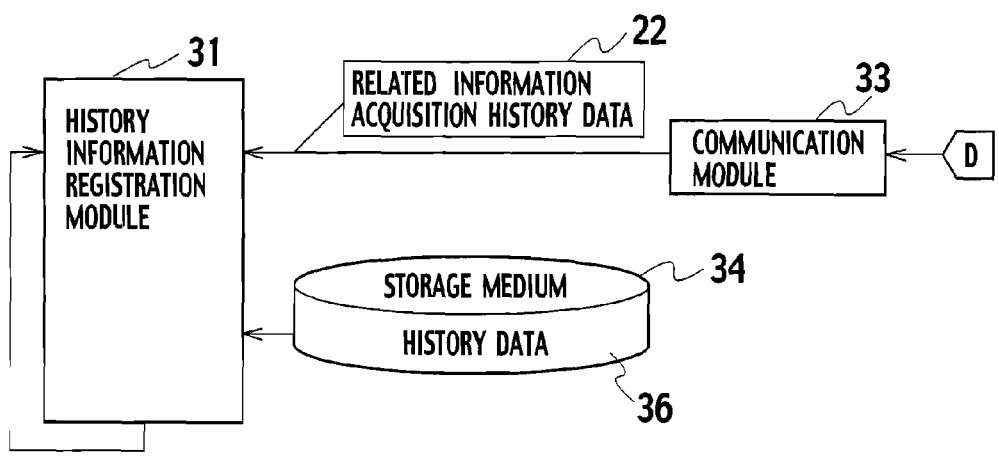
FIG. 11 is a flow diagram explaining a history information registration sequence according to the first embodiment of the present invention.

FIG. 11 shows a history information registration sequence in which the location server 102 receives, via the network 101, a requested keyword, an acquisition condition, and a value of the to-be-acquired data location from the history registration module 17 of the information communication terminal 100 to store these pieces of information in the storage medium 20. It is noted that "D" in FIG. 11 corresponds to "D" in FIG. 4B.

The history information registration module 31 of the location server 102 uses, via the control module 32, the communication module 33 to receive the requested keyword, the acquisition condition, and the value of the to-be-acquired data location sent from the history registration module 17 of the information communication terminal 100.

Next, the history information registration module 31 generates the history data 36 based on the requested keyword, the acquisition condition, and the value of the to-be-acquired data location. Here, the history data 36 is composed of the acceptance date and time, the requested keyword, the acquisition condition, and the to-be-acquired data location. The acceptance date and time are set to a time at which the requested keyword, the acquisition condition, and the value of the to-be-acquired data location are received by the history information registration module 31 from the history registration module 17 of the information communication terminal 100. Other values are set to values received from the history registration module 17 of the information communication terminal 100.

Next, the history information registration module 31 stores, via the control module 32, the generated history data 36 as the history data 36 in the storage medium 20.

<Screen Output Image of Information Communication Terminal 100>

Figure 12:
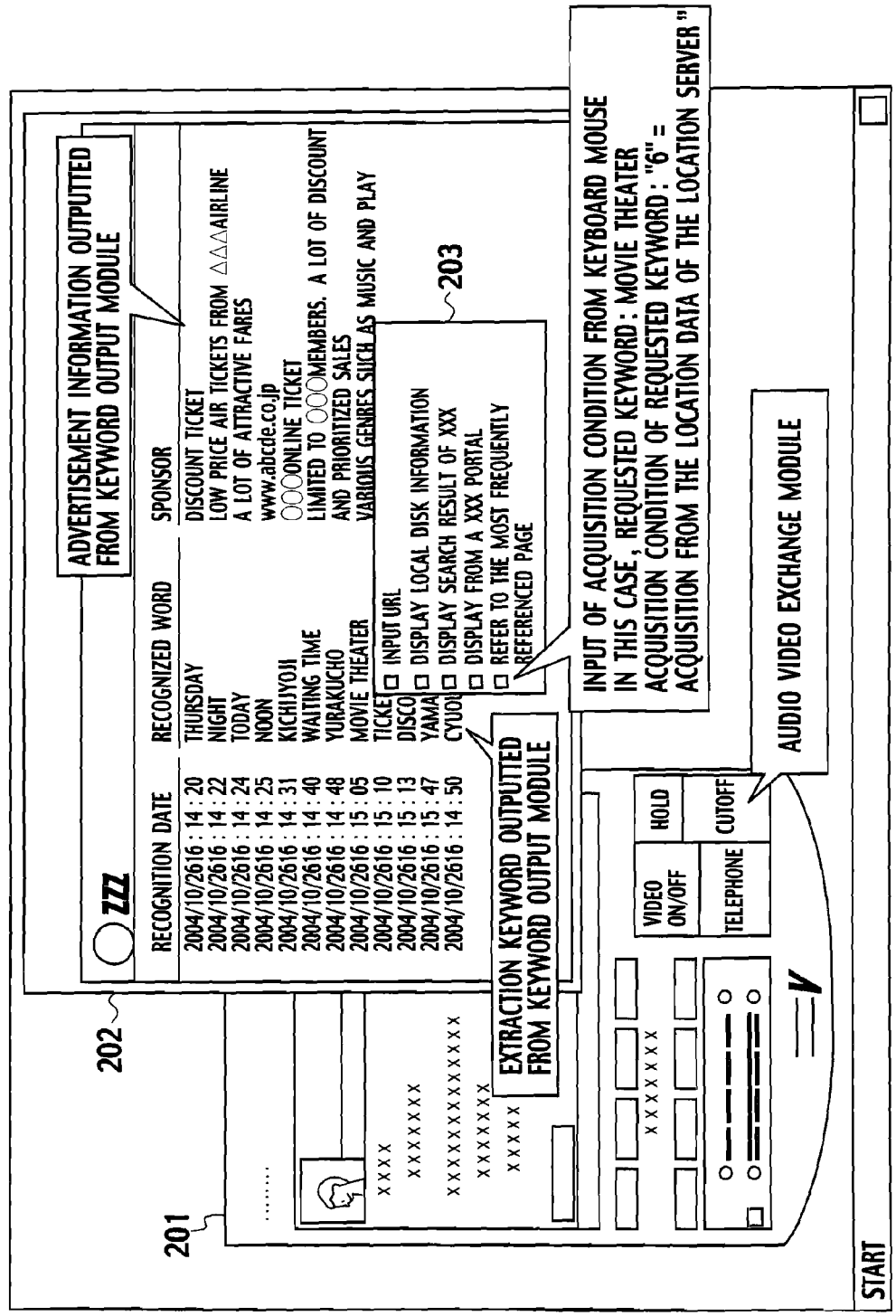
FIG. 12 illustrates an example of a screen output image of an information communication terminal according to the first embodiment of the present invention.

FIG. 12 shows an example of a screen output image of the information communication terminal 100 according to an embodiment of the present invention. FIG. 12 shows an example of a display of the audio video exchange module 1, extracted keywords outputted from the keyword output module 13, the advertisement information 64 outputted from the keyword output module 13, and the acquisition condition input 65 from the keyboard/mouse 3.

Figure 13:
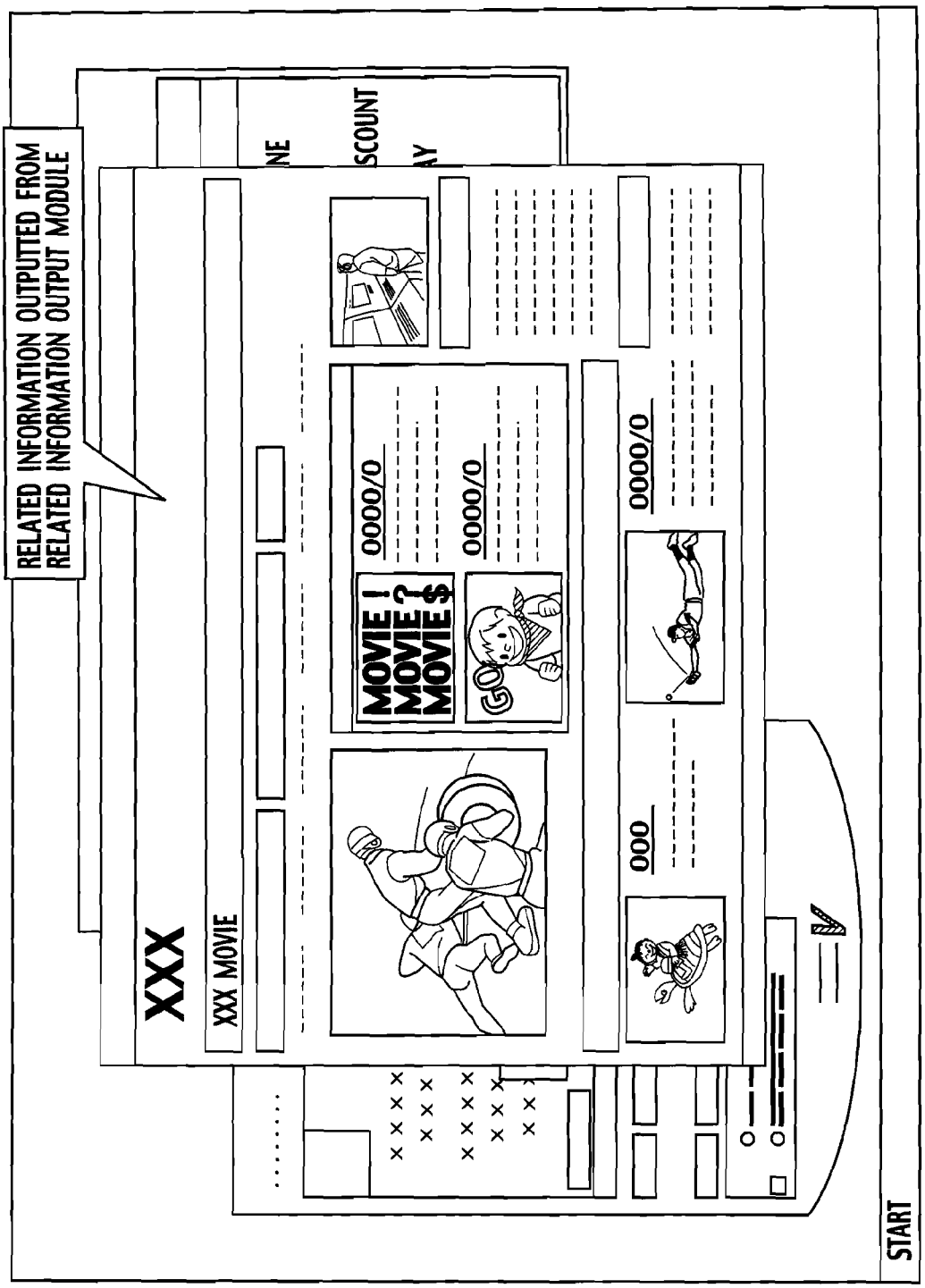
FIG. 13 illustrates an example of a screen output image of an information communication terminal according to the first embodiment of the present invention.

FIG. 13 also shows an example of a screen output image by the information communication terminal 100 and an example of a display of the related information 68 outputted from the related information output module 14.

According to the first embodiment as described above, an information communication system can include the speech recognition module and the keyword extraction module for extracting a keyword from conversation speech information and the related information acquisition module for acquiring information related to the keyword.

By the speech recognition, a user does not have to input information via a keyboard for example or to search a place where the desired information is stored in order to obtain a list displayed on a terminal that shows keywords for searching additional information and advertisement information. Thus, the user can select an interesting keyword to obtain additional information and advertisement information.

Furthermore, additional information and advertisement information themselves are not directly displayed on the terminal but are displayed in the form of keywords so that the user can make a choice from among the keywords to display information regarding the selected keyword. Thus, even when a plurality of keywords are recognized, the user can select information that the user really wants.

When the speech recognition cannot recognize any keyword at all or when a wrong keyword is recognized, an interaction by the user for the keyword is prompted again. Thus, the user can acquire, without depending on the speech information recognition algorithm function, information having a deep relation with conversation based on a keyword included in the conversation.

Such a module also can be provided in each terminal to provide calibration data for example for the speech recognition to the terminal. In this case, speech recognition can be performed with a higher accuracy than that by speech recognition by an exchange facility.

In this case, a keyword can be extracted without providing conversation audio data to an exchange facility provider.

Furthermore, a user can obtain additional information and advertisement information by selecting a highly-relevant keyword, thus eliminating a need for providing all pieces of conversation-related information.

Furthermore, an exclusive exchange facility for performing a call control of audio video communication (IP telephone, IP television telephone) or information exchange, keyword extraction in the exclusive exchange facility, or the distribution of accessorial information from the exclusive exchange facility is no more required.

Furthermore, even a pure P2P-type IP telephone method and a P2P-side IP telephone method can provide accessorial information based on the keyword to the system.

Furthermore, a provider desiring both of an audio video communication service and an accessorial information provision service to a user does not always have to structure and operate an exclusive exchange facility.

Furthermore, the speech recognition performed within an information communication system to eliminate the need for speech recognition performed in an exclusive exchange facility eliminates, when the system tries to acquire accessorial information based on the keyword, a need for sending a system or user identifier to the exterior of the terminal.

Furthermore, a user desiring the protection of his or her privacy information can have the same level of privacy protection as that of a general "downloading operation of text, audio, or video information from the Internet to a user terminal".

Furthermore, a user can browse, through an information communication system, accessorial information and advertisement information stored in a facility outside of an exclusive exchange network (e.g., the Internet).

Furthermore, an information communication terminal, an information communication system, an information communication method, and an information communication program as well as a recording medium having a record thereof can be provided that can use the so-called pure P2P-type IP telephone method that does not require an exchange facility for call establishment and information exchange and a P2P-type IP telephone method that does not require information exchange.

Second Embodiment

-Description of the Entire Structure-

An information communication system according to a second embodiment is different from the information communication system shown in FIG. 1 in that the information communication terminal 100 further includes a speech recognition result exchange module 70.

When an operation condition setting data 23 (which will be described later) has the speech recognition result transmission necessity set to "1=required", the speech recognition result exchange module 70 uses the communication module 19 to exchange the word information 62 outputted from the speech recognition module 6 with the information communication terminal 100 of a call party.

The information communication terminal 100 as a destination is determined based on the speech additional information 61 outputted from the speech recognition module 6. It is assumed that there may be a plurality of information communication terminals 100 as a call party. The speech recognition result exchange module 70 sends to the keyword extraction module 8 the word information 62 as call party text data acquired from the information communication terminal 100 as the call party.

The keyword extraction module 8 is a module that extracts, based on the word information (e.g., word, word class) acquired from the speech recognition result exchange module 70, a keyword based on the keyword extraction condition setting data 24 (which will be described later) to generate, based on the extracted keyword and the speech additional information, extracted keyword history data 21 (which will be described later) to store the extracted keyword history data 21 to subsequently send the data to the keyword acceptance module 7. It is noted that the keyword extraction also may be performed by statistical analysis or linguistic analysis of word information as described in the fifth embodiment. The use of this module allows a user of the information communication terminal 100 to narrow down the keywords displayed on the monitor 2.

The control module 18 uses the communication module 19 depending on a request from the audio video exchange module 1, the speech recognition result exchange module 70, the advertisement information acquisition module 12, the information acquisition method determination module 10, the related information output module 14, the common information transmission module 15, the common information acceptance module 16, and the history registration module 17.

The communication module 19 is controlled by the control module 18 and is used by the audio video exchange module 1, the speech recognition result exchange module 70, the advertisement information acquisition module 12, the information acquisition method determination module 10, the related information output module 14, the common information transmission module 15, the common information acceptance module 16, and the history registration module 17 to exchange information with another information communication terminal 100, the related information server 104, the location server 102, and the advertisement information server 103 via the network 101.

Other structures are the same as those of the information communication system shown in FIG. 1 and thus will not described further.

-Description of Processing Flow-

Figure 24:
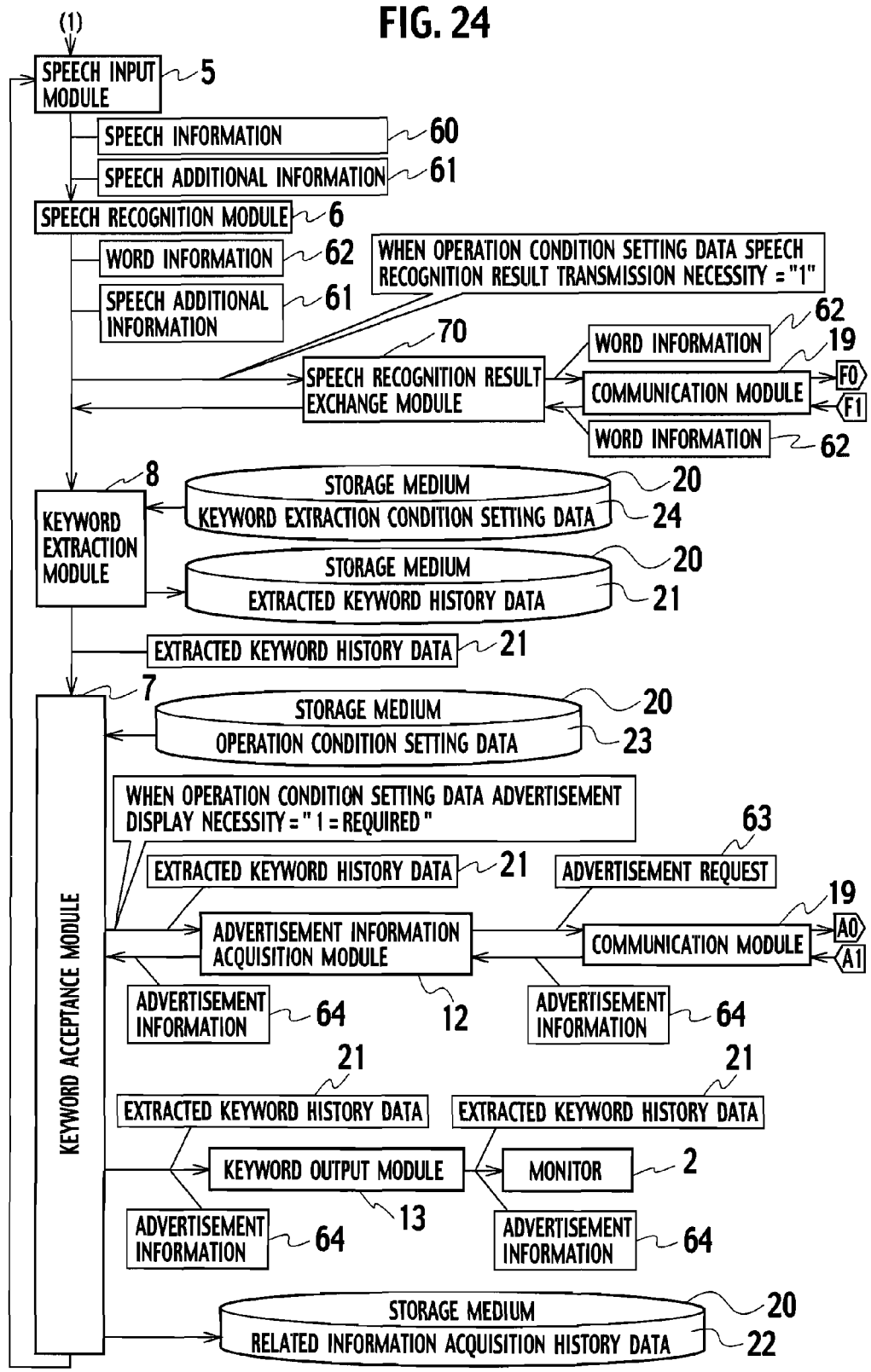
FIG. 24 is a flow diagram explaining a keyword display sequence according to the second embodiment of the present invention.
Figure 25:
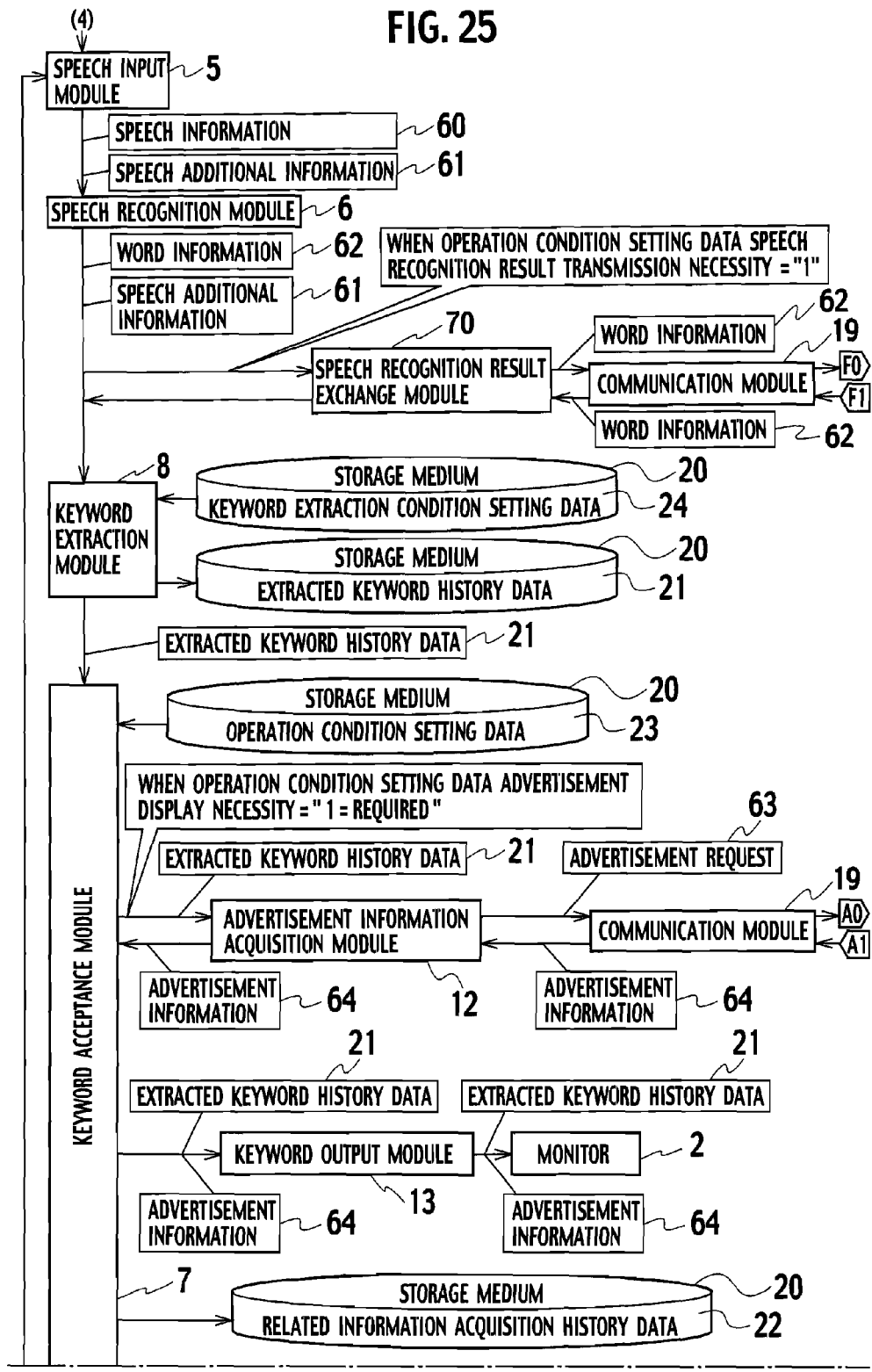
FIG. 25 is a flow diagram explaining common information reception/information display sequence according to the second embodiment of the present invention.

With reference to FIG. 24 and FIG. 25, the following section will describe a processing for acquiring related information by the information communication terminal 100 according to the second embodiment. The processing flow of the second embodiment is identical with the processing flow shown in the first embodiment except for a part of the keyword display sequence shown in (1) of FIG. 2 and the keyword display/information display sequence shown in (4) of FIG. 2. Thus, the identical flow will not be further described.

<Keyword Display Sequence>

Figure 2:
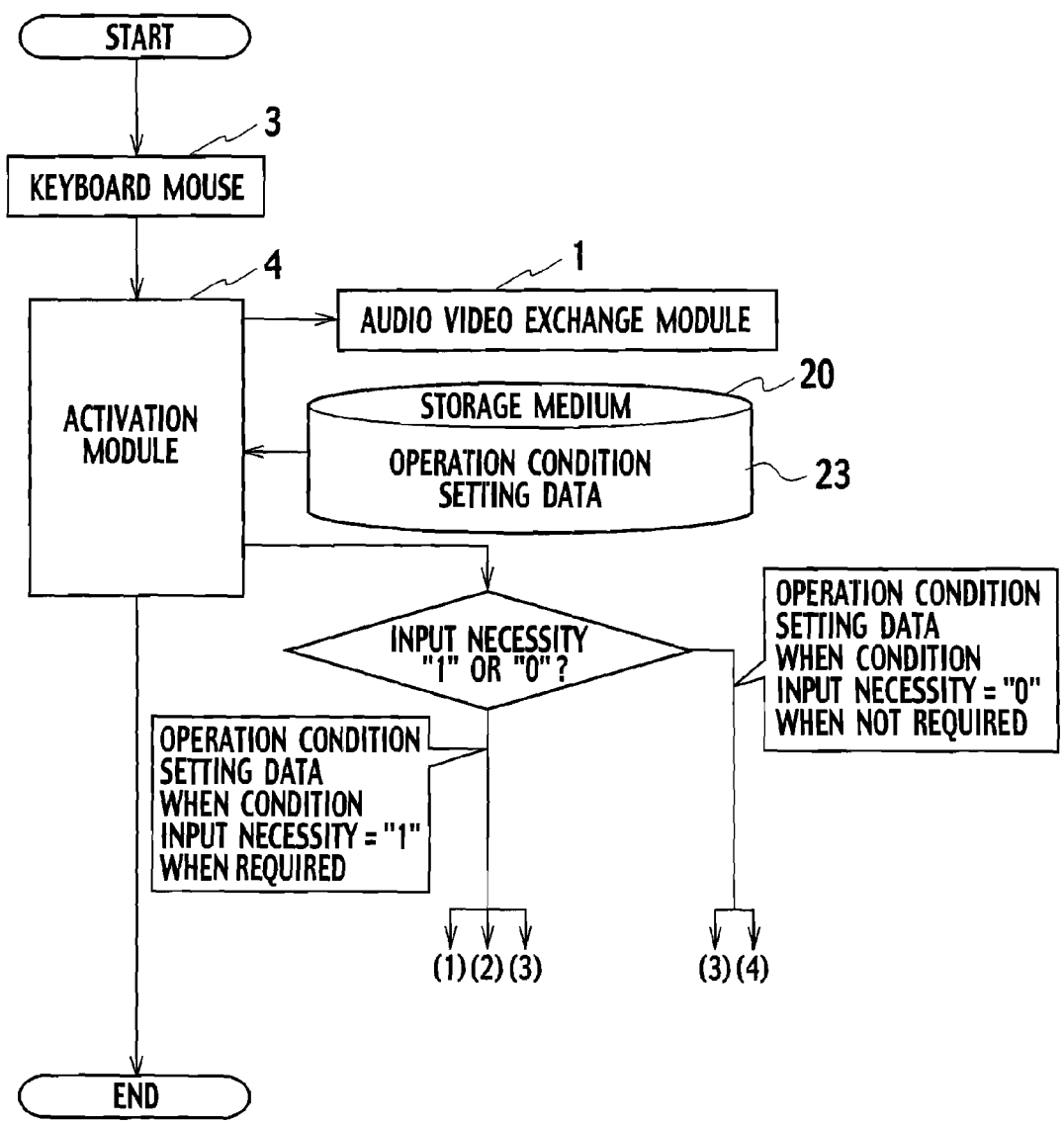
FIG. 2 is a flow diagram explaining an activation sequence of the information communication system according to the first embodiment of the present invention.
Figure 3:
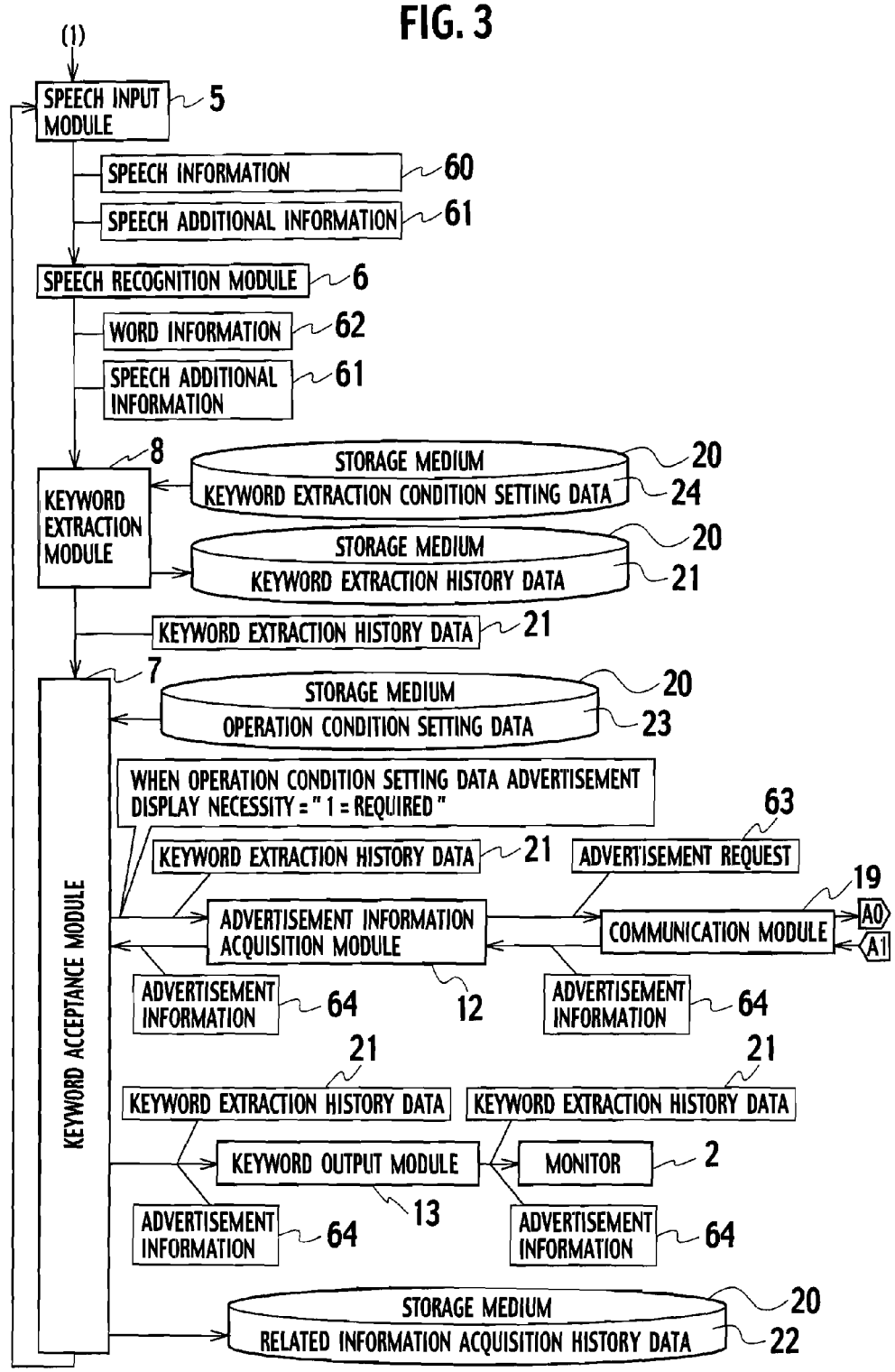
FIG. 3 is a flow diagram explaining a keyword display sequence of the information communication system according to the first embodiment of the present invention.

A keyword display sequence shown in FIG. 24 ((1) of FIG. 2) is a sequence in which a keyword is extracted by the speech recognition module 6 and the keyword extraction module 8 based on the speech information 60 of a call and then the keyword is displayed on the monitor 2.

First, the speech input module 5 acquires the speech information 60 and the speech additional information 61 included in the communication by audio video exchange module 1 to send the speech information 60 and the speech additional information 61 to the speech recognition module 6. Here, the speech additional information 61 means information regarding a call performed by the audio video exchange module 1 that includes a call ID and a calling party ID.

When the speech recognition module 6 receives the speech information 60 and the speech additional information 61, a word included in the call and the word class thereof are specified based on the speech information 60 to generate the word information 62 at least including the word class. When the speech recognition result transmission necessity is set to "1=required", the word information 62 and the speech additional information 61 are sent to the speech recognition result exchange module 70 to the keyword extraction module 8.

When the speech recognition result exchange module 70 receives the word information 62 and the speech additional information 61, the communication module 19 is used via the control module 18 to send the word information 62 and the requesting calling party ID acquired from the activation module 4 to the information communication terminal 100 of the call party by sending all of the first to the fifth calling party IDs recorded in the speech additional information 61 to the information communication terminal 100 as a destination. The speech recognition result exchange module 70 uses, via the control module 18, the communication module 19 to receive the word information 62 and the requesting calling party ID sent from the speech recognition result exchange module 70 of the information communication terminal 100 as a call party to send the word information 62 and the requesting calling party ID to the keyword extraction module 8.

When the speech recognition result transmission necessity is set to "0=not required", the word information 62 and the speech additional information 61 are not sent to the speech recognition result exchange module 70 but is sent to only the keyword extraction module 8.

The keyword extraction module 8 receives the word information 62 and the speech additional information 61 from the speech recognition module 6. When the keyword extraction module 8 receives the word information 62 of the call party and the requesting calling party ID of the call party from the speech recognition result exchange module 70, the keyword extraction module 8 uses the requesting calling party ID acquired from the activation module 4 as key information to read, via the control module 18, the keyword extraction condition setting data 24 from the storage medium 20. The keyword extraction condition setting data 24 includes a setting showing whether keyword extraction must be performed for each word class or not. It is noted that the keyword extraction also may be performed by statistical analysis or linguistic analysis of word information as described in the fifth embodiment.

Next, the keyword extraction module 8 extracts, from the word information, only a word having a word class for which the keyword extraction condition setting data 24 is set to "1=to be extracted". Then, the extracted keyword history data 21 is generated based on the extracted keyword and the speech additional information 61 and is stored in the storage medium 20 via the control module 18.

The extracted keyword history data 21 is at least composed of extraction date and time, a call ID, a requesting calling party ID, a calling party ID, a speaker ID, and an extracted keyword. The call ID is set to the value of the speech additional information 61.

When the extracted keyword is the word information 62 acquired from the speech recognition module 6, the speaker ID is set to the requesting calling party ID acquired from the activation module 4. When the extracted keyword is the word information acquired from the speech recognition result exchange module 70, the speaker ID is set to the requesting calling party ID of the call party acquired from the speech recognition result exchange module 70.

The requesting calling party ID is set to the requesting calling party ID acquired from the activation module 4. The extraction date and time are set to date and time at which the keyword is extracted by the keyword extraction module 8. The extracted keyword is set to the keyword extracted by the keyword extraction module 8. Next, the keyword extraction module 8 sends the stored extracted keyword history data 21 to the keyword acceptance module 7. The subsequent processing is the same as that of the processing flow in the first embodiment.

<Keyword Display/Information Display Sequence>

The following section will describe the keyword display/information display sequence shown in (4) of FIG. 2 with reference to FIG. 25.

FIG. 25 shows a sequence in which a keyword is extracted from the speech information 60 of a call by the speech recognition module 6 and the keyword extraction module 8 and is displayed on the monitor 2 to simultaneously determine, with regards to the displayed keyword, the location (e.g., URL) of the related information 68 acquired by the information acquisition method determination module 10 to allow the related information acquisition module 11 to acquire, based on the determined location (e.g., URL), the related information 68 to display the related information 68 on the monitor 2.

First, the speech input module 5 acquires the speech information 60 and the speech additional information 61 included in the communication by the audio video exchange module 1 to send the speech information 60 and the speech additional information 61 to the speech recognition module 6. Here, the speech additional information 61 means information that is for a call performed by the audio video exchange module 1 and that includes a call ID and a calling party ID.

When the speech recognition module 6 receives the speech information 60 and the speech additional information 61, the speech recognition module 6 specifies, based on the speech information 60, a word included in the call and the word class thereof to generate the word information 62 at least including the word and the word class. When the speech recognition result transmission necessity is set to "1=required", the word information 62 and the speech additional information 61 are sent to the speech recognition result exchange module 70 and the keyword extraction module 8.

When the speech recognition result exchange module 70 receives the word information 62 and the speech additional information 61, the speech recognition result exchange module 70 uses the communication module 19, via the control module 18, to send, to the information communication terminal 100 of the call party, the word information 62 and the requesting calling party ID acquired from the activation module 4 by sending all calling party IDs recorded in the speech additional information 61 to the information communication terminal 100 as a destination. The speech recognition result exchange module 70 uses, via the control module 18, the communication module 19 to receive the word information 62 and the requesting calling party ID sent from the speech recognition result exchange module 70 of the information communication terminal 100 of the call party to send the word information 62 and the requesting calling party ID to the keyword extraction module 8.

When the speech recognition result transmission necessity is set to "0=not required", the word information 62 and the speech additional information 61 are not sent to the speech recognition result exchange module 70 but are sent to only the keyword extraction module 8.

When the keyword extraction module 8 receives the word information 62 and the speech additional information 61 from the speech recognition module 6 and the word information 62 of the call party and the requesting calling party ID of the call party from the speech recognition result exchange module 70, the keyword extraction module 8 uses the requesting calling party ID acquired from the activation module 4 as key information to read, via the control module 18, the keyword extraction condition setting data 24 in the storage medium 20. The keyword extraction condition setting data 24 shows whether keyword extraction must be performed for each word class or not.

Next, the keyword extraction module 8 extracts as a keyword, from the word information, a word having a word class for which the keyword extraction condition setting data 24 is set to "1=to be extracted" to generate, based on the extracted keyword and the speech additional information 61, the extracted keyword history data 21 to store the extracted keyword history data 21 in the storage medium 20 via the control module 18.

The extracted keyword history data 21 is at least composed of extraction date and time, a call ID, a requesting calling party ID, a calling party ID, a speaker ID, and the extracted keyword. The call ID is set to the value of the speech additional information 61.

When the extracted keyword is the word information 62 acquired from the speech recognition module 6, the speaker ID is set to the requesting calling party ID acquired from the activation module 4. When the extracted keyword is the word information acquired from the speech recognition result exchange module 70, the speaker ID is set to the requesting calling party ID of the call party acquired from the speech recognition result exchange module 70.

The requesting calling party ID is set to the requesting calling party ID acquired from the activation module 4. The extraction date and time are set to date and time at which the keyword is extracted by the keyword extraction module 8. The extracted keyword is set to the keyword extracted by the keyword extraction module 8.

Next, the keyword extraction module 8 sends the stored extracted keyword history data 21 to the keyword acceptance module 7. The subsequent processing flow is the same as that of the first embodiment.

-Screen Output Image of Information Communication Terminal 100-

With reference to FIG. 12 and FIG. 13, the following section will describe an example of a screen output image of the information communication terminal 100 according to the second embodiment. FIG. 12 shows examples of a display by a call operation window 201 for performing an operation regarding the audio video exchange module 1, a display by a keyword advertisement display window 202 for displaying an extracted keyword outputted from the keyword output module 13 and the advertisement information 64 outputted from the keyword output module 13, and a display by a acquisition condition input window 20 for inputting an acquisition condition from the keyboard/mouse 3.

First, when the audio video exchange module 1 is activated, the call operation window 201 is displayed to allow a user to perform an operation for checking a call party, an operation for holding a call or an operation for cutting a call.

Next, when a keyword and advertisement information are acquired from speech information of the conversation during the call, the keyword advertisement display window 202 is displayed to allow a user to select a keyword for which the user wants to acquire related information.

When the user selects the keyword, then the acquisition condition input window 203 is displayed. The user can select, from among pieces of information displayed on this acquisition condition input window 203, a condition under which related information is acquired.

For example, when the user selects "movie theater" from among the keywords displayed on the keyword advertisement display window 202, the acquisition condition input window 203 is displayed. When the user selects "display from a xxx portal" from this acquisition condition input window 203, an acquisition condition is set to "6=Acquisition from the location data 35 of the location server 102" in FIG. 16 to acquire detailed information regarding movie theaters from the location data 35.

FIG. 13 shows an example of a screen output image by the information communication terminal 100 regarding detailed information for movie theaters acquired from the location data 35 in FIG. 12.

Although the second embodiment provides the keyword extraction module 8 at each information communication terminal, the keyword extraction module 8 also may be provided at another terminal on the network (e.g., search server). The keyword extraction module 8 provided at another terminal other than each information communication terminal can reduce the burden to each information communication terminal.

Conventionally, a technique had been known by a combination of information by a call audio between terminals and information acquired by the search within a communication network. In this technique, a call audio from an originator terminal or a destination terminal of a television telephone could be subjected to speech recognition by an exchanger connected with these terminals to use the speech recognition result as a search keyword to perform information search within an data communication network to send the search result to an originator data communication terminal or a destination data communication terminal. For example, a case will be considered in which information regarding a train route is provided to the following conversation is provided.

Example: Speaker A: "Let's meet at Shibuya."
Speaker B: "Is it OK at 7:00?"
Speaker A: "OK."

Specifically, suggestion of train route information to the conversation including the words "waiting time" and "Shibuya" and "7:00" is considered. In order to search appropriate route information from this conversation information, information regarding a destination and an arrival time is required.

However, the above information intersects the speeches of the plurality of speakers. Thus, the respective speech recognition results must be acquired and interaction contents of any of the above conversations are not enough to identify these pieces of information. Furthermore, there were the following problems.

(1) An information provision unit is required on an exclusive audio exchange facility. Thus, if such an exclusive audio exchange facility does not exist, information suitable for conversation contents cannot be provided.

(2) A speech recognition unit for recognizing audio data has a lower accuracy when including therein registered audio characteristic information (calibration data) of the speaker. Thus, when a speech recognition unit is used in the above-described technique, the audio characteristic information of the speaker must be registered prior to communication. Furthermore, when any of an originator terminal or a destination terminal performs speech recognition, these terminals must exchange audio characteristic information of the respective speakers to register the information. However, registration of the audio characteristic information of the call party requires a large amount of a preparatory operation and requires a large amount of data.

(3) Furthermore, when a call party audio is recognized, audio received via a communication line is subjected to a recognition processing. However, audio received via a communication line has a deteriorated audio quality. The audio having the deteriorated quality subjected to speech recognition deteriorates the speech recognition accuracy.

(4) Furthermore, speech recognition requires calibration depending on a speaker. Thus, when voices of a plurality of speakers are subjected to speech recognition by a single speech recognition apparatus and when a plurality of speakers talk at the same time, the speech recognition accuracy is deteriorated.

(5) Furthermore, when audio characteristic information is previously registered only in a speaker using a television telephone performing speech recognition to perform speech recognition, a highly accurate speech recognition result can be obtained only by an initial registration processing. However, only interaction contents of one speaker cannot identify required information.

On the other hand, the information communication terminal according to the second embodiment obtains information from an external related information server connected via a network. Thus, required information can be acquired without using an exclusive audio exchange facility including an information provision module.

Furthermore, the information communication terminal according to the second embodiment uses a speech recognition exchange module provided for each information communication terminal to perform a speech recognition processing. Thus, information can be acquired without requiring an exclusive audio exchange facility.

Furthermore, the information communication terminal according to the second embodiment can perform speech recognition with a high accuracy without previously acquiring or registering audio characteristic information of a call party and without being influenced by deteriorated audio data by the use a communication line.

Furthermore, even when a plurality of speakers talk at the same time, the information communication terminal according to the second embodiment can subject interaction contents of the respective speakers to speech recognition with a high accuracy.

Furthermore, by exchanging speech information subjected to speech recognition between information communication terminals, the information communication terminal according to the second embodiment can combine interaction contents of a plurality of speakers to identify required information.

Third Embodiment

-Description of the Entire Structure-

Figure 23:
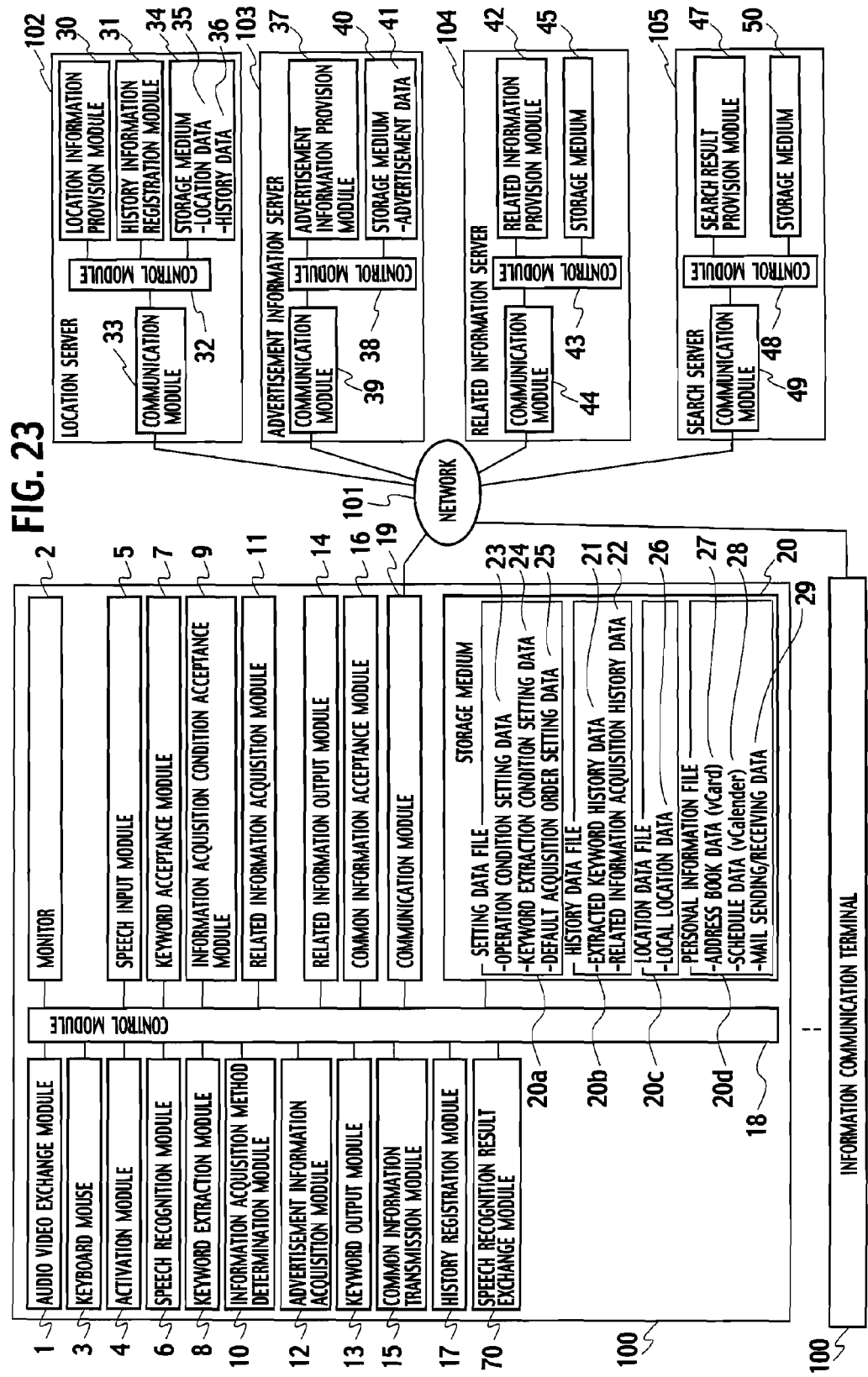
FIG. 23 is a structure diagram illustrating the entire structure of a data communication system according to a second embodiment of the present invention.
Figure 26:
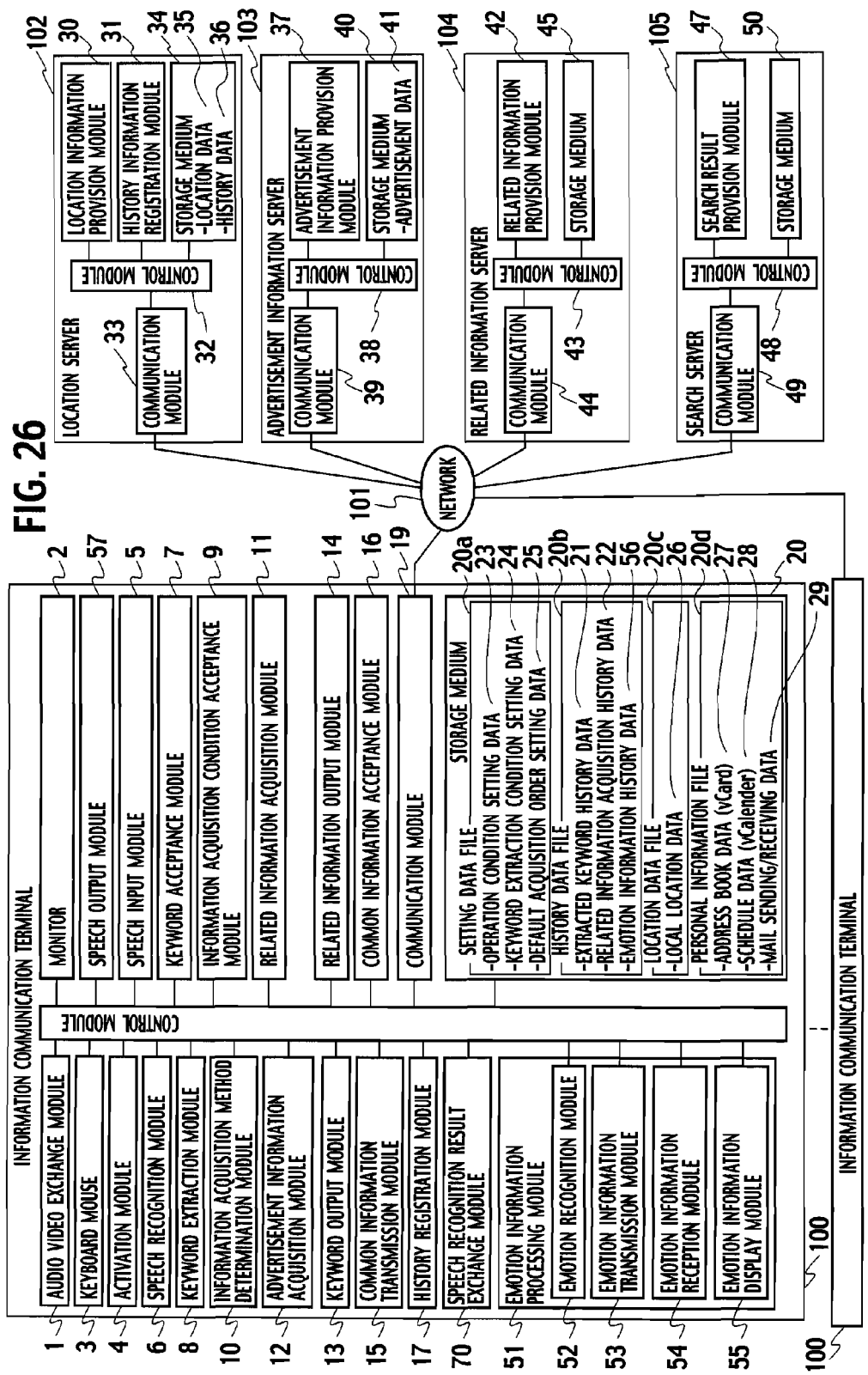
FIG. 26 is a structure diagram illustrating the entire structure of an information communication system according to a third embodiment of the present invention.

As shown in FIG. 26, an information communication system according to a third embodiment is different from the information communication system shown in FIG. 23 in that the information communication terminal 100 further includes an emotion information processing module 51 and a speech output module 57. The emotion information processing module 51 includes an emotion recognition module 52, an emotion information transmission module 53, an emotion information reception module 54, and an emotion information display module 55.

The emotion recognition module 52 is a module that identifies, based on speech information acquired from the speech input module 5, an emotion included in the audio to send the emotion as emotion information to the emotion information transmission module 53 and the emotion information display module 55. Emotion information may be, for example, data divided based on ten levels in accordance with delight, anger, sorrow and pleasure included in the audio. All functions of the emotion recognition module 52 are not always stored in the information communication terminal and the functions also may be partially stored in another terminal having a higher calculation capability.

The emotion information transmission module 53 sends the emotion information generated by the emotion recognition module 52 to the information communication terminal 100 of the call party via the audio video exchange module 1 and the communication module 19. However, when a user of the information communication terminal 100 sets the operation condition setting data 23 of the storage medium 20 so that emotion information is prohibited from being transmitted to the information communication terminal 100 of the call party, transmission of emotion information is not performed. Another case is also assumed in which there are a plurality of information communication terminals 100 of call parties.

The emotion information reception module 54 is a module that receives the emotion information sent from the emotion information transmission module 53 of the information communication terminal 100 of the call party via the audio video exchange module 1 and the communication module 19 to send the received emotion information to the emotion information display module 55. Another case is also assumed in which there are a plurality of information communication terminals 100 of call parties.

The emotion information display module 55 is a module that displays on the monitor 2, via the control module 18, emotion information acquired from the emotion recognition module 52 (=self emotion information) and emotion information acquired from the emotion information reception module 54 (=emotion information of a call party).

The control module 18 controls the transmission of the information inputted via the keyboard/mouse 3 to the audio video exchange module 1, the activation of the audio video exchange module 1, an output to the monitor 2 of video exchanged by the audio video exchange module 1 and video outputted from the emotion information display module 55, the use of the communication module 19 by the audio video exchange module 1, and writing operations to the storage medium 20 by the audio video exchange module 1, the emotion information transmission module 53, and the emotion information display module 55.

The monitor 2 is controlled by the control module 18 and displays video and character information exchanged by the audio video exchange module 1 and emotion information outputted by the emotion information display module 55 to the user of the information communication terminal 100.

The speech input module 5 is a module that acquires speech information of a self terminal to send the information, via the control module 18, to the audio video exchange module 1 and the emotion recognition module 52. Specifically, the speech input module 5 is assumed as including a microphone and an audio AD conversion board.

The speech output module 57 is a module that reproduces speech information acquired from the audio video exchange module 1 via the control module 18. Specifically, the speech output module 57 is assumed as including a speaker and an audio AD conversion board.

The storage medium 20 is controlled by the control module 18. Information in the storage medium 20 is stored and read by the audio video exchange module 1, the emotion information transmission module 53, and the emotion information display module 55. The history data file 20b stores therein the emotion information history data 56.

The emotion information history data 56 is data showing the history of emotion information extracted from the speech information by the emotion recognition modules 52 of by a self information communication terminal and a call party information communication terminal. The emotion information history data 56 is assumed as being composed of acceptance date and time, a calling party ID, and emotion information. Examples of contents and settings of the respective items are shown in FIG. 27.

The operation condition setting data 23 of the setting data file 20a stores therein the setting data regarding the operation of the information communication terminal 100. The operation condition setting data 23 is assumed as being composed of self terminal calling party ID setting data and emotion information transmission permission/prohibition setting data. Examples of contents and settings of the respective items are shown in FIG. 28.

Other structures are substantially the same as those of the information communication systems shown in FIG. 1 and FIG. 23 and thus will not be further described.

-Description of Processing Flow-

Figure 29:
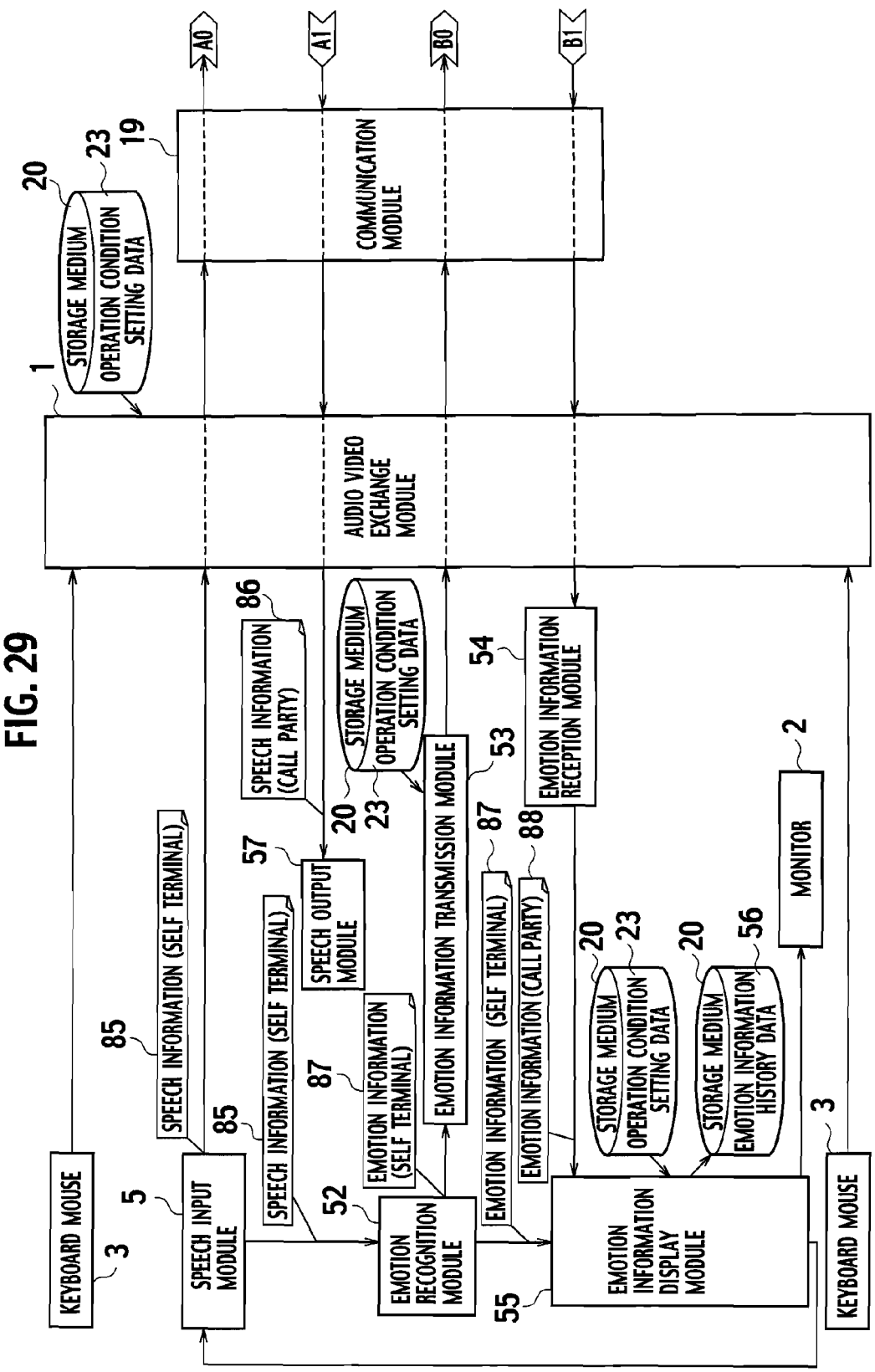
FIG. 29 is a flow diagram explaining an emotion information exchange sequence of the information communication system according to the third embodiment of the present invention.

With reference to FIG. 29, the flow of the processing of a method for exchanging emotion information by the information communication terminal 100 according to the third embodiment will be described.

First, a user of the information communication terminal 100 uses the keyboard/mouse 3 to activate the audio video exchange module 1. Then, the audio video exchange module 1 reads a self terminal calling party ID of the operation condition setting data 23 in the storage medium 20 via the control module 18.

Next, the user of the information communication terminal 100 uses the keyboard/mouse 3 to input the calling party ID of the call party to the audio video exchange module 1. The audio video exchange module 1 uses the inputted calling party ID of the call party and the self terminal calling party ID to start the call with the call party (realtime exchange of video, audio, and character information and file).

Next, the speech input module 5 acquires the interaction audio of the user of the self information communication terminal 100 to send the speech information (self terminal) 85 to the audio video exchange module 1 and the emotion recognition module 52.

When the audio video exchange module 1 receives the speech information (self terminal) 85, the audio video exchange module 1 sends the audio information (self terminal) 85 through the control module 18 and via the communication module 19 to the information communication terminal 100 of the call party (A0 in FIG. 29).

When the audio video exchange module 1 receives the speech information (call party) from the information communication terminal 100 of the call party through the control module 18 and via the communication module 19 (A1 in FIG. 29), the audio video exchange module 1 sends the received speech information (call party) to the speech output module 57. The speech output module 57 reproduces the acquired speech information (call party) 86. Here, "A0 in the self terminal" substantially corresponds to "A1 in the call party terminal" and "A0 in the call party terminal" substantially corresponds to "A1 in the self terminal".

When the emotion recognition module 52 receives the speech information (self terminal) 87 from the audio video exchange module 1, the emotion recognition module 52 measures the emotion included in the speech information (self terminal) 85 to generate emotion information (self terminal) 87. Next, the emotion recognition module 52 sends the emotion information (self terminal) 87 to the emotion information transmission module 53 and the emotion information display module 55.

When the emotion information transmission module 53 receives the emotion information (self terminal), the emotion information transmission module 53 reads, via the control module 18, a value of the emotion information transmission permission/prohibition of the operation condition setting data 23 in the storage medium 20.

When the value is "1" (permitted), the emotion information transmission module 53 sends the emotion information (self terminal) to the audio video exchange module 1. When the audio video exchange module 1 receives the emotion information (self terminal), the audio video exchange module 1 sends to the information communication terminal 100 of the call party, through the control module 18 and via the communication module 19, the emotion information (self terminal) and the calling party ID of the self terminal read from the storage medium 20 (B0 in FIG. 2).

When the value of the emotion information transmission permission/prohibition is "0" (prohibited), the emotion information transmission module 53 discards the emotion information (self terminal).

When the value of the emotion information transmission permission/prohibition is "0" (prohibited), the emotion information transmission module 53 discards the emotion information (self terminal) 87.

When the audio video exchange module 1 receives, through the control module 18 and via the communication module 19, the emotion information (call party) and the calling party ID of the call party terminal from the information communication terminal 100 of the call party (B1 in FIG. 2), the audio video exchange module 1 sends the received emotion information (call party) and the calling party ID of the call party terminal to the emotion information reception module 54.

Then, the emotion information reception module 54 further sends the acquired emotion information (call party) 88 and the calling party ID of the call party terminal to the emotion information display module 55. Here, "B0 in the self terminal" substantially corresponds to "B1 in the call party terminal" and "B0 in the call party terminal" substantially corresponds to "B1 in the self terminal".

Next, when the emotion information display module 55 receives the emotion information (self terminal) 87 from the emotion recognition module 52, the emotion information display module 55 reads, through the control module 18, the self terminal calling party ID of the operation condition setting data 23 in the storage medium 20.

Next, the emotion information display module 55 generates the emotion information history data 56 to store the emotion information history data 56 in the storage medium 20 through the control module 18.

The emotion information history data 56 includes "acceptance date and time" set to date and time at which the emotion information (self terminal) from the emotion recognition module 52 is received, "calling party ID" set to the read calling party ID of the self terminal, and "emotion information" set to the emotion information (self terminal) acquired from the emotion recognition module 52.

Next, the emotion information display module 55 displays the stored emotion information history data 56 on the monitor 2 through the control module 18.

When the emotion information display module 55 receives the emotion information (call party) and the calling party ID of the call party terminal from the emotion information reception module 54, the emotion information display module 55 generates the emotion information history data 56 to store the emotion information history data 56 in the storage medium 20 through the control module 18.

The emotion information history data 56 includes "acceptance date and time" set to the time at which the emotion information (call party) is received from the emotion information reception module 54, "calling party ID" set to the calling party ID of the call party terminal acquired from the emotion information reception module 54, and "emotion information" set to the emotion information (call party) acquired from the emotion information reception module 54.

Next, the emotion information display module 55 displays the stored emotion information history data 56 on the monitor 2 through the control module 18.

Finally, the user of the information communication terminal 100 uses the keyboard/mouse 3 to operate the audio video exchange module 1 to complete the call with the call party (realtime exchange of video, audio, and character information and file) and the audio video exchange module 1 is completed if required.

There is a technique for using a terminal (e.g., PC) to acquire audio or video information for example to analyze, based on this acquired speech information, emotion information of the speaker. By the use of this technique, a service has been provided by which an emotion recognition apparatus provided on an exclusive exchanger analyzes speech information of the conservation between communication terminals to prepare emotion information and the calling party browses, via the communication terminal, the emotion information of the call party on this emotion recognition apparatus.

However, the speech information used for the analysis by this service is acquired via a communication line and has a deteriorated sound quality due to an influence by the voice band, thus causing a deteriorated accuracy of the emotion recognition.

On the other hand, another technique has been known in which sound inputted to a microphone is converted to a character string to analyze emotion information based on the conversion result. By this technique, inputted sound can be analyzed without using a communication line to prepare emotion information having a high recognition accuracy.

However, no unit has been provided to acquire the analyzed emotion information of the communication partner. Thus, emotion information including additional information could not be acquired in a Peer to Peer (P2P)-type communication.

In view of the above, the information communication terminal 100 according to the third embodiment can use the emotion recognition module 52 prepared for each information communication terminal 100 to perform an emotion recognition processing. Thus, the emotion information of the call party can be obtained with a high recognition accuracy even in a call performed via a communication line. Furthermore, emotion recognition can be performed with a high accuracy without being influenced by deterioration of audio data due to the use of a communication line.

Furthermore, emotion information obtained from another information communication terminal connected via a network can realize, without using an exclusive exchange facility, the acquisition of emotion information and appropriate additional information. Thus, emotion information including additional information suitable for the conversation contents and the emotion information can be acquired in the Peer to Peer (P2P)-type communication Modification of the Third Embodiment In a modification of the third embodiment, a case will be described in which the related information acquisition module 11 of the information communication terminal 100 shown in FIG. 26 is used to acquire related information related to inputted speech information.

When the speech input module 5 is used to input the interaction audio of a self information communication terminal user, speech information (self terminal) is sent to the speech recognition module 6.

When the speech recognition module 6 receives the speech information (self terminal), a word included in the speech information (self terminal) is identified and is converted to input text data. The converted input text data is sent to the speech recognition result exchange module 70 and the related information acquisition module 11.

When the speech recognition result exchange module 70 receives the inputted text data, the speech recognition result exchange module 70 sends this inputted text data to the information communication terminal 100 of the call party and the call party text data converted by the call party is received from the information communication terminal 100 of the call party. The inputted text data and the received call party text data are sent from the speech recognition result exchange module 70 to the keyword extraction module 8.

When the keyword extraction module 8 receives the inputted text data and the call party text data, the keyword extraction module 8 extracts a keyword for acquiring related information from this inputted text data and the call party text data. The extracted keyword is sent to the related information acquisition module 11.

When the related information acquisition module 11 receives the keyword, the related information acquisition module 11 sends to the related information server 104 a request for information related to this keyword.

When the related information server 104 receives the request for related information, the related information server 104 acquires, through the control module 43, required related information in the storage medium 45. The acquired related information is sent to the related information acquisition module 11 of the information communication terminal 100 of the requesting party.

The related information received by the related information acquisition module 11 is displayed on the monitor 2.

The information communication terminal 100 according to the modification of third embodiment can acquire emotion information of a communication partner and also can acquire related information related to the conversation contents.

Fourth Embodiment

-Description of the Entire Structure-

Figure 30:
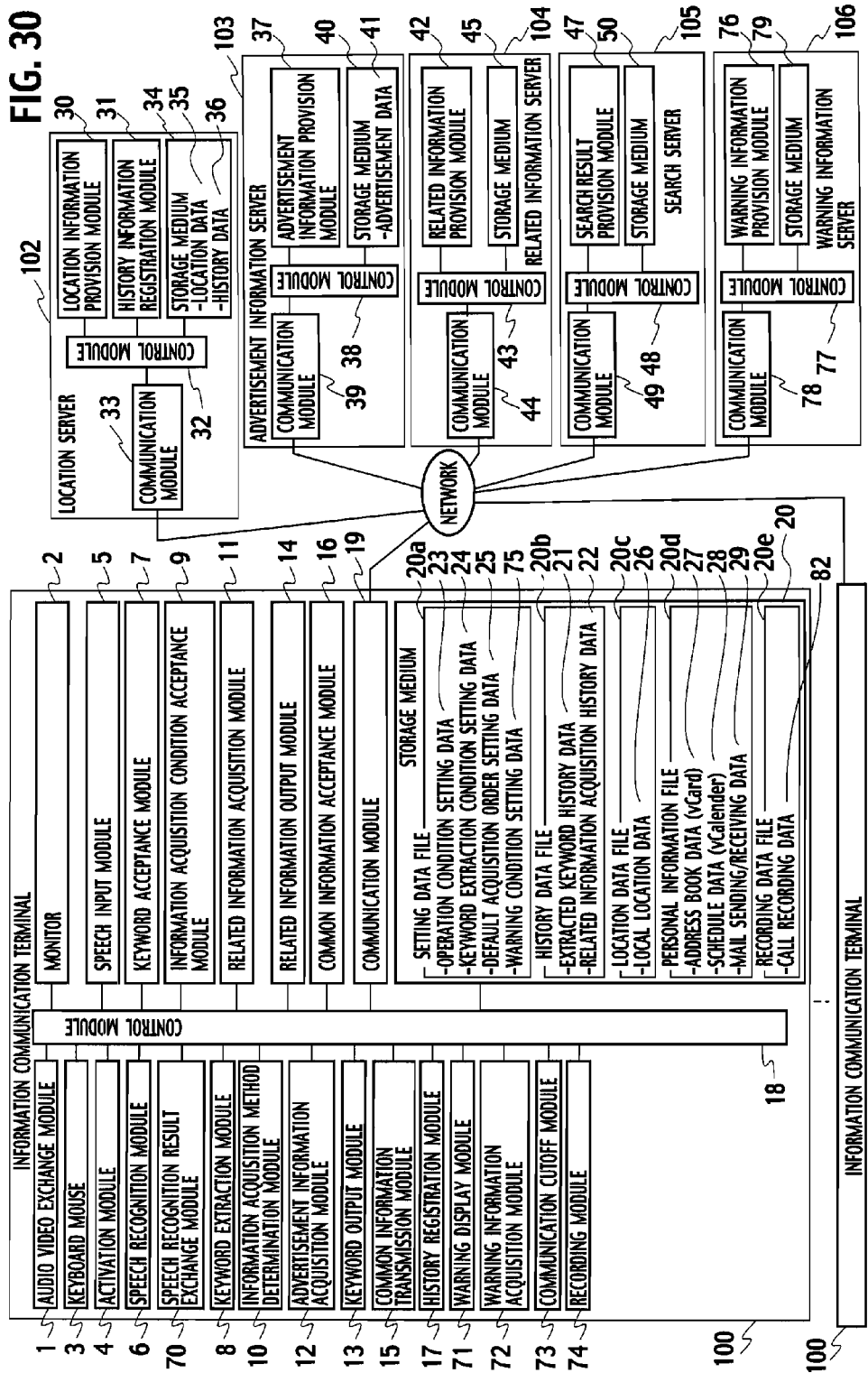
FIG. 30 is a structure diagram illustrating the entire structure of a data communication system according to a fourth embodiment of the present invention.

As shown in FIG. 30, an information communication system according to a fourth embodiment is different from the information communication systems shown in FIG. 1, FIG. 23, and FIG. 26 in that the information communication system includes a warning information server 106.

The warning information server 106 in the fourth embodiment is an apparatus that is used as a member of a pair with the information communication terminal 100 and that retains warning data 80.

The warning data 80 is data showing a set of keywords to be monitored by the information communication terminal 100, a condition for displaying, when a keyword included in the set is detected, a warning on the monitor 2, and the warning data 80 displayed on the monitor 2. The warning data 80 is assumed to be edited and controlled by an operator of the warning information server 106.

The operator receives, at any time, information from police for example regarding a keyword frequently used in a fraud using a telephone to register the information in the warning data 80.

When the information communication terminal 100 is set to permit the acquisition of the warning data 80 (when the warning data acquisition necessity is set to "1=required" (which will be described later)), the information communication terminal 100 can acquire the warning data 80 from the warning information server 106 to update warning condition setting data 75 of the information communication terminal 100. The other structures are substantially the same as those described in the first and second embodiments and thus will not be further described.

<Description of Structure and Operation of Information Communication Terminal 100>

The information communication terminal 100 further has a warning display module 71, a warning information acquisition module 72, a communication cutoff module 73, and a recording module 74.

The warning display module 71 is a module that monitors the extracted keyword history data 21 stored by the keyword extraction module 8 to count, when a keyword included in the warning object keyword set in the warning condition setting data 75 is stored, the keyword to output, when the detection number satisfies a condition for issuing a warning, warning display information to the monitor. The warning display module 71 also has a function to output, when a keyword from a call party is not detected for a fixed time, the warning data 80 to the monitor 2. It is noted that, although this embodiment describes "whether a threshold value of a detection number (warning issue detection number) is exceeded or not" as a condition for issuing a warning, the condition also may be described by a logical formula.

When the warning information acquisition module 72 is a module that uses, when the operation condition setting data 23 has the warning data acquisition necessity set to "1=required", the communication module 19 to acquire the warning data 80 in the warning information server 106. The warning information acquisition module 72 is called by the warning display module 71.

The communication cutoff module 73 is a module that monitors the extracted keyword history data 21 stored by the keyword extraction module 8 to count, when a keyword included in the warning object keyword set in the warning condition setting data 75 is stored, the keyword to automatically cut the communication when the detection number satisfies the condition for issuing a warning.

The recording module 74 is a module that monitors the extracted keyword history data 21 stored by the keyword extraction module 8 to count, when a keyword included in the warning object keyword set in the warning condition setting data 75 is stored, the keyword to start, when the detection number satisfies the condition for issuing a warning, the recording of the speech information in the call.

The control module 18 performs the transmission of the input information of the keyboard/mouse 3 to the keyword acceptance module 7, video exchanged by the audio video exchange module 1, and an output of information outputted from the keyword output module 13, the related information acquisition module 11, and the warning display module 71 to the monitor 2.

Furthermore, the control module 18 provides the use of the communication module 19 by the audio video exchange module 1, the speech recognition result exchange module 70, the advertisement information acquisition module 12, the information acquisition method determination module 10, the related information output module 14, the common information transmission module 15, the common information acceptance module 16, the history registration module 17, and the warning information acquisition module 72.

The control module 18 also controls the reading and writing operations to a storage medium by the keyword acceptance module 7, the keyword extraction module 8, the information acquisition condition acceptance module 9, the information acquisition method determination module 10, the related information acquisition module 11, the common information acceptance module 16, and the warning display module 71.

The communication module 19 is controlled by the control module 18 and is used by the audio video exchange module 1, the speech recognition result exchange module 70, the advertisement information acquisition module 12, the information acquisition method determination module 10, the related information output module 14, the common information transmission module 15, the common information acceptance module 16, the history registration module 17, and the warning information acquisition module 72 to exchange information with another information communication terminal 100, the related information server 104, the location server 102, the advertisement information server 103, and the warning information server 106 via the network 101. Specifically, the communication module 19 is assumed as a system (e.g., modem) for physically transmitting data and the control software thereof.

The storage medium 20 is controlled by the control module 18 and information therein is stored and read by the keyword acceptance module 7, the keyword extraction module 8, the information acquisition condition acceptance module 9, the information acquisition method determination module 10, the related information acquisition module 11, the common information acceptance module 16, and the warning display module 71. The recording medium 20 stores therein a setting data file 20a, a history data file 20b, a location data file 20c, a personal information data file 20d, and a recording data file 20e for retaining the recording data 82. The setting data file 20a stores therein the warning condition setting data 75.

The operation condition setting data 23 stores therein setting data regarding an operation of the information communication terminal 100. The operation condition setting data 23 is assumed as being composed of: a requesting calling party ID, an information acquisition condition input necessity, a speech recognition result transmission necessity, an advertisement display necessity, a warning data acquisition necessity, a communication cutoff necessity, a recording necessity, an external server use necessity, a default common condition setting, and the location (for history) of the advertisement information server 103. Examples of contents and settings of the respective items are shown in FIG. 36.

The warning condition setting data 75 is data used by the keyword extraction module 8 to monitor a keyword extracted from speech information and is assumed as being composed of a requesting calling party ID, a keyword non detection warning setting time, keyword non detection warning information, the first valid date and time, the first warning object keyword set, the first warning issue detection number, the first warning display information, the second valid date and time, the second warning object keyword set, the second warning issue detection number, the second warning object keyword detection warning information, the third valid date and time, the third warning object keyword set, the third warning issue detection number, and the third warning issue keyword detection warning information. Examples of contents and settings of the respective items are shown in FIG. 37.

The numbers of the warning object keyword set, the warning issue detection number, and the warning display information are not limited to three and also may be a number requiring a warning. The warning issue detection number is not limited to a number and also may be prepared by describing a display condition of warning information by a logical formula.

The call recording data 82 is data that is obtained by using, when speech information acquired by the speech input module 5 and the recording necessity of the operation condition setting data 23 is set to "1=required", the recording module 74 to record speech information acquiring from the information communication terminal 100 of the call party via the communication module 19. Other structures are the same as those of the information communication terminal 100 shown in the first and second embodiments and thus will not be described further.

<Description of Structure and Operation of Warning Information Server 106>

The warning information server 106 includes a warning information provision module 76, a control module 77, a communication module 78, and a storage medium 79.

The warning information provision module 76 is structured so that the warning information server 106 receives, via the network 101, the warning information request 81 from the information communication terminal 100 to return the warning data 80 to the information communication terminal 100.

The control module 77 controls the use of the communication module 78 by the warning information provision module 76 and the storage medium 79.

The communication module 78 is controlled by the control module 77 and is used by the warning information provision module 3 to exchange information via the information communication terminal 100 and the network 101. Specifically, the communication module 78 is assumed as an apparatus (e.g., modem) for physically sending data and the control software thereof.

The storage medium 79 is controlled by the control module 77 and information therein is stored and read by the warning information provision module 76. The storage medium 79 also stores the warning data 80 as data.

The warning data 80 is data used by the information communication terminal 100 to use the keyword extraction module 8 to monitor a keyword extracted from speech information and is assumed as being composed of registration date and time, valid date and time, a warning object keyword set, a warning issue detection number, and warning display information.

Examples of contents and setting of the respective items of the warning data 80 are shown in FIG. 38. The warning object keyword set, the warning issue detection number, and the warning display information also may be registered in an amount requiring a warning. Furthermore, the warning issue detection number is not limited to a number and also may be prepared by describing a display condition of warning information by a logical formula.

-Description of Processing Flow-

Figure 31:
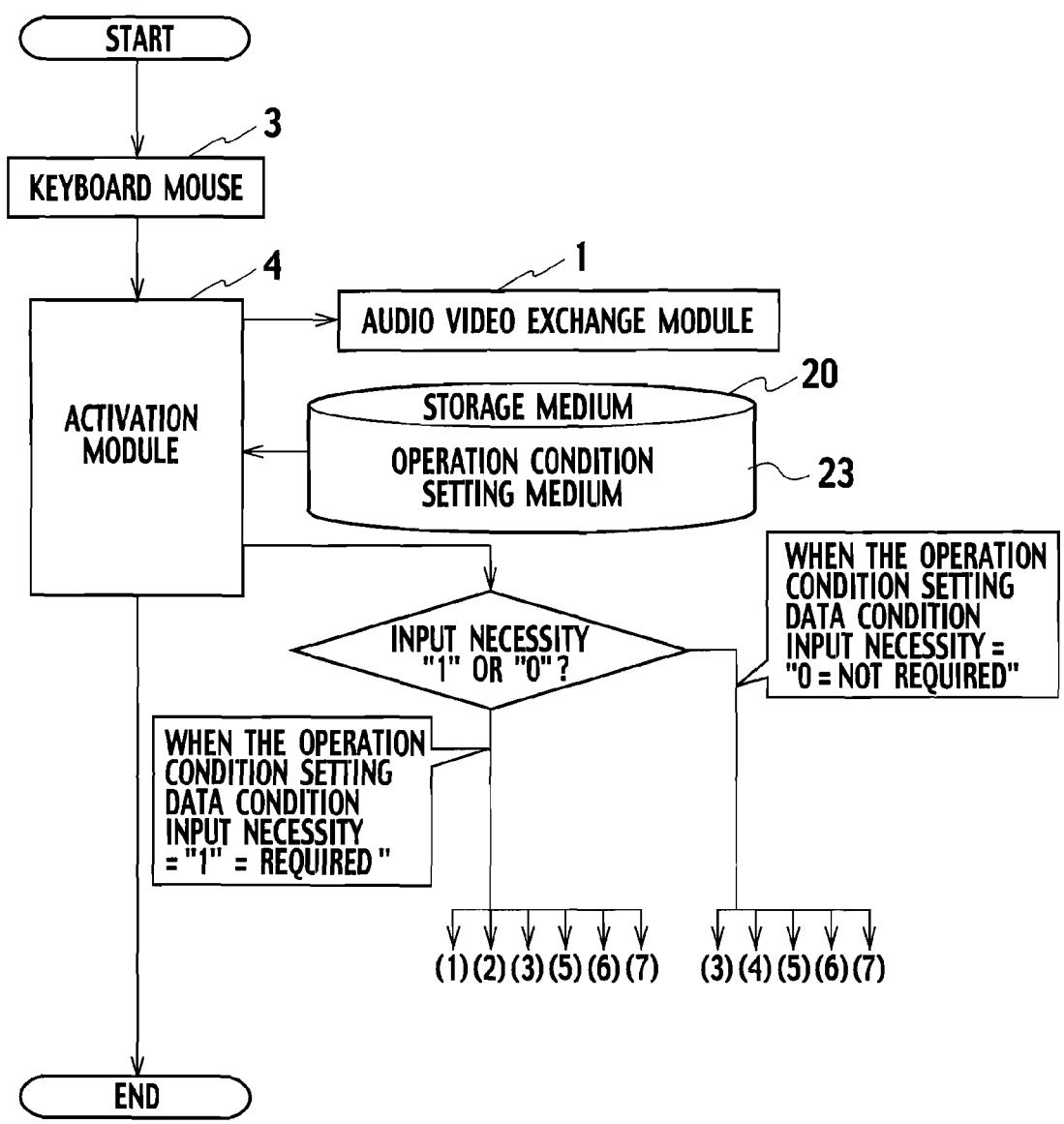
FIG. 31 is a flow diagram explaining an activation sequence according to the fourth embodiment of the present invention.

With reference to FIG. 31 to FIG. 35, the flow of the processing of a method for acquiring related information by the information terminal using the fourth embodiment will be described. It is noted that the processings shown in (1), (2), and (4) of FIG. 31 are the same as those of the first and second embodiments and thus will not be described further.

<Activation Sequence>

As shown in FIG. 31, a user of the information communication terminal 100 uses the keyboard/mouse 3 to execute the activation module 4. The execution also may include an input of a requesting calling party ID of the user executed the activation. First, the activation module 4 activates the audio video exchange module 1 to start a call with a call party. Next, the activation module 4 uses the requesting calling party ID as key information to read, through the control module 18, the value of the information acquisition condition input necessity of the operation condition setting data 23 in the storage medium 20.

Then, when the first conditional branching is reached by the value of the information acquisition condition input necessity and the value of the information acquisition condition input necessity is "1=required", the activation module 4 activates the speech input module 5 (which leads to the (1) keyword display sequence (FIG. 24)), the information acquisition condition acceptance module 9 (which leads to the (2) acquisition condition acceptance/information display sequence (FIG. 4)), the common information acceptance module 16 (which leads to the (3) common information reception/display sequence (FIG. 5)), the warning display module 71 (which leads to the (5) warning display sequence (FIG. 32)), the communication cutoff module 73 (which leads to the (6) communication cutoff sequence (FIG. 33)), and the recording module 74 (which leads to the (7) recording sequence (FIG. 34)).

When the value of the information acquisition condition input necessity is set to "1=required", a user can select, from among the keywords displayed on the monitor 2, a keyword for which related information is acquired or a condition under which related information is acquired. The user also can share the acquired related information with a call party.

Next, when the second conditional branching is reached by the value of the information acquisition condition input necessity and the value of the information acquisition condition input necessity is "0=not required", the activation module 4 activates the speech input module 5 (which leads to the (4) keyword display/information display sequence (FIG. 25)), the common information acceptance module 16 (which leads to the (3) common information reception/display sequence (FIG. 5)), and the warning display module 71 (which leads to the (5) warning display sequence (FIG. 32)).

When the value of the information acquisition condition input necessity is set to "0=not required", the user cannot select, from among the keywords displayed on the monitor 2, a keyword for which related information is acquired or a condition under which related information is acquired and related information regarding an extracted keyword or related information shared by the call party is automatically displayed.

The requesting calling party ID is sent to the respective modules activated by the activation module 4.

<Warning Display Sequence>

Figure 32:
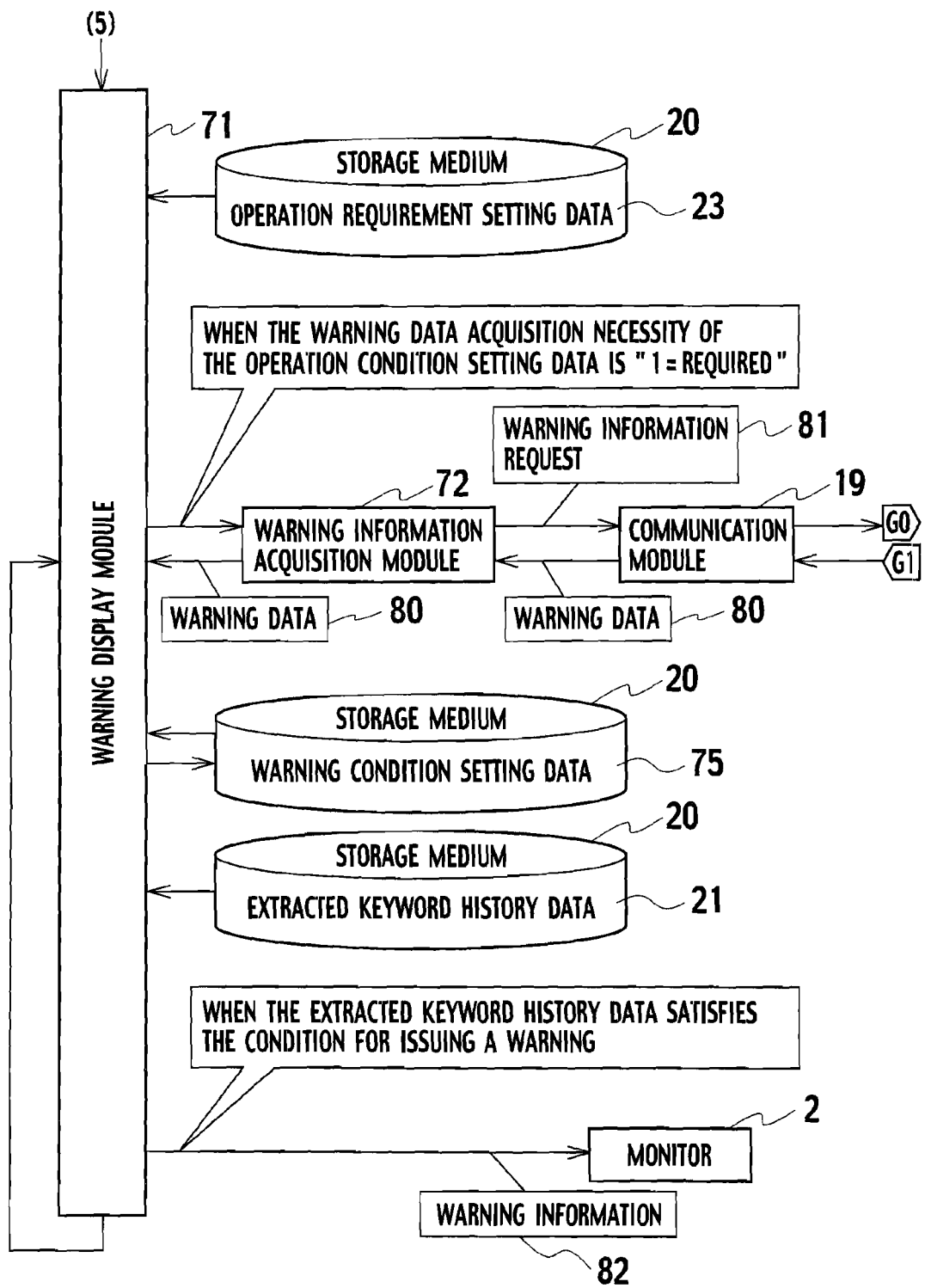
FIG. 32 is a flow diagram explaining a warning display sequence according to the fourth embodiment of the present invention.

The warning display sequence shown in (5) of FIG. 31 will be described with reference to FIG. 32.

The warning display sequence (FIG. 32) shows a sequence in which the warning display module 71 is activated by the activation module 4 to subsequently monitor the extracted keyword history data 21 stored by the keyword extraction module 8 and, when a keyword included in the extracted keyword history data 21 satisfies a condition for issuing a warning, the warning data 80 is outputted to the monitor 2.

First, the warning display module 71 uses the requesting calling party ID acquired from the activation module 4 as key information to read, through the control module 18, a value of the warning data acquisition necessity of the operation condition setting data 23 in the storage medium 20.

When the operation condition setting data 23 has a warning data acquisition necessity value set to "1=required", the warning display module 71 reads, through the control module 18, the value of the location of the warning information server of the operation condition setting data 23 in the storage medium 20 to send the value to the warning information acquisition module 72.

Next, when the warning information acquisition module 72 receives the value of the location of the warning information server, a warning information request 81 is sent, based on the value of the location of the warning information server, from the communication module 19 via the control module 18 to the warning information server 106 and the warning data 80 is acquired from the warning information server 106 and is returned to the warning display module 71.

The transmission of the warning data 80 from the warning information server 106 will be described later with reference to a warning information provision sequence of FIG. 35.

Next, the warning display module 71 generates the warning condition setting data 75 regarding the acquired warning data 80 to store, through the control module 18, the generated warning condition setting data 75 in the storage medium 20.

The warning display module 71 uses the requesting calling party ID acquired from the activation module 4 as key information to store valid date and time, a warning object keyword set, a warning issue detection number, and warning display information of the acquired warning data 80 as valid date and time, a warning object keyword set, a warning issue detection number, and warning display information of the warning condition setting data 75.

When the operation condition setting data 23 has a value of the warning data acquisition necessity set to "0=not required", the warning display module 71 does not acquire the warning data 80 from the warning information server 106.

The warning display module 71 uses the requesting calling party ID as key information to acquire, through the control module 18, the stored warning condition setting data 75 from the storage medium 20.

In this event, the warning display module 71 reads the keyword non detection warning setting time, the keyword non detection warning information, and the valid date and time in the warning condition setting data 75 from among a warning object keyword set, a warning issue detection number, and warning display information for a time ahead of the current time.

(*) Next, the warning display module 71 uses the requesting calling party ID as key information to acquire, through the control module 18, the extracted keyword history data 21 stored in the storage medium 20 after the activation of the warning display module 71 by the activation module 4.

When the acquired extracted keyword history data 21 does not include a record for which a speaker ID is other than requesting calling party IDs acquired from the activation module 4 for a time equal to or longer than the keyword non detection warning setting time, the warning display module 71 outputs the keyword non detection warning information to the monitor 2 through the control module 18.

Next, the warning display module 71 searches the extracted keyword of the extracted keyword history data 21 to count the number of the extracted keyword history data 21 for which the extracted keyword is included in the warning object keyword set.

When the count result is equal to or higher than the warning issue detection number of the applicable warning object keyword set, the warning display module 71 outputs the warning data 80 of the applicable warning object keyword set to the monitor 2 through the control module 18.

The warning display module 71 is repeated until processings after the above (*) are completed by the audio video exchange module 1.

<Communication Cutoff Sequence>

Figure 33:
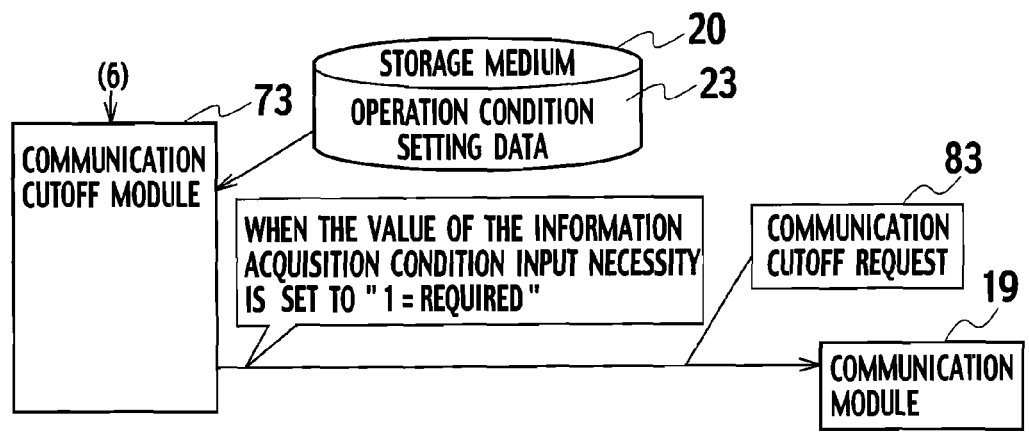
FIG. 33 is a flow diagram explaining call cutoff sequence according to the fourth embodiment of the present invention.

The following section will describe a communication cutoff sequence shown in (6) of FIG. 31 with reference to FIG. 33.

The communication cutoff sequence (FIG. 33) is a sequence in which the communication cutoff module 73 is activated by the activation module 4 to monitor the extracted keyword history data 21 stored by the keyword extraction module 8 to cut the communication when a keyword included in the extracted keyword history data 21 satisfies a condition for issuing a warning.

First, the communication cutoff module 73 uses the requesting calling party ID acquired from the activation module 4 as key information to read, through the control module 18, a communication cutoff necessity value of the operation condition setting data 23 in the storage medium 20.

When the operation condition setting data 23 has a communication cutoff necessity value set to "1=required", the communication cutoff module 73 sends, based on the requesting calling party ID, the communication cutoff request 83 to the communication module 19 through the control module 18 to cut the communication.

When the operation condition setting data 23 has a communication cutoff necessity value set to "0=not required", the transmission of the communication cutoff request 83 is not performed.

<Recording Sequence>

Figure 34:
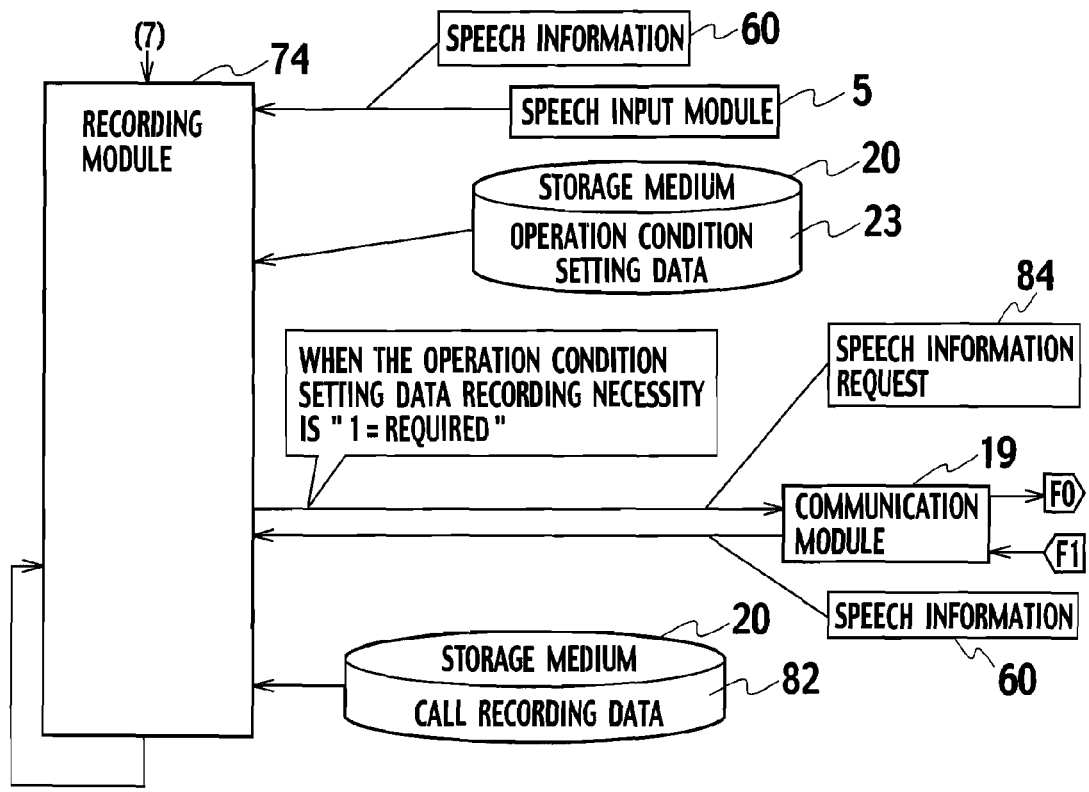
FIG. 34 is a flow diagram explaining a recording sequence according to the fourth embodiment of the present invention.

The following section will describe a recording sequence shown in (7) in FIG. 31 with reference to FIG. 34.

The recording sequence (FIG. 34) shows a sequence in which the recording module 74 is activated by the activation module 4 to subsequently monitor the extracted keyword history data 21 stored by the keyword extraction module 8 and, when a keyword included in the extracted keyword history data 21 satisfies a condition for issuing a warning, the speech information 60 included in the call is recorded.

First, the recording module 74 uses the requesting calling party ID acquired from the activation module 4 as key information to acquire the speech information 60 inputted from the speech input module 5.

Next, the requesting calling party ID acquired from the activation module 4 is used as key information to read, through the control module 18, a recording necessity value of the operation condition setting data 23 in the storage medium 20.

When the operation condition setting data 23 has a recording necessity value set to "1=required", the recording module 74 uses, based on the requesting calling party ID, the communication module 19 to send the speech information request 84 through the control module 18 to the information communication terminal 100 of the call party to acquire the speech information 60 from the information communication terminal 100 of the call party to return the speech information 60 to the recording module 74.

The speech information 60 acquired from the speech information 60 and the information communication terminal 100 of the call party inputted from the speech input module 5 is stored by the recording module 74 into the call recording data 82 of the storage medium 20.

The above processing loop is repeated until the audio and video exchange is completed.

<Warning Information Provision Sequence>

Figure 35:
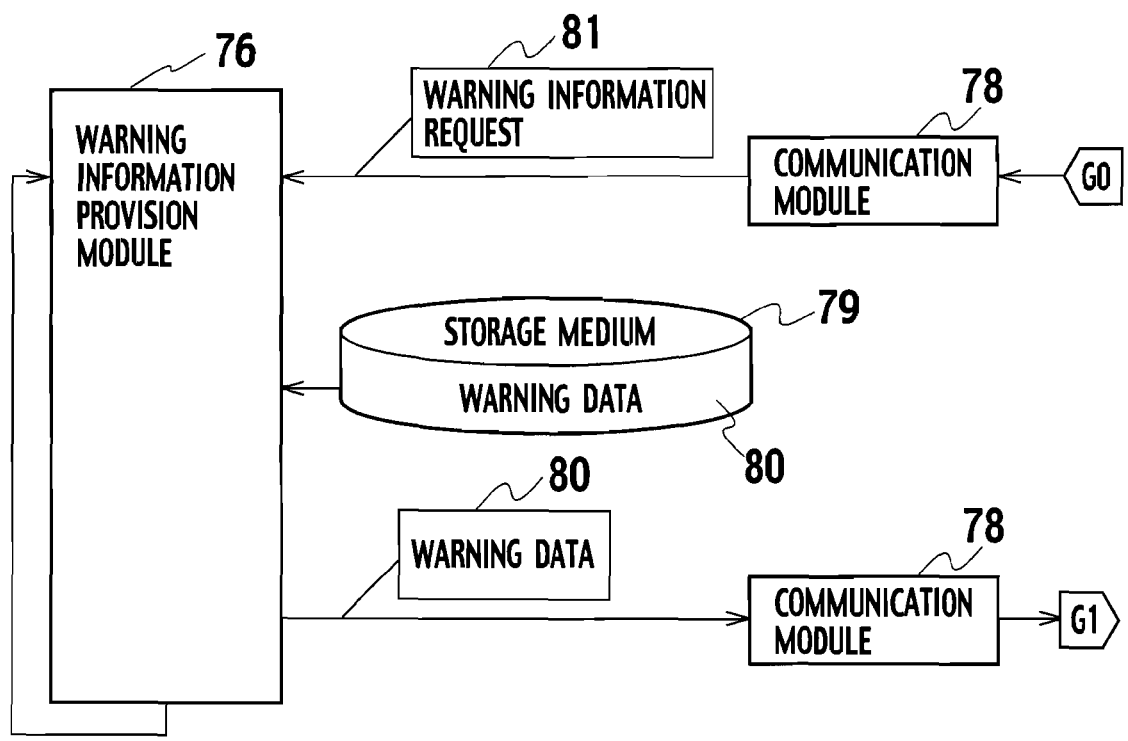
FIG. 35 is a flow diagram explaining warning information provision sequence according to the fourth embodiment of the present invention.

Next, the following section will describe a warning information provision sequence with reference to FIG. 35. FIG. 35 shows a sequence in which the warning information server 106 receives, through the network 101, the warning information request 81 from the information communication terminal 100 to return the warning data 80 to the information communication terminal 100.

The warning information provision module 76 of the warning information server 106 uses the communication module 78 via the control module 77 to receive the warning information request 81 sent from the warning information acquisition module 72 of the information communication terminal 100.

Next, the warning information provision module 76 searches, through the control module 77, the record of the warning data 80 in the storage medium 79 to read, from among valid dates and times in the record of the warning data 80, a warning object keyword set, a warning issue detection number, and the warning data 80 at a time ahead of the current time.

Next, the warning information provision module 76 uses the communication module 78 through the control module 77 to send to the warning information acquisition module 72 of the information communication terminal 100 the read valid date and time, warning object keyword set, warning issue detection number, and warning data 80.

The warning information provision module 76 waits, through the control module 77, the warning information request 81 sent from the warning information acquisition module 72 of the information communication terminal 100.

The above loop is repeated until the audio video exchange module 1 is completed.

-Screen Output Image of the Information Communication Terminal 100-

FIG. 12 shows an example of a screen output image of the information communication terminal 100 according to the present embodiment.

First, when the audio video exchange module 1 is activated, the call operation window 201 is displayed to allow a user to perform an operation for checking a call party or holding or cutting the call.

Next, when a keyword and advertisement information are acquired from the speech information of the conversation during the call, the keyword advertisement display window 202 is displayed to allow a user to select a keyword for which the user wants to acquire related information.

When the user selects the keyword, the acquisition condition input window 203 is further displayed. The user can select, from among conditions displayed on this acquisition condition input window 203, a condition under which related information is acquired.

For example, when the user selects "movie theater" from among keywords displayed on the keyword advertisement display window 202, the acquisition condition input window 203 is displayed. When the user selects "display from a xxx portal" through this acquisition condition input window 203, the acquisition condition is set to "6=Acquisition from the location data 35 of the location server 102" in FIG. 18 and detailed information regarding movie theaters is acquired from the location data 35.

FIG. 13 shows an example of a screen output image by the information communication terminal 100 for detailed information regarding movie theaters acquired from the location data 35 in FIG. 12.

It is noted that, when the activation module 4 in the warning display sequence activates the warning display module 71 to subsequently monitor the extracted keyword history data 21 stored by the keyword extraction module 8 and a keyword included in the extracted keyword history data 21 satisfies the condition for issuing a warning, the communication cutoff module 73 also can be set to cut the communication.

In the same case, the recording module 74 also can start the recording of the speech information of the call.

In recent years, unwanted calls from unscrupulous businessmen (e.g., bank transfer scam) have been frequently caused. Communication partners of these unwanted calls are in an amount of an unspecified number and cannot know who is calling in advance. Furthermore, these unwanted calls have been sophisticated with time by impersonation or an imaginary traffic accident for example. Thus, a person receiving an unwanted call has found a difficulty in recognizing and handling the call.

Methods for avoiding such unwanted calls include "number request service" and "unwanted call blocking service".

The "number request service" is a service to reject a telephone call for which a telephone number of an originator is not displayed. This service can force the originator to display, in order to make a telephone call, the telephone number of the originator. Thus, a person receiving the telephone call can check at least the telephone number of the originator in advance.

The "unwanted call blocking service" is a service by which a person received an unwanted call uses his or her telephone machine to register the telephone number of the originator of this unwanted call to reject subsequent telephone calls from this originator. The use of this service can reject unwanted telephone calls from specific originators.

However, the "number request service" can be easily avoided by notifying a telephone number of a caller.

Furthermore, bank transfer scam for example in recent years cannot be prevented only by displaying a caller's telephone number because this kind of fraud is performed by conversation contents for example and thus a person received a telephone call cannot recognize that this call is an unwanted call.

Furthermore, the "unwanted call blocking service" only can block unwanted called from specific originators for which telephone numbers are already known. Thus, a problem has been left unsolved in which bank transfer scam in recent years for example cannot be avoided because this kind of fraud uses an unspecified number of telephone calls to make telephone calls that are new to users of the unwanted call blocking service.

When a person having received a telephone call can recognize that this call is an unwanted call, the person typically can cut the call, can record the call contents as proof, or can make a telephone call to another person in order to check whether the speaker of call is who the person thinks for example. However, the "number request service" and "unwanted call blocking service" both merely suppress calls and do not have a measure for preventing fraud from being caused once the call is started.

On the other hand, the information communication terminal 100 according to the fourth embodiment can identify whether the call is an unwanted call or not by using a keyword extracted from exchanged conversation contents generated by a call party. Thus, a person received a telephone call from an unspecified originator can recognize, during the call, whether the telephone call is an unwanted call or not.

Furthermore, when the call is recognized as an unwanted call, a warning message is displayed. Thus, the person having received the unwanted call can immediately take an appropriate action. Furthermore, keywords for identifying an unwanted call for example are acquired from an external warning information serve specialized for information regarding unwanted and are used. Thus, sophisticated unwanted calls also can be avoided.

Fifth Embodiment

-Description of the Entire Structure-

Figure 39:
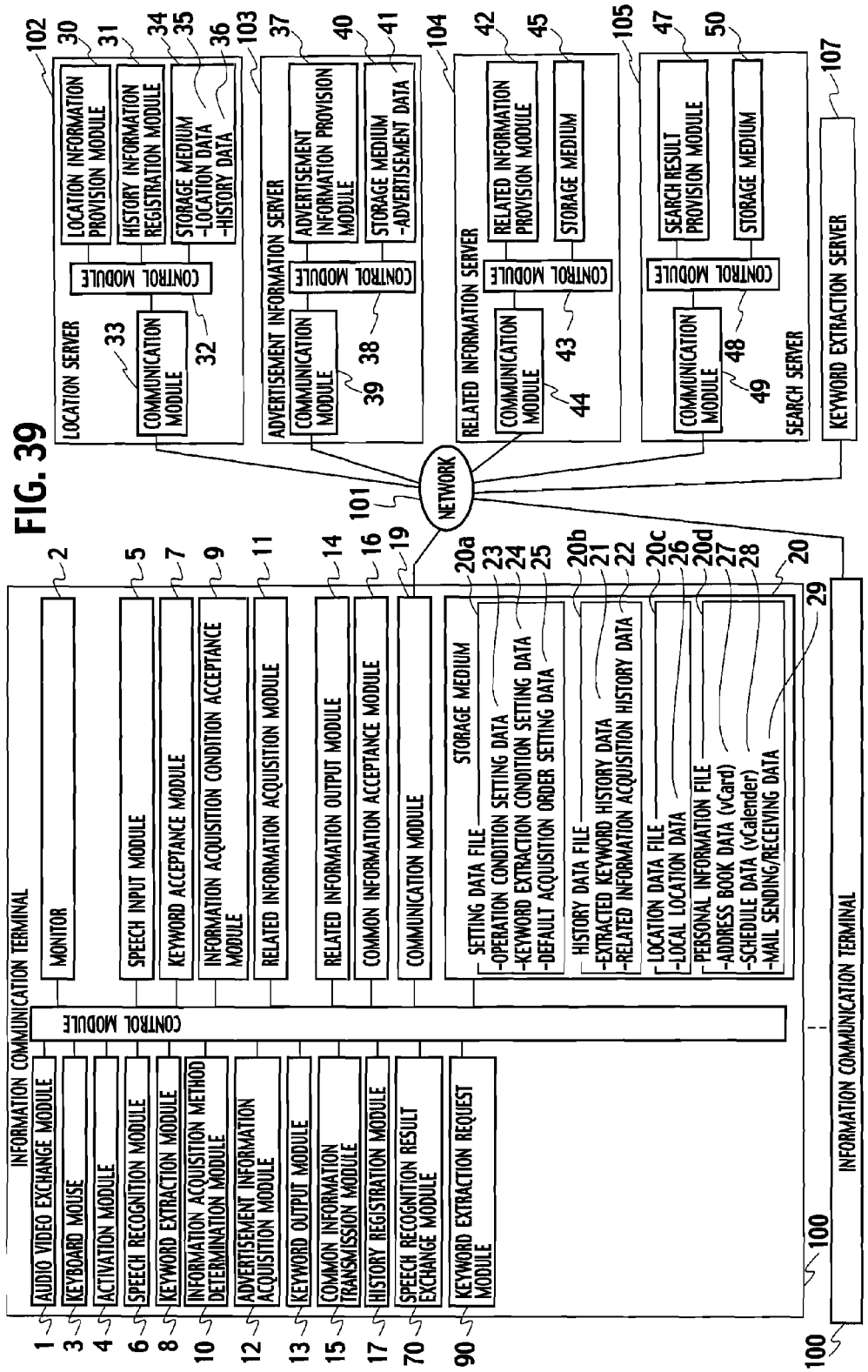
FIG. 39 is a structure diagram explaining the entire structure of an information communication system according to a fifth embodiment of the present invention.

An information communication system according to a fifth embodiment is different from the information communication systems shown in first to fourth embodiments in that the information communication system according to the fifth embodiment includes, as shown in FIG. 39, a keyword extraction server 107 connected to the network 101.

In the present invention, the keyword extraction server 107 is an apparatus used as a member of a pair with the information communication terminal 100 that extracts a keyword from the content of the conversation performed through the information communication terminal 100. More specifically, the keyword extraction server 107 includes a server-side keyword extraction module (not shown) that acquires, from the information communication terminal 100, word information of the conversation converted to text by the speech recognition module 6 of the information communication terminal 100 to extract a keyword. Thus, the keyword extraction server 107 returns the keyword information extracted from the word information to the information communication terminal 100. A method for extracting a keyword is assumed to be a method for extracting a word of a specific word class and a method for extracting a keyword by subjecting the word information to statistical analysis or linguistic analysis. Any method may be used so long as the method can extract an appropriate keyword.

<Description of Structure and Operation of the Information Communication Terminal 100>

The information communication terminal 100 is different from the information communication systems shown in the first to fourth embodiments in that this information communication terminal 100 further has a keyword extraction request module 90.

The keyword extraction request module 90 is a module that uses, when the information communication terminal 100 has a low processing performance (when "external keyword extraction server use necessity" (which will be described later) is "1=required"), the keyword extraction server 107 to extract a keyword from the word information to send the result to the keyword extraction module 8. Specifically, based on a request from the keyword extraction module 8, the communication module 19 is used to send the word information to the keyword extraction server 107 to request keyword extraction. When the keyword extraction server 107 receives the extracted keyword, the keyword extraction server 107 sends the keyword to the keyword extraction module 8.

The control module 18 further controls the keyword extraction request module 90. The communication module 19 is further used by the keyword extraction request module 90 to exchange information with another information communication terminal 100, the location server 102, the advertisement information server 103, the related information server 104, and the search server 105 via the network 101.

The extracted keyword history data 21 stored in the history data file 20b is data representing the history of a keyword extracted from the speech information by the speech recognition module 6 and the keyword extraction module 8. The extracted keyword history data 21 is assumed as being composed of a plurality of types of calling party IDs, speaker IDs, extracted keywords, and extracted keyword types ("0" or "1") for respectively identifying extraction date and time, a call ID, a requesting calling party ID, and a plurality of calling parties. An example of contents and settings of the respective items can be seen in the extracted keyword history data shown in FIG. 43.

The related information acquisition history data 22 is data showing the history of an information acquisition performed by the advertisement information acquisition module 12 and the related information acquisition module 11. The related information acquisition history data 22 is assumed as being composed of acceptance date and time, a call ID, a requesting calling party ID, a requested keyword, a requested keyword type ("0" or "1"), an acquisition condition ("0" to "8"), a common condition, a requested data location, and a to-be-acquired data location. An example of contents and settings of the respective items can be seen in the related information acquisition history data shown in FIG. 44.

The operation condition setting data 23 is assumed as being composed of a requesting calling party ID, an information acquisition condition input necessity, an advertisement display necessity, an external server use necessity, an external keyword extraction server use necessity, a default common condition setting, an advertisement information server location, a search server location, a location server location (to be acquired location), a location server location (for history), and a keyword extraction server location. An example of contents and settings of the respective items can be seen in the operation condition setting data shown in FIG. 42.

The keyword extraction condition setting data 24 is data for setting, from among words recognized by the recognition module 6 based on speech information, words to be extracted by the keyword extraction module 8 for the respective word classes. The keyword extraction condition setting data 24 is assumed as being composed of, for example, a requesting calling party ID, a proper name extraction necessity, a noun extraction necessity, and a verb extraction necessity. An example of contents and settings of the respective items is substantially the same as the already-described keyword extraction condition setting data shown in FIG. 15.

It is noted that the number of items may be identical with the number of word classes classified by the speech recognition module 6. In addition to a word class, a specific proper name or sense classification also may be set to set a word to be extracted as a keyword. For example, when an extracted keyword type is "1" (when a keyword is related information not included in word information as a speech recognition result of conversation contents), a control also may be set not to extract the word as a keyword. Other structures are the same as those of the information communication systems shown in the first to fourth embodiments and thus will not be further described.

<Description of Structure and Operation of the Location Server 102>

The location server 102 includes: the location information provision module 30, the history information registration module 31, the control module 32, the communication module 33, and the storage medium 34.

The location information provision module 30 determines, via the network 101, the requested keyword and the requested keyword type ("0" to "1") and the requested keyword acquisition condition sent from the information communication terminal 100 to the location server 102, a data location of related information to return the data location to the information communication terminal 100.

The history information registration module 31 receives, via the network 101 and from the history registration module 17 of the information communication terminal 100 a requested keyword, a requested keyword type, an acquisition condition, and the value of the to-be-acquired data location to store these pieces of information as the history data 36 into the storage medium 34.

The history data 36 is data showing the history of information acquisition performed by the respective related information acquisition modules 11 of the information communication terminals 100. The history data 36 is assumed as being composed of acceptance date and time, a requested keyword, a requested keyword type, an acquisition condition, and a to-be-acquired data location. An example of contents and settings of the respective items can be seen in the history data shown in FIG. 45.

<Description of Structure and Operation of the Keyword Extraction Server 107>

The keyword extraction server 107 waits for to-be-extracted word information 91 sent from the keyword extraction request module 90 of the information communication terminal 100. It is noted that, although not shown in FIG. 39, the keyword extraction server 107 at least includes a server-side keyword extraction module, a control module, and a communication module. A detailed structure of the keyword extraction server 107 will be described later.

-Description of Processing Flow-

Figure 40:
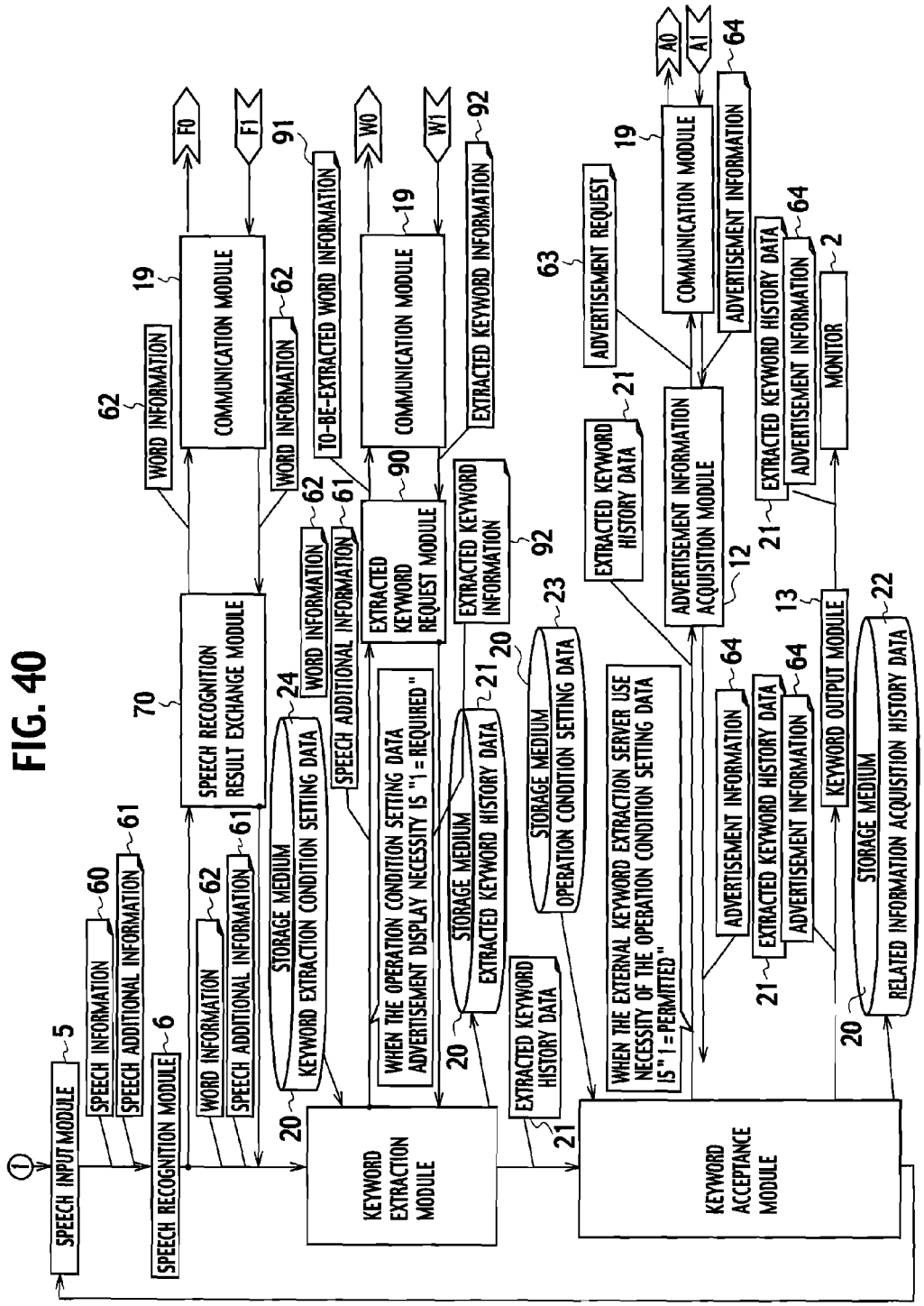
FIG. 40 is a flow diagram explaining a keyword display sequence of an information communication system according to the fifth embodiment of the present invention.
Figure 41:
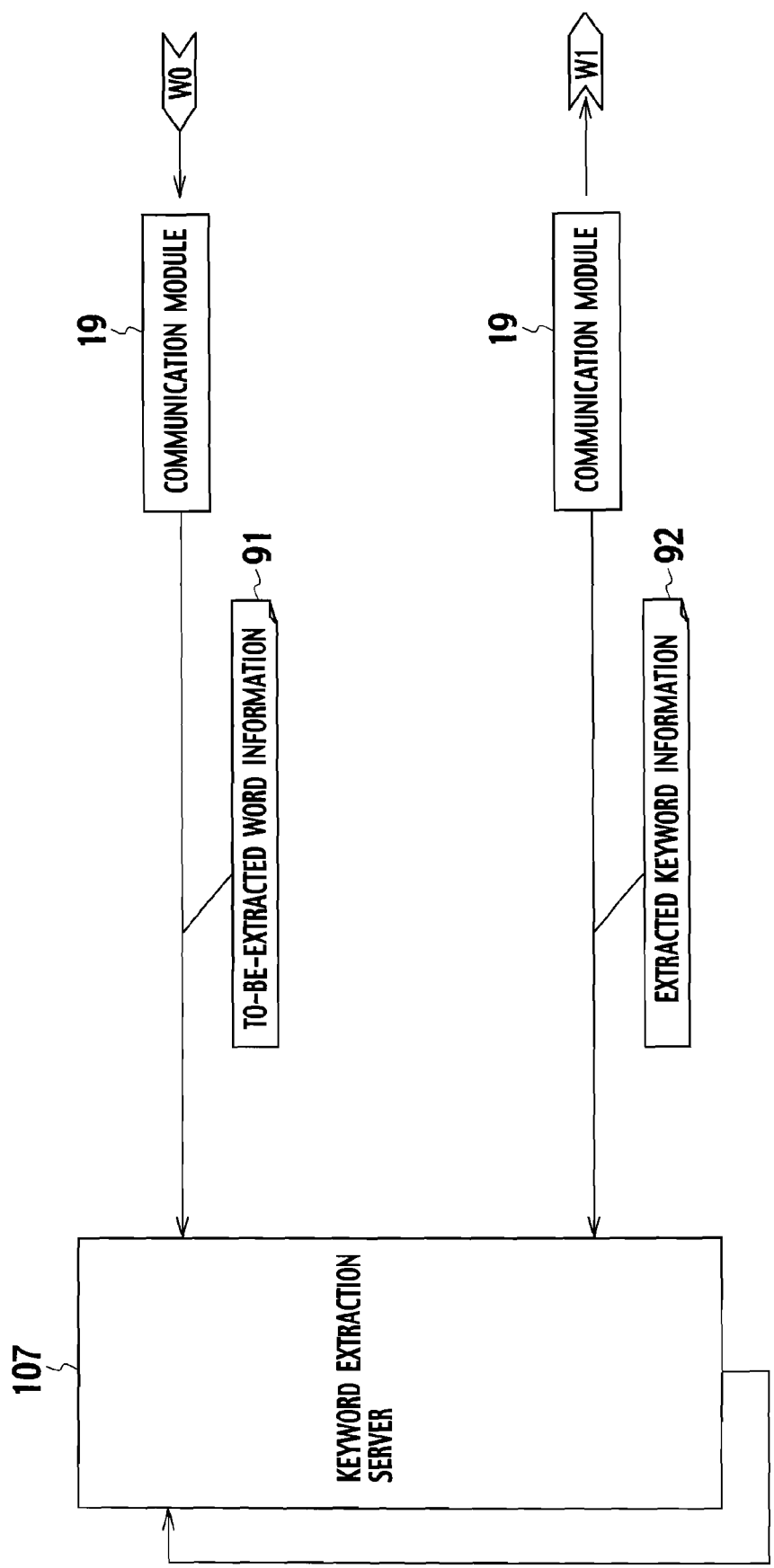
FIG. 41 is a flow diagram explaining a server-side keyword extraction sequence by a keyword extraction server according to the fifth embodiment of the present invention.

With reference to FIG. 40 to FIG. 41, the flow of the processing of a method for acquiring related information by an information terminal according to the fifth embodiment will be described. The processing flows of the fifth embodiment are substantially the same as the processing flows shown in the first to fourth embodiments except for the processing in the keyword display sequence shown in (1) of FIG. 2.

<Keyword Display Sequence>

The keyword display sequence shown in FIG. 40 and FIG. 41 ((1) in FIG. 2) shows a sequence in which a keyword in the speech information 60 of a call is extracted by the speech recognition module 6 and the keyword extraction module 8 and is displayed on the monitor 2.

The speech input module 5 acquires the speech information 60 and the speech additional information 61 included in the communication by the audio video exchange module 1 to send the speech information 60 and the speech additional information 61 to the speech recognition module 6. Here, the speech additional information 61 is information regarding a call performed by the audio video exchange module 1 and includes a call ID and a calling party ID.

When the speech recognition module 6 receives the speech information 60 and the speech additional information 61, the speech recognition module 6 identifies, based on the speech information 60, a word included in the call and the word class thereof to generate the word information 62 at least including the word or the word class to send the word information 62 and the speech additional information 61 to the speech recognition result exchange module 70 and the keyword extraction module 8.

When the speech recognition result exchange module 70 receives the word information 62 and the speech additional information 61, the speech recognition result exchange module 70 uses, through the control module 18, the communication module 19 to send the word information 62 and the requesting calling party ID acquired from the activation module 4 to the information communication terminal 100 of the call party by sending all calling party IDs recorded in the speech additional information 61 to the information communication terminal 100 as a destination.

The speech recognition result exchange module 70 receives, via the communication module 19, the word information 62 and the requesting calling party ID sent from the speech recognition result exchange module 70 of the information communication terminal 100 of the call party to send the word information 62 and the requesting calling party ID to the keyword extraction module 8.

When the keyword extraction module 8 receives the word information 62 and the speech additional information 61 from the speech recognition module 6 and receives the word information 62 of the call party and the requesting calling party ID of the call party from the speech recognition result exchange module 70, the keyword extraction module 8 uses the requesting calling party ID acquired from the activation module 4 as key information to read, through the control module 18, a value of the external keyword extraction server use necessity of the operation condition setting data 23 in the storage medium 20.

It is noted that, when the value of the external keyword server use necessity is set to "0=forbidden", the keyword extraction module 8 reads the keyword extraction condition setting data 24 in the storage medium 20. Then, the keyword extraction module 8 extracts as a keyword, only a word having a word class for which the keyword extraction condition setting data 24 is set to "1=to be extracted" in the word information to generate, based on the extracted keyword and the speech additional information 61, the extracted keyword history data 21 to store, through the control module 18, the keyword in the storage medium 20.

The extracted keyword history data 21 at least includes extraction date and time, a call ID, a requesting calling party ID, a calling party ID, a speaker ID, an extracted keyword, and an extracted keyword type. The call ID and the calling party ID are set to a value of the speech additional information. The extracted keyword type is set, for example to "0=keyword included in the word".

When an extracted keyword is the word information 62 acquired from the speech recognition module 6, the speaker ID is set to the requesting calling party ID acquired from the activation module 4. When an extracted keyword is the word information acquired from the speech recognition result exchange module 70, the speaker ID is set to the requesting calling party ID of a call party acquired from the speech recognition result exchange module 70. The requesting calling party ID is set to the requesting calling party ID acquired from the activation module 4. The extraction date and time are set to requesting calling party ID of a call party acquired from the at which the keyword is extracted by the keyword extraction module 8. The extracted keyword is set to the keyword extracted by the keyword extraction module 8.

Next, the keyword extraction module 8 sends the stored extracted keyword history data 21 to the keyword acceptance module 7.

It is noted that the keyword extraction module 8 also may perform, in addition of extraction of a word having a specific word class as a keyword from the word information 62, extraction of a keyword by the statistical analysis or linguistic analysis of the word information. In this case, a keyword database also may be referred to so that a conversation-related keyword (which is not always included in the word information) as a keyword can be extracted by the keyword module. In such a case, the extracted keyword type of the keyword history data is set to "1=keyword not included in word information".

The keyword extraction condition setting data 24 is set to "extracted keyword type" to be extracted. Thus, a control may be provided in which, when the extracted keyword type is "1" (when the keyword is related information not included in the word information resulting from speech recognition of the conversation contents), the keyword extraction module 8 does not extract the word as a keyword.

On the other hand, when the external keyword server use necessity has a value set to "1=permitted" as shown in FIG. 40, the keyword extraction module 8 uses the requesting calling party ID acquired from the activation module 4 as key information to read, through the control module 18 and from the storage medium 20, the value of the operation condition setting data 23 of the location of a server from which a keyword is extracted.

The keyword extraction module 8 sends, to the keyword extraction request module 90, the acquired value of the location of a server from which a keyword is extracted, the word information and the speech additional information received from the speech recognition module 6, as well as the word information of the call party and the requesting calling party ID of the call party received form the speech recognition result exchange module 70.

Next, the keyword extraction request module 90 generates, based on the received word information and speech additional information as well as the requesting calling party ID of the call party, the to-be-extracted word information 91 (which is composed of a combination of a word, a word class, and a speaker ID). Here, the speaker ID of the to-be-extracted word information 91 is set, when the word information is received from the speech recognition module 6, to a speaker ID in the speech additional information corresponding to this word information and is set, when the word information is word information of a call party received from the speech recognition result exchange module 70, to a requesting calling party ID of the call party.

The keyword extraction request module 90 uses, based on the value of the location of a server from which a keyword is extracted, the communication module 19 via the control module 18 to send the to-be-extracted word information 91 to acquire the extracted keyword information 92 from the keyword extraction server 107 to return the extracted keyword information 92 to the keyword extraction module 8. The extracted keyword information 92 includes a keyword, a word class, a speaker ID, and an extracted keyword type for example.

When the keyword extraction module 8 receives the extracted keyword information 92, the keyword extraction module 8 reads the keyword extraction condition setting data 24 in the storage medium 20. The keyword extraction condition setting data 24 includes a setting showing whether keyword extraction must be performed for each word class or not.

The keyword extraction module 8 selects, from the extracted keyword information 92, only a word having a word class for which the keyword extraction condition setting data 24 is set to "1=to be extracted" to generate, based on the selected keyword and speech additional information, the extracted keyword history data 21 to store the extracted keyword history data 21 in the storage medium 20 through the control module 18.

The keyword extraction module 8 sends the stored extracted keyword history data 21 to the keyword acceptance module 7. The subsequent processing is substantially the same as that of the processing flow shown in FIG. 3.

<Server-Side Keyword Extraction Sequence>

As shown in FIG. 41, the keyword extraction server 107 receives the to-be-extracted word information 91 sent from the keyword extraction request module 90 of the information communication terminal 100. Here, the to-be-extracted word information 91 is composed of at least a combination of a word, a word class, and a speaker ID and the keyword extraction server 107 extracts a keyword from the one or more pieces of received to-be-extracted word information 91. A keyword extraction method may be a method for extracting a specific word class of a word or a method for subjecting a word to statistical analysis or linguistic analysis. However, any method may be used so long as the method can extract an appropriate keyword. In the case of the latter, the keyword extraction server 107 also may have a database for keywords to extract a conversation-related keyword (which is not included in the to-be-extracted word information 91).

Next, the keyword extraction server 107 generates the extracted keyword information 92 regarding the extracted keyword. The extracted keyword information 92 includes at least a keyword, a word class, a speaker ID, and an extracted keyword type. The word class and the speaker ID of the extracted keyword information 92 are set to the values of the word class and the speaker ID of the applicable to-be-extracted word information 91. The extracted keyword type is set to "0" when the extracted keyword is included in the to-be-extracted word information 91 and is set to "1" when the extracted keyword is not included in the to-be-extracted word information 91. It is noted that, when the extracted keyword type is "1", the word class is set to a value determined by the keyword extraction server 107 and the speaker ID is not set.

Next, the keyword extraction server 107 sends the generated extracted keyword information 92 to the keyword extraction request module 90 of the information communication terminal 100.

Generally, when a keyword is extracted from word information by statistical analysis or linguistic analysis, the processing apparatus requires a large amount of calculation processing capability. The information communication system according to the fifth embodiment allows a keyword to be extracted both by the information communication terminal 100 and the keyword extraction server 107. The information communication terminal 100 can allow keyword extraction to be performed, depending on the processing performance of the information communication terminal 100, by the keyword extraction module 8 of the information communication terminal 100 (in a case where the information communication terminal 100 has a high processing performance) or by the keyword extraction server 107 (in a case where the information communication terminal 100 has a low processing performance). Specifically, when the information communication terminal 100 is set to use the keyword extraction server 107 (when "keyword extraction server 107 use necessity" is set to "1=required" (which will be described later)), the information communication terminal 100 can use the keyword extraction server 107 to extract a keyword from the word information.

It is noted that a keyword extraction function may be switched to the keyword extraction module 8 of the information communication terminal 100 or the keyword extraction server 107 based on a static switching by a set value or a dynamic switching based on the load to the information communication terminal 100.

In the fifth embodiment, a keyword related to the conversation (a keyword not already included in the speech recognition result) also can be extracted by the keyword extraction module 8. For example, conservation related to a meal can be provided with a name of a specific restaurant as a keyword to provide additional information to the speaker. In this case, the keyword is not always included in the word information and thus a flag ("extracted keyword type" and "requested keyword type" (which will be described later)) can be used to provide information.

-Details of Keyword Extraction-

First Example

<The Entire Structure of Keyword Extraction Server>

Figure 46:
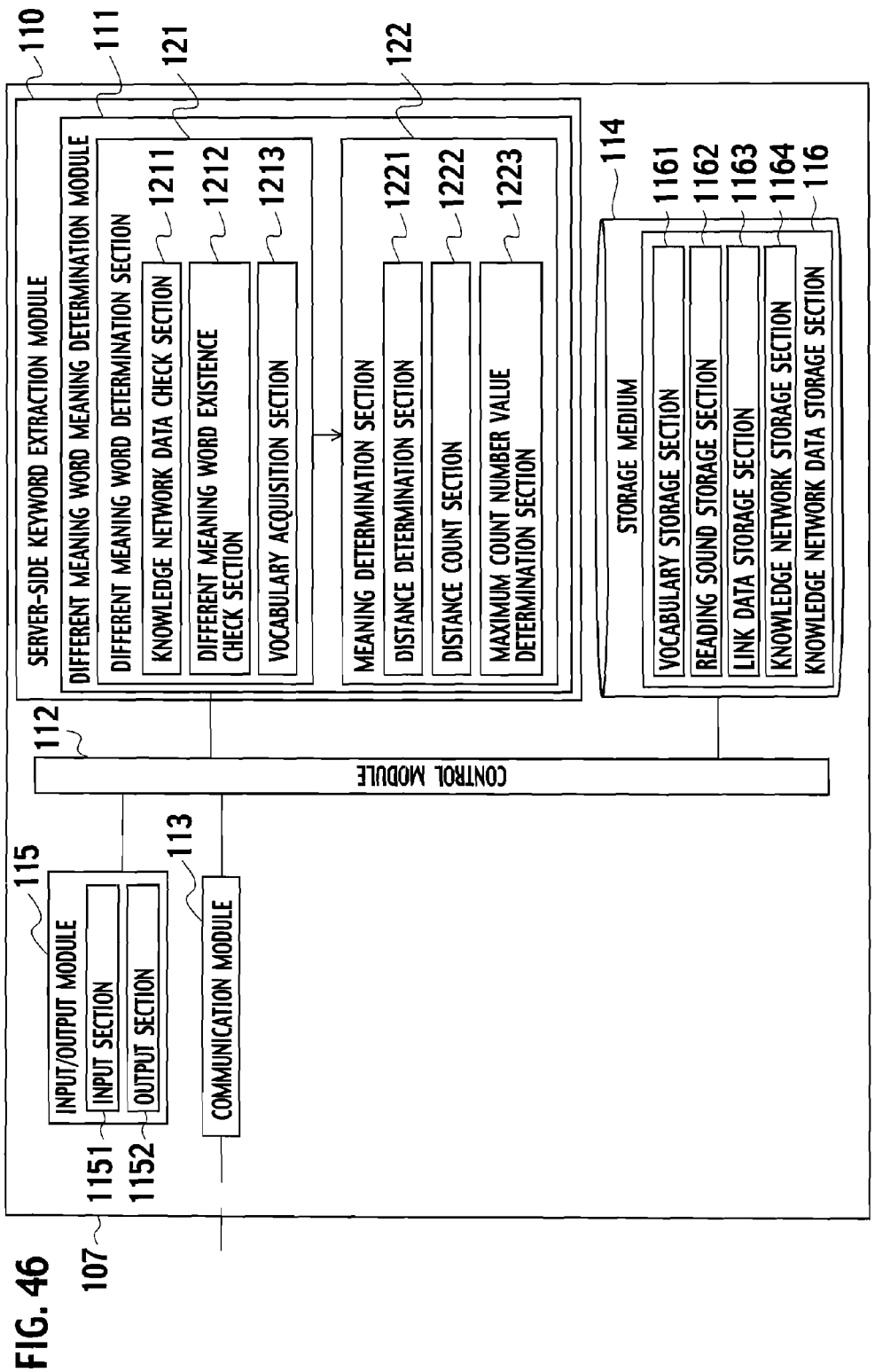
FIG. 46 is a structure diagram explaining the entire structure of a keyword extraction server according to a first example of the fifth embodiment of the present invention.

A keyword extraction server 107 according to a first example of the fifth embodiment includes, as shown in FIG. 46, a server-side keyword extraction module 110, a control module 112, a communication module 113, and a storage medium 114.

The server-side keyword extraction module 110 extracts, via the network 101, a keyword from the information received by the keyword extraction server 107 to return the keyword to the information communication terminal 100.

The server-side keyword extraction module 110 includes a different meaning word meaning determination module 111. The different meaning word meaning determination module 111 includes a different meaning word determination section 121 that reads a word collection to refer to vocabulary information to determine whether the word collection includes a homonym or a homograph and a meaning determination section 122 that reads link information to refer to the link information to determine the meaning of a word determined as a homonym or a homograph based on a distance between the word and another word simultaneously inputted with the word.

The different meaning word determination section 121 includes: a knowledge network data check section 1211 for referring to vocabulary information and link information; a different meaning word existence check section 1212 for referring to the check result of the knowledge network data check section 1211 to determine whether a homonym or a homograph exist or not; and a vocabulary acquisition section 1213 for referring to, when a homonym or a homograph exist, vocabulary information to acquire all vocabulary having an identical notation or reading sound with that of the word determined as a homonym or a homograph.

The meaning determination section 122 includes: a distance determination section 1221 that compares the respective pieces of the vocabulary acquired by the vocabulary acquisition section 1213 with the vocabulary in the word collection other than a homonym or a homograph to investigate whether the distance between the former vocabulary and the latter vocabulary exists within a specified distance or not; a distance count section 1222 for counting the distance between the respective pieces of vocabulary; and a maximum count number value determination section 1223 for finally determining the vocabulary having the maximum count number as the vocabulary of a homonym or a homograph.

The control module 112 controls the use of the communication module 113 by the server-side keyword extraction module 110. Specifically, the control module 112 may be assumed as an operating system such as Windows (registered trademark), Linux (registered trademark), or Sun-OS (registered trademark).

The communication module 113 is controlled by the control module 112 and is used by the server-side keyword extraction module 110 to exchange information with the information communication terminal 100 via the network 101. Specifically, the communication module 113 is assumed as an apparatus for physically sending data (e.g., modem) and the control software thereof.

The storage medium 114 is controlled by a control module and information therein is read by the server-side keyword extraction module 110. The storage medium 114 includes a knowledge network data storage section 116 for storing vocabulary, vocabulary information showing the correspondence among pieces of vocabulary, and link information showing a distance among pieces of vocabulary.

The knowledge network data storage section 116 includes: a vocabulary storage section 1161 for storing vocabulary; a vocabulary sound storage section 1162 for storing reading sound; a link data storage section 1163 for storing ink information; and a knowledge network 1164.

The keyword extraction server 107 also may further include an input/output apparatus 115 that includes an input section 1151 that is an apparatus for inputting word collection inputted as audio or text to output a word ID for which the meaning is determined and that inputs a word collection outputted as a result of a speech recognition or a natural language processing (to-be-extracted word information 91); and an output section 1152 for receiving the word collection for which the meaning is fixed as a result of the processing. The existence of the input/output apparatus 115 allows a user to input the to-be-extracted word information 91 without using the communication module 113. Thus, the keyword extraction server 107 can be used as a single "apparatus for determining the meaning of a homonym or a homograph" independent of the network <Structure of Knowledge Network>

The keyword extraction server 107 shown in FIG. 46 can use a knowledge network to investigate a distance between a plurality of pieces of vocabulary having different meanings and having an identical reading sound or an identical notation and a word simultaneously inputted with the vocabulary to select a piece of vocabulary having different meanings and having an identical reading sound or notation that is more relevant to the simultaneously inputted word to select a correct piece of vocabulary suitable to the context.

The knowledge network can discriminate a homonym or a homograph because words having different meanings and having an identical pronunciation or notation are handled as different pieces of vocabulary. Thus, the knowledge network can be used to determine whether a certain word is the one of words having an identical reading sound or notation.

Furthermore, the knowledge network can recognize a correct meaning because words having an identical reading sound or notation and specifying different meanings can be handled as different pieces of vocabulary and a distance between a simultaneously inputted word collection and a homonym or a homograph is used. Thus, the meanings of a homonym or a homograph can be correctly recognized.

The keyword extraction server 107 shown in FIG. 46 can process not only a word having a different meaning and having a different notation but also a homograph because homographs are provided with different IDs for the respective meanings.

Figures 48, 49:
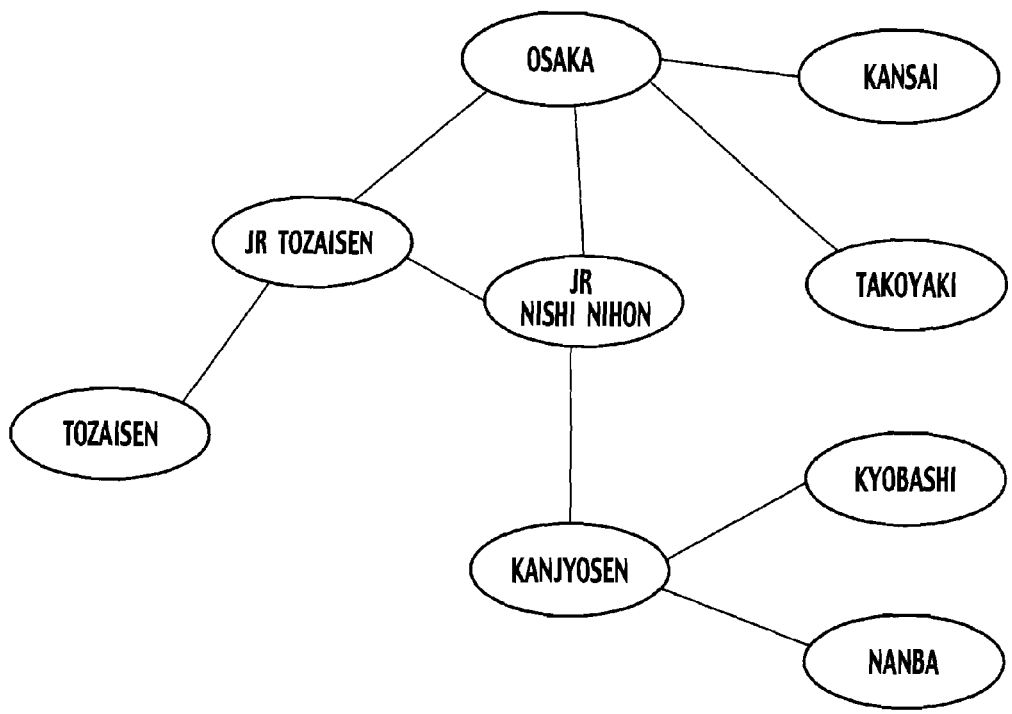
FIG. 48 illustrates an example of nodes (vocabulary) constituting a knowledge network in a knowledge network recording section according to the first example of the fifth embodiment of the present invention.
FIG. 49 illustrates an example of a knowledge network in a knowledge network recording section according to the first example of the fifth embodiment of the present invention.

The knowledge network includes nodes that represent vocabulary for example and that are connected. The knowledge network is structured, as shown in FIG. 48, so that relevant nodes (pieces of vocabulary) are connected by a link. FIG. 48 shows an example of a piece of vocabulary "Tozaisen" for which an ID is set to 1, the notation is "Tozaisen", and the notation is read as "Tozaisen". The respective pieces of vocabulary are given with unique IDs and pieces of vocabulary having an identical ideographical representation are also given with different IDs.

As shown in FIG. 49, the knowledge network is composed of vocabulary information and link information. The knowledge network is structured so that relevant pieces of vocabulary are connected by a link. In the example of FIG. 49, the vocabulary "Tozaisen" is linked to the vocabulary "JR Tozaisen", the vocabulary "JR Tozaisen" is linked to the vocabulary "osaka" and the vocabulary "JR Nishi Nihon", the vocabulary "osaka" is linked to the vocabulary "kansai" and the vocabulary "takoyaki", the vocabulary "JR Nishi Nihon" is linked to the vocabulary "kanjyousen", and the vocabulary "kanjyousen" is linked to the vocabulary "kyobashi" and the vocabulary "nanba".

In the knowledge network, a distance between a plurality of vocabulary of a homonym or a homograph and a simultaneously-inputted word is selected by using the knowledge network to select the vocabulary of the word having a different meaning and having an identical pronunciation or notation more relevant to the simultaneously-inputted word to select correct vocabulary suitable to the context.

-Description of Processing Flow-

<Entire Processing Flow>

Figure 50:
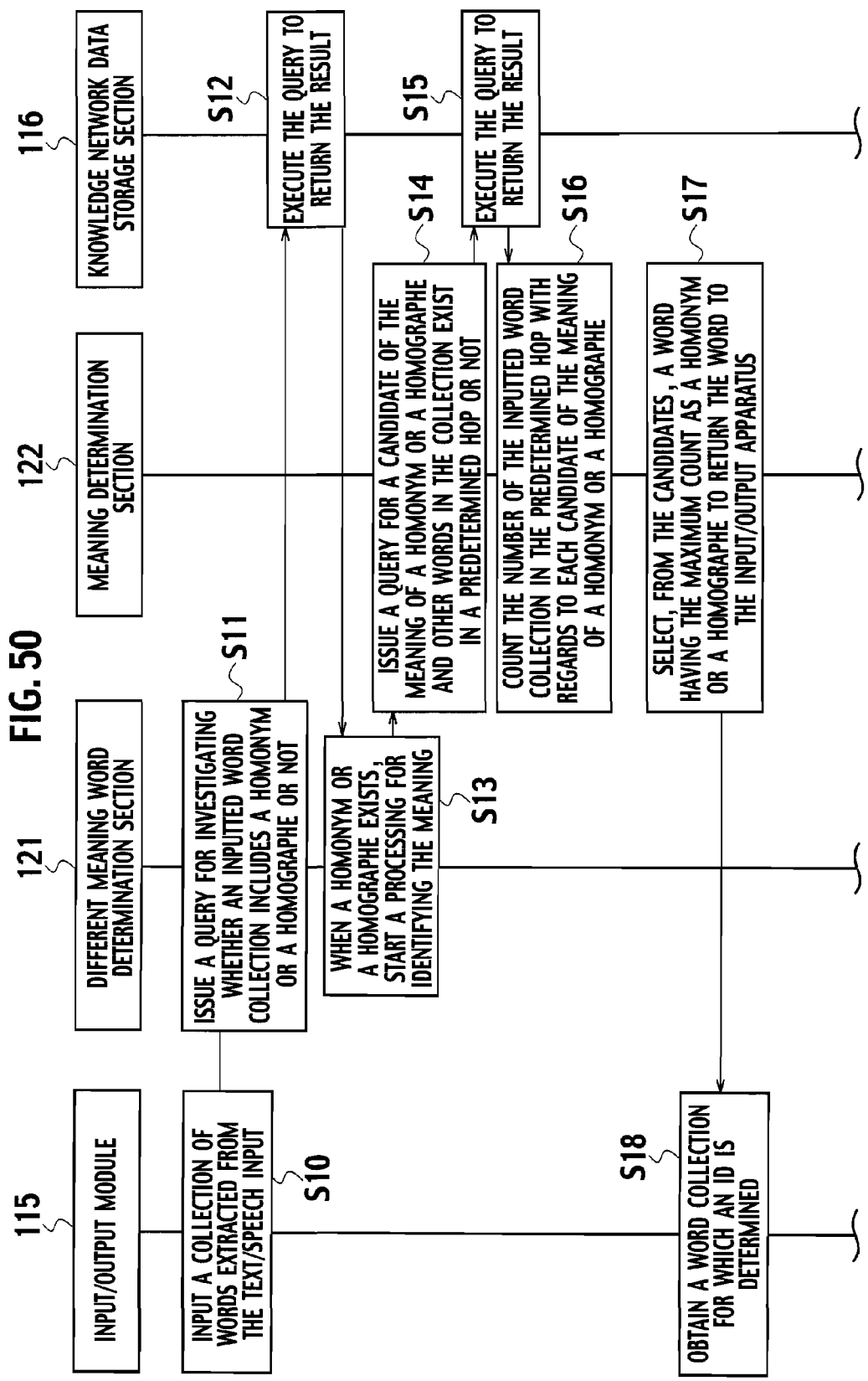
FIG. 50 is a flow diagram explaining a processing for determining the meaning of a homonym or a homograph by a keyword extraction server according to the first example of the fifth embodiment of the present invention.

The processing flow of the keyword extraction server 107 in the first embodiment is described as shown in FIG. 50.

(a) When the communication module 113 acquires the to-be-extracted word information 91 via the network 101, Step S10 allows the input section 1151 of the input/output module 115 to input the to-be-extracted word information 91 to send the to-be-extracted word information 91 to the different meaning word determination section 121.

(b) Next, Step S11 allows the different meaning word determination section 121 to issue a query for investigating whether the inputted word collection includes a homonym or a homographs.

(c) Next, Step S12 executes a query for investigating, in the knowledge network data storage section 116, whether the inputted word collection includes a homonym or a homograph to send the result to the different meaning word determination section 121.

(d) Next, when the different meaning word determination section 121 includes a homonym or a homograph in Step S13, a processing for identifying the meaning is started.

(e) Next, Step S14 issues a query for investigating, in the meaning determination section 122, whether candidates of meanings of the word having a different meaning and having an identical pronunciation or notation and other words in the collection exist within a predetermined hop or not.

(f) Next, Step S15 executes a query for investigating, in the knowledge network data storage section 116, whether candidates of meanings of the word having a different meaning and having an identical pronunciation or notation and other words in the collection exist within a predetermined hop or not to send the result to the meaning determination section 122.

(g) Next, Step S16 counts, in the meaning determination section 122, the number of inputted word collections in the predetermined hop for each candidate of the word having a different meaning and having an identical pronunciation or notation.

(h) Next, Step S17 allows the meaning determination section 122 to select, from among the candidates, a candidate having the maximum count as a meaning of a homonym or a homograph to return the candidate to the input/output apparatus 115.

(i) Next, Step S18 allows the input/output apparatus 115 to acquire the word collection for which an ID is determined.

<Method for Determining Meanings of a Homonym or a Homograph>

A method for determining meanings of a homonym or a homograph according to the first example includes: a step for allowing the different meaning word determination section 121 to refer to vocabulary information and link information stored in the knowledge network data storage section 116; a step for allowing the different meaning word determination section 121 to determine whether a homonym or a homograph exists or not; a step for allowing the different meaning word determination section 121 to refer, when a homonym or a homograph exists, to the vocabulary information to acquire all pieces of vocabulary of words having an identical notation or reading sound determined as a homonym or a homograph; a step for allowing the meaning determination section 122 to compare the respective pieces of vocabulary for which IDs are acquired with the vocabulary other than words having different meanings and having an identical reading sound or notation in the word collection to investigate whether the distance between pieces of vocabulary exists within a predetermined distance or not; a step for allowing the meaning determination section 122 to count a distance between pieces of vocabulary for the respective pieces of vocabulary; and a step for allowing the meaning determination section 122 to finally determine a piece of vocabulary having the maximum count number as a piece of vocabulary as a homonym or a homograph.

Alternatively, the step for referring to vocabulary information and link information is executed by the knowledge network data check section 1211 in the different meaning word determination section 121. The step for determining whether a homonym or a homograph exists or not is executed by the different meaning word existence check section 1212 in the different meaning word determination section 121. The step for acquiring all pieces of vocabulary is executed by the vocabulary acquisition section 1213 in the different meaning word determination section 121.

Alternatively, the step for investigating whether a distance between pieces of vocabulary exists in a predetermined distance or not is executed by the distance determination section 1221 of the meaning determination section 122. The step for counting a distance between pieces of vocabulary is executed by the distance count section 1222 in the meaning determination section 122.

Alternatively, the step for determining a piece of vocabulary for which the count number is maximum as a homonym or a homograph is executed by the maximum count number value determination section 1223 in the meaning determination section 122.

<Algorithm for Determining a Meaning of a Different Meaning Word Having an Identical Reading Sound or Notation>

Figure 51:
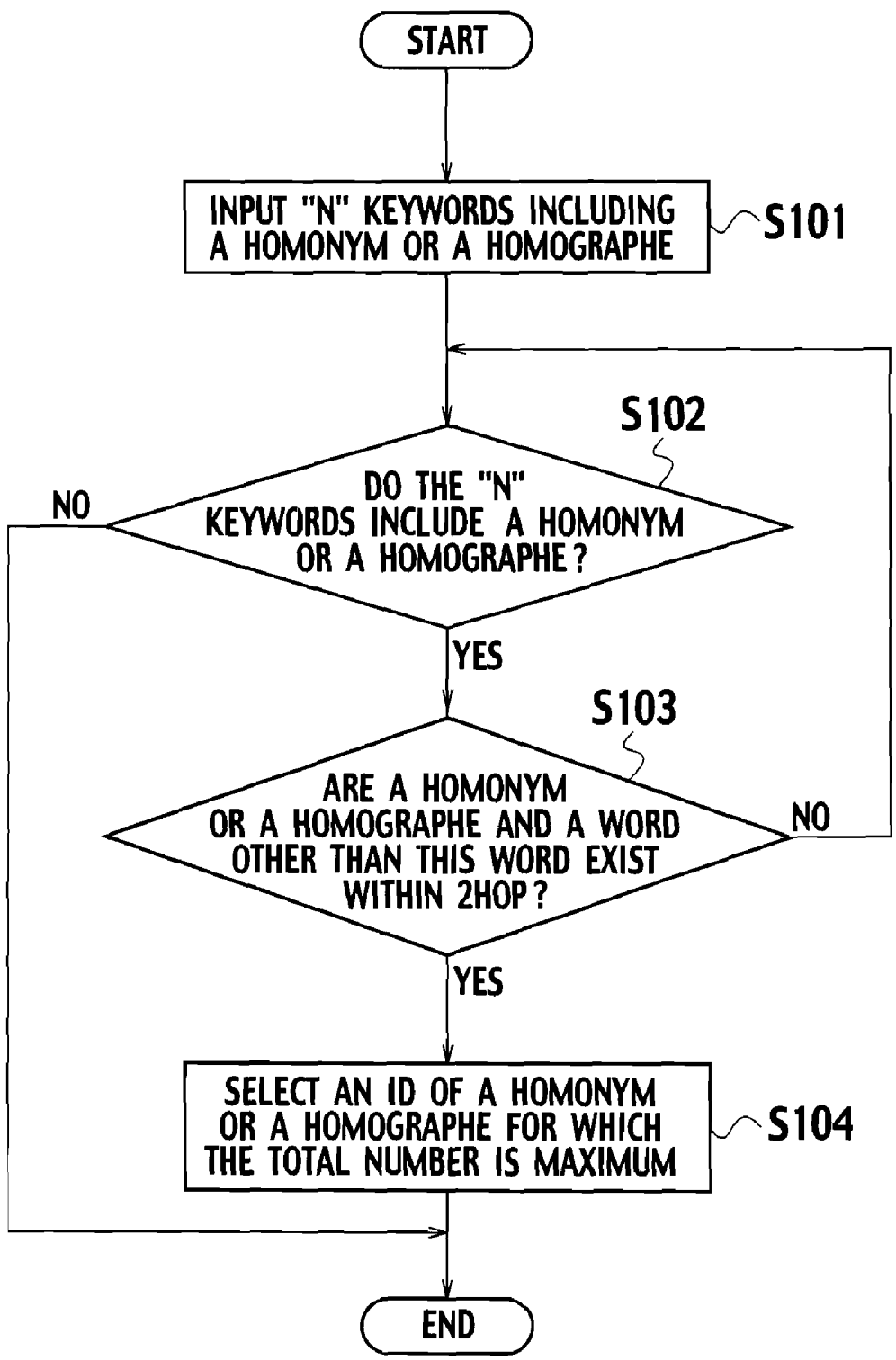
FIG. 51 is a flow diagram explaining an algorithm for determining the meaning of a homonym or a homograph in the processing for determining the meaning of a homonym or a homograph by a keyword extraction server according to the first example of the fifth embodiment of the present invention.

An algorithm for determining a meaning of a different meaning word having an identical reading sound or notation is shown in the flowchart shown in FIG. 51.

This algorithm is based on assumption 1 that a knowledge network is prepared in advance.

This algorithm is based on assumption 2 that words having an identical notation and different meanings are recognized as separate "keywords". Specifically, words having an identical notation and different meanings are given with IDs for discrimination.

(a) First, Step S101 inputs "n" keywords including a homonym or a homograph to the input/output apparatus 115.

(b) Next, Step S 102 allows the different meaning word determination section 121 to determine whether the "n" keywords include a homonym or a homograph or not.

(c) When Step S102 results in "NO", the algorithm is completed.

(d) When Step S102 results in YES, the processing proceeds to Step S103 to determine whether a homonym or a homograph and a word other than this word exist within 2hop or not.

(e) When Step S103 results in NO, the processing returns to Step S102.

(f) When Step S103 results in YES, the respective IDs (meanings) of words having different meanings and having an identical reading sound or notation are given with points. Then, an ID of a homonym or a homograph that has the highest points is selected as having a meaning suitable to the conversation contents. Although S103 uses 2hop, the number of hops is not limited to this value and the number of hops can be changed depending on the vocabulary network.

Conventionally, a homonym and a homograph of audio input and text input have been difficulty recognized to correctly grasp the meaning. Thus, it has been difficult to determine whether a certain word is a homonym or a homograph. Alternatively, it has been difficult to correctly recognize the meaning of a homonym and a homograph.

In view of the above, a method using vocabulary co-occurrence has been suggested. However, the use of vocabulary co-occurrence recognizes homographs as belonging to a single group and provides only a unique meaning to each notation, thus failing to provide a plurality of meanings to a single word.

A conversion apparatus has been known by which, when a word network is structured to retain a distance in the meaning between the vocabulary of a reading sound and the vocabulary of a notation and the notation and a sentence includes a homonym, the distance between words in the sentence is checked to suggest a candidate having a shorter distance at a high level conversion candidate. However, this conversion apparatus could not recognize correct meanings of words that are homonym and that are homographs.

On the other hand, the keyword extraction server 107 according to the first example can determine whether a word of an audio input or a text input is a homonym or a homograph to correctly recognize the meaning of the homonym or the homograph.

Modification of the First Example

Figure 47:
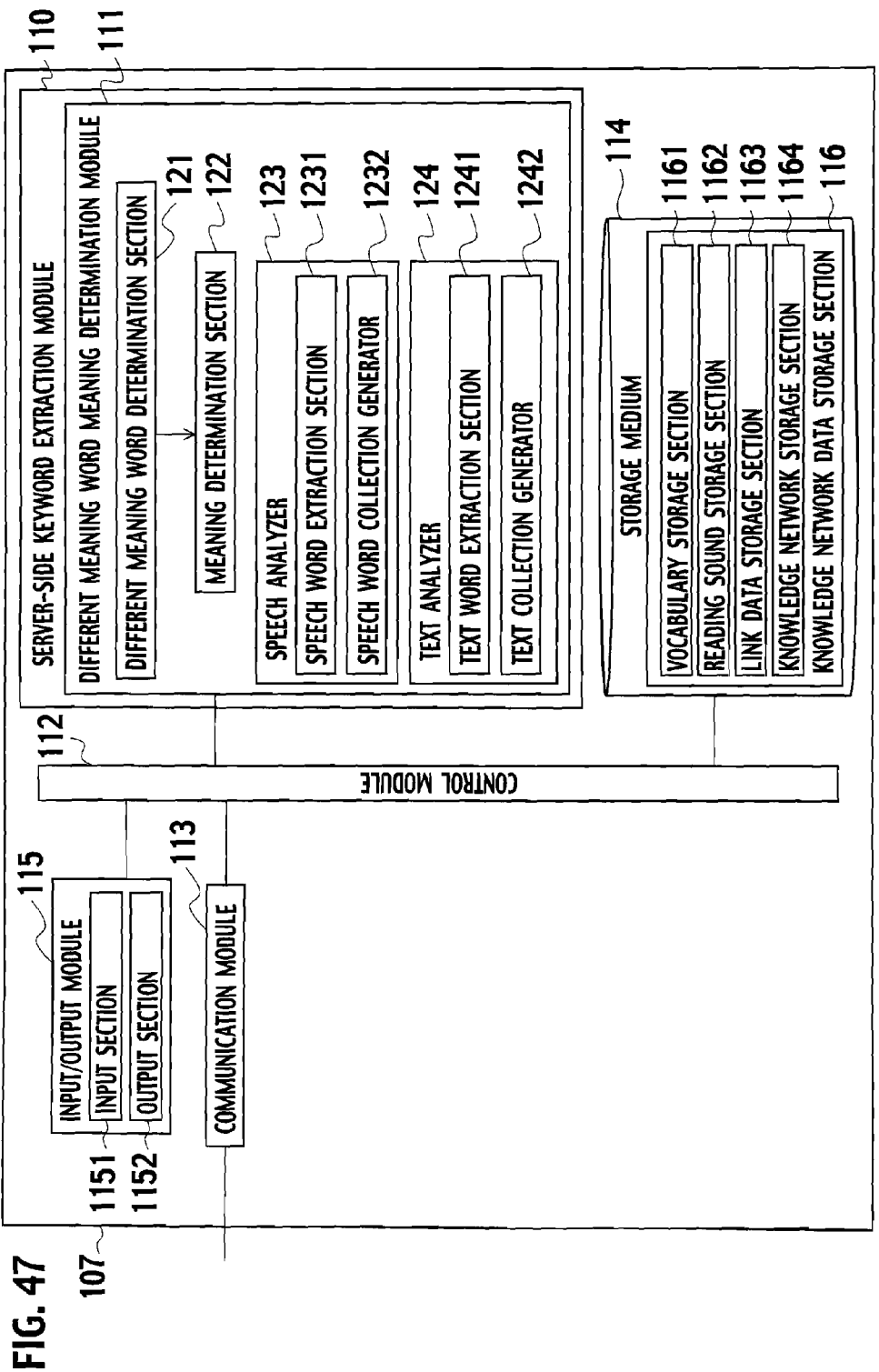
FIG. 47 is a structure diagram explaining the entire structure of a keyword extraction server according to a modification of the first example of the fifth embodiment of the present invention.

The keyword extraction server 107 according to a modification of the first example includes, as shown in FIG. 47: a knowledge network data storage section 116 for storing vocabulary information showing the correspondence between a piece of vocabulary and the vocabulary reading sound and link information showing a distance between pieces of vocabulary; a different meaning word determination section 121 for reading a word collection to refer to the vocabulary information to determine whether the word collection includes a homonym or a homograph or not: a meaning determination section 122 for reading link information to refer to the link information to determine the meaning of a word determined as a homonym or a homograph based on a distance between the word and another word simultaneously inputted with the word; and a text analyzer 124 for extracting a word from a text sentence to generate text word collection.

Alternatively, a speech analyzer 123 for extracting a word from audio to generate audio word collection may be also included.

Alternatively, the speech analyzer 123 includes, as shown in FIG. 47, a speech word extraction section 1231 for extracting a word from audio and an audio word collection generation section 1232 for generating an audio word collection.

Alternatively, the speech analyzer 123 includes a speech word collection generator 1241 for extracting a word from a text sentence and a text word collection generator 1242 for generating a text word collection. It is noted that, when the keyword extraction server 107 according to the modification of the first example is installed in another apparatus, only a word collection has to be received and the speech analyzer 123 and the text analyzer 124 are not always required.

The keyword extraction server 107 according to the modification of the first example (an apparatus for determining the meaning of a homonym or a homograph) can determine whether a word of an audio input or a text input is a homonym or a homograph to correctly recognize the meaning of the homonym or the homograph.

<Knowledge Network>

The following section will describe a specific example of a knowledge network in the knowledge network data storage section 116 in the keyword extraction server 106 according to the modification of the first example. The respective nodes (vocabulary) have ID numbers, notations, and reading sounds as shown in FIG. 52.

Figure 53:
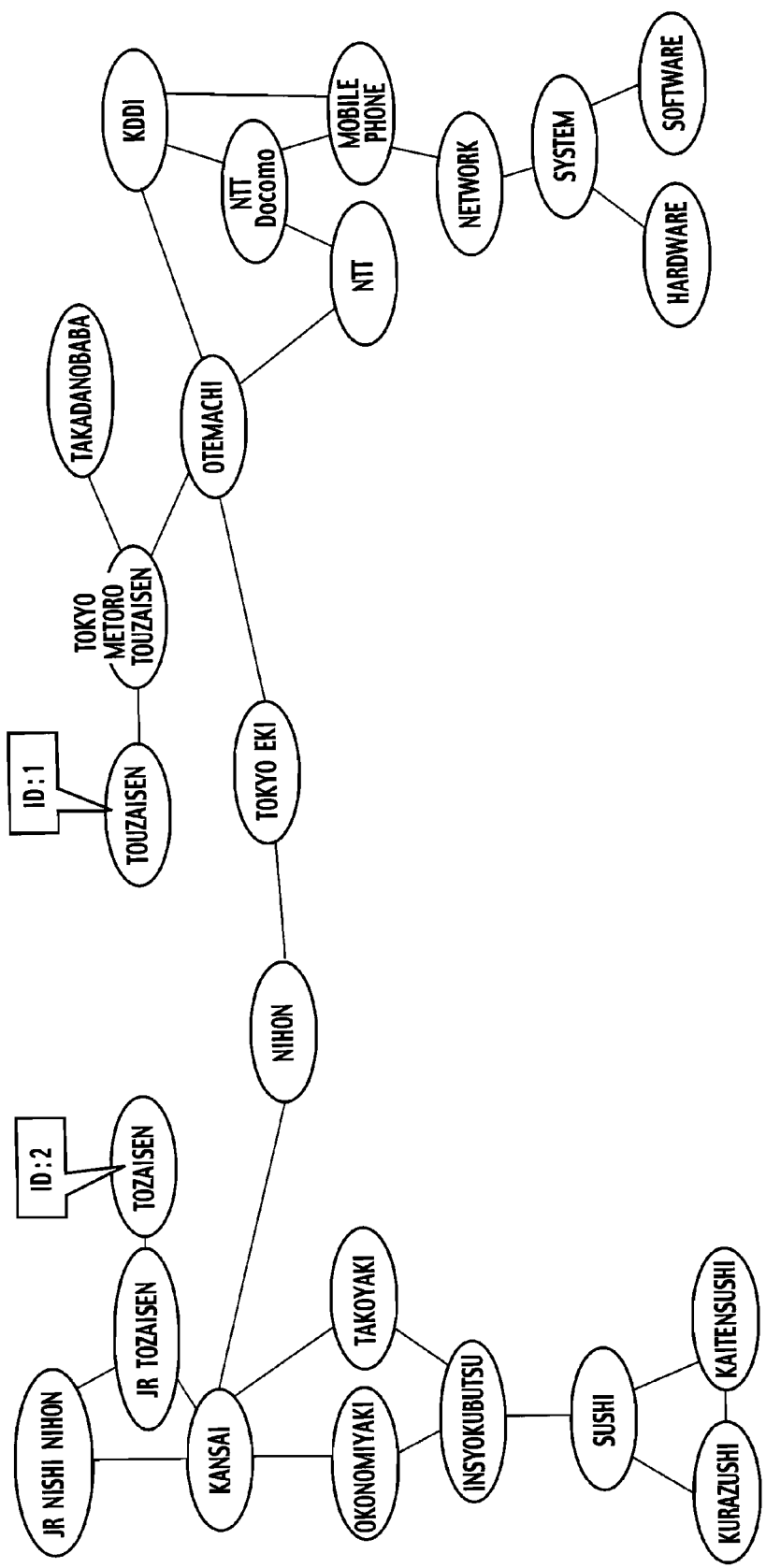
FIG. 53 illustrates a specific example of a knowledge network in a knowledge network recording section according to the modification of the first example of the fifth embodiment of the present invention.

As shown in FIG. 53, the knowledge network is structured so that vocabulary shown by ID1 "Tozaisen" is linked to vocabulary "Tokyo Metoro Touzaisen", vocabulary "Tokyo Metoro Touzaisen" is linked to vocabulary "Takadanobaba" and vocabulary "Otemachi", vocabulary "Otemachi" is linked to vocabulary "NTT", vocabulary "Toukyo eki", and vocabulary "KDDI", vocabulary "NTT" is linked to vocabulary "NTTDocomo", vocabulary "KDDI" is linked to vocabulary "NTTDocomo" and vocabulary "mobile phone", vocabulary "mobile phone" is linked to vocabulary "NTTDocomo" and vocabulary "Network", vocabulary "Network" is linked to vocabulary "system", and vocabulary "system" is linked to vocabulary "hardware" and vocabulary "Software".

Similarly, vocabulary "Tozaisen" shown by ID2 is linked to vocabulary "JR Tozaisen", vocabulary "JR Tozaisen" is linked to vocabulary "JR Nishi Nihon" and vocabulary "Kansai", vocabulary "Kansai" is linked to vocabulary "JR Nishi Nihon", vocabulary "NIHON", vocabulary "Takoyaki", and vocabulary "Okonomiyaki", vocabulary "Nihon" is linked to vocabulary "Toukyo eki", vocabulary "Takoyaki" and vocabulary "Okonomiyaki" are linked to vocabulary "insyokubutsu", vocabulary "insyokubutsu" is linked to vocabulary "Sushi", vocabulary "Sushi" is linked to vocabulary "Kurazushi" and "Kaitensushi", and vocabulary "Kurazushi" is linked to vocabulary "Kaitensushi".

<Inputted Text Data>

FIG. 54 shows an example in which the keyword extraction server 107 according to the modification example of the first embodiment uses a specific example of a knowledge network shown in FIG. 53 to extract a word collection from the exemplary inputted text data of the text analyzer 124. The exemplary inputted text data is inputted to the speech word collection generator 1241 in the text analyzer 124 to extract a word collection and an exemplary input word collection is generated by the text word collection generator 1242. The exemplary input word collection is transferred to the input/output apparatus 115.

The exemplary inputted text data is composed of conversation sentences by persons A and B as shown in FIG. 54 composed of: "A: Today, I will go to Otemachi for business. Since I have some spare time, I will go there by Tozaisen. B: You can get a seat in the train. What is the purpose of your visit to Otemachi today? A: We are thinking about an ordering system using a Mobile phone and will discuss the system. B: Come to think of it, I heard about such a system used in some Sushi restaurants recently. A: Year, that's exactly what I'm doing. You may probably know Kurazushi. The system is for that company." Based on the above sentences, an exemplary input word collection composed of "Otemachi, Tozaisen, Otemachi, mobile phone, system, Sushi, system, and Kurazushi" can be obtained.

<Method for Determining a Homonym or a Homograph and the Determination Result>

Example 1

(a) Determination of a Homonym or a Homograph

First, when the knowledge network data storage section 116 includes therein the vocabulary of FIG. 52 and the knowledge network of FIG. 53, the different meaning word determination section 121 uses the knowledge network to determine whether the inputted word collection includes a homonym or a homograph or not. Since the word collection includes two words of a word having notation "Tozaisen" and a word having a reading sound "Tozaisen", the word [Tozaisen] is determined as a homonym and a homograph.

(b) Meaning Determination

The word [Tozaisen] has two meanings. ID1 means Tokyo Metoro Tozaisen and ID2 means JR Tozaisen. In order to determine which meaning the word "Tozaisen" has in the exemplary inputted text data shown in FIG. 54, the meaning determination section 122 performs the following processing.

Investigate whether the respective words "Tozaisen" of ID1 and ID2 and the other words in the word collection of "Otemachi", "Tozaisen", "Otemachi", "mobile phone" "system", "Sushi", "system", and "Kurazushi" are within 2hop or not.

Select a word having the maximum number of IDs found within 2hop as a homonym and a homograph in the input word collection.

The keyword extraction server 107 according to the modification of the first example uses the specific example of the knowledge network shown in FIG. 53 to use the exemplary input word collection extracted from the exemplary inputted text data shown in FIG. 54 to determine a word as a homonym and a homograph, the result of which is shown in FIG. 55.

FIG. 55 shows IDs, notations, attributes of the respective IDs, and emerged words in the collection. Positions showing a relation between the words "Tozaisen" having the respective IDs and emerged words show flags showing whether the words are found within 2hop or not by showing "1" for "within 2hop" and "0" for "within 3hop or more".

The rightmost column of FIG. 55 shows the total number of words found within 2hop. A word having the maximum number of IDs found within 2hop is selected as a homonym and a homograph in the input word collection.

Finally, the determined ID is outputted to the input/output apparatus 115 and the processing is completed.

It is noted that a resource as an input source is not limited to a context of the exemplary inputted text data as shown in FIG. 54. The resource also may be a general conversation, a fragmentary collection of words, or audio for example.

The investigation of a relation between the respective pieces of vocabulary by the meaning determination section 122 needs not to always use 2hop and can use an appropriate number of hop depending on the structure of the knowledge network.

Second Example

Knowledge Network

Figure 58:
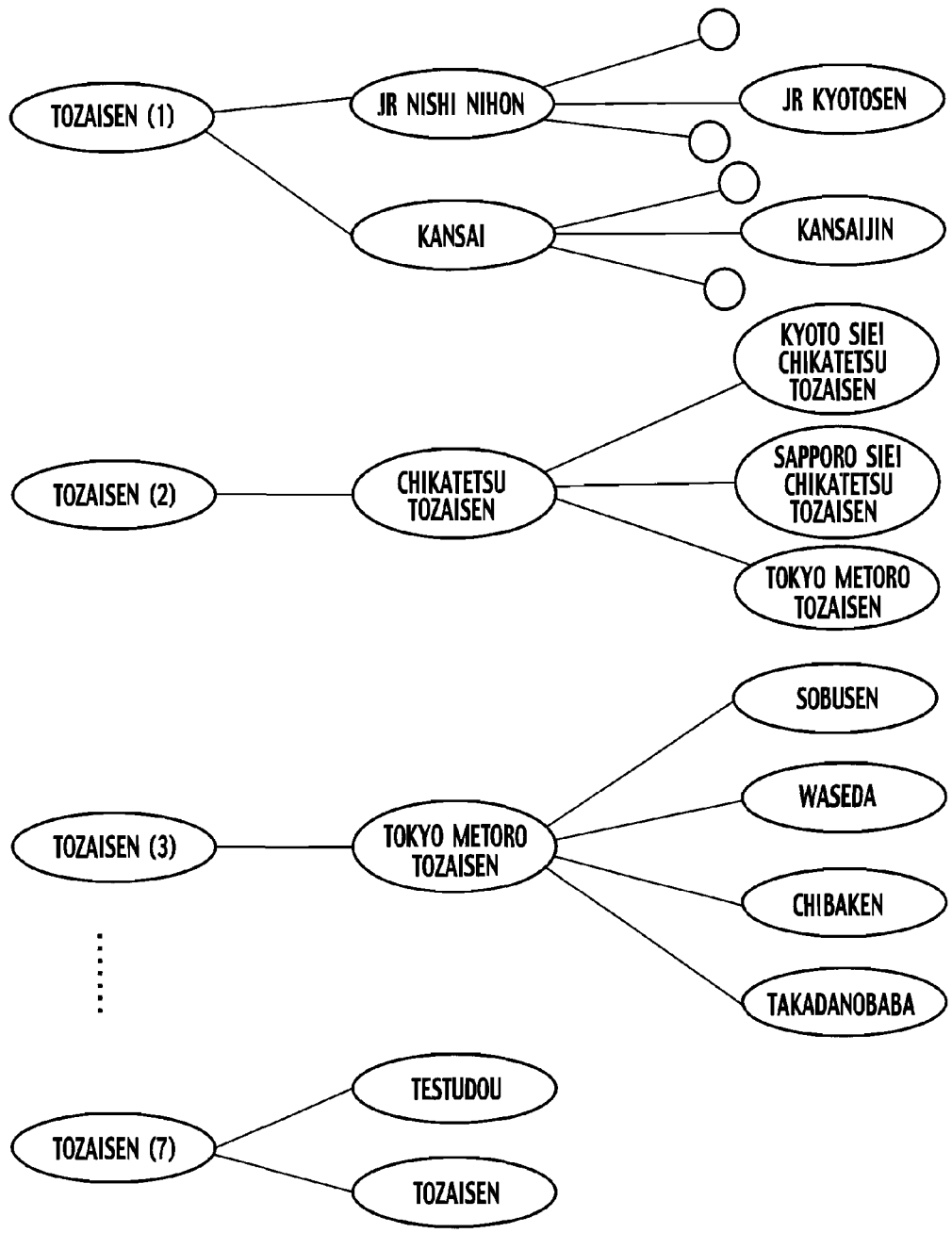
FIG. 58 shows another specific example of a knowledge network in the knowledge network data storage section in the keyword extraction server according to the modification of the first example of the fifth embodiment of the present invention.

The following section will describe another specific example of a knowledge network in the knowledge network data storage section 116 in the keyword extraction server 107 according to the second example of the first embodiment with reference to FIG. 58. The knowledge network is as shown in FIG. 58. The ID numbers, notations, and reading sounds of the respective pieces of vocabulary are the same as those of FIG. 52 and will not be shown here.

In the knowledge network shown in FIG. 58, the vocabulary "Tozaisen (1)" is linked to the vocabulary "JR Nishi Nihon" and the vocabulary "Kansai", the vocabulary "JR Nishi Nihon" is linked to the vocabulary "JR Kyotosen", and the vocabulary "Kansai" is linked to the vocabulary "Kansaijin". The vocabulary "Tozaisen(2)" is linked to the vocabulary "chikatetsu Tozaisen", the vocabulary "chikatetsu Tozaisen" is linked to the vocabulary "Kyotoshiei chikatestu Tozaisen", "Sapporosiei chikatestu Tozaisen", and "Metoro Tozaisen". The vocabulary "Tozaisen(3)" is linked to the vocabulary "Tokyo MetoroTozaisen", the vocabulary "Tokyo MetoroTozaisen" is linked to the vocabulary "Sobusen", "Waseda", "Chibaken", and "Takadanobana". Similarly, the vocabulary "Tozaisen(7)" is linked to the vocabulary [Tetsudou] and [Tozaisen].

<Inputted Text Data>

FIG. 56 shows an exemplary input word collection obtained by using a specific example of the knowledge network shown in FIG. 58 to extract a word collection from the exemplary inputted text data of the input/output apparatus 115.

Sentences subjected to the extraction describes an earthquake in the Kanto region on July 23. These sentences are composed of the following sentences:

Information obtained in Waseda Station at about 17:30 includes sentences of "Recovery of Tozaisen is not yet announced. JR is also not available. Seibusen is available." The person moved on foot with a friend to Takadanobana and obtained, at a police box, information composed of "It seems like that the first earthquake in the northwest region of Chiba prefecture was followed by the second earthquake of a seismic intensity of 5 in the Adachi-key." However, whether the information is correct or not is unclear.

Based on the above sentences, an input word collection of "Waseda, Tozaisen, Seibusen, Takadanobana, and Chibaken" can be obtained.

(Method for Determining the Meaning of a Homonym and a Homograph and the Determination Result)

(a) First, Step 1 determines whether each word is a homonym or a homograph or not. The result is that "Tozaisen" is determined as a homonym and a homograph.

(b) Step 2 investigates whether a pair of the word as a homonym and a homograph and a word other than this word exist within 2hop or not.

(c) Step 3 selects an ID of the homonym and the homograph having the maximum total number.

FIG. 57 shows the result of using the keyword extraction server 107 according to the modification of the first example to use a specific example of the knowledge network shown in FIG. 58 to use the exemplary input word collection shown in FIG. 56 obtained by extracting a word collection from the exemplary inputted text data to determine a homonym and a homograph.

In FIG. 57, those words within 2hop are given with a flag [1] and those words not within 2hop are given with a flag [2]. The total number found within 2hop in the rightmost column of FIG. 57 shows how many words exit in 2hop. An ID of the words having the maximum total number found within 2hop is selected as a meaning of a homonym and a homograph in the input word collection.

As a result, an ID3 meaning "Tokyo MetoroTozaisen" is selected. The context of the conversation also describe a subway line "Tozaisen" in Tokyo and thus the determination result is correct.

Thus, the keyword extraction server 107 according to the modification of the first example (an apparatus for determining the meaning of a homonym and a homograph) can determine, based on speech information and character information, a homonym or a homograph to correctly recognize the meaning of a homonym or a homograph.

Second Example

<The Entire Structure of Keyword Extraction Server>

Figure 59:
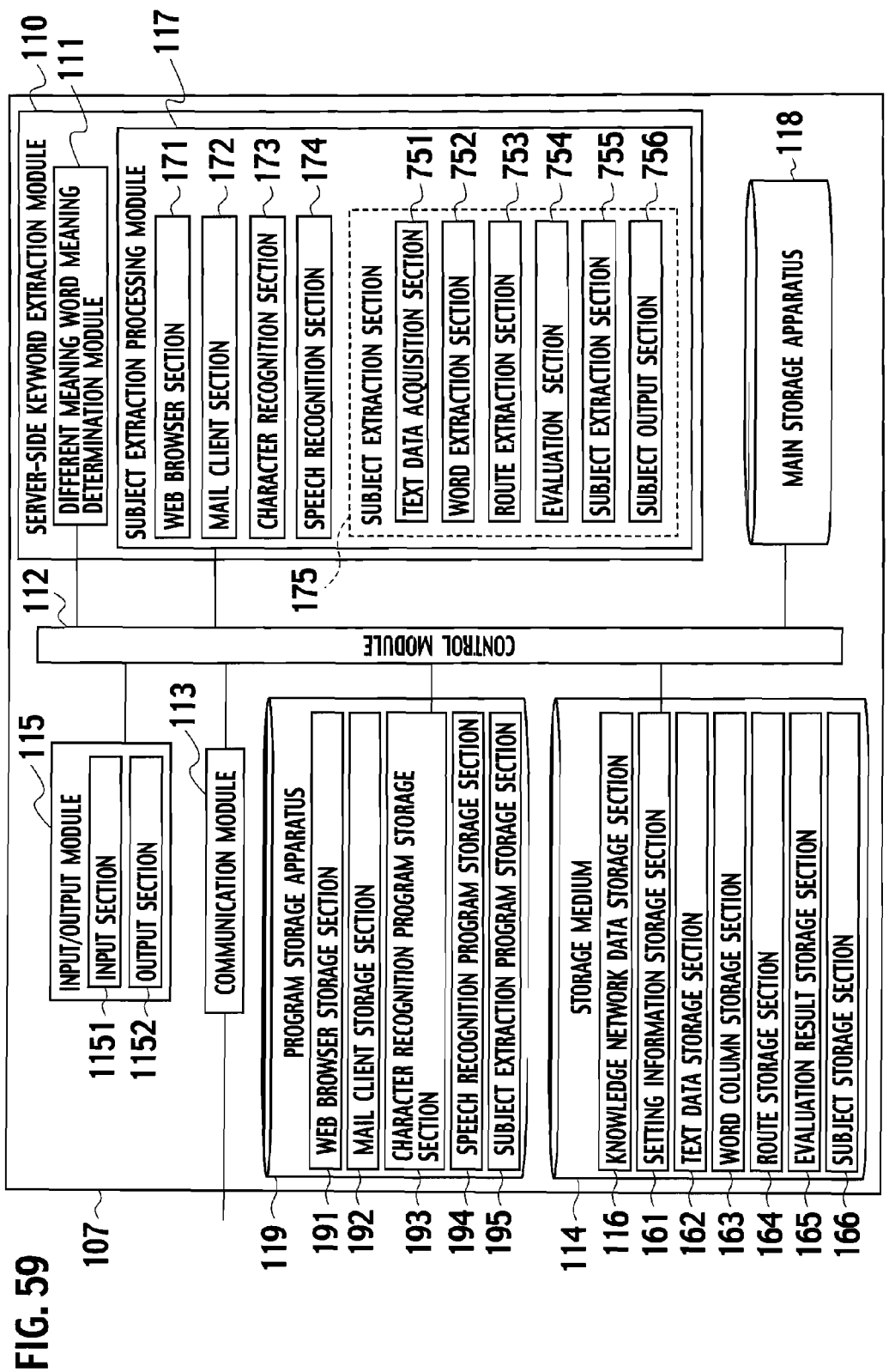
FIG. 59 is a structure diagram illustrating the entire structure explaining the entire structure of a keyword extraction server according to a second example of the fifth embodiment of the present invention.

The keyword extraction server 107 according to the second example of the fifth embodiment includes, as shown in FIG. 59; a text data acquisition section 751 for acquiring text data; a word extraction section 752 for reading a dictionary describing a plurality of words and a rout among the plurality of words by a network to extract, from the text data 52, a plurality of words described in the dictionary; an evaluator 754 for using, based on the extracted word, the dictionary to evaluate the plurality of words described in the dictionary; and a subject extraction section 755 for extracting, from among the plurality of words described in the dictionary, a word having a relatively high evaluation. The text data acquisition section 751, the word extraction section 752, the evaluator 754, and the subject extraction section 755 are included in the subject extraction processing module 117.

The keyword extraction server 107 is connected, via the control module 112, with the input/output module 115, a main storage apparatus 118, and the program storage apparatus 119 for example. The knowledge network data storage section 116 is included in the storage medium 114.

First, "dictionary" for storing the knowledge network data storage section 116 of the storage medium 114 will be described. The term "dictionary" includes a word relevance dictionary that defines and describes word dictionaries (nodes) describing a plurality of words and a route among a plurality of words of the word dictionaries. In the word dictionary, as shown in FIG. 60, "word A, "word B, "word C, and "word D are represented by uniquely-identifiable IDs of 1, 2, 3, 4, and 5, respectively. In the word relevance dictionary, as shown in FIG. 61, (1, 3) shows the existence of a relation (semantic relation) between "word A" and "word C" and (2, 5) shows the existence of a relation (semantic relation) between "word B" and "word E".

The word dictionary and the word relevance dictionary can be generally prepared by using a great number of documents composed of word definitions and the description thereof (e.g., language dictionary). For example, an index word "A" and an index word "B" appearing in the description of the index word "A" in the dictionary may be considered as nodes of the word dictionary to assume that "A" and "B" have a relation (semantic relation) to prepare a route (link). The word dictionary and the word relevance dictionary thus prepared can be considered as defining a co-occurrence relation of a certain word and another word in which these words are used simultaneously.

Figure 62:
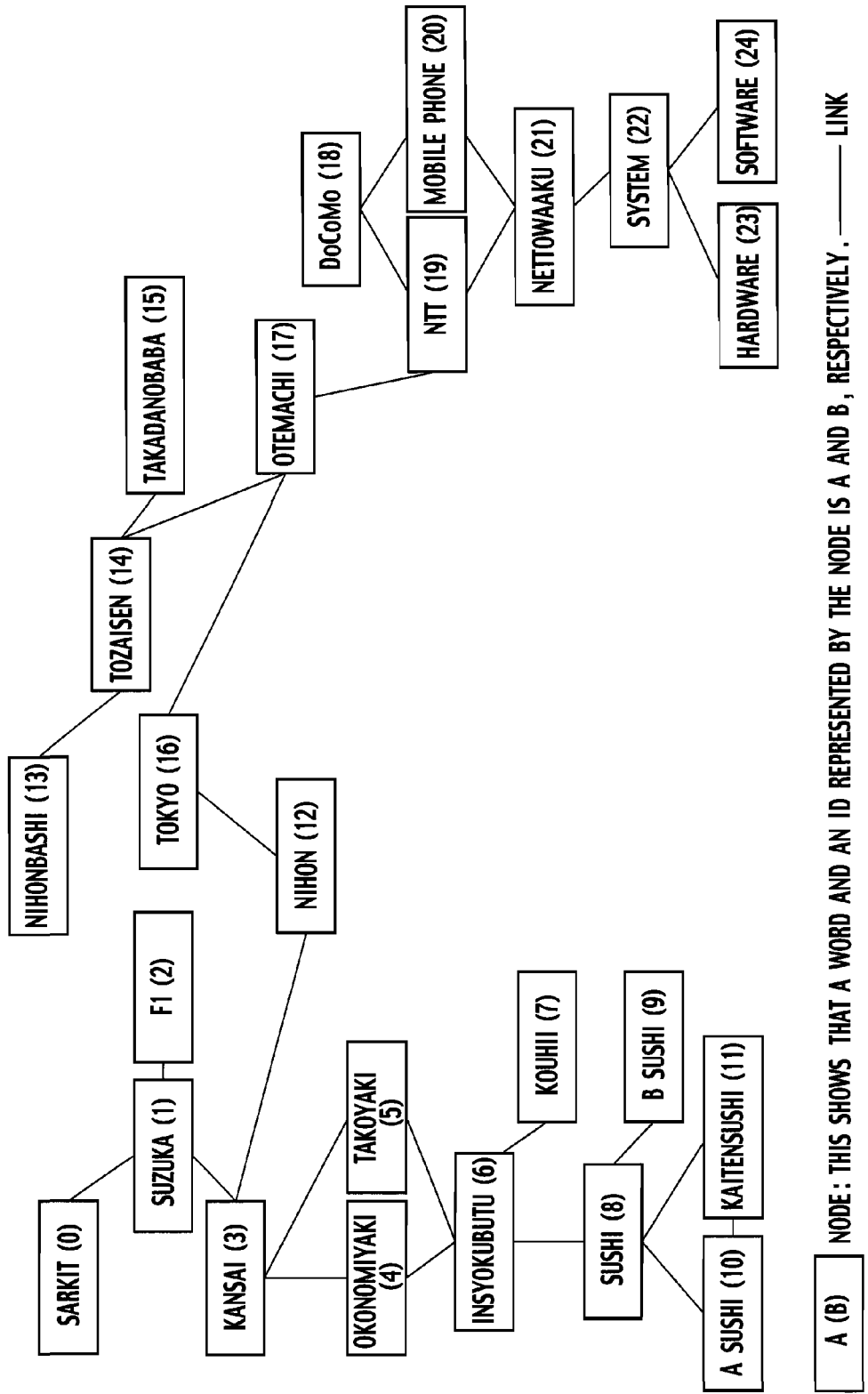
FIG. 62 illustrates an example of a table of word relevance dictionary representing a knowledge network shown in FIG. 63.

In the second example, a word network structure represented by connecting a plurality of words described in the word dictionary as shown in FIG. 60 by the route as shown in FIG. 61 described in the word relevance dictionary is called as "knowledge network". FIG. 62 shows an example of the knowledge network in the example. In the knowledge network, words are represented as nodes and a relation (semantic relation) among words is represented as a link. In FIG. 62, the rectangular shapes represent nodes and lines represent links. The respective nodes are given with uniquely identifiable IDs. The link is represented as a non-directed graph.

It is noted that, although a knowledge network composed of a small number of nodes and links is used for convenience of description, the number of words (the number of nodes) in an actual case is about hundreds of thousands to millions and the number of links is about millions to tens of millions. The word dictionary and the word relevance dictionary are read when the subject extraction program is activated.

FIG. 63 shows an example of a representation of the knowledge network shown in FIG. 62 stored in a file format and shows an example of word group (nodes) of the knowledge network. The word dictionary has IDs and a column of keywords. FIG. 64 shows an example of the word relevance dictionary shown in FIG. 62 describing a link of the knowledge network. The word relevance dictionary shows a relation among IDs of words constituting the link. The (origin, end point)=(1, 2) represents a link between words (Suzuka and F1).

The word dictionary and the word relevance dictionary respectively shown in FIG. 63 and FIG. 64 are prepared, for example, by analyzing a sentence of "A SUSHI": A representative revolving sushi bar chain that sells "fresh tuna" as a featured product and whose headquarter is located in . . . " To assume that "A SUSHI" has a relation (semantic relation) with "Kaitenzushi" and "Sushi", respectively to provide a link from "A SUSHI" to "Kaitenzushi" and "Sushi", respectively. Here, the link is represented as a non-directed graph without considering the definition and reference relation.

The input section 1151 shown in FIG. 59 includes, for example, a keyboard as well as an image input section and an audio input section as required. The keyboard is used to input text data to the text data acquisition section 751. The keyboard also can be used to perform an input for an operation of the keyword extraction server 107, an input to a web page, and an input for preparation of an e-mail.

The image input section is an apparatus to use the keyword extraction server 107 to convert an image printed on a paper to a static image or an apparatus to use the keyword extraction server 107 to convert video to a moving image. The image input section may be a scanner, a camera, or a camcorder. An output of the image input section is an input of the character recognition section 173.

The audio input section may be an audio input (e.g., microphone, remote PC). An output of the audio input section is an input of the speech recognition section 174. For example, audio of the conversation as shown in FIG. 7 is inputted to the audio input section.

The keyword extraction server 107 shown in FIG. 59 includes: a web browser section 171, a mail client section 172, a character recognition section 173, a speech recognition section 174, and a subject extraction module 175.

The web browser section 171 provides a user interface to various protocols on the Internet (e.g., HTTP, FTP, Gopher). The web browser section 171 also provides a function to interpret HTML as a processing result of a web server to render a screen. Display information of HTML displayed on the browser by the rendering result is inputted to the text data acquisition section 751 by an explicit operation by a user (e.g., copy and paste). The web browser section 171 also may directly input the text data displayed on the browser to the text data acquisition section 751 without using the explicit operation by the user.

The mail client section 172 is a mail sending/receiving apparatus that supports a mail protocol (e.g., POP3 and APOP). The mail client section 172 acquires text data included in a mail sent and received to a general mail client to send the text data to the text data acquisition section 751.

The character recognition section 173 is an apparatus that recognizes a character inputted from the image input section (e.g., OCR). The character recognition section 173 acquires text data from an image taken by a scanner and acquires text data from a caption and a ticker for example of television video for example to send the data to the text data acquisition section 751.

The speech recognition section 174 recognizes an audio (call) inputted from the audio input section to identify text data included in the audio. For example, the speech recognition section 174 recognizes audio inputted to the audio input section to identify text data as shown in FIG. 66. The text data recognized by the speech recognition section 174 shown in FIG. 66 includes a false recognition to an actual call shown in FIG. 65. Generally, it is assumed that the use of a current speech recognition program may cause many false recognitions due to an acoustic environment or shortage of language models to the conversation. The speech recognition section 174 sends the word information (word, word class) as a speech recognition result to the text data acquisition section 751.

It is noted that all functions of the speech recognition section 174 are not always stored in an audio video communication terminal and a part of the functions also may be stored in another terminal having a higher calculation capability.

The subject extraction module 175 shown in FIG. 59 includes the text data acquisition section 751, the word extraction section 752, the route extraction module 153, the evaluator 754, and the subject extraction section 755. The text data acquisition section 751 may have configurations such as a server form for waiting for text data via a specific port; a form for waiting for text data via a clip board; a status for waiting for text data by calling an application program interface (API), and a status for accepting text data via a file.

The text data acquisition section 751 acquires text data from the web browser section 171, the mail client section 172, the character recognition section 173, and the speech recognition section 174 for example. The text data acquisition section 751 sends the acquired text data to the word extraction section 752.

The word extraction section 752 shown in FIG. 59 accepts the text data from the text data acquisition section 751. The word extraction section 752 reads the word dictionary from the knowledge network data storage section 116 to develop the word dictionary in the main storage apparatus 118. The word extraction section 752 uses the word dictionary to use a method (e.g., morphologic analysis) to analyze the text data to extract, from the text data, words included in the word dictionary. The "morphologic analysis" is a processing to search the text data in the word dictionary to acquire information (e.g., word class information (word class), beginning of sentence information (beginning of sentence), anterior connection information (anterior connection), posterior connection information (posterior connection)). FIG. 67 shows a plurality of words (word column) extracted from text data shown in FIG. 66. The word extraction section 752 sends the extracted word column to the word column storage section 163 of the storage medium 114.

The word column storage section 163 accumulates therein word columns outputted from the word extraction section 752 by a First-In-First-Out (FIFO) type list of a fixed number. For example, the word column shown in FIG. 67 is directly retained as a list (window). In addition to FIFO, words also may be retained for a fixed period of time after the input regardless of the number of words. The size of the list (hereinafter referred to as "window size") can be changed by a set value for example.

If the size of the window stored in the word column storage section 163 is increased, a longer sentence (text data) will be evaluated. If the size of the window is reduced, a recently inputted word column within a fixed range will be evaluated and the evaluation based on the subject will be performed. For example, a window size sufficiently large for the number of inputted word columns=9 is a window size=30 (which means that window size=■). In an actual case, an appropriate window size can be set depending on the length of evaluated text data to narrow down word columns to be evaluated.

The route extraction section 753 shown in FIG. 59 selects, from a plurality of words in the window stored in the word column storage section 163, two words in an arbitrary order (e.g., the ascending order or the descending order of window) (jth word in the window j(=positive integer) and kth word in the window k(=positive integer)). However, a combination of identical words is not selected and once-evaluated combination is also not selected. For example, combinations of arbitrary order (1th to 9th) words and kth(k=1 to 9) words in the word column in the window shown in FIG. 67 include: "Otemachi"-"Otemachi", "Otemachi"-"Suzuka", "Otemachi"-"Tozaisen", "Otemachi"-"Okonomiyaki", "Suzuka"-"Otemachi", ..., "B Sushi"-"B Sushi". Among them, combinations of identical words of "Otemachi" "Otemachi", "Suzuka"-Suzuka", ..., "B Sushi"-"B Sushi" are not evaluated. Once a combination "Otemachi"-"Suzuka" is selected, the combination "Suzuka"-"Otemachi" in the homeward route is not evaluated. When this is represented by a function, only the following function (f1) is subjected to calculation.

$$j!=k \&\& j>k \quad (f1)$$

Even the calculation of identical words or the homeward route does not have a basic influence on the subject extraction method of the embodiment of the present invention. By omitting the calculation of identical words and the homeward route, the calculation amount can be reduced.

Furthermore, the route extraction section 753 reads the word dictionary and the word relevance dictionary from the knowledge network data storage section 116 to develop the word dictionary and the word relevance dictionary in the main storage apparatus 118. The route extraction section 753 assumes one of the selected two words as an origin node and the other as an end point node to calculate a distance of a route (route length) connecting the origin node and the end point node on the knowledge network to extract the shortest route based on the route length. Although the calculation of the route length may consider the weight of the link, this case simply assumes the link weight as 1 (one). Specifically, the shortest route length=the number of hops. The shortest route may be extracted by a full search from the origin node, the Dijkstra method, and Warshall-Floyd method for example.

When the route search result finds a plurality of shortest routes between one origin node and one end point node, all of the shortest routes are returned. Specifically, the function (f2) as shown below is assumed.

$$\text{List<int[ ]>getALLShortestPath(Network network, int } f, \text{int } t) \quad (f2)$$

Here, "f" represents an origin node ID, "t" represents an end point node ID, "int [ ]" represents a sequence retaining an ID of a node showing the shortest route, and "List<int[ ]>" represents the sequence of the shortest route considering a case where a plurality of the shortest routes exist between an origin node and an end point node, respectively.

For example, when an origin node ID of f=18 (Docomo) and an end point node ID of t=21(Network) are specified in the knowledge network shown in FIG. 63, ((18, 19, 21), (18, 20, 21)) is returned. This represents that "Docomo" and "Network" have therebetween the two shortest routes of a route 1=(Docomo, NTT, Network) and a route 2=(Docomo, mobile phone, Network). The shortest route length between "Docomo" and "Network" is 2. It is noted that the shortest route information between once-calculated origin node and end point node also can be cached to be reused for the next calculation so that calculation can be performed with a higher speed.

The evaluator 754 shown in FIG. 59 reads a threshold value (route determination threshold value) "A" defined by the setting information stored in the setting information storage section 161 to determine whether the shortest route length calculated by the route extraction section 753 is equal to or higher then the route determination threshold value) "A" or not. When the shortest route length is longer than the route determination threshold value) "A", the word is assumed as a non-relevant word and excluded from the subject calculation. Only when the shortest route length is equal to or lower than route determination threshold value A, the word is assumed as a relevant word and is covered by evaluation. The reason is that, when a distance between words is equal to or longer than a fixed distance on the knowledge network, these words are not relevant to each other word and thus a part including a higher number of subjects can be extracted.

Furthermore, by excluding the shortest route longer than the route determination threshold value "A from the calculation coverage, the calculation amount can be reduced. Furthermore, evaluator 754 also can use, instead of comparing the shortest route length with the route determination threshold value "A", an implementation in which search for a fixed route length or more is not performed.

Furthermore, the evaluator 754 calculates evaluation values of an origin node and an end point node positioned at ends of the shortest route. With regards to a method for distributing evaluation values depending on a distance, various methods may be considered. However, evaluation values also may be uniformly calculated without being provided with a particular weight for example. In this case, an evaluation value "fp" of an origin node and an evaluation value "tp" of an end point node are represented by the formula (1).

$$fp=tp=1 \quad (1)$$

Alternatively, evaluation values also may be calculated depending on the number of links of origin nodes and end point nodes. When assuming that the number of links of origin nodes is "lj" and the number of links of end point nodes is "lk", an origin node evaluation value "fp" and an end point node evaluation value "tp" are represented by the formula (2) and the formula (3), respectively.

$$fp=lj \quad (1)$$

$$tp=lk \quad (2)$$

Alternatively, an evaluation value depending on the shortest route length between an origin node and an end point node also may be calculated. For example, the shorter the shortest route length between an origin node and an end point node is, a higher evaluation value is calculated. When the shortest route lengths between an origin node and an end point node are 1, 2, 3, and 4, respectively, and when the shortest route length between an origin node and an end point node is larger than 4, an origin node evaluation value "fp" and an end point node evaluation value "tp" are represented by the formulae (4) to (8), respectively.

$$fp=tp=1 \quad (4)$$

$$fp=tp=0.5 \quad (5)$$

$$fp=tp=0.25 \quad (6)$$

$$fp=tp=0.125 \quad (7)$$

$$fp=tp=0 \quad (8)$$

Alternatively, an evaluation value also may be exponentially calculated depending on the shortest route length between an origin node and an end point node. In this case, the distance between an origin node and an end point node is represented as "D" and a weighting parameter is represented as "P", and the origin node evaluation value "fp" and the end point node evaluation value "tp" are represented by the formula (9).

$$fp=tp=1/D^P \quad (9)$$

Furthermore, the evaluator 754 optionally uses the origin node evaluation value "fp" and the end point node evaluation value "tp" to provide all words (nodes) existing on the shortest route with points, respectively. For example, nodes existing on the shortest route between "Docomo" and "Network"

are, in the case of the route 1, "Docomo", "NTT", and "Network" and are, in the case of the route 2, "Docomo", "mobile phone", and "Network". Points can be calculated by, for example, uniformly providing points to all words (nodes) existing on the shortest route. In this case, points given to all words (nodes) are represented by the formula (10).

$$\text{Point}=1 \tag{10}$$

Alternatively, points also may be given depending on a distance from an origin node and an end point node a node to be evaluated. Points given to a word (node) are represented by the following formula (11) by assuming the shortest route length between an origin node and an end point node (the shortest the number of hops) as hops and a distance from the origin node to the word (node) to be evaluated as "L and by using the evaluation value fp of the origin node and the evaluation value tp of the end point node.

$$\text{point}=(fp*(\text{hop}-L)/\text{hop}+tp*(L/\text{hop})) \tag{11}$$

It is noted that, although the formula (11) gives lower points to a word (node) having a loner distance from the origin node and the end point node, higher points also may be given to a word having a longer distance to the origin node and the end point node. In this case, higher points are given to a word (node) that is closer to the middle between the origin node and the end point node.

Furthermore, a plurality of the shortest routes exist between when origin node and the end point node, the number of the shortest routes also may be assumed as R so that points can be given in a divided manner depending on the number of the shortest routes as shown in the formula (12).

$$\text{point}=(fp*(\text{hop}-L)/\text{hop}+tp*(L/\text{hop}))/R \tag{12}$$

In the second example, the formula (12) is used to give points to the respective words (nodes) existing on the shortest route between an arbitrary origin node and an arbitrary end point node among word columns. Here, the origin node evaluation value fp and the end point node evaluation value tp are calculated by the formula (13) with the weighting parameter P=3.

$$fp=tp=1/D^3 \tag{13}$$

Furthermore, the evaluator 754 counts the points with regards to each word (node), given to the shortest route. FIG. 68 shows the evaluation result. In FIG. 68, the vertical axis (1) shows nodes existing on the shortest route while the horizontal axis shows origin nodes and end point nodes. In the horizontal axis, among an arbitrary combination of two words of "Otemachi"-"Otemachi", "Otemachi"-"Suzuka", "Otemachi"-"Tozaisen", "Otemachi"-"Okonomiyaki", . . . , "Suzuka"-"Otemachi", . . . "B Sushi"-"B Sushi", a combination of identical words, a combination of homeward routes among outward routes and homeward routes, and a combination having the shortest route length of 5 or more are removed, respectively.

In FIG. 68, the vertical axis (2) shows the shortest route between "Otemachi" and "Tozaisen". Since "Otemachi" and "Tozaisen" are adjacent to each other, "Otemachi" and "Tozaisen" are given with the point 1.00, respectively. Similarly, the vertical axis (3) in FIG. 68 shows the shortest route between "Otemachi" and "mobile phone". The shortest route length between "Otemachi" and "mobile phone" is 3 and "Otemachi", "NTT", "Network", and "mobile phone" existing on existing on the shortest route are given with the point 0.4.

As can be seen from FIG. 68, "Otemachi" and "Tozaisen" on the vertical axis (2) adjacent to each other on the knowledge network and thus are given with relatively high points. "Otemachi" and "mobile phone" on the vertical axis (3) have therebetween the shortest route length of 3 and thus are given with relatively low points. Specifically, words more close to each other (words having therebetween a shorter distance) are given with higher points to contribute to an operation for identifying a region on the knowledge network in which words are close to each other. The vertical axis (4) shows the total number of points given in the respective shortest routes of the respective nodes.

The subject extraction section 755 shown in FIG. 59 extracts, from among words described in the dictionary, a word that is important in the text data and that is highly evaluated (i.e., a word as a subject having a high relevance with the text data (hereinafter referred to as "subject word"). Although a subject word may be extracted by various methods, a quantity B defined by the setting information stored in the setting information storage section 161 is read for example to extract "B" words ("B" is a positive integer) may be extracted from the total points given to words (nodes).

FIG. 69 shows the result of extracting, based on the evaluation result shown in FIG. 68, top "B=5" words of the total points given to the words (nodes). In FIG. 69, the leftmost column shows words (after the input) newly inputted to the word column storage section 163 and the remaining columns show subject words extracted when the word is inputted. When the word "Network" is inputted for example, "Otemachi", "Network", "mobile phone", "Tozaisen", and "NTT" are extracted. It is noted that, a subject word given when a new word is inputted is shown, when pieces of text data are collectively evaluated, "Otemachi", "Network", "Kaitensushi", "Kaitensushi", "A SUSHI", and "mobile phone" are extracted when the words to "B Sushi" at the end are inputted.

Alternatively, the subject extraction section 755 also may read the threshold value (subject extraction threshold value) C defined by the setting information stored in the setting information storage section 161 to extract a word having the point equal to or higher than the subject extraction threshold value C.

FIG. 70 shows an example in which, based on the evaluation result shown in FIG. 68, a word having the total given points equal to or higher than the subject extraction threshold value C=1.00 is extracted. When the inputted word is in the "Network" row for example, "Otemachi", "Network", "mobile phone", and "Tozaisen" are extracted.

Figure 71:
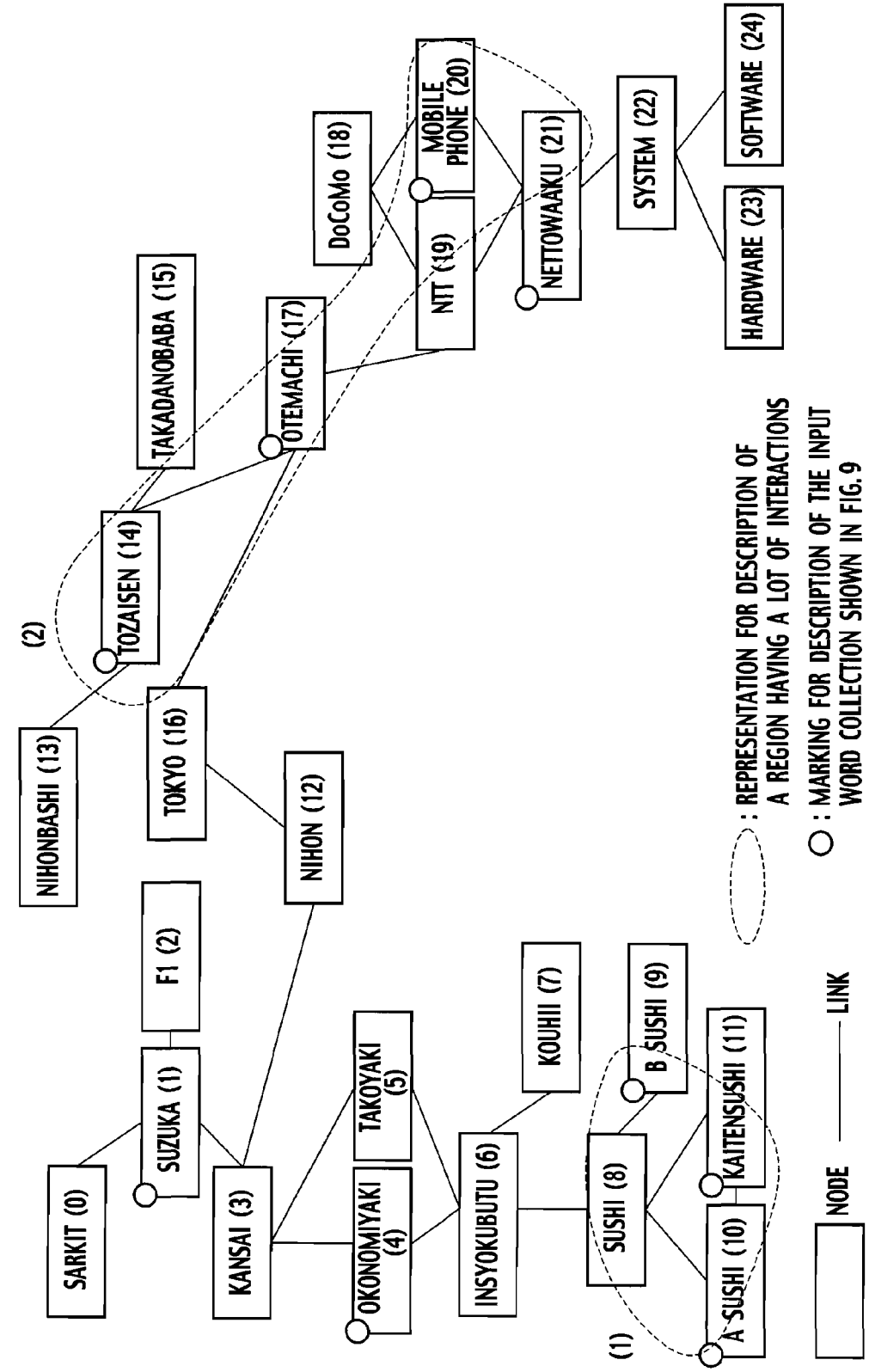
FIG. 71 is a schematic view explaining the extraction result of a subject word according to the second example of the fifth embodiment of the present invention.

FIG. 71 shows the outline of the concept of the calculation result shown in FIG. 69 and FIG. 70. In FIG. 71, parts shown by ▫ to nodes are parts showing the positions of the word columns shown in FIG. 67 on the knowledge network. Furthermore, a region surrounded by a dotted line is a region in which many words exist inputted from the word column storage section 163. It is analogized that, "Otemachi" and "Tozaisen" in the word column shown in FIG. 6 shows a subject regarding a place. The words "mobile phone", "Network", "Kaitensushi", and "A SUSHI" show a business plan being discussed. In the word column shown in FIG. 67, "Suzuka" and "Okonomiyaki" appear due to the false recognition by the audio input program and have no direct relation with the conversation.

A subject output section 756 shown in FIG. 59 causes the subject word extracted by the subject extraction section 755 to be displayed by the output section 1152 and to be outputted to a file stored in the subject storage section 166. The subject word also may be outputted to a file by a format such as Rich site summary (RSS).

The output section 1152 is an apparatus that functions as an output of the keyword extraction server 107 and that can display the subject word. The output section 1152 may be a display apparatus (e.g., CRT display, liquid crystal display).

The program storage apparatus 119 includes: a subject extraction program storage section 195 (file) for storing a subject extraction program, a web browser storage section 191 for storing a web browser, a mail client storage section 192 for storing a mail client, a character recognition program storage section 193 for storing a character recognition program, and a speech recognition program storage section 194 for storing a speech recognition program.

The subject extraction program is a program operating in the keyword extraction server 107 (e.g., personal computer (PC) work station (WS)). When the subject extraction program is executed as an independent process on a PC, a WS or an exclusive terminal for example, the program is activated by the activation of an icon on a graphical user interface (icon on GUI) or an input of a command from a command line. When the subject extraction program is implemented as a library as a part of another program, a library constituting the subject extraction program in the background of the activation of another program is initialized. Furthermore, the subject extraction program also may be a server called from a remote program by a remote procedure call (RPC) for example. The subject extraction program is used while being combined with a web browser, a mail client, a character recognition program, or a speech recognition program for example.

The subject extraction program causes the keyword extraction server 107 to execute: (a) an instruction for causing the text data acquisition section 751 to acquire text data; (b) an instruction for causing the word extraction section 752 to extract, from the text data, a plurality of words described in the dictionary describing a plurality of words and a relation among the plurality of words; (c) an instruction for causing the evaluator 754 to use, based on the extracted word, the dictionary to evaluate a plurality of words described in the dictionary; (d) an instruction for causing the subject extraction section 755 to extract, from among a plurality of words described in the dictionary, a highly-evaluated subject; and (e) an instruction for causing the subject output section 156 to output the extracted subject word to the output section 1152 for example or to store the extracted subject word in the subject storage section 166 of the storage medium 114.

A web browser is a client program that provides a user interface to various protocols on the Internet (e.g., HTTP protocol, FTP, Gopher). An instruction for sending text data displayed on a browser to the text data acquisition section 751 is executed by the web browser section 171.

A mail client is a client program for supporting a mail protocol (e.g., POP3, APOP). The main client acquires text data included in mails sent from and received by a general mail client and causes the mail client section 172 to execute an instruction for sending the text data to the text data acquisition section 751.

A character recognition program is a program for causing the character recognition section 173 to execute an instruction for recognizing text data from the image information inputted from the image input section to send the recognition result (text data) to the text data acquisition section 751.

A speech recognition program is a program for causing the speech recognition section 174 to execute an instruction for identifying, in the speech information acquired from the audio input section, a word included in the call to send the word information (word, word class) to the text data acquisition section 751. A speech recognition generally requires the speech recognition program to previously incorporate therein words to be recognized, grammar, and language models for example. Words stored in a word dictionary (which will be described later) should be incorporated in the speech recognition program so that these words can be subjected to speech recognition.

The storage medium 114 includes: the knowledge network data storage section 116 for storing the word dictionary and the word relevance dictionary; the setting information storage section 161 for storing various pieces of setting information required for subject extraction; the text data storage section 162 for appropriately storing text data as required from the web browser section 171, the mail client section 172, the character recognition section 173, and the speech recognition section 174; the word column storage section 163 for appropriately storing the word column as required extracted by the word extraction section 752; the route storage section 164 for appropriately storing the shortest route as required calculated by the route extraction section 753; the evaluation result storage section 165 for appropriately storing the result of the evaluation by the evaluator 754 and points given to the respective nodes as required; and the subject storage section 166 for appropriately storing the subject as required extracted by the subject extraction section 755.

The main storage apparatus 118 functions as a temporary data memory that temporarily stores data used when a program is executed by a calculator or that is used as a work area for example. The main storage apparatus 118 may be, for example, a semiconductor memory, a magnetic disk, an optical disk, a magneto optical disk, or a magnetic tape for example.

-Processing Flow-

Figure 72:
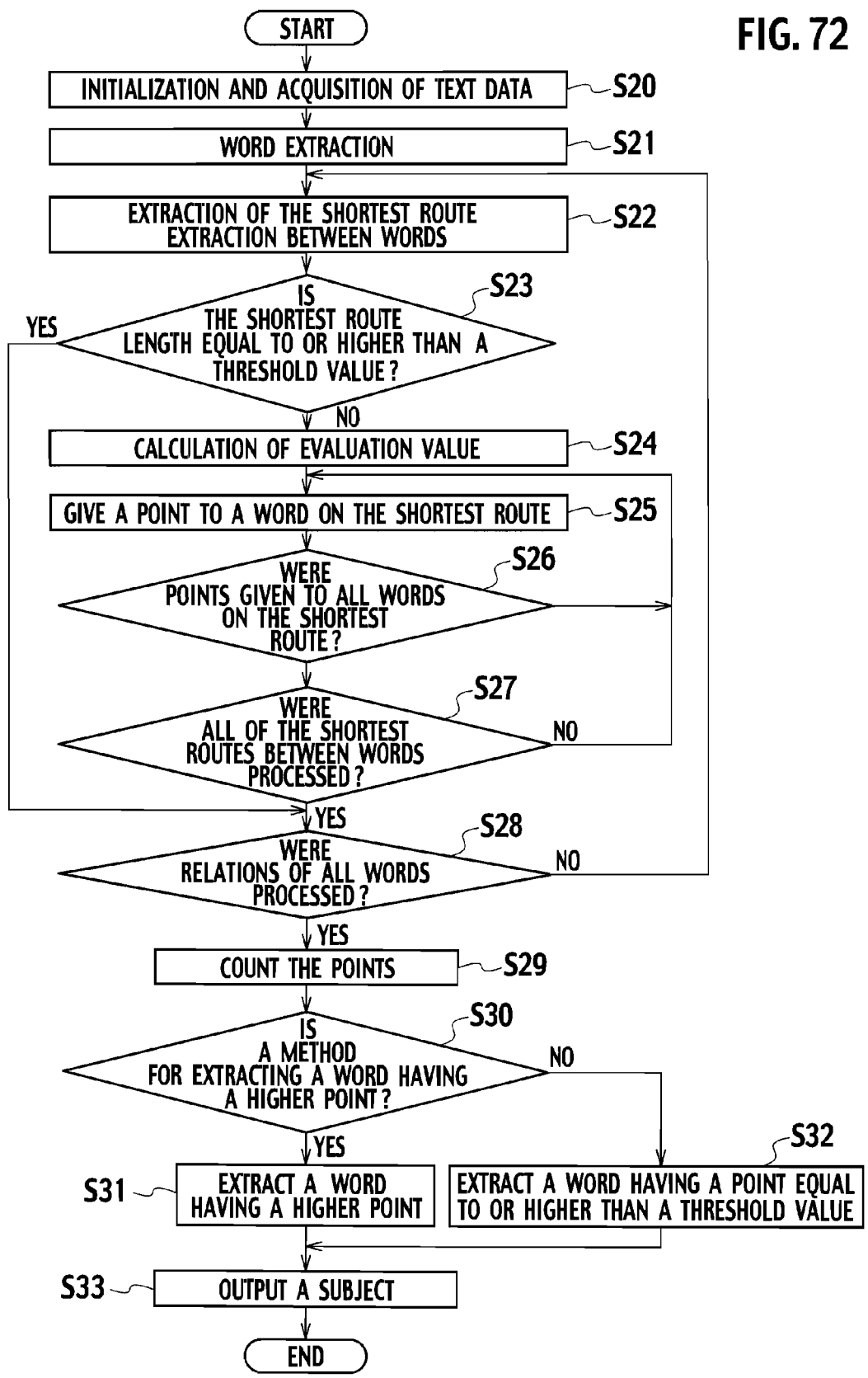
FIG. 72 is a flowchart explaining a subject extraction method according to the second example of the fifth embodiment of the present invention.

Next, the following section will describe a subject extraction method by the keyword extraction server 107 according to second example with reference to a flowchart of FIG. 72. It is noted that the subject extraction method described below is a mere example and various methods other than this method also may be used. For simplicity, the following section will describe a case where a subject extraction program as a library is included in a speech recognition program. It is noted that the embodiment of the present invention will describe a method for collectively evaluating pieces of text data.

(a) Step S20 inputs the audio as shown in FIG. 65 to the audio input section of the input section 1151. The speech recognition section 174 recognizes the audio inputted to the audio input section as shown in FIG. 66 to send the speech recognition result (text data) as a file to the text data acquisition section 751. The subject extraction program is activated by a command of the operating system (OS) while using the text data file as an argument. The initial processing is performed in the background of the activation of the subject extraction program. For example, as the initialization of the subsequent point calculation, points of each word (node) stored in the evaluation result storage section 165 are cleared. The text data acquisition section 751 sends the text data sent from the speech recognition section 174 to the word extraction section 752.

(b) Step S21 allows the word extraction section 752 reads the word dictionary stored in the knowledge network data storage section 116 to use the word dictionary to analyze the text data received from the text data acquisition section 751 to extract, as shown in FIG. 67, a word described in the word dictionary from the text data. The extracted is retained in the window of the word column storage section 163.

(c) Step 22 allows the route extraction section 753 to select, from among the words retained in the window of the word column storage section 163, two words in an arbitrary order. However, a double processing is not performed and thus identical words are not selected and a relation between once evaluated words is not evaluated. Among the selected two words, one word is assumed as an origin point node and the other word is assumed as an end point node. The route extraction section 753 reads the word dictionary as shown in FIG. 64 stored in the knowledge network data storage section 116 and the word relevancy dictionary as shown in FIG. 62 to use the knowledge network as shown in FIG. 63 to search and extract the shortest route on the network structure.

(d) Step 23 allows the evaluator 754 to read the route determination threshold value A from the setting information storage section 161 to proceed to Step 28 when determining that the shortest route between an origin point node and an end point node calculated by the route extraction section 753 is longer than the route determination threshold value A. When the shortest route is equal to or lower than the route determination threshold value A, the process proceeds to Step 24.

(e) Step 24 allows the evaluator 754 to use the formulae (1) to (9) to calculate the respective evaluation values of the origin point node and the end point node positioned at ends of the shortest route. For example, as shown in the formulae (4) to (8), a higher evaluation value is calculated as the shortest route between the origin point node and the end point node is shorter.

(f) Step 25 allows the evaluator 754 to optionally use the respective evaluation values of the origin point node and the end point node to use the formulae (10) to (13) for example the give points to the respective words (nodes) existing on the shortest route as shown in FIG. 68. It is noted that, when Step 25 does not use the respective evaluation values of the origin point node and the end point node, the processing of Step 24 can be omitted to reduce the calculation time.

(g) Step 26 allows the evaluator 754 to determine whether points are given to all words (nodes) or not. When points are given to all words (nodes), the processing proceeds to Step S27. When points are not given to all words (nodes) on the other hand, the processing returns to the procedure of Step S25 to give points to words (nodes) not yet given with points. As a result, points are given to all words (nodes) existing on the shortest route.

(h) Step 27 allows the evaluator 754 to determine whether all of the shortest routes between the origin point node and the end point node are calculated or not. When determining that all of the shortest routes between the origin point node and the end point node are calculated, the processing proceeds to Step S28. When a plurality of shortest routes between the origin point node and the end point node are extracted and not all of the shortest routes are calculated, the procedure of Step S25 is returned to give points to nodes existing on the not-yet-calculated shortest route. As a result, words (nodes) existing on all of the shortest routes are processed.

(i) Step S28 allows the evaluator 754 to determine whether all combinations of words retained in the window of the word column storage section 163 are processed or not. However, a double processing is not performed and thus a combination of identical words or a combination of once evaluated words is not evaluated. When determining that all combinations are determined, the processing proceeds to Step S9. When not all of the combinations are calculated on the other hand, the processing returns to the procedure of Step S22 to process a combination of two not yet calculated words. As a result, all combinations of words are processed.

(j) Step S29 allows the evaluator 754 to count, as shown in the vertical axis (4) of FIG. 68, points given to the respective words (nodes).

(k) Step S30 allows the subject extraction section 755 to determine, depending on the set value defined by the setting information stored in the setting information storage section 161, whether to use a subject word extraction method for extracting top "B" words having points. When determining to use the method for extracting top "B" words, the processing proceeds to Step S31. Step S31 allows the subject extraction section 755 reads, from the setting information storage section 161, the quantity B defined by the setting information to extract, as shown in FIG. 69, top B(=5) words as subject words.

(l) When Step S30 determines that the method for extracting the top "B" words is not used on the other hand, the processing proceeds to Step S32. Step S32 allows the subject extraction threshold value C to be read from the setting information storage section 161 to extract, as shown in FIG. 70, a word for which the total points given to the word (node) is equal to or higher than the subject extraction threshold value C(=1.00) as a subject word.

(m) Step S33 allows the subject output section 156 to output the subject word extracted by the subject extraction section 755 to the output section 1152 or a file for example.

In order to assist the understanding of dialogue contents, the search of related information of dialogue contents, and the enrichment of dialogue contents, a subject extraction technique had been examined by which a speech recognition result of successively generated audio and a character string in a character recognition result for example from an image by an optical formula character reading apparatus (OCR) for example are interpreted to extract a subject word showing the contents thereof.

As the first subject extraction method, a method for using a specific subject transition word or subject transition rule to recognize the change in the subject has been known. This method previously stores words showing the transition of the subject (e.g., "to begin with", "first", "next") in the subject transition word dictionary to subsequently use the subject transition rule to grammatically interpret an inputted character string to extract a subject in the string.

As the second subject extraction method, a method for using an appearance frequency or an appearance interval of a word has been known. This method uses the appearance frequency or the appearance interval of word to extract an important word in an input document.

As the third subject extraction method, a method for using a technical term dictionary for each specialized field. This method selects a field and keywords highly depending on the field to determine, as a subject, a field on which a keyword detected in an evaluation zone depends most.

However, the first method using a subject transition word for example requires an input of a word that triggers the subject transition and general conversations for example not always include the word. Furthermore, the use of grammatical rules for extracting a subject word cannot always have a conversation as expected by the grammatical rules. Furthermore, conversation not obeying the previously prepared grammatical rules are ignored and thus the method still operates even when a character string including a false recognition for example is inputted. However, this method does not assume to handle a false recognition. Thus, this method cannot appropriately handle a case where a word showing a subject transition is falsely recognized or a case where recognition is skipped. Furthermore, this method previously requires the subject transition dictionary showing words triggering subject transition and also requires the definition of grammars for extracting a subject.

In the case of the second subject extraction method (i.e., a method for using an appearance frequency of a word for example), the appearance frequency or the appearance interval or a word is used based on the assumption that a repeatedly appearing word is an important word. However, this method does not evaluate the relation between words and thus cannot extract an important word so long as an identical word is communicated a plurality of times.

Furthermore, the third subject extraction method (i.e., a method for using the technical term dictionary) is a method for evaluating how many times a word relating to a previously determined subject is inputted and does not particularly consider a false recognition.

On the other hand, the keyword extraction server 107 according to the second example uses the knowledge network to give points depending on a distance between words to an inputted word column. Thus, a part having a higher number of inputted word columns (=when this is intuitively explained, the gravity center of the word group) can be extracted.

Furthermore, the knowledge network is not based on heuristic knowledge and can be generated by the analysis of a language dictionary or a web document for example. An inputted word column is evaluated only by the knowledge network and thus a need for previously determining extraction rules (e.g., grammar) is eliminated.

Furthermore, a long pair is not extracted from a part having a higher number of inputted word columns. Thus, even when text data includes a false recognition (e.g., image recognition result, speech recognition result), the false recognition can be removed.

Modification of the Second Example

Although the above-described second example has described the method for outputting an output of a speech recognition program to a file to subsequently collectively evaluate the output, a modification of the second example will describe a method for sequentially evaluating an output of the speech recognition program to display the current subject on a realtime basis.

In the above-described second example, all outputs from the speech recognition section 174 are all recognized and are then stored in a file. However, this modification example sends recognized text data to the text data acquisition section 751 whenever text data is sequentially recognized. Then, the text data acquisition section 751 sequentially sends the accepted text data to the word extraction section 752. The word extraction section 752 analyzes the accepted text data by a morphologic analysis for example to sequentially extract, from the text data, a word included in the word dictionary. The word is sequentially sent to the word column storage section 163.

Figure 73:
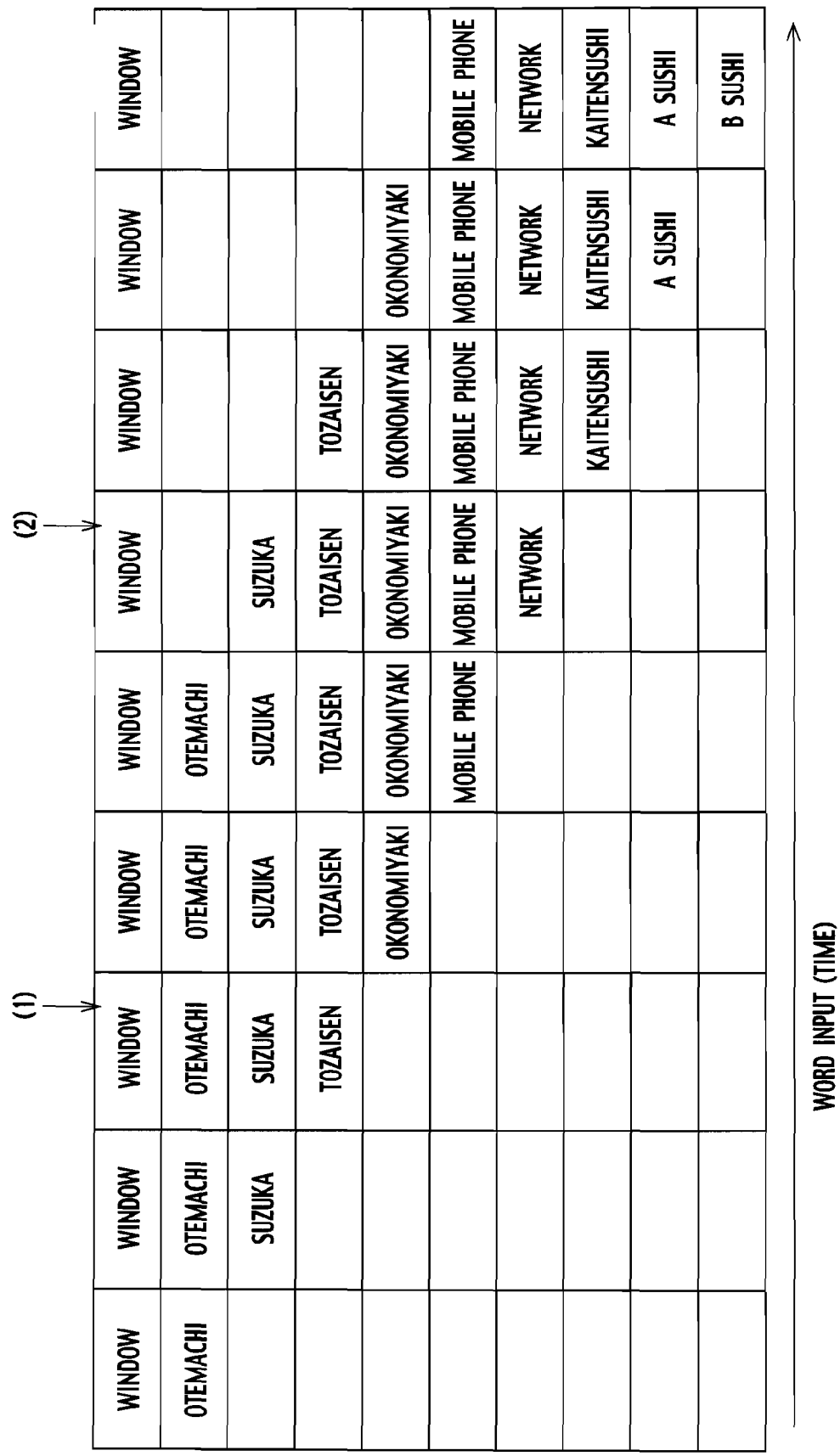
FIG. 73 shows a graph explaining the change of a window having a window size=5 to time according to a modification of the second example of the fifth embodiment of the present invention.

FIG. 73 shows the window in the word column storage section 163 whenever a new word is inputted to the word column storage section 163. In FIG. 73, the vertical axis shows a word column stored in the word column storage section 163 at a certain moment. The horizontal axis shows a change in time whenever a new word is inputted. For example, FIG. 73 shows that the word column storage section 163 includes "Otemachi", "Suzuka", and "Tozaisen" at this moment. Since the FIFO is used and the window size is 5, the oldest "Otemachi" is removed from the window and a new word "Network" is inputted, as can be seen from FIG. 73. The route extraction section 753 extracts the shortest route between the two words retained in the window shown in FIG. 73 as needed. The evaluator 754 calculates points of the words on the shortest route. The subject extraction section 755 extracts a subject word.

FIG. 74 shows a result of extracting the top B=2 subject words of the total points whenever an input word is inputted. In FIG. 74, the leftmost column shows words (after input) newly inputted to the word column storage section 163 and the other columns show subject words extracted when the words are inputted. As can be seen from FIG. 74, when a word "Suzuka" is inputted, "Suzuka" and "Otemachi" are extracted. When "Tozaisen", "Okonomiyaki", and "mobile phone" are inputted, "Otemachi" and "Tozaisen" are extracted. When "Network" and "Kaitenzushi" are inputted, "Network" and "mobile phone" are extracted. When "A SUSHI" and "B Sushi" are inputted, "A SUSHI" and "Kaitenzushi" are extracted. Specifically, it is understood that every input of a word causes a subject word to change to follow the inputted text data.

Similarly, FIG. 75 shows an example of a display of words subjected to the same calculation that have points of the subject extraction threshold value C=1.00 or more. FIG. 75 also shows that every input of a word causes a subject word to change to follow the inputted text data.

Furthermore, FIG. 74 and FIG. 75 show that, among inputted word column, a word in a region in the knowledge network shown in FIG. 63 having a higher number of words is extracted and a word having a long distance to other inputted words (e.g., "Suzuka", "Okonomiyaki") is suppressed from being extracted as a subject (such a word is not extracted when being evaluated by a threshold value).

According to the modification of the second example, inputted text data can be sequentially analyzed to extract a word as a subject, thus providing the extraction of a word as a realtime subject Although described later, the subject extraction program according to the second example also may be incorporated in the Internet protocol (IP) telephone terminal. In this case, a substantial subject calculation processing is the same. However, speech information generated in the IP telephone terminal is subjected to speech recognition to evaluate a word column in the speech recognition result to display, when the conversation is completed, "today's subject". A conversation start processing performed in the IP telephone triggers the transmission of the speech recognition result to the text data acquisition section 751 and the evaluation I triggered by the completion of the conversation. During a time from the start of the conversation to the completion of the conversation, text data of the speech recognition result is accumulated in the word column storage section 163 and the activation of the subject extraction section 755 is triggered by the completion of the conversation.

Alternatively, the subject extraction section 755 also may be sequentially activated during the conversation to display the subject information on the display of the IP telephone terminal as needed.

Third Example

-Entire Structure of Keyword Extraction Server-

Figure 76:
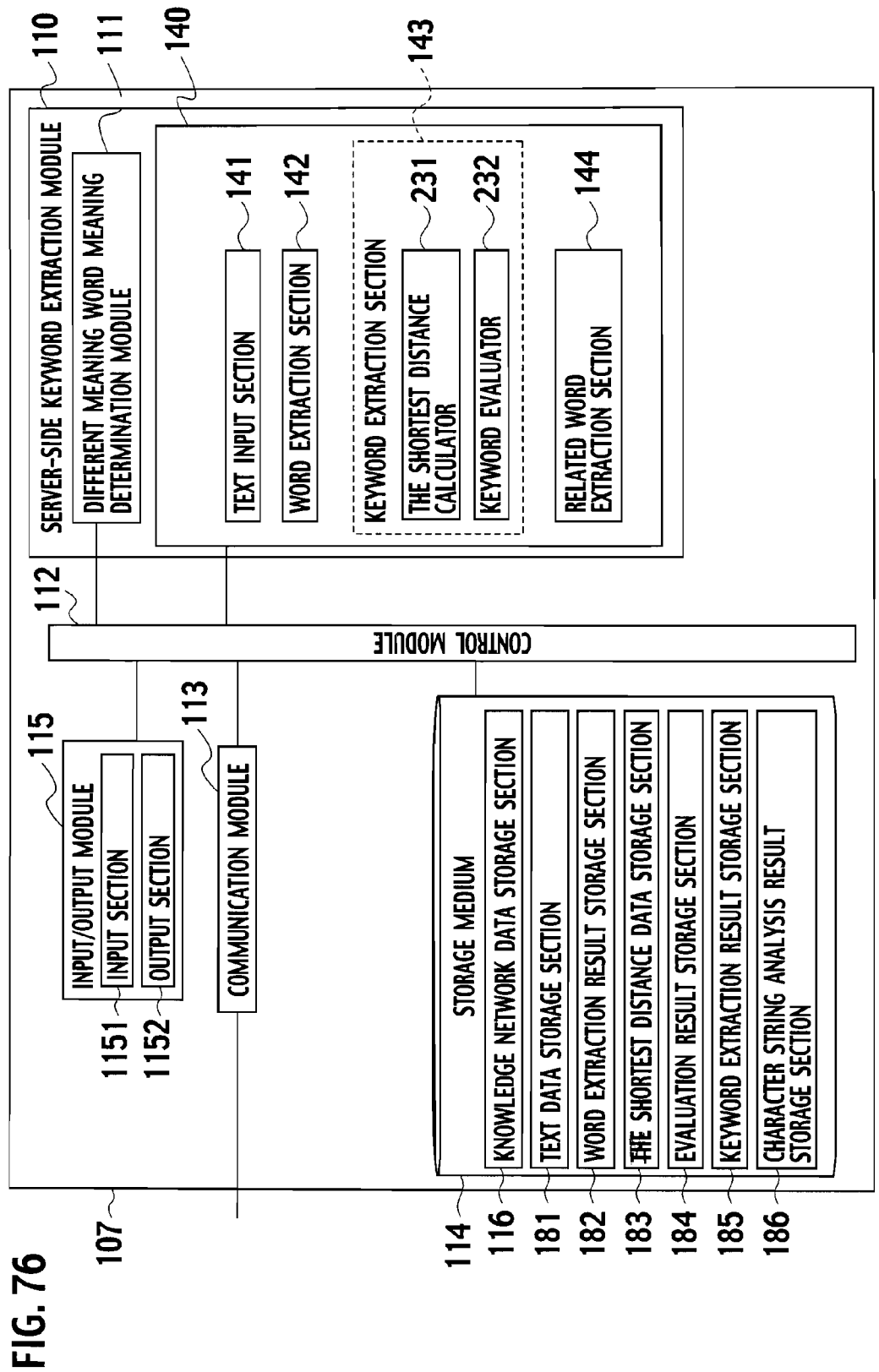
FIG. 76 is a structure diagram explaining the entire structure of a keyword extraction server according to a third example of the fifth embodiment of the present invention.

The keyword extraction server 107 according to a third example includes, as shown in FIG. 76, the knowledge network data storage section 116 for storing the knowledge network data, the word extraction section 142 for extracting, from the text data, a word included in the knowledge network data, and the keyword extraction section 143 for using the knowledge network data to calculate the shortest distance data between the extracted words to exclude the shortest distance data showing a distance equal to or higher than a fixed distance from the evaluation candidates to evaluate the relation between the extracted words to extract a keyword from the evaluation result.

In the third example, "knowledge network data" is data for a plurality of words showing the semantic relation between two words by a distance. The knowledge network is given, for example, node attribute data illustrated in FIG. 77 and link attribute data illustrated in FIG. 78.

As shown in FIG. 77, the node attribute data includes a number (node number) for uniquely identifying a word (node), a name of a word (node name), and information regarding all node average distances used in a general network analysis. For example, a node name having a node number "1" corresponds to "Otemachi" and "Otemachi" has an all node average distance has a value of [3.478]. Node attribute data also may store therein, in addition to information for an all node average distance, the number of links, a distance centrality, a mediation centrality for example, or an index value showing the characteristic of the word in the network data so that extracted keywords or related words can be ordered more easily.

As shown in FIG. 78, the link attribute data includes data representing a connection relation between a word and a word (link) by specifying a node number starting the link and a node number ending the link. For example, when the node number starting the link is "1" and the node number ending the link is "16", this shows the existence of a link between "Otemachi (node number 1)" and "Tokyoeki (node number 16)" shown in FIG. 78.

Figure 79:
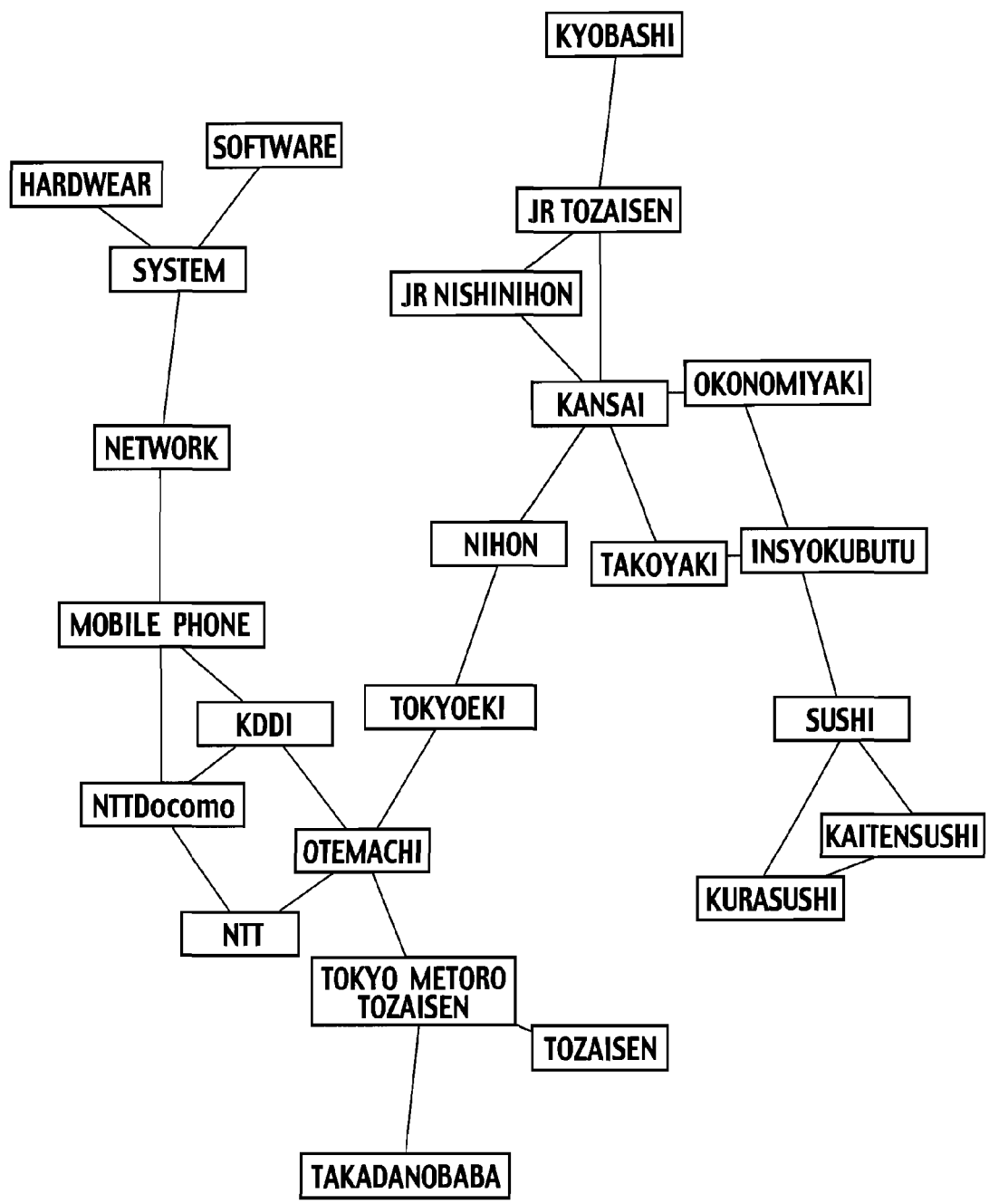
FIG. 79 is a schematic view explaining knowledge network data visually representing a relation between the node attribute data and the link attribute data shown in FIG. 77 and FIG. 78.

FIG. 79 shows visual representation of the node attribute data and the link attribute data illustrated in FIG. 77 and FIG. 78. The "semantic relation between words" represented by the knowledge network data includes a dictionary relation, a hierarchical relation in a concept, an identical meaning relation, and a synonymous relation for example. However, this embodiment does not limit the types of semantic relations. For example, in the knowledge network data of FIG. 79, "Otemachi" and "NTT" also may have therebetween "geographical relation" and "system" and "Hardware" also may have therebetween "comprehensive relation in the concept".

It is noted that "the shortest distance" between words in the third example represents the number of nodes bypassed from a node on the knowledge network to another node. The following section a case where the shortest distance including "0" node is "1" and the shortest distance including "1" is "2". However, unique values different for the respective nodes and links also may be retained in node attribute data or in link data so that the unique value is added when a specific node is bypassed.

Furthermore, although the third example will describe a case when the knowledge network data represents a non-directed graph, the knowledge network data also may represent a directed graph. In this case, the calculation of the shortest distance and the extraction of a related word are evaluated in accordance with the direction of a connection relation (link).

The word extraction section 142, the keyword extraction section 143, and the related word extraction section 144 can be constituted as a part of the server-side keyword extraction module 110 of the keyword extraction server 107 shown in FIG. 76. The server-side keyword extraction module 110 is connected, via the control module 112, the input section 1151, the input/output module 115 including the output section 1152, and the storage medium 114 for storing various programs and data for example required for the processing by the server-side keyword extraction module 110.

The storage medium 114 includes the knowledge network data storage section 116, a text data storage section 181, a word extraction result data storage section 182, a shortest distance data storage section 183, an evaluation result storage section 184, a keyword extraction result data storage section 185, and a text analysis result data storage section 186.

The server-side keyword extraction module 110 further includes a text input section 141 and a related word extraction section 144. The text input section 141 causes the inputted text data from the input section 1151 to be stored in the text data storage section 181. Text data may be provided in a file format or also may be stored in another storage apparatus of the keyword extraction server 107 of FIG. 76.

Contents of text data include, for example, character string information on a web page, character string information in a sent or received mail, sent or received information in an instant message, and text data obtained by converting audio data (e.g., contents of a speech recognition result of a telephone call). Furthermore, text data also may be information obtained by converting character string information or moving image information on an image acquired by an optimal character recognition function (OCR) to character string information. Text data may include notation including a grammatical error, a word including a typographical error, or a false recognition for example.

The word extraction section 142 extracts, from among the text data stored in the text data storage section 181, a word included in the knowledge network data illustrated in FIG. 77 to FIG. 79 to store the result as the word extraction result data in the word extraction result data storage section 182.

The keyword extraction section 143 includes the shortest distance calculator 231 and keyword evaluator 232. The shortest distance calculator 231 reads the word extraction result data extracted by the word extraction section 142 to calculate the shortest distance between the extracted words cause the calculation result as the shortest distance data to be stored in the shortest distance data storage section 183.

The keyword evaluator 232 uses the relation of the shortest distance data calculated by the shortest distance calculator 231 to calculate word evaluation data for evaluating the relation between the extracted words to cause the calculation result as the word evaluation data to be stored in the evaluation result storage section 184. The evaluation of the relation in this embodiment will be described in detail with regards to the first and second text analysis methods. However, the evaluation of the relation can be performed by any of:

(1) A method in which the shortest distance data calculated by the shortest distance calculator 231 is used to calculate "accumulation number of each shortest distance" showing the number of the appearance of the shortest distance between a word and another extracted word.

(2) A method for calculating "average distance and shortened distance" of the shortest distance data.

Furthermore, the keyword evaluator 232 uses the word evaluation data to extract a keyword based on the shortest distance data between extracted words to cause the keyword extraction result to be stored in the keyword extraction result data storage section 185.

The related word extraction section 144 reads the extracted keyword result data extracted by the keyword extraction section 143 to verify a relation between the data and knowledge network data to extract a related word having a relatively short distance to the extracted keyword to store the extracted keyword and the extracted related word as a text analysis result in the text analysis result data storage section 186. Other structures are substantially the same as those of the keyword extraction server 107 according to other embodiments and thus will not be described.

-First Text Analysis Method-

The first text analysis method according to the third example will be described with reference to the flowchart of FIG. 80.

<Text Data Input Processing S41>

Figures 80, 81:
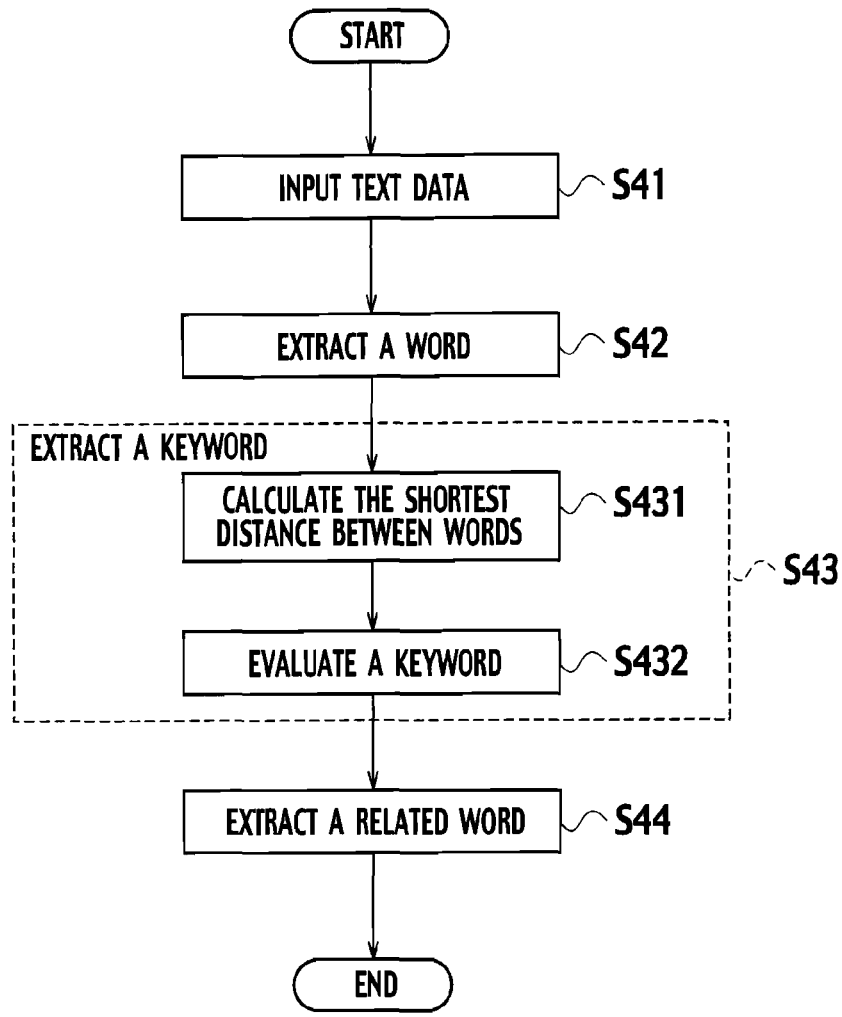
FIG. 80 is a flowchart showing a text analysis method according to the third example of the fifth embodiment of the present invention.
FIG. 81 illustrates an example of input text data according to the third example of the fifth embodiment of the present invention.

When the keyword extraction server 107 shown in FIG. 76 is activated, Step S41 of FIG. 80 allows the text input section 141 to store, in the text data storage section 181, to-be-extracted word information acquired via communication module 113 or text data as shown in FIG. 81 acquired via the input section 1151.

<Word Extraction Processing S42>

Step S42 of FIG. 80 allows the word extraction section 142 to read the text data illustrated in FIG. 81 stored in the text data storage section 181 to extract, from the text data, a word included in the node attribute data (see FIG. 77) of the knowledge network data storage section 116. Then, the extraction result is stored as word extraction result data in the word extraction result data storage section 182 of FIG. 76.

The output of the word extraction result data executed by the word extraction section 142 and the timing at which the keyword extraction section 143 is called (which will be described later) are performed based on set value and setting information of the processing execution unit (step) in the word extraction condition setting data illustrated in FIG. 82. For example, when text data includes 10 words and the processing execution unit (step) has a set value of 2, this means that the word extraction section 142 performs an output of the word extraction result data and the calling of the keyword extraction section 143 5 times for 2 words. The example of setting data of FIG. 82 describes a case where "1" is specified as a set value.

Based on the setting data of FIG. 82, words existing in the knowledge network data illustrated in FIG. 77 to FIG. 79 are extracted one by one by the word extraction section 142 from the text data of FIG. 81 of "A: Today, I will go to Otemachi for business. Since I have some spare time, I will go there by Tozaisen . . . ".

Specifically, the word extraction section 142 firstly extracts "Otemachi" from the text data of FIG. 81 to store, as shown in FIG. 83(a), the data as having the extracted word node number "1" in the word extraction result data storage section 182. Similarly, the word extraction section 142 in each step extracts, from the text data of FIG. 81, "Tozaisen", "Otemachi", "mobile phone", "system", "Sushi", "system", and "Kurasushi" one by one to output the word extraction result data as shown in FIG. 83(b) to FIG. 83(h).

It is noted that the word extraction by the word extraction section 142 also may be performed by a full text search processing of text data by a general hash search or by subjecting text data to a morphologic analysis to subject the result to a matching determination processing.

<Keyword Extraction Processing S43>

Whenever the word extraction result data shown in FIG. 83(a) to FIG. 83(h) is outputted, Step S43 of FIG. 80 allows the keyword extraction section 143 to call the shortest distance calculator 231 to calculate the shortest distance between the extracted words. Thereafter, the keyword extraction section 143 calls the keyword evaluator 232 to evaluate and extract keywords based on the relation of the shortest distance between the extracted words. Then, the keyword extraction result is stored as keyword extraction data in the keyword extraction result data storage section 185. The following section will describe an example of a specific processing.

(Processing S431 for Calculating the Shortest Distance Between Words)

Step S431 of FIG. 80 allows the shortest distance calculator 231 to read, from the storage medium 114, the setting data of the processing for calculating the shortest distance between words illustrated in FIG. 84. Then, the shortest distance calculator 231 calculates, for every processing execution unit (step), the shortest distance between a newly extracted word and an already extracted word to store the calculation result as the shortest distance data in the shortest distance data storage section 183.

The setting data illustrated in FIG. 84 includes the set value of the distance calculation window width and the related information thereof, the set value of the shortest distance to be calculated, and the related information thereof. The distance calculation window width shows the maximum number of words of the shortest distance data stored in the storage medium 114. For example, when the distance calculation window width has a set value of 5, the shortest distance data storage region is secured by the shortest distance calculator 231 at the first activation. An example of the shortest distance data storage region is shown in FIG. 85(a). The shortest distance data includes words (node names) for which the distance is calculated, node numbers, and the results of calculating the shortest distance among the respective 5 words.

It is noted that, in order to reduce the processing load of the calculation of the shortest distance, the set value of the shortest distance to be calculated shown in FIG. 84 is preferably set within a range having no influence on the processing by the keyword evaluator 232 (which will be described later). When the shortest distance specified by the shortest distance calculator 231 is equal to or longer than the set value of the shortest distance to be calculated, the shortest distance calculator 231 stops the calculation to output the calculation result of "N" N (not found). As a result, the shortest distance data for which the shortest distance between words is equal to or higher than a fixed value is excluded from the evaluation of the relation in Step S43 (which will be described later). Thus, even when text data includes an error of a word for example, the error word for example can be prevented from being extracted as a keyword.

Specifically, when the word extraction section 142 outputs the word extraction result data shown in FIG. 83(a), the shortest distance calculator 231 extracts information for the extracted word node number "1" and the extracted word "Otemachi" in FIG. 83(a). Then, the shortest distance between the newly extracted word and the already extracted words is calculated by referring to the knowledge network data shown in FIG. 77 to FIG. 79. The shortest distance data of FIG. 85(a) does not have an already extracted word. Thus, the shortest distance calculator 231 stores the shortest distance data shown in FIG. 85(a) in the shortest distance data storage section 183.

Next, when the word extraction section 142 outputs the word extraction result data shown in FIG. 83(b), the shortest distance calculator 231 extracts the information of FIG. 83(b) at the extracted word node number "2" and the extracted word "Tozaisen" as well as the shortest distance data of FIG. 85(a). The shortest distance calculator 231 calculates the shortest distance between the newly extracted word "Tozaisen" and the already extracted word of FIG. 85(a) of "Otemachi" by verifying them with the knowledge network data shown in FIG. 77 to 79. As shown in FIG. 79, the shortest distance from "Otemachi" to "Tozaisen" is "2". Thus, the shortest distance calculator 231 outputs a distance calculation result of "2" to store the shortest distance data shown in FIG. 85(b) in the shortest distance data storage section 183.

The shortest distance calculator 231 also subjects the word extraction result data shown in FIG. 83(c) and FIG. 83(d) to the same processing to output the shortest distance data shown in FIG. 85(c) and FIG. 85(d).

Next, when the word extraction section 142 outputs the word extraction result data shown in FIG. 83(e), the shortest distance calculator 231 extracts the information of FIG. 83(*e*) for the extracted word node number "5" and the extracted word "system" as well as the shortest distance data of FIG. 85(*d*). The shortest distance calculator 231 calculates the shortest distance between the newly extracted word "system" and the already extracted words "Otemachi", "Tozaisen", "Otemachi", and "mobile phone" of FIG. 85(*d*) by verifying them with the knowledge network data shown in FIG. 77 to 79. In FIG. 79, the shortest distance between "system" and "Tozaisen" is 6. The shortest distance to be calculated shown in FIG. 84 has a set value of 4 and the shortest distance between "system" and "Tozaisen" is 4 or more. Thus, the shortest distance calculator 231 stops the calculation of the shortest distance between "system" and "Tozaisen" to output a value "N" as a calculation result to store, in the shortest distance data storage section 183, the shortest distance data shown in FIG. 85(*e*).

In this manner, the shortest distance calculator 231 also subjects the word extraction result data shown in FIG. 83(*f*) to FIG. 83(*h*) to the same processing to output the shortest distance data shown in FIG. 85(*f*) to FIG. 85(*h*). It is noted that, when the number of steps is higher than the distance calculation window width, order data for the shortest distance is overwritten.

The shortest distance can be calculated based on an algorithm such as known Dijkstra method or Warshall-Floyd. When these algorithms are not used, based on two node numbers to be calculated in the word extraction result data, the shortest distance between link attributes from both sides of an origin node number and an end point node number also may be calculated.

(Keyword Evaluation Processing S432)

Step S432 of FIG. 80 allows the keyword evaluator 232 to read, from the storage medium 114, the setting data of the keyword evaluation processing illustrated in FIG. 86. Then, with regards to each processing execution unit (step), the shortest distance data shown in FIG. 85(*a*) to FIG. 85(*h*) outputted from the shortest distance calculator 231 and the word evaluation data shown in FIG. 87(*a*) to FIG. 87(*h*) already outputted from the shortest distance calculator 231 are read to calculate a value obtained by evaluating the relation between the already extracted word and the newly extracted word.

The following section will describe a case in which the first text analysis method uses, as a "relation evaluation value" for evaluating the relation between words, the shortest distance data calculated by the shortest distance calculator 231 to use "accumulation number of each shortest distance" showing the accumulation number for each of the shortest distances at which the shortest distance between extracted words appears.

The setting data illustrated in FIG. 86 includes information for the set value of the evaluation window width for preparing the word evaluation data shown in FIG. 87(*a*) to FIG. 87(*h*) and the related information as well as information for the set value (extraction keyword accumulation number (the shortest distances 0 to 2)) required for the calculation of the keyword extraction result data shown in FIG. 88(*a*) to FIG. 88(*h*). It is noted that, in order to allow the keyword evaluator 232 to refer to the required shortest distance data, the evaluation window width has a set value equal to or lower than the set value of the distance calculation window width of FIG. 84. In the setting data of FIG. 86, the evaluation window width has a set value of 5, the extraction keyword accumulation number (the shortest distance 0) has a set value of 1, the extraction keyword accumulation number (the shortest distance 1) has a set value of 1, and the extraction keyword accumulation number (the shortest distance 2) has a set value of 2.

For example, when the evaluation window width has a set value of 5, a word evaluation data storage region is secured by the keyword evaluator 232 at the first activation. An example of the word evaluation data storage region is shown in FIG. 87(*a*). The word evaluation data includes a word (node name), a node number, and the calculation results of the accumulation numbers of the shortest distances among the respective five words.

The word evaluation data stores an index value used in a general network analysis (e.g., all node average distance, the number of links, distance centrality, mediation centrality) as node attribute data so that a keyword extraction condition can be switched depending on an index value of each word. Alternatively, an upper limit of the quantity of extracted keywords also may be provided so that keyword extraction is performed in an order of the index values.

For example, when the shortest distance calculator 231 outputs the shortest distance data shown in FIG. 85(*a*), the keyword evaluator 232 classifies pieces of data the shortest distances between newly extracted words and already extracted words based on the distance. The shortest distance data of data does not record therein the data of distance values. Thus, the keyword evaluator 232 stores, in the evaluation result storage section 184, the calculation result shown in FIG. 87(*a*) as word evaluation data.

Then, the keyword evaluator 232 reads the word evaluation data shown in FIG. 87(*a*) to extract, as a keyword, a word for which any of values of the calculation result of the accumulation number the shortest distance data is equal to or higher than the extraction keyword accumulation number (the shortest distances 0 to 2) illustrated in FIG. 86. In the example of FIG. 87(*a*), the shortest distance data is not recorded. Thus, the keyword evaluator 232 stores, as shown in FIG. 88(*a*), the keyword extraction result data of "extracted keyword node number: none" and "extracted keyword: none" in the keyword extraction result data storage section 185.

When the shortest distance calculator 231 outputs the shortest distance data shown in FIG. 85(*b*), the keyword evaluator 232 reads the word evaluation data of FIG. 85(*b*) to classify the shortest distances between the newly extracted words and the extracted words based on the distance. The shortest distance data of FIG. 85(*b*) stores therein the respective values of "2" showing the shortest distance between the node names "Otemachi" and "Tozaisen". Thus, the keyword evaluator 232 stores values of "1" as the word evaluation data of the node names "Otemachi" and "Tozaisen" in the region of the shortest distance 2 and stores the values as the word evaluation data shown in FIG. 87(*b*) in the evaluation result storage section 184.

Next, the keyword evaluator 232 reads the word evaluation data shown in FIG. 87(*b*) to extract, as a keyword, a word for which any values of the calculation result of the accumulation number of the shortest distance data is equal to or higher than the set value of the extraction keyword accumulation number (the shortest distances 0 to 2) illustrated in FIG. 86. In the example of FIG. 87(*b*), the value of "1" if inputted as the accumulation number of the shortest distance 2 of the node names "Otemachi" and "Tozaisen". However, since this value is smaller than the set value "2" of the extraction keyword accumulation number (distance 2) of FIG. 86, this word is not extracted as a keyword. As a result, the keyword evaluator 232 causes the keyword extraction result data storage section 185 store therein, as shown in FIG. 88(*b*), the keyword extraction result data of "extracted keyword node number: none" and "extracted keyword: none".

Furthermore, the shortest distance calculator 231 subjects the word extraction result data shown in FIG. 87(*c*) to FIG.

87(*h*) to the same processing to output the keyword extraction result data shown in FIG. 88(*c*) to FIG. 88(*h*). It is noted that, when the number of steps is higher than the distance calculation window width, order data for the shortest distance is overwritten.

<Related Word Extraction Processing S44>

Step S44 of FIG. 8 allows the related word extraction section 144 to read the "extracted keyword node number" in the keyword extraction result data shown in FIGS. 88(*a*) to 88(*h*) to search the node attribute data and the link attribute data of the knowledge network data shown in FIG. 77 to FIG. 79 to extract, as a related word, a word having a relatively short distance to the extracted keyword. The n, the result of extracting the related word is stored as text analysis result data in the text analysis result data storage section 186.

It is noted that the related word extraction section 144 can read the related word extraction condition setting data as illustrated in FIG. 89 to limit related words to be extracted. The limitation on related words can be performed by an "extraction distance number" showing the maximum distance from a keyword for which a related word is extracted and "upper limit of related word output for each distance" showing the maximum quantity of an output of related words for each distance from the keyword or example. FIG. 89 shows the extraction distance number of "2", an upper limit of the number of an output of related words for a distance 1 of "2", and an upper limit of the number of an output of related words for a distance 2 of "1".

The text analysis data includes, as shown in FIG. 90(*a*), word identification showing the identification information of a keyword and a related word, an extracted keyword node number, an extracted keyword name, and a node number to which the link extends. The text analysis data also may include, as data obtained by compressing knowledge network data by a keyword to be outputted and an extracted related word, each keyword or a node number of a node to which a link from the related word extends.

Furthermore, index values used in a general network analysis (e.g., all node average distance, the number of links, distance centrality, mediation centrality) also can be stored as node attribute data so that keywords can be extracted based on an order of the index values showing a priority of the extraction of related words. The text analysis data stored in the text analysis result data storage section 186 also may be outputted from the output section 1152 as a network image as shown in FIG. 79.

For example, when the keyword extraction section 143 outputs the keyword extraction result data shown in FIG. 88(*a*), the related word extraction section 144 extracts, based on the related word extraction condition setting data shown in FIG. 89, information for a keyword and a related word to store, in the text analysis result data storage section 186, the text analysis result data as shown in FIG. 90(*a*). In FIG. 88(*a*), no keyword exists and thus none of word identification, an extracted keyword node number, an extracted keyword, or a node number of a node to which the link extends is inputted. In the case of the keyword extraction result data shown in FIG. 88(*b*), a keyword or a related word is similarly not extracted for the text analysis data shown in FIG. 90(*b*).

Next, when the keyword extraction section 143 outputs the keyword extraction result data shown in FIG. 88(*c*), the related word extraction section 144 extracts, from the keyword extraction result data shown in FIG. 88(*c*), information for the extracted keyword "Otemachi" having the keyword node number "1" and the extracted keyword "Tozaisen" having the keyword node number "2". The maximum distance between "Otemachi" and "Tozaisen" for which extraction is performed is 2 that satisfies the set value condition of the extraction distance number shown in FIG. 89. Thus, the related word extraction section 144 extracts related words of "Otemachi" and "Tozaisen". The following section will describe a case where related words are outputted in an order of all node average distances of the knowledge network data shown in FIG. 77 to FIG. 79. In the related word extraction condition setting data of FIG. 89, the shortest distance of "2" corresponds to the upper limit of an output of related words of "1". Thus, the related word extraction section 144 extracts "Tokyo Metoro Tozaisen" from the knowledge network shown in FIG. 79 to store the text analysis result data as shown in FIG. 90(*c*) in the text analysis result data storage section 186. The same processing is repeated to allow the related word extraction section 144 calculate the text analysis result data shown in FIGS. 90(*d*) to 90(*h*).

-Second Text Analysis Method-

The second text analysis method according to the third example will be described with reference to the flowchart of and FIG. 91 to FIG. 94. It is noted that the respective processings shown in Steps S41, S42, and S 431 of FIG. 80 are substantially the same as those of the above-described first text analysis method. Thus, the following section will describe a keyword evaluation processing in Step S432 and a related word extraction processing in Step S44.

<Keyword Evaluation Processing S432>

Step S432 allows the keyword evaluator 232 to read, with regards to each processing execution unit (step), the shortest distance data shown in FIG. 85(*a*) to FIG. 85(*h*) outputted from a module for calculating the shortest distance between words and already outputted word evaluation data shown in FIG. 92(*a*) to FIG. 92(*h*) to calculate, based on the setting data shown in FIG. 91, a value obtained by evaluating the relation between the newly extracted word and the already extracted word to store the new word evaluation data, for each step, in the evaluation result storage section 184.

The word evaluation data also may store therein index values used for a general network analysis (e.g., all node average distance, the number of links, distance centrality, mediation centrality) so that a keyword extraction condition can be switched depending on an index value of each word. Alternatively, an upper limit of the quantity of extracted keywords also may be provided so that keyword extraction is performed in an order of the index values.

The following section will describe, with reference to FIG. 91 to FIG. 94, e a case where an "average distance" of the shortest distance data calculated by the shortest distance calculator 231 and "shortened distance" based on the average distance are calculated as a relation evaluation value.

The setting data includes, as shown in FIG. 91, a set value and the related information of an evaluation window width, the set value of "number of distances to be averaged" required for the calculation of the average distance of the shortest distance by using the shortest distance data shown in FIG. 85(*a*) to FIG. 85(*h*), and the set values of "number of distances to be averaged" and "to-be-extracted shortened distance" required for keyword extraction (which will be described later). The keyword evaluator 232 extracts the word as a keyword when the word satisfies the setting data of the keyword extraction processing shown in the "number of distances to be averaged" or "to-be-extracted shortened distance" set in FIG. 91 (i.e., "when the word has a sufficiently short average distance to another word in the evaluation window (sufficiently short average distance of the shortest distance data) to have a close relation between the words" or "when a difference between an average distance between the word and another words in the evaluation window and an average distance between the word and all words on the knowledge network has a sufficiently high value (shortened distance) to show s close relation with the word in the evaluation window").

The example shown in FIG. 91 shows a case in which the evaluation window value has a value of 5, the number of average distance calculation results has a value of 2, the number of distances to be averaged has a value of 1.5, and the to-be-extracted shortened distance has a value of 3.0. It is noted that, in order to allow the keyword evaluator 232 to refer to required shortest distance data, the evaluation window width has a set value equal to or lower than the set value of the distance calculation window width of FIG. 84.

For example, when the evaluation window width has a set value of 5, the keyword evaluator 232 secures a word evaluation data storage region at the first activation. An example of the word evaluation data storage region is shown in FIG. 92(*a*). The word evaluation data includes a word (node name), a node number, average distances among the respective words, and the result of calculating a shortened distance.

In the calculation of an average of the shortest distances, the keyword evaluator 232 reads information for the number of distances to be averaged illustrated in FIG. 91. Then, when the evaluation window shows the shortest distance calculation result in a quantity higher than that of the set value, the shortest distance calculation results of the higher number of the calculation of distances to be averaged (having a shorter distance) are sequentially subjected to the calculation of an average distance. When the distance calculation result is 0, this calculation result is subjected to the average calculation and the distance calculation result of N is excluded from the average calculation.

For example, when the shortest distance calculator 231 outputs the shortest distance data shown in FIG. 85(*a*), the keyword evaluator 232 calculates, based on the set value of the number of average distance calculation results illustrated in FIG. 91, an average value of data of the shortest distance between a newly extracted word and an already extracted word. The shortest distance data of FIG. 85(*a*) does not record the value of the shortest distance data to result in the average distance N. Since the shortened distance stores a value N as an average distance, the distance is calculated. As a result, the keyword evaluator 232 stores, in the evaluation result storage section 184, the word evaluation data shown in FIG. 92(*a*).

Then, the keyword evaluator 232 reads the word evaluation data shown in FIG. 92(*a*) to extract, based on the set values of the number of distances to be averaged and the to-be-extracted shortened distance of FIG. 91. In the example of FIG. 92(*a*), the average distance is N and the shortened distance is not recorded. Thus, the keyword evaluator 232 stores, as shown in FIG. 93(*a*), the keyword extraction result data of "extracted keyword node number: none" and "extracted keyword: none" in the keyword extraction result data storage section 185.

When the shortest distance calculator 231 outputs the shortest distance data shown in FIG. 85(*b*), the keyword evaluator 232 reads the set value of the number of average distance calculation results illustrated in FIG. 91 to calculate an average value of the data of the shortest distance between a newly extracted word and an already extracted word. The shortest distance data of FIG. 85(*b*) stores the value of 2 of the shortest distance between node names "Otemachi" and "Tozaisen", respectively. Thus, the keyword evaluator 232 calculates the respective average distances and shortened distances to store, in the word evaluation data shown in FIG. 92(*b*), an average distance of "2.00" and a shortened distance of "1.478" for the node name "Otemachi" and an average distance of "2.00" and a shortened distance of "3.217" for the node name "Tozaisen" to store the word evaluation data in the evaluation result storage section 184.

Then, the keyword evaluator 232 reads the word evaluation data shown in FIG. 92(*b*) to extract a keyword based on the set values of the number of distances to be averaged and the to-be-extracted shortened distance shown in FIG. 91. In the example of FIG. 92(*a*), the node name "Tozaisen" has a shortened distance of "3.217" that is equal to or higher than the set value of "3.0" of the to-be-extracted shortened distance of FIG. 91. Thus, the node name "Tozaisen" is extracted as a keyword. Thus, as shown in FIG. 93(*b*), the keyword extraction result data of "extracted keyword node number: 2" and "extracted keyword: Tozaisen" is stored in the keyword extraction result data storage section 185.

The shortest distance calculator 231 in each step uses the shortest distance data shown in FIG. 85(*c*) to FIG. 85(*h*) to calculate an average distance and a shortened distance to subsequently calculate the word evaluation data shown in FIG. 92(*c*) to FIG. 92(*h*) to output, based on the word evaluation data shown in FIG. 92(*c*) to FIG. 92(*h*), the keyword extraction result data shown in FIG. 93(*c*) to FIG. 93(*h*). It is noted that, when the distance calculation window width is higher than the number of steps, order data for the shortest is overwritten.

<Related Word Extraction Processing S44>

Step S44 of FIG. 80 allows the related word extraction section 144 reads "extracted keyword node number" in the keyword extraction result data shown in FIG. 93(*a*) to FIG. 93(*h*) to search node attribute data and link attribute data of the knowledge network data shown in FIG. 77 to FIG. 78 to extract a word adjacent to the extracted keyword as a related word. Then, the result or extracting the related word as text analysis result data is stored in the text analysis result data storage section 186.

For example, when the keyword extraction section 143 outputs the keyword extraction result data shown in FIG. 93(*a*), the related word extraction section 144 extracts information for a keyword and a related word based on the setting data regarding the related word extraction condition shown in FIG. 89 to store, in the text analysis result data storage section 186, the text analysis result data as shown in FIG. 94(*a*). In FIG. 93(*a*), no keyword exists. Thus, none of word identification, an extracted keyword node number, an extracted keyword, or a node number of a node to which the link extends is inputted.

Next, when keyword extraction section 143 outputs the keyword extraction result data shown in FIG. 93(*b*), the related word extraction section 144 extracts, from the keyword extraction result data shown in FIG. 93(*b*), information for the extracted keyword "Tozaisen" having the keyword node number 2. Since FIG. 93(*b*) shows only one keyword, a related word is not extracted. As a result, the related word extraction section 144 stores the text analysis result as shown in FIG. 94(*b*) in the text analysis result data storage section 186.

Next, when the keyword extraction section 143 outputs the keyword extraction result data shown in FIG. 93(*c*), the related word extraction section 144 extracts, from the keyword extraction result data shown in FIG. 93(*c*), information for the extracted keyword "Otemachi" having the keyword node number "1" and the extracted keyword "Tozaisen" having the keyword node number "2". The words "Otemachi" and "Tozaisen" to-be-extracted have therebetween the maximum distance that satisfies the set value condition of the extraction distance number shown in FIG. 89. Thus, the related word extraction section 144 extracts a related word of "Otemachi" and "Tozaisen". In the related word extraction condition setting data of FIG. 89, the upper limit number of the related word output is 1 when the shortest distance is 2. Thus, the elated word extraction section 144 extracts, from the knowledge network shown in FIG. 79, "Tokyo Metoro Tozaisen" to store the text analysis result data as shown in FIG. 94(*c*) in the text analysis result data storage section 186. The same processing is repeated to allow the elated word extraction section 144 to calculate the text analysis result data shown in FIG. 94(*d*) to FIG. 94(*h*).

In order to assist the understanding of dialogue contents, the search of related information of dialogue contents, and the enrichment of dialogue contents, in the communication using an electronic mail, an instant message, or telephone for example, (1) presentation of an important word (keyword) included in sent or received and (2) presentation of a related word of a keyword are effective.

On the other hand, text information sent or received in the communication or a speech recognition result may include a wrong word due to an error or a typographical error or a false recognition for example (hereinafter referred to as "error word"). Thus, in order to execute the above-described (1) and (2) with a high accuracy, it is desirable that (3) an error word is suppressed from being extracted as a keyword or a related word.

As an analysis method that can present a related word of a word, a technique has been known in which data including a semantic relation between a word and a word or a co-occurrence relation is previously prepared to analyze a word (related word) that has the shortest distance to an input word and that has an importance equal to or higher than a threshold value. Another technique also has been known by which two types of pieces of data including a semantic relation between a word and a word and data including the co-occurrence relation are used to improve the extraction accuracy of the related word.

Furthermore, another technique also has been known by which a plurality of sentence examples are previously prepared to calculate the shortest distance between a word constituting an input sentence and a word constituting the prepared sentence example to evaluate the similarity between the input sentence and the sentence example to select a specific sentence example. Then, a word in the input sentence corresponding to a word constituting the selected specific sentence example is converted to correct an error word in the input sentence.

However, these information search methods cannot evaluate the importance of an input word itself or the correctness as a term. Thus, a related word has not been suppresses from being extracted from a word or an error word having a low importance.

A technique has been known by which a previously prepared sentence example can be compared with an input sentence to correct an error word included in the input sentence. However, this technique requires a sentence example corresponding to an input sentence to be previously prepared and thus cannot analyze complicated information as used for a general dialogue. Furthermore, this technique has no function to extract a keyword from input sentence or to present a related word based on the extracted keyword. Thus, this technique could not exclude an error word for example from an enormous amount included in the input sentence to extract or to present information required for the understanding and search of dialogue contents for example.

On the other hand, according to the third example, the shortest distance calculator 231 of the keyword extraction section 143 calculates shortest distance between words included in text data to use the keyword evaluator 232 to evaluate, based on the data of the shortest distance, the relation between the words. The processing for calculating the shortest distance data inputs a value of "N (not found)" to the shortest distance data for which the distance is equal to or higher than a fixed distance and thus a word having a long distance in the semantic relation (i.e., a word having a low importance or an error word) is not considered as a candidate of the evaluation of the word relation. Thus, a word (word having a high importance) having a close semantic relation can be extracted as a keyword from text data with a higher priority and an error word for example can be suppressed from being extracted as a keyword. This can eliminate a false recognition, an error conversion, an error, and a typographical error included in text data to establish a text analysis system and an analysis method that can evaluate the correctness of a term.

Furthermore, the related word extraction section 144 also can be used to extract based on the keyword extraction results shown in FIG. 88(*a*) to FIG. 88(*h*) and FIG. 93(*a*) to FIG. 93(*h*), relates words as shown in FIG. 90(*a*) to FIG. 90(*h*) and FIG. 94(*a*) to FIG. 94(*h*).

Furthermore, according to the third example of the present invention, knowledge network data stored in the knowledge network data storage section 116 eliminates a need for preparing sentence examples for the extraction of a keyword or a related word. Thus, a correct keyword and related word that have a high importance and that are correct as a term can be presented to information sent and received in the communication using an electronic mail, an instant message, and a telephone for example. This can contribute to the understanding of dialogue contents, the search of related information of dialogue contents, and the enrichment of dialogue contents.

Other Embodiments

As described above, the present invention has been described based on the first to fifth embodiments. However, the description and drawings constituting a part of this disclosure should not be understood as limiting this invention. Various substitute embodiments, illustrative embodiments, and operation techniques will be clear for those skilled in the art over this disclosure.

The second example of the fifth embodiment has illustrated the keyword extraction server 107 including the different meaning word meaning determination module 111 and the subject extraction processing module 117. The third example has illustrated the keyword extraction server 107 including the different meaning word meaning determination module 111 and the related word extraction processing module 140. However, the keyword extraction server 107 also may have another structure to achieve a fixed objective by having a structure including only the subject extraction processing module 117 or only the related word extraction processing module 140.

Figure 95:
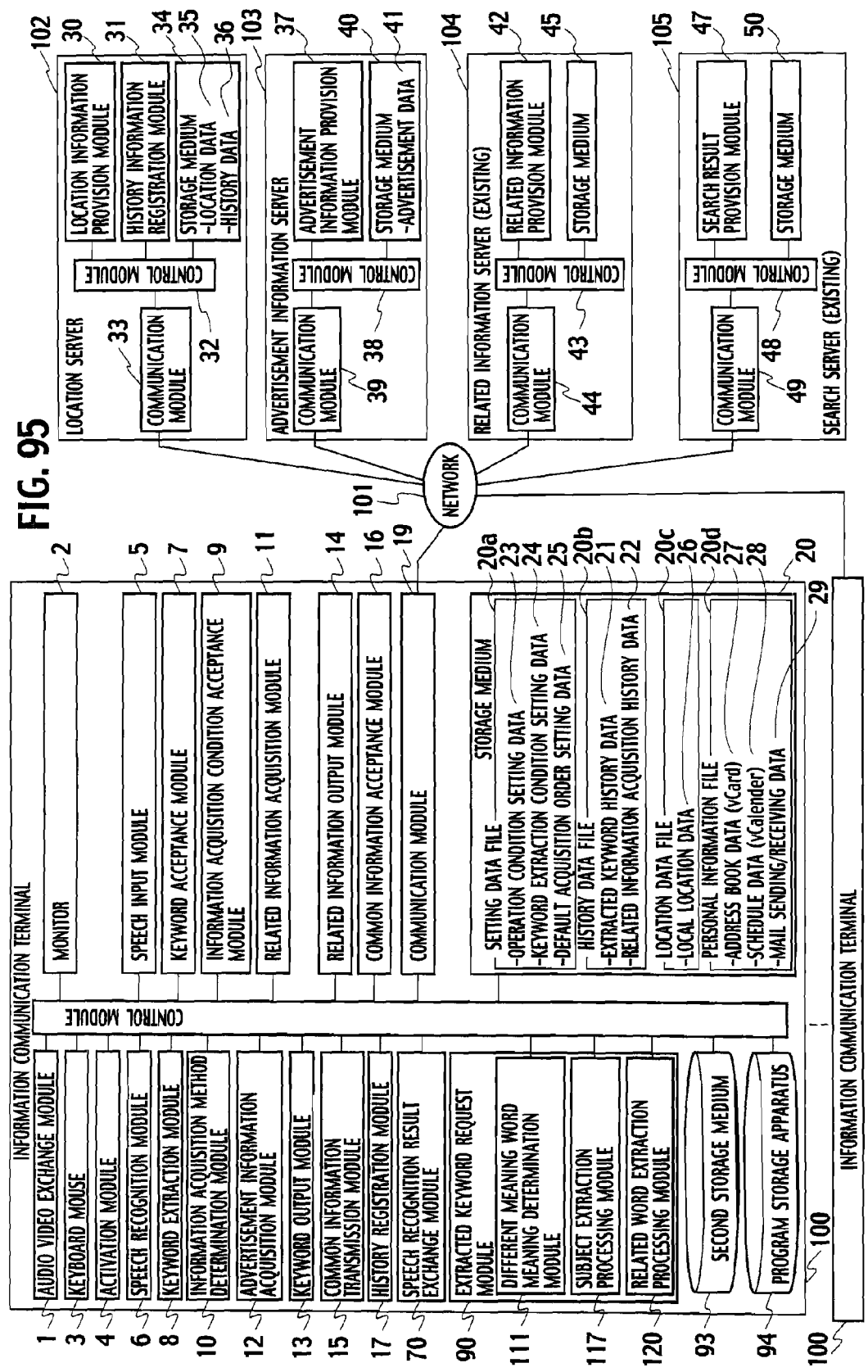
FIG. 95 is a structure diagram explaining the entire structure of an information communication system according to the other embodiment of the present invention.

Furthermore, the information communication terminal 100 shown in the first to third examples of the fifth embodiment provides the different meaning word meaning determination module 111, the subject extraction processing module 117, and the related word extraction processing module 140 in the keyword extraction module 8 as shown in FIG. 95. Thus, when the keyword extraction module 8 extracts a keyword based on the keyword extraction condition setting data 24 from word information (word, word class) acquired from the speech recognition module 6, a dictionary called as "knowledge network" showing a semantic relation among a plurality of words can be used to present an extracted keyword and a related word of a subject suitable for the dialogue contents.

Figure 96:
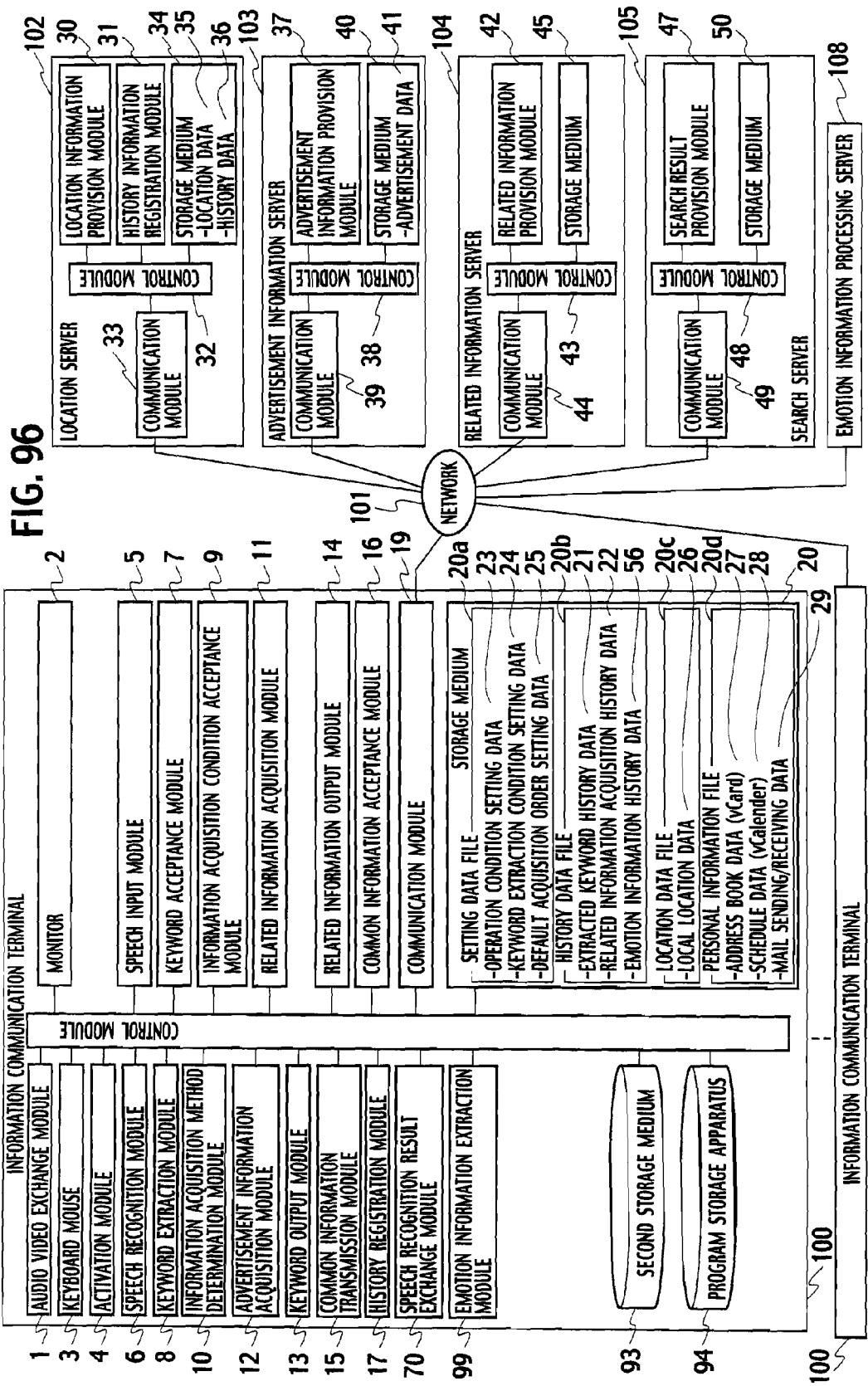
FIG. 96 is a structure diagram explaining the entire structure of the information communication system according to the other embodiment of the present invention.

For example, another structure as shown in FIG. 96 also may be used. In this structure, the emotion information processing server 108 for performing substantially the same processing as that of the emotion information processing module 51 shown in FIG. 26 is connected to the network 101 and the information communication terminal 100 includes the emotion information extraction request module 99. The emotion information extraction request module 99 also may extract the result of processing emotion information from an information processing server connected via the network 101.

As described above, the present invention can include various embodiments not described herein for example. Thus, the technical scope of the present invention is determined only based on specific matters of the invention according to the scope of the claims applicable from the above.

INDUSTRIAL APPLICABILITY

An information communication terminal, an information communication system, an information communication method, an information communication program, and a recording medium having a record thereof of the present invention can be used for industries related to a data processing technique to acquire a communication technique (e.g., IP telephone, IP television telephone), information retained by a server on the network, and information on an user terminal to display the information on an user terminal screen.

The invention claimed is:

1. An information communication terminal configured to exchange at least speech information with a plurality of information communication terminals, comprising:
a speech recognition module configured to recognize the speech information to identify a plurality of words based on the recognized speech information;
a storage medium configured to store keyword extraction condition setting data in which conditions for extracting keywords are set;
a keyword extraction module configured to read the keyword extraction condition setting data to extract a plurality of keywords from the plurality of words;
a subject extraction processing module configured to:
associate the plurality of words read by the keyword extraction module with knowledge network data in which the plurality of keywords and a route among the plurality of keywords are described in a network form,
generate a plurality of word pairs in a predetermined order from the plurality of keywords,
extract the shortest route connecting words in each word pair from the knowledge network data,
give point values to each word on each of the shortest routes,
count the point values given to the respective words, and extract a word having a relatively high point value as a subject word;
a related information acquisition module configured to acquire related information related to the plurality of keywords; and
a related information output module configured to provide the related information to a monitor.

2. The information communication terminal according to claim 1, further comprising:
a keyword output module configured to provide the plurality of keywords to the monitor; and
an information acquisition condition acceptance module configured to accept keywords selected from the plurality of keywords and an input of an information acquisition condition of the related information,
wherein the related information acquisition module reads the accepted keyword and the accepted information acquisition condition to acquire the related information.

3. The information communication terminal according to claim 2, further comprising:
a common information module configured to share at least one of the information acquisition condition and the related information with another information communication terminal.

4. The information communication terminal according to claim 1, further comprising:
a speech recognition result exchange module configured to exchange a speech recognition result including the plurality of words specified based on the speech information with another information communication terminal.

5. The information communication terminal according to claim 1, further comprising:
an emotion recognition module configured to recognize emotion information acquired from the speech information;
an emotion information transmission module configured to transmit the emotion information to another information communication terminal; and
an emotion information reception module configured to receive emotion information sent from the another information communication terminal.

6. The information communication terminal according to claim 1, further comprising:
a warning display module configured to compare a warning object keyword set stored in the storage medium with the plurality of keywords to calculate an appearance number at which a keyword included in the warning object keyword set appears to display a warning when the appearance number is equal to or higher than a previously-set number.

7. The information communication terminal according to claim 1, further comprising:
a communication cutoff module configured to compare a warning object keyword set stored in the storage medium with the plurality of keywords to calculate an appearance number at which a keyword included in the warning object keyword set appears to cut the communication with the plurality of information communication terminals when the appearance number is equal to or higher than a previously set number.

8. The information communication terminal according to claim 1, further comprising:
a speech information recording module configured to compare a warning object keyword set stored in the storage medium with the plurality of keywords to calculate an appearance number at which a keyword included in the warning object keyword set appears to start the recording of the speech information when the appearance number is equal or higher than a previously set number.

9. The information communication terminal according to claim 1, wherein the keyword extraction module further comprises:
a different meaning word meaning determination module, including:
a different meaning word determination section configured to determine whether or not the plurality of words include a homonym or a homographe, by using knowledge network data in which vocabulary information showing a correspondence between a vocabulary and a reading sound of the vocabulary and link information showing a distance relation of the vocabulary; and a meaning determination section configured to determine the meaning of the word having a different meaning, based on the distance between the plurality of words.

10. The information communication terminal according to claim 9, wherein the different meaning word determination section further includes:

a knowledge network data check section configured to refer to the vocabulary information and the link information;

a different meaning word existence check section configured to refer to a result of checking the knowledge network data check section to determine whether a homonym or a homographe exists or not; and a vocabulary acquisition section configured to refer, when a homonym or a homographe exists, to the vocabulary information to acquire all vocabulary having an identical notation or reading sound with that of the word determined as a homonym or a homographe.

11. The information communication terminal according to claim 10, wherein the meaning determination section further includes:

a distance determination section configured to compare the respective pieces of vocabulary acquired by the vocabulary acquisition section with vocabulary in a word collection other than a homonym or a homographe to investigate whether a distance between pieces of vocabulary is within a predetermined distance or not;

a distance count section configured to count a distance between pieces of vocabulary for the respective pieces of vocabulary; and a maximum count number value determination section configured to determine vocabulary having the maximum count number as vocabulary of a homonym or a homographe.

12. The information communication terminal according to claim 1, wherein the subject extraction processing module gives, when the words have therebetween a plurality of the shortest routes, points to words existing on the plurality of the shortest routes.

13. The information communication terminal according to claim 1, wherein the subject extraction processing module compares the shortest route with a previously set threshold value to give the point only to a word existing on the shortest route having a distance shorter than the threshold value.

14. The information communication terminal according to claim 1, wherein the subject extraction processing module gives higher points to a word existing on the shortest route that has a shorter distance to a word positioned at an end of the shortest route.

15. The information communication terminal according to claim 14, wherein the subject extraction processing module reads a previously set quantity to extract, from among words existing on the shortest route, words having the higher points in the quantity.

16. The information communication terminal according to claim 1, wherein the subject extraction processing module reads a previously set threshold value to extract a word having the point equal to or higher than a threshold value.

17. The information communication terminal according to claim 1, wherein the subject extraction processing module calculates, depending on a distance of the shortest route, an evaluation value of a word positioned at an end of the shortest route to give the word existing on the shortest distance a point considering the evaluation value.

18. The information communication terminal according to claim 17, wherein the subject extraction processing module gives a higher point to a word existing on the shortest distance as the shortest route has a shorter distance.

19. The information communication terminal according to claim 17, wherein the subject extraction processing module gives a higher point to a word of words existing on the shortest route that has a shorter distance to the word positioned at an end of the shortest route.

20. The information communication terminal according to claim 1, wherein the keyword extraction module uses knowledge network data in which data representing a semantic relation between two words by a distance are prepared for a plurality of words to calculate data of the shortest distance between extracted words to calculate, while excluding the shortest distance data equal to or higher than a fixed distance, a relation between extracted words to extract the keyword based on the calculation result of the relation.

21. The information communication terminal according to claim 20, wherein the keyword extraction module accumulates, with regards to the respective extracted words, appearance numbers of the shortest distance to another extracted word for each the shortest distance to calculate the relation between the words to extract, as the keyword, a word for which an accumulation value of the shortest distance is equal to or higher than a set value.

22. The information communication terminal according to claim 20, wherein the keyword extraction module calculates, with regards to the respective extracted words, an average distance of the shortest distance data to calculate a relation between the words to extract, as the keyword, a word for which the average distance is equal to or higher than a set value.

23. The information communication terminal according to claim 20, wherein the keyword extraction module calculates, with regards to the respective extracted words, a difference between an average distance between words shown by the knowledge network data and an average distance of the shortest distance data to calculate a relation between words to extract, as the keyword, a word for which the difference is equal to or higher than a set value.

24. The information communication terminal according to claim 23, wherein the keyword extraction module reads the keyword to refer to the knowledge network data to extract a related word for having a distance from the keyword equal to or lower than a set value.

25. The information communication terminal according to claim 23, wherein the related word extraction module reads an upper limit value of an extraction quantity of the related word to extract the related words in a quantity corresponding to the upper limit value.

26. An information communication system connected with a plurality of information communication terminals via a network, one of the information communication terminals includes:

a speech recognition module configured to recognize at least speech information sent via the network to identify a plurality of words, based on the recognized speech information;

a storage medium configured to store keyword extraction condition setting data in which conditions for extracting keywords are set;

a keyword extraction module configured to read the keyword extraction condition setting data to extract a plurality of keywords from the plurality of words;

a related information acquisition module configured to acquire related information related to the plurality of keywords; and a related information output module configured to provide related information to a monitor, wherein the keyword extraction module includes:

a subject extraction processing module configured to:

associate the plurality of words extracted from the speech information sent via the network with knowledge network data in which the plurality of keywords and a route among the plurality of keywords are described in a network form, generate a plurality of word pairs in a predetermined order from the plurality of keywords, extract the shortest route connecting words in each word pair from the knowledge network data, give point values to words on each of the shortest routes, count the point values given to the respective words, and extract a word having a relatively high point value as a subject word.

27. The information communication system according to claim 26, wherein the information terminal further includes:

a warning information acquisition module configured to read operation condition setting data stored in the storage medium to acquire warning information for displaying a warning via the network, when the plurality of keywords extracted by the keyword extraction module include a specific keyword.

28. The information communication system according to claim 26, wherein the information terminal further includes:

a keyword extraction request means configured to read operation setting condition data stored in the storage medium and the keyword extraction condition setting data to request a keyword extraction server connected via the network to extract the keyword.

29. The information communication system according to claim 26, the keyword extraction means further comprises:

a different meaning word meaning determination module, including:

a different meaning word determination section configured to determine whether or not the plurality of words include a homonym or a homographe, by using knowledge network data in which vocabulary information showing a correspondence between a vocabulary and a reading sound of the vocabulary and link information showing a distance relation of the vocabulary; and a meaning determination section configured to determine the meaning of the word having a different meaning, based on the distance between the plurality of words.

30. The information communication system according to claim 26, wherein the keyword extraction means uses the knowledge network data to calculate the shortest distance data between the plurality of extracted words to calculate, while excluding the shortest distance data equal to or higher than a fixed distance, a relation between extracted words to extract the keyword based from the calculation result of the relation.

31. An information communication method for using an information communication terminal including a speech recognition module, a storage medium, a keyword extraction module, a subject extraction module, a related information acquisition module, a related information output module, and a monitor to exchange at least speech information with another information communication terminal, the method comprising:

recognizing a plurality of words in the speech information by the speech recognition module;

storing keyword extraction condition setting data including conditions for extracting keywords in the storage medium;

reading the keyword extraction condition setting data from the storage medium and extracting a plurality of keywords from the plurality of words by the keyword extraction module;

associating the plurality of words read by the keyword extraction module with knowledge network data in which the plurality of keywords and a route among the plurality of keywords are described in a network form;

generating a plurality of word pairs in a predetermined order from the plurality of keywords;

extracting the shortest route connecting words in each word pair from the knowledge network data;

giving point values to words on each of the shortest routes;

counting the point values given to the respective words;

extracting a word having a relatively high point value as a subject word;

acquiring related information relating to the plurality of keywords by the related information acquisition module; and providing the related information to the monitor by the related information output module.

32. A non-transitory computer-readable storage medium storing an information communication program for causing an information communication terminal including a speech recognition module, a storage medium, a keyword extraction module, a subject extraction module, a related information acquisition module, a related information output module, and a monitor to exchange at least speech information with another information communication terminal, to execute an information communication method comprising:

recognizing a plurality of words in speech information by the speech recognition module;

storing keyword extraction condition setting data including conditions for extracting keywords in the storage medium;

reading the keyword extraction condition setting data from the storage medium and extract a plurality of keywords from the plurality of words by the keyword extraction module;

associating the plurality of words read by the keyword extraction module with knowledge network data in which the plurality of keywords and a route among the plurality of keywords are described in a network form;

generating a plurality of word pairs in a predetermined order from the plurality of keywords;

extracting the shortest route connecting words in each word pair from the knowledge network data;

giving point values to words on each of the shortest routes;

counting the point values given to the respective words;

extracting a word having a relatively high point value as a subject word;

acquiring related information related to the plurality of keywords by the related information acquisition module; and providing the related information by the related information output module.

* * * * *